(12) United States Patent
Qaderi et al.

(10) Patent No.: US 11,360,431 B2
(45) Date of Patent: Jun. 14, 2022

(54) RECONSTRUCTING OBJECTS WITH DISPLAY ZERO ORDER LIGHT SUPPRESSION

(71) Applicant: Pacific Light & Hologram, Inc., South Pasadena, CA (US)

(72) Inventors: Kamran Qaderi, Pasadena, CA (US); Stephen John Hart, San Juan Capistrano, CA (US); Robert Alan Hess, Mesa, AZ (US); Jonathan Seamus Blackley, South Pasadena, CA (US)

(73) Assignee: Pacific Light & Hologram, Inc., South Pasadena, CA (US)

( * ) Notice: Subject to any disclaimer, the term of this patent is extended or adjusted under 35 U.S.C. 154(b) by 0 days.

(21) Appl. No.: 17/478,559

(22) Filed: Sep. 17, 2021

(65) Prior Publication Data
US 2022/0083002 A1 Mar. 17, 2022

Related U.S. Application Data

(63) Continuation of application No. PCT/US2021/050271, filed on Sep. 14, 2021, and a
(Continued)

(51) Int. Cl.
*G03H 1/22* (2006.01)
*G03H 1/00* (2006.01)
(Continued)

(52) U.S. Cl.
CPC ......... *G03H 1/2202* (2013.01); *G02B 5/1814* (2013.01); *G02B 5/3025* (2013.01);
(Continued)

(58) Field of Classification Search
CPC .. G03H 1/2202; G03H 1/2286; G03H 1/2294; G03H 2223/20; G03H 2223/22;
(Continued)

(56) References Cited

U.S. PATENT DOCUMENTS

| 4,586,780 A | 5/1986 | Chern et al. |
| 5,016,950 A | 5/1991 | Smith |

(Continued)

FOREIGN PATENT DOCUMENTS

| CN | 101241603 | 8/2008 |
| CN | 104776865 | 7/2015 |

(Continued)

OTHER PUBLICATIONS

Ichikawa et al., "Realistic expression for full-parallax computer-generated holograms with the ray-tracing method," Optical Society of America, Nov. 16, 2012, 9 pages.
(Continued)

*Primary Examiner* — Jade R Chwasz
(74) *Attorney, Agent, or Firm* — Fish & Richardson P.C.

(57) ABSTRACT

Methods, apparatus, devices, and systems for reconstructing three-dimensional objects with display zero order light suppression are provided. In one aspect, a method includes illuminating a display with light at an incident angle, a portion of the light illuminating display elements of the display, modulating the display elements of the display with a hologram corresponding to holographic data to diffract the portion of the light to form a holographic scene corresponding to the holographic data, and redirecting display zero order light away from the holographic scene to suppress the display zero order light in the holographic scene. The display zero order light includes reflected light from the display. The light includes a plurality of different colors of light.

30 Claims, 79 Drawing Sheets

Related U.S. Application Data continuation of application No. PCT/US2021/050275, filed on Sep. 14, 2021.

(60) Provisional application No. 63/079,707, filed on Sep. 17, 2020, provisional application No. 63/149,964, filed on Feb. 16, 2021.

(51) Int. Cl.

| | | |
|---|---|---|
| *G02B 5/30* | (2006.01) | |
| *G02B 27/09* | (2006.01) | |
| *G02B 27/30* | (2006.01) | |
| *G02B 27/42* | (2006.01) | |
| *H04N 13/346* | (2018.01) | |
| *G02B 30/10* | (2020.01) | |
| *G02B 5/18* | (2006.01) | |
| *G03H 1/26* | (2006.01) | |
| *H04N 13/30* | (2018.01) | |
| *G02F 1/133* | (2006.01) | |
| *G02F 1/1335* | (2006.01) | |
| *H04N 13/275* | (2018.01) | |
| *G02B 30/52* | (2020.01) | |
| *G02B 30/40* | (2020.01) | |
| *G02B 27/01* | (2006.01) | |
| *G06T 19/00* | (2011.01) | |

(52) U.S. Cl.
CPC ..... *G02B 27/0103* (2013.01); *G02B 27/0927* (2013.01); *G02B 27/30* (2013.01); *G02B 27/4205* (2013.01); *G02B 30/10* (2020.01); *G02B 30/40* (2020.01); *G02B 30/52* (2020.01); *G02F 1/13306* (2013.01); *G02F 1/133514* (2013.01); *G02F 1/133528* (2013.01); *G03H 1/0005* (2013.01); *G03H 1/2205* (2013.01); *G03H 1/2286* (2013.01); *G03H 1/2294* (2013.01); *G03H 1/268* (2013.01); *G06T 19/006* (2013.01); *H04N 13/275* (2018.05); *H04N 13/30* (2018.05); *H04N 13/346* (2018.05); *G03H 2001/0088* (2013.01); *G03H 2001/2215* (2013.01); *G03H 2001/2221* (2013.01); *G03H 2223/20* (2013.01); *G03H 2223/22* (2013.01); *G03H 2223/23* (2013.01); *G03H 2223/24* (2013.01)

(58) Field of Classification Search
CPC ....... G03H 2223/23; G03H 2001/2231; G03H 2001/2207; G03H 2001/2292; G03H 2222/13; G03H 2222/31; G03H 2222/34; G03H 2225/60; G03H 2225/61; G03H 2225/52
USPC ......................................... 359/32, 27, 22, 11
See application file for complete search history.

(56) References Cited

U.S. PATENT DOCUMENTS

| | | | |
|---|---|---|---|
| 5,144,288 A | 9/1992 | Hamada et al. | |
| 5,347,375 A | 9/1994 | Saito et al. | |
| 5,668,648 A | 9/1997 | Saito et al. | |
| 5,719,600 A | 2/1998 | Alcorn | |
| 5,753,349 A | 5/1998 | Boswell | |
| 5,825,448 A | 10/1998 | Bos et al. | |
| 6,256,120 B1 | 7/2001 | Suzuki et al. | |
| 6,288,803 B1 | 9/2001 | Hattori et al. | |
| 6,580,388 B1 | 6/2003 | Stoyanov et al. | |
| 6,606,095 B1 | 8/2003 | Lengyel et al. | |
| 7,103,099 B1 | 9/2006 | Paz et al. | |
| 7,277,209 B1 | 10/2007 | Grossetie et al. | |
| 7,660,039 B2 | 2/2010 | Santoro et al. | |
| 7,837,361 B2 | 11/2010 | Santoro et al. | |
| 8,047,673 B2 | 11/2011 | Santoro | |
| 8,218,211 B2 | 7/2012 | Kroll et al. | |
| 8,233,204 B1 | 7/2012 | Robbins et al. | |
| 8,400,696 B2 | 3/2013 | Ikeda et al. | |
| 8,786,925 B2 | 7/2014 | Hart et al. | |
| 8,976,081 B2 | 3/2015 | Rao et al. | |
| 9,515,099 B2 | 12/2016 | Kwon et al. | |
| 9,990,877 B2 | 6/2018 | Kim | |
| 10,098,565 B2 | 10/2018 | Brannan et al. | |
| 10,156,725 B2 | 12/2018 | TeKolste et al. | |
| 10,379,496 B2 | 8/2019 | Onural | |
| 10,445,556 B2 | 10/2019 | Vilenskii et al. | |
| 10,475,370 B2 | 11/2019 | Spitzer et al. | |
| 10,534,209 B1 | 1/2020 | Fu et al. | |
| 10,853,999 B2 | 12/2020 | Blackley et al. | |
| 10,854,000 B2 | 12/2020 | Blackley et al. | |
| 10,867,439 B2 | 12/2020 | Blackley et al. | |
| 10,878,622 B2 | 12/2020 | Blackley et al. | |
| 10,878,623 B2 | 12/2020 | Blackley et al. | |
| 10,902,673 B2 | 1/2021 | Blackley et al. | |
| 10,909,756 B2 | 2/2021 | Blackley et al. | |
| 10,964,103 B2 | 3/2021 | Blackley et al. | |
| 2001/0024177 A1* | 9/2001 | Popovich | G02B 5/32 345/8 |
| 2003/0081154 A1 | 5/2003 | Coleman et al. | |
| 2003/0151809 A1 | 8/2003 | Takahashi | |
| 2004/0004586 A1 | 1/2004 | Endo et al. | |
| 2004/0066547 A1 | 4/2004 | Parker et al. | |
| 2004/0094699 A1 | 5/2004 | Goto et al. | |
| 2004/0105091 A1 | 6/2004 | Zaidi et al. | |
| 2005/0078374 A1 | 4/2005 | Taira et al. | |
| 2005/0122454 A1 | 6/2005 | Sharp | |
| 2006/0239171 A1 | 10/2006 | Ooi et al. | |
| 2006/0279528 A1 | 12/2006 | Schobben et al. | |
| 2007/0024999 A1* | 2/2007 | Crossland | G03H 1/2286 359/859 |
| 2007/0242325 A1 | 10/2007 | Kitamura | |
| 2007/0257943 A1 | 11/2007 | Miller et al. | |
| 2008/0037131 A1 | 2/2008 | Steenblik et al. | |
| 2008/0247128 A1 | 10/2008 | Khoo | |
| 2008/0300478 A1 | 12/2008 | Zuhars et al. | |
| 2009/0015922 A1 | 1/2009 | St. Hilaire | |
| 2009/0128562 A1 | 5/2009 | McCombe et al. | |
| 2009/0303597 A1 | 12/2009 | Miyawaki et al. | |
| 2010/0085642 A1 | 4/2010 | Drinkwater | |
| 2010/0149139 A1 | 6/2010 | Kroll et al. | |
| 2010/0157399 A1 | 6/2010 | Kroll et al. | |
| 2010/0238528 A1 | 9/2010 | Govil et al. | |
| 2010/0328433 A1 | 12/2010 | Li | |
| 2010/0328759 A1 | 12/2010 | Kirkby et al. | |
| 2011/0050655 A1 | 3/2011 | Mukawa | |
| 2011/0157667 A1 | 6/2011 | Lacoste et al. | |
| 2012/0008181 A1 | 1/2012 | Cable et al. | |
| 2012/0218481 A1 | 8/2012 | Popovich | |
| 2012/0236415 A1 | 9/2012 | Nagano et al. | |
| 2013/0022222 A1 | 1/2013 | Zschau et al. | |
| 2013/0135290 A1 | 5/2013 | Davidson | |
| 2013/0208508 A1 | 8/2013 | Nichol et al. | |
| 2013/0268357 A1 | 10/2013 | Heath | |
| 2013/0278631 A1 | 10/2013 | Border et al. | |
| 2013/0306627 A1 | 11/2013 | Libman et al. | |
| 2014/0064655 A1 | 3/2014 | Nguyen et al. | |
| 2014/0071539 A1 | 3/2014 | Gao | |
| 2014/0354697 A1 | 12/2014 | Endisch | |
| 2014/0358002 A1 | 12/2014 | Daoura | |
| 2015/0277378 A1 | 10/2015 | Smithwick et al. | |
| 2015/0325035 A1 | 11/2015 | Howell | |
| 2015/0355597 A1 | 12/2015 | Schwerdtner | |
| 2015/0378080 A1 | 12/2015 | Georgiou | |
| 2016/0055778 A1 | 2/2016 | Kim | |
| 2016/0077367 A1 | 3/2016 | Lo et al. | |
| 2016/0078683 A1 | 3/2016 | Sudol et al. | |
| 2016/0104750 A1 | 4/2016 | Jinta et al. | |
| 2016/0147000 A1 | 5/2016 | Yoon | |
| 2016/0147003 A1 | 5/2016 | Morozov et al. | |
| 2016/0157828 A1 | 6/2016 | Sumi et al. | |
| 2016/0223987 A1 | 8/2016 | Park et al. | |
| 2016/0291545 A1 | 10/2016 | Fan et al. | |

(56) References Cited

U.S. PATENT DOCUMENTS

| | | |
|---|---|---|
| 2016/0336484 A1 | 11/2016 | McGroddy et al. |
| 2016/0349508 A1 | 12/2016 | Horikawa |
| 2016/0379606 A1* | 12/2016 | Kollin .................. G06T 3/4038 345/428 |
| 2017/0038727 A1 | 2/2017 | Kim et al. |
| 2017/0160547 A1 | 6/2017 | Webster et al. |
| 2017/0269767 A1 | 9/2017 | Yang et al. |
| 2017/0293259 A1 | 10/2017 | Ochiai et al. |
| 2017/0308988 A1 | 10/2017 | Li et al. |
| 2017/0322414 A1 | 11/2017 | Ishii |
| 2017/0323125 A1 | 11/2017 | Yang |
| 2017/0351944 A1 | 12/2017 | Yang |
| 2018/0024289 A1 | 1/2018 | Fattal |
| 2018/0039072 A1 | 2/2018 | Okumura |
| 2018/0231789 A1 | 8/2018 | Ng et al. |
| 2018/0253869 A1 | 9/2018 | Yumer et al. |
| 2018/0275350 A1 | 9/2018 | Oh |
| 2018/0284460 A1 | 10/2018 | Cheng et al. |
| 2018/0364641 A1 | 12/2018 | Park et al. |
| 2019/0004478 A1* | 1/2019 | Gelman ................ G03H 1/2205 |
| 2019/0014319 A1 | 1/2019 | Jannard et al. |
| 2019/0101866 A1 | 4/2019 | Georgiou et al. |
| 2019/0113802 A1 | 4/2019 | Won et al. |
| 2019/0121291 A1 | 4/2019 | Leister et al. |
| 2019/0155033 A1 | 5/2019 | Gelman et al. |
| 2019/0196400 A1 | 6/2019 | Chang |
| 2020/0271949 A1 | 8/2020 | Colin et al. |
| 2020/0272098 A1 | 8/2020 | Colin et al. |
| 2020/0273236 A1 | 8/2020 | Colin et al. |
| 2020/0273242 A1 | 8/2020 | Colin et al. |
| 2020/0275081 A1 | 8/2020 | Colin et al. |
| 2020/0275082 A1 | 8/2020 | Colin et al. |
| 2020/0275088 A1 | 8/2020 | Colin et al. |
| 2020/0278498 A1 | 9/2020 | Schultz et al. |
| 2020/0278543 A1 | 9/2020 | Shultz et al. |
| 2020/0280715 A1 | 9/2020 | Colin et al. |
| 2020/0341194 A1 | 10/2020 | Waldem et al. |
| 2021/0209846 A1 | 7/2021 | Blackley et al. |
| 2021/0294003 A1 | 9/2021 | Roehrig et al. |
| 2021/0397128 A1 | 12/2021 | Hirose et al. |
| 2022/0050298 A1 | 2/2022 | Klug et al. |

FOREIGN PATENT DOCUMENTS

| | | |
|---|---|---|
| CN | 109564403 | 4/2019 |
| JP | 2016-042036 | 3/2016 |
| WO | WO 2017/120320 | 7/2017 |
| WO | WO 2017/198713 | 11/2017 |
| WO | WO 2019/143729 | 7/2019 |

OTHER PUBLICATIONS

Ichikawa et al., "Realistic 3D image reconstruction in CGH with Fourier transform optical system," Proc. SPIE 8644, Practical Holography XXVII: Materials and Applications, Mar. 1, 2013, doi: 10.1117112.2003371, 10 pages.

International Search Report and Written Opinion in International Appln. No. PCT/US2021/050275, dated Dec. 13, 2021, 14 pages.

U.S. Appl. No. 17/478,580, filed Sep. 17, 2021 Qaderi et al.

U.S. Appl. No. 17/478,298, filed Sep. 17, 2021 Qaderi et al.

U.S. Appl. No. 17/478,324, filed Sep. 17, 2021 Qaderi et al.

* cited by examiner

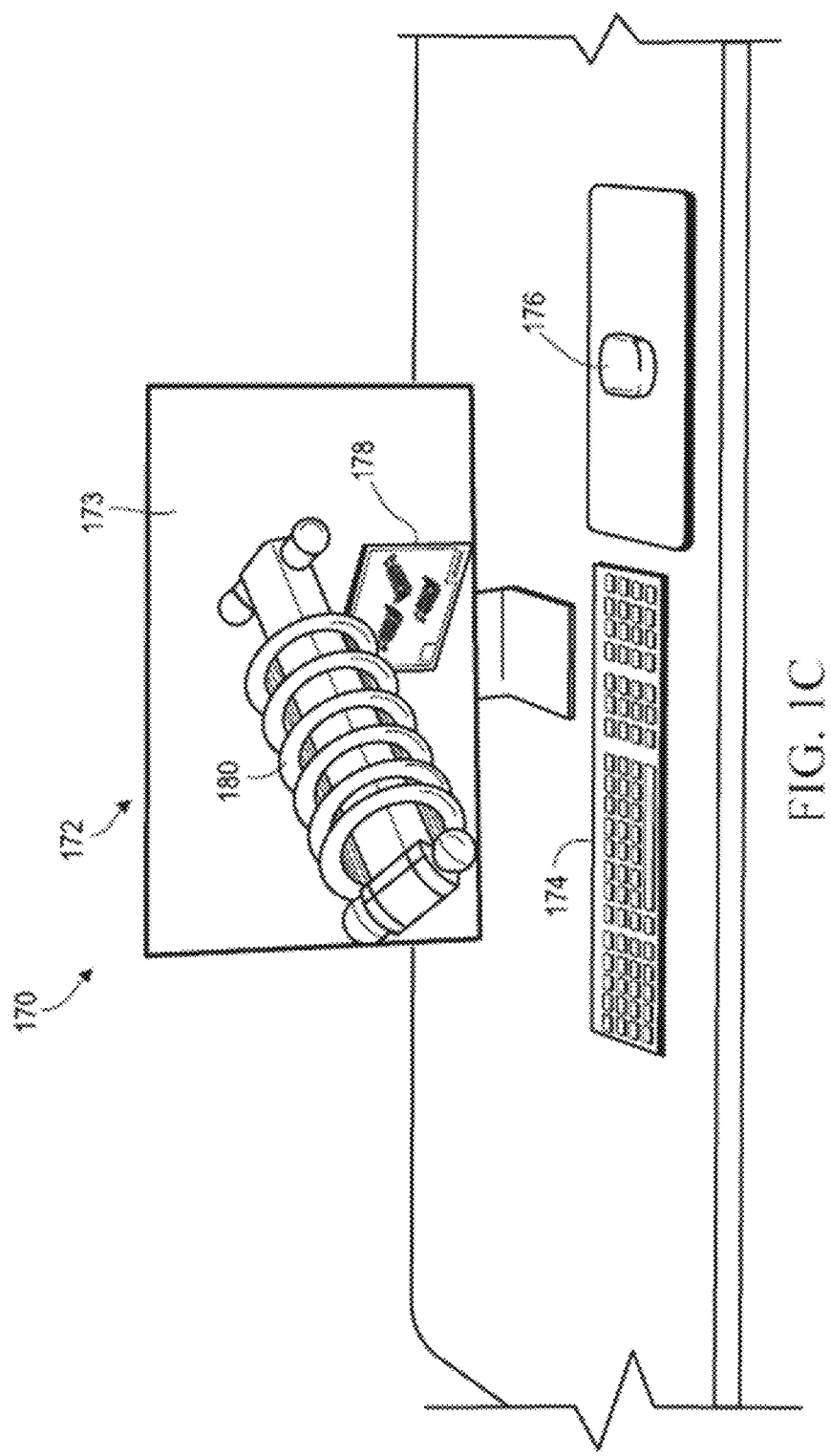

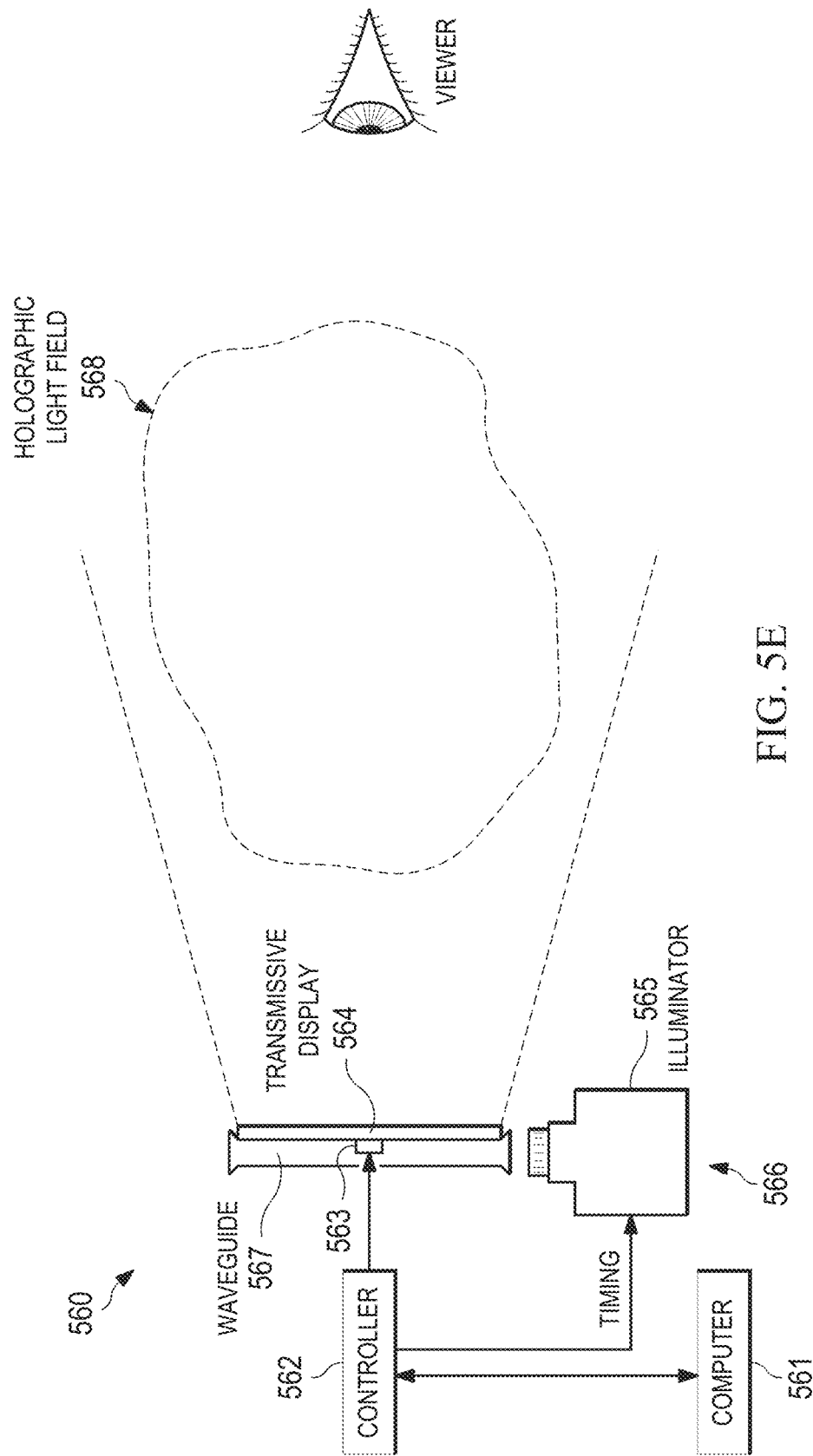

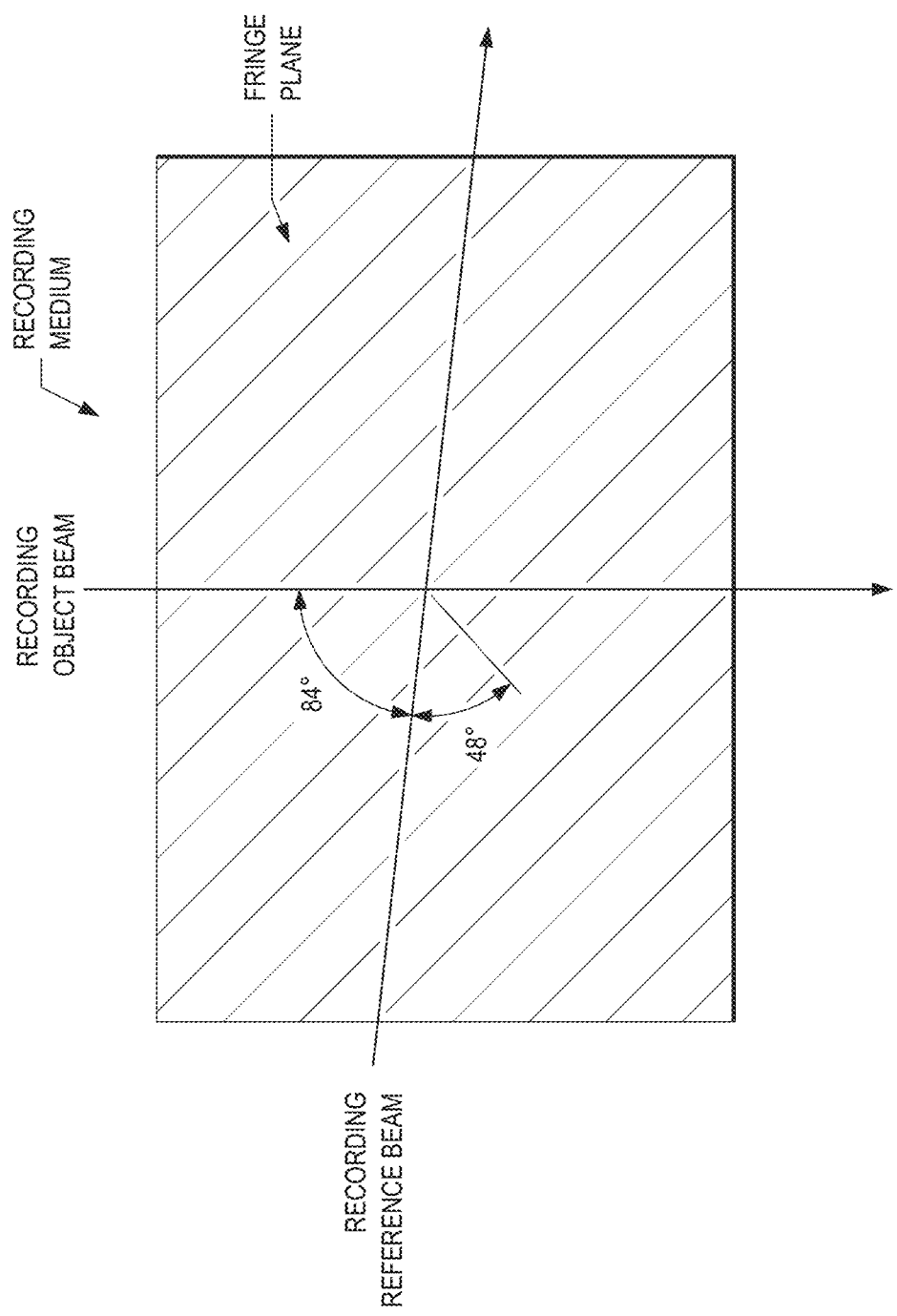

```
1400 ─┐
      ↓
┌─────────────────────────────────────────────────────────────────┐
│ FORM A FIRST DIFFRACTIVE COMPONENT CONFIGURED TO DIFFRACT A FIRST│ ─ 1402
│ COLOR OF LIGHT HAVING A FIRST POLARIZATION STATE AND A FIRST     │
│ INCIDENT ANGLE AT A FIRST DIFFRACTED ANGLE WITH A FIRST          │
│ DIFFRACTION EFFICIENCY                                           │
└─────────────────────────────────────────────────────────────────┘
                                │
                                ↓
┌─────────────────────────────────────────────────────────────────┐
│ FORM A SECOND DIFFRACTIVE COMPONENT CONFIGURED TO DIFFRACT A     │ ─ 1404
│ SECOND COLOR OF LIGHT HAVING THE FIRST POLARIZATION STATE AND A  │
│ SECOND INCIDENT ANGLE OUT AT A SECOND DIFFRACTED ANGLE WITH A    │
│ SECOND DIFFRACTION EFFICIENCY                                    │
└─────────────────────────────────────────────────────────────────┘
                                │
                                ↓
┌─────────────────────────────────────────────────────────────────┐
│ ARRANGE A COLOR-SELECTIVE POLARIZER BETWEEN THE FIRST AND SECOND │ ─ 1406
│ DIFFRACTIVE COMPONENTS TO ROTATE A POLARIZATION OF THE SECOND    │
│ COLOR OF LIGHT FROM A SECOND POLARIZATION STATE TO THE FIRST     │
│ POLARIZATION STATE                                               │
└─────────────────────────────────────────────────────────────────┘
```

```
┌─────────────────────────────────────────────────────────────┐
│ FORM A FIRST DIFFRACTIVE COMPONENT INCLUDING A FIRST DIFFRACTIVE │ ─ 1452
│ STRUCTURE CONFIGURED TO DIFFRACT A FIRST COLOR OF LIGHT HAVING A │
│                    FIRST INCIDENT ANGLE                      │
└─────────────────────────────────────────────────────────────┘
                              │
                              ▼
┌─────────────────────────────────────────────────────────────┐
│     FORM A SECOND DIFFRACTIVE COMPONENT INCLUDING A SECOND   │ ─ 1454
│  DIFFRACTIVE STRUCTURE CONFIGURED TO DIFFRACT A SECOND COLOR OF │
│             LIGHT HAVING A SECOND INCIDENT ANGLE             │
└─────────────────────────────────────────────────────────────┘
                              │
                              ▼
┌─────────────────────────────────────────────────────────────┐
│  ARRANGE A FIRST REFLECTIVE LAYER BETWEEN THE FIRST AND SECOND │ ─ 1456
│  DIFFRACTIVE STRUCTURES TO TOTALLY REFLECT THE FIRST COLOR OF LIGHT │
│  HAVING THE FIRST INCIDENT ANGLE AND TRANSMIT THE SECOND COLOR OF │
│           LIGHT HAVING THE SECOND INCIDENT ANGLE             │
└─────────────────────────────────────────────────────────────┘
                              │
                              ▼
┌─────────────────────────────────────────────────────────────┐
│   ARRANGE A SECOND REFLECTIVE LAYER AFTER THE SECOND DIFFRACTIVE │ ─ 1458
│  STRUCTURE TO TOTALLY REFLECT THE SECOND COLOR OF LIGHT HAVING THE │
│                    SECOND INCIDENT ANGLE                     │
└─────────────────────────────────────────────────────────────┘
```

FIG. 14B

RECONSTRUCTING OBJECTS WITH DISPLAY ZERO ORDER LIGHT SUPPRESSION

INCORPORATION BY REFERENCE

The present application is a continuation of, and claims benefit under 35 USC § 120 to, international applications PCT/US2021/50271 entitled "DISPLAYING THREE-DIMENSIONAL OBJECTS" and filed on Sep. 14, 2021, and PCT/US2021/50275 entitled "RECONSTRUCTING OBJECTS WITH DISPLAY ZERO ORDER LIGHT SUPPRESSION" and filed on Sep. 14, 2021, which claim priority under 35 U.S.C. § 119 to U.S. Ser. No. 63/079,707 entitled "DISPLAYING THREE-DIMENSIONAL OBJECTS" and filed on Sep. 17, 2020, and to U.S. Ser. No. 63/149,964 entitled "RECONSTRUCTING OBJECTS WITH DISPLAY ZERO ORDER LIGHT SUPPRESSION" and filed on Feb. 16, 2021. The entire contents of each of the applications are incorporated by reference in its entirety herein.

TECHNICAL FIELD

This disclosure relates to three-dimensional (3D) displays, and more particularly to 3D displays with object reconstruction.

BACKGROUND

Advances in traditional two-dimensional (2D) projection and 3D rendering have led to new approaches for 3D displays, including numerous hybrid techniques that mix head and eye tracking with conventional display devices for virtual reality (VR), augmented reality (AR), and mixed reality (MR). These techniques attempt to replicate an experience of holographic imagery, combined with tracking and measurement-based calculations, to simulate stereo or in-eye light field that can be represented by an actual hologram.

SUMMARY

The present disclosure describes methods, apparatus, devices, and systems for reconstructing objects (e.g., 2D or 3D), particularly with display zero order light suppression. The present disclosure provides techniques that can efficiently suppress display zero order light (e.g., reflected, diffracted, or transmitted) from a display in a reconstructed holographic scene (or holographic content) to improve an effect of the holographic scene and accordingly a performance of a display system. As an example, when light illuminates a display for holographic reconstruction, a portion of the light is incident on and diffracted by display elements that are modulated with a hologram to form a desired holographic scene. The other portion of the light is incident on and reflected at gaps between the display elements on the display. The reflected other portion of the light can be considered as at least a part (e.g., a main order) of display zero order light that may be undesirably presented in the holographic scene. The display zero order light can also include any other unwanted light from the display, e.g., diffracted light at the gaps, reflected light from the display elements, or reflected light from a display cover on the display. Embodiments of the disclosure can suppress such display zero order light.

In some implementations, a hologram is configured such that a first portion of light illuminated on display elements of the display is diffracted by the display elements modulated by the hologram to have at least one characteristic different from that of display zero order light including reflected light from the display. The display zero order light can include a second portion of the light illuminated on gaps between the display elements and reflected at the gaps without modulation of the hologram. The techniques can make use of the difference between the diffracted first portion of the light and the display zero order light (e.g., the reflected second portion of the light) to cause the display zero order light to be suppressed in the holographic scene formed by the diffracted first portion of the light. The techniques can be applied individually or in a combination thereof. The techniques can be applied to any other display systems that suppress or eliminate undesired light from desired light.

In some examples, the display is configured to suppress higher orders of the display zero order light, e.g., by including irregular or non-uniform display elements that have different sizes. The display elements can have no periodicity, and can form a Voronoi pattern. In some examples, in the holographic scene, the display zero order light can have a much smaller power density than the diffracted first portion of the light. That is, the display zero order light is suppressed by increasing a signal to noise ratio of the holographic scene, e.g., by diverging the display zero order light without divergence of the diffracted first portion of the light, or by adjusting respective phases of the display elements within a predetermined phase range such as $[0, 2\pi]$, or both. In some examples, the display zero order light is suppressed by directing the display zero order light away from the diffracted first portion of the light, e.g., by illuminating the light on the display at an incident angle and preconfiguring the hologram such that the diffracted first portion of the light still propagates around a normal axis and the display zero order light propagates at a reflected angle. The display zero order light can be redirected outside of the holographic scene formed by the diffracted first portion of the light, e.g., by adding an additional optically diffractive grating structure to further direct the display zero order light away from the holographic scene. The display zero order light can be reflected back away from the holographic scene. The display zero order light can be also absorbed before the holographic scene.

In the present disclosure, the terms "zero order" and "zero-order" are used interchangeably, and the terms "first order" and "first-order" are used interchangeably.

In the present disclosure, the terms "zero order" and "zero-order" are used interchangeably, and the terms "first order" and "first-order" are used interchangeably.

One aspect of the present disclosure features a method including: illuminating a display with light, a first portion of the light illuminating display elements of the display; and modulating the display elements of the display with a hologram corresponding to holographic data to i) diffract the first portion of the light to form a holographic scene corresponding to the holographic data, and ii) suppress display zero order light in the holographic scene, the display zero order light including reflected light from the display.

In some examples, illuminating the display with the light includes a second portion of the light illuminates gaps between adjacent display elements. The display zero order light can include at least one of: the second portion of the light reflected at the gaps of the display, the second portion of the light diffracted at the gaps of the display, reflected light from the display elements, or reflected right from a display cover covering the display.

The reflected light from the display forms a main order of the display zero order light, and the display can be configured to suppress one or more higher orders of the display zero order light, and where the display elements are irregular or non-uniform. In some examples, the display elements form a Voronoi pattern.

In some implementations, the method further includes: configuring the hologram such that the diffracted first portion of the light has at least one characteristic different from that of the display zero order light. The at least one characteristic can include at least one of: a power density; a beam divergence; a propagating direction away from the display; or a polarization state.

In some implementations, the display zero order light is suppressed in the holographic scene with a light suppression efficiency. The light suppression efficiency is defined as a result of one minus a ratio between an amount of the display zero light in the holographic scene with the suppression and an amount of the display zero light in the holographic scene without the suppression. In some cases, the light suppression efficiency is more than a predetermined percentage that is one of 50%, 60%, 70%, 80%, 90%, or 99%. In some cases, the light suppression efficiency is 100%.

In some implementations, the method further includes: for each of a plurality of primitives corresponding to an object, determining an electromagnetic (EM) field contribution to each of the display elements of the display by computing, in a global three-dimensional (3D) coordinate system, EM field propagation from the primitive to the display element; and for each of the display elements, generating a sum of the EM field contributions from the plurality of primitives to the display element. The holographic data can include the sums of the EM field contributions for the display elements of the display from the plurality of primitives of the object. The holographic scene can include a reconstructed object corresponding to the object.

In some implementations, the holographic data includes respective phases for the display elements of the display, and the method further includes configuring the hologram by adjusting the respective phases for the display elements to have a predetermined phase range. The predetermined phase range can be [0, 2π].

In some implementations, adjusting the respective phases for the display elements includes: adjusting the respective phases according to $$\emptyset_a = A\emptyset_i + B,$$

where $\emptyset_i$ represents an initial phase value of a respective phase, $\emptyset_a$ represents an adjusted phase value of the respective phase, and A and B are constants.

In some implementations, adjusting the respective phases includes: adjusting the constants A and B such that a light suppression efficiency for the holographic scene is maximized. The light suppression efficiency can be larger than 50%, 60%, 70%, 80%, 90%, or 99%. In some cases, adjusting the constants A and B includes adjusting the constants A and B by a machine vision algorithm or a machine learning algorithm.

In some implementations, the method further includes: diverging the diffracted first portion of the light to form the holographic scene; and diverging the display zero order light in or adjacent to the holographic scene. In some examples, diverging the diffracted first portion of the light includes guiding the diffracted first portion of the light through an optically diverging component arranged downstream the display, and diverging the display zero order light includes guiding the display zero order light through the optically diverging component.

In some examples, the light illuminating the display is a collimated light. The display zero order light is collimated before arriving at the optically diverging component, and the method can further include configuring the hologram such that the diffracted first portion of the light is converging before arriving at the optically diverging component.

In some implementations, the holographic data includes a respective phase for each of the display elements. The method can further include configuring the hologram by adding a corresponding phase to the respective phase for each of the display elements, and the corresponding phases for the display elements can be compensated by the optically diverging component such that the holographic scene corresponds to the respective phases for the display elements. The corresponding phase for each of the display elements can be expressed as:

$$\emptyset = \frac{\pi}{\lambda f}(ax^2 + by^2),$$

where Ø represents the corresponding phase for the display element, λ represents a wavelength of the light, f represents a focal length of the optically diverging component, x and y represent coordinates of the display element in a coordinate system, and a and b represent constants.

In some implementations, the holographic scene corresponds to a reconstruction cone with a viewing angle. The method can further include configuring the hologram by moving a configuration cone with respect to the display with respect to a global 3D coordinate system along a direction perpendicular to the display with a distance corresponding to a focal length of the optically diverging component, the configuration cone corresponding to the reconstruction cone and having an apex angle identical to the viewing angle, and generating the holographic data based on the moved configuration cone in the global 3D coordinate system. The plurality of primitives of the object can be in the moved configuration cone.

In some implementations, the optically diverging component is a defocusing element including at least one of a concave lens or a holographic optical element (HOE) configured to diffract the display zero order light outside of the holographic scene.

In some implementations, the optically diverging component is a focusing element including at least one of a convex lens or a holographic optical element (HOE) configured to diffract the display zero order light outside of the holographic scene.

In some implementations, the method further includes: displaying the holographic scene on a two-dimensional (2D) screen spaced away from the display along a direction perpendicular to the display. The method can further include: moving the 2D screen to obtain different slices of the holographic scene on the 2D screen.

In some implementations, the method further includes: guiding the light to illuminate the display. In some examples, guiding the light to illuminate the display includes: guiding the light by a beam splitter, and the diffracted first portion of the light and the display zero order light transmit through the beam splitter.

In some implementations, illuminating the display with the light includes: illuminating the display with the light at normal incidence.

In some implementations, the diffracted first portion of the light forms a reconstruction cone with a viewing angle, and illuminating the display with the light includes illuminating the display with the light at an incident angle that is larger than a half of the viewing angle. In some examples, the method further includes: configuring the hologram such that the diffracted first portion of the light forms the reconstruction cone that is same as a reconstruction cone to be formed by the diffracted first portion of the light if the light is normally incident on the display.

In some examples, the holographic data includes a respective phase for each of the display elements. The method can further include configuring the hologram by adding a corresponding phase to the respective phase for each of the display elements, and the corresponding phases for the display elements can be compensated by the incident angle such that the holographic scene corresponds to the respective phases for the display elements.

In some examples, the corresponding phase for each of the display elements can be expressed as:

$$\emptyset = \frac{2\pi}{\lambda}(x\cos\theta + y\cos\theta),$$

where $\emptyset$ represents the corresponding phase for the display element, $\lambda$ represents a wavelength of the light, x and y represent coordinates of the display element in a global 3D coordinate system, and $\theta$ represents an angle corresponding to the incident angle.

In some examples, configuring the hologram includes: moving a configuration cone with respect to the display with respect to a global 3D coordinate system, the configuration cone corresponding to the reconstruction cone and having an apex angle corresponding to the viewing angle of the reconstruction cone, and generating the holographic data based on the moved configuration cone in the global 3D coordinate system.

In some examples, moving the configuration cone with respect to the display in the global 3D coordinate system includes: rotating the configuration cone by a rotation angle with respect to a surface of the display with respect to the global 3D coordinate system, the rotation angle corresponding to the incident angle.

In some implementations, the method further includes: blocking the display zero order light from appearing in the holographic scene. A light suppression efficiency for the holographic scene can be 100%. In some examples, blocking the display zero order light includes: guiding the display zero order light towards an optically blocking component arranged downstream the display. The method can further include: guiding the diffracted first portion of the light to transmit through the optically blocking component with a transmission efficiency to form the holographic scene. The transmission efficiency can be no less than a predetermined ratio. The predetermined ratio can be 50%, 60%, 70%, 80%, 90%, or 99%.

In some implementations, the optically blocking component is configured to transmit a first light beam having an angle smaller than a predetermined angle and block a second light beam having an angle larger than the predetermined angle, and the predetermined angle is smaller than the incident angle and larger than the half of the viewing angle.

The optically blocking component can include a plurality of microstructures or nanostructures, a metamaterial layer, or an optically anisotropic film.

In some implementations, the method further includes: guiding the light to illuminate the display by guiding the light through an optically diffractive component on a substrate configured to diffract the light out with the incident angle. Guiding the light to illuminate the display can include at least one of: guiding the light through a waveguide coupler to the optically diffractive component, guiding the light through a coupling prism to the optically diffractive component, or guiding the light through a wedged surface of the substrate to the optically diffractive component.

In some implementations, the optically diffractive component is formed on a first surface of the substrate facing to the display, and the optically blocking component is formed on a second surface of the substrate that is opposite to the first surface.

In some implementations, the method further includes: redirecting the display zero order light away from the holographic scene. A light suppression efficiency for the holographic scene can be 100%.

In some implementations, redirecting the display zero order light away from the holographic scene includes: diffracting the display zero order light away from the holographic scene by an optically redirecting component arranged downstream the display. The optically redirecting component can be configured to transmit the diffracted first portion of the light to form the holographic scene.

In some implementations, the optically redirecting component is configured such that the display zero order light is diffracted outside of the holographic scene in a three-dimensional (3D) space along at least one of an upward direction, a downward direction, a leftward direction, a rightward direction, or a combination thereof.

In some implementations, the optically redirecting component is configured to diffract a first light beam having an angle identical to a predetermined angle with a substantially larger diffraction efficiency than a second light beam having an angle different from the predetermined angle, and the predetermined angle is substantially identical to the incident angle. The optically redirecting component can include a Bragg grating.

In some implementations, the optically diffractive component is formed on a first surface of the substrate facing to the display, and the optically redirecting component is formed on a second surface of the substrate that is opposite to the first surface.

In some cases, the incident angle of the light is negative, and a diffraction angle of the display zero order light diffracted by the optically redirecting component is negative. In some cases, the incident angle of the light is positive, and a diffraction angle of the display zero order light diffracted by the optically redirecting component is positive. In some cases, the incident angle of the light is negative, and a diffraction angle of the display zero order light diffracted by the optically redirecting component is positive. In some cases, the incident angle of the light is positive, and a diffraction angle of the display zero order light diffracted by the optically redirecting component is negative.

In some implementations, the optically redirecting component is covered by a second substrate. The method can further include: absorbing, by an optical absorber formed on at least one of a side surface of the second substrate or a side surface of the substrate, the display zero order light redirected by the optically redirecting component and reflected by an interface between the second substrate and a surrounding medium.

In some implementations, the second substrate includes an anti-reflective coating on a surface of the second substrate opposite to the optically redirecting component, and the anti-reflective coating is configured to transmit the display zero order light.

In some implementations, the display zero order light is p polarized before arriving at the second substrate, and the optically redirecting component is configured to diffract the display zero order light to be incident at a Brewster's angle on an interface between the second substrate and a surrounding medium, such that the display zero order light totally transmits through the second substrate.

In some implementations, the method further includes: converting a polarization state of the display zero order light from s polarization to p polarization before display zero order light arrives at the second substrate. In some cases, converting the polarization state of the display zero order light includes: converting the polarization state of the display zero order light by an optically polarizing device arranged upstream the optically redirecting component with respect to the display.

In some cases, converting the polarization state of the display zero order light includes: converting the polarization state of the display zero order light by an optically polarizing device arranged downstream the optically redirecting component with respect to the display. The optically polarizing device can include an optical retarder and an optical polarizer that are sequentially arranged downstream the optically redirecting component, and the optical retarder can be formed on a side of the second substrate opposite to the optically redirecting component, the optical polarizer being covered by a third substrate. In some examples, the optical retarder includes a broadband half-wave plate and the optical polarizer includes a linear polarizer.

In some implementations, the second substrate includes: a first side on top of the optically redirecting component and a second side opposite to the first side. An optically blocking component can be formed on the second side of the second substrate and configured to transmit the diffracted first portion of the light and to absorb the display zero order light diffracted by the optically redirecting component.

In some implementations, the optically blocking component includes an optically anisotropic transmitter configured to transmit a first light beam with an angle smaller than a predetermined angle, and absorb a second light beam with an angle larger than the predetermined angle. The predetermined angle can be larger than half of the viewing angle and smaller than a diffraction angle at which the display zero order light is diffracted by the optically redirecting component.

In some implementations, the optically redirecting component is configured to diffract the display zero order light to be incident with an angle larger than a critical angle on an interface between the second substrate and a surrounding medium, such that the display zero order light diffracted by the optically diffractive component is totally reflected at the interface. An optical absorber can be formed on side surfaces of the substrate and the second substrate and configured to absorb the totally reflected display zero order light.

In some implementations, the light includes a plurality of different colors of light, and the optically diffractive component is configured to diffract the plurality of different colors of light at the incident angle on the display.

In some implementations, the optical redirecting component includes a respective optically redirecting subcomponent for each of the plurality different colors of light. In some examples, the respective optically redirecting subcomponents for the plurality of different colors of light can be recorded in a same recording structure. In some examples, the respective optically directing subcomponents for the plurality of different colors of light are recorded in different corresponding recording structures.

In some implementations, the optical redirecting component is configured to diffract the plurality of different colors of light at different diffraction angles towards different directions in a 3D space. The optical redirecting component can be configured to diffract at least one of the plurality of different colors of light to be incident at at least one Brewster's angle at an interface. The interface can include one of: an interface between a top substrate and a surrounding medium, or an interface between two adjacent substrates.

In some implementations, the optical redirecting component is configured to diffract a first color of light and a second color of light within a plane, and a third color of light orthogonal to the plane. In some implementations, the optical redirecting component includes at least two different optically redirecting subcomponents configured to diffract a same color of light of the plurality of different colors of light. The two different optically redirecting subcomponents can be sequentially arranged in the optical redirecting component.

In some implementations, guiding the light to illuminate the display includes: sequentially guiding the plurality of different colors of light to illuminate the display in a series of time periods. In some implementations, the optical redirecting component includes a switchable optically redirecting subcomponent configured to diffract a first color of light at a first state during a first time period and transmit a second color of light at a second state during a second time period. In some implementations, the optical redirecting component includes a switchable optically redirecting subcomponent configured to diffract a first color of light at a first state during a first time period and diffract a second color of light at a second state during a second time period.

In some implementations, the plurality of different colors of light includes a first color of light and a second color of light, the first color of light having a shorter wavelength than the second color of light, and in the optically redirecting component, a first optically redirecting subcomponent for the first color of light is arranged closer to the display than a second optically redirecting subcomponent for the second color of light.

In some implementations, fringe planes of at least two optically redirecting subcomponents for at least two different colors of light are oriented substantially differently.

In some implementations, the optically redirecting component includes: a first optically redirecting subcomponent configured to diffract a first color of light; a second optically redirecting subcomponent configured to diffract a second color of light; and at least one optically polarizing device arranged between the first and second optically redirecting subcomponents and configured to convert a polarization state of the first color of light such that the first color of light transmits through the second optically redirecting subcomponent. The at least one optically polarizing device can include optical retarder and an optical polarizer that are sequentially arranged downstream the first optically redirecting subcomponent.

In some cases, a half of the viewing angle is within a range from −10 degrees to 10 degrees or a range from −5 degrees to 5 degrees. In some cases, the incident angle is −6 degrees or 6 degrees.

Another aspect of the present disclosure features a method including: illuminating a display with light, a portion of the light illuminating display elements of the display; and generating a holographic scene by diffracting the portion of light, while suppressing display zero order light present in the holographic scene, where the display zero order light includes reflected light from the display.

In some implementations, suppressing the display zero order light present in the holographic scene includes: diverging the display zero order light.

In some implementations, generating a holographic scene by diffracting the portion of light includes modulating the display elements with a hologram. Suppressing the display zero order light present in the holographic scene can include adjusting a phase range of the hologram.

In some implementations, illuminating the display with the light includes illuminating the display with the light at an incident angle, and suppressing the display zero order light present in the holographic scene can include modulating the portion of light with a hologram configured such that the portion of the light is diffracted by the display elements at a diffraction angle different from a reflected angle at which the reflected light is reflected. In some cases, suppressing the display zero order light present in the holographic scene includes: blocking the display zero order light by an incident angle dependent material. The incident angle dependent material can include a metamaterial or an optically anisotropic material.

In some implementations, suppressing the display zero order light present in the holographic scene includes: redirecting the display zero order light. Redirecting the display zero order light can include diffracting the display zero order light by an optically diffractive component. The light can include different colors of light, and redirecting the display zero order light can include diffracting the different colors of light to different directions in a three-dimensional (3D) space.

In some implementations, suppressing the display zero order light present in the holographic scene includes: suppressing the display zero order light with a light suppression efficiency no less than a predetermined ratio. The light suppression efficiency is defined as a result of one minus a ratio between an amount of the display zero order light in the holographic scene with the suppression and an amount of the display zero order light without the suppression. The predetermined ratio can be 50%, 60%, 70%, 80%, 90%, or 100%.

Another feature of the present disclosure features an optical device including: an optically diffractive component and an optically blocking component. The optically diffractive component is configured to diffract light at an incident angle to illuminate a display, with a portion of the light illuminating display elements of the display, and the optically blocking component is configured to block display zero order light in a holographic scene formed by the portion of the light diffracted by the display elements, the display zero order light including reflected light from the display.

In some implementations, the optical device is configured to perform the method as described above.

In some implementations, the display is configured to be modulated with a hologram corresponding to holographic data to diffract the portion of the light to form the holographic scene, and the optically blocking component is configured to transmit the diffracted portion of the light to form the holographic scene. The diffracted portion of the light can form a reconstruction cone with a viewing angle, and the incident angle can be larger than a half of the viewing angle.

The optically blocking component can be configured to transmit a first light beam having an angle smaller than a predetermined angle and block a second light beam having an angle larger than the predetermined angle, and the predetermined angle can be smaller than the incident angle and larger than the half of the viewing angle.

In some implementations, the optically blocking component includes a metamaterial layer or an optically anisotropic film. In some implementations, the optically blocking component includes a plurality of microstructures or nanostructures.

In some implementations, the optical device further includes a substrate having opposite sides. The optically diffractive component and the optically blocking component can be formed on the opposite sides of the substrate.

Another aspect of the present disclosure features a method of fabricating the optical device as described above, including: forming the optically diffractive component on a first side of a substrate and forming the optically blocking component on a second side of the substrate opposite to the first side.

Another aspect of the present disclosure features an optical device including: an optically diffractive component and an optically redirecting component. The optically diffractive component is configured to diffract light at an incident angle onto a display including a plurality of display elements spaced with gaps on the display. The display is configured to diffract a portion of the light illuminating the display elements. The optically redirecting component is configured to transmit the portion of the light to form a holographic scene and to redirect display zero order light away from the holographic scene in a three-dimensional (3D) space, the display zero order light including reflected light from the display.

In some examples, the optically redirecting component includes a Bragg grating.

In some implementations, the optically diffractive component is formed on a first side of a substrate facing to the display, and the optically redirecting component is formed on a second side of the substrate that is opposite to the first side.

In some implementations, the optical device further includes a second substrate covering the optically redirecting component. In some implementations, the optical device further includes an optical absorber formed on at least one of a side surface of the substrate or a side surface of the second substrate, and the optical absorber is configured to absorb the display zero order light redirected by the optically redirecting component and reflected by an interface between the second substrate and a surrounding medium.

In some implementations, the optical device further includes: an anti-reflective coating formed on the second substrate and being opposite to the optically redirecting component, the anti-reflective coating being configured to transmit the display zero order light redirected by the optically redirecting component.

In some implementations, the optical device further includes: an optically polarizing device configured to convert a polarization state of the display zero order light from s polarization to p polarization before the display zero order light arrives at the second substrate, and the optically redirecting component is configured to diffract the display zero order light to be incident at a Brewster's angle on an interface between the second substrate and a surrounding medium, such that the display zero order light totally transmits through the second substrate. The optical polarizing device can include an optical retarder and a linear polarizer that are sequentially arranged together.

In some implementations, the optically polarizing device is arranged upstream the optically redirecting component with respect to the display. In some implementations, the optically polarizing device is formed a side of the second substrate opposite to the optically redirecting component, the optically polarizing device being covered by a third substrate.

In some implementations, the optical device further includes: an optical blocking component formed on a side of the second substrate opposite to the optically redirecting component, the optical blocking component being configured to transmit the portion of the light and to absorb the display zero order light diffracted by the optically redirecting component. The optically blocking component can include an optically anisotropic transmitter.

In some implementations, the optically redirecting component is configured to diffract the display zero order light to be incident with an angle larger than a critical angle on an interface between the second substrate and a surrounding medium, such that the display zero order light diffracted by the optically diffractive component is totally reflected at the interface.

In some implementations, the light includes a plurality of different colors of light. The optically diffractive component is configured to diffract the plurality of different colors of light at the incident angle on the display, and the optical redirecting component can be configured to diffract display zero order light of the plurality of different colors of light reflected by the display at different diffraction angles towards different directions in the 3D space, the display zero order light including reflected light of the plurality of different colors of light by the display.

In some implementations, the optical diffractive component includes a plurality of holographic gratings for the plurality of different colors of light, and each of the plurality of holographic gratings is configured to diffract a respective color of light of the plurality of different colors of light at the incident angle on the display.

In some implementations, the optical redirecting component includes a plurality of redirecting holographic grating for the display zero order light of the plurality of different colors of light, and each of the plurality of redirecting holographic gratings is configured to diffract display zero order light of a respective color of light of the plurality of different colors of light at a respective diffractive angle towards a respective direction in the 3D space.

In some implementations, the optical redirecting component includes at least two different redirecting holographic gratings configured to diffract display zero order light of a same color of light of the plurality of different colors of light.

In some implementations, the optical redirecting component includes a switchable redirecting holographic grating configured to diffract a first color of light at a first state during a first time period and transmit a second color of light at a second state during a second time period.

In some implementations, the optical redirecting component includes a switchable redirecting holographic grating configured to diffract a first color of light at a first state during a first time period and diffract a second color of light at a second state during a second time period.

In some implementations, the plurality of different colors of light includes a first color of light and a second color of light, the first color of light having a shorter wavelength than the second color of light, and, in the optically redirecting component, a first redirecting holographic grating for the first color of light is arranged closer to the display than a second redirecting holographic grating for the second color of light.

In some implementations, fringe planes of at least two redirecting holographic gratings for at least two different colors of light are oriented substantially differently.

In some implementations, the optically redirecting component includes: a first redirecting holographic grating configured to diffract a first color of light; a second redirecting holographic grating configured to diffract a second color of light; and at least one optical polarizing device arranged between the first and second redirecting holographic gratings and configured to convert a polarization state of the first color of light such that the first color of light transmits through the second redirecting holographic grating.

In some implementations, the optical device is configured to perform the methods described above.

Another aspect of the present disclosure features a method of fabricating the optical device as described above, including: forming the optically diffractive component on a first side of a substrate; and forming the optically redirecting component on a second side of the substrate opposite to the first side.

Another aspect of the present disclosure features a system including: a display including display elements separated with gaps on the display and an optical device configured to illuminate the display with light, with a portion of the light illuminating on the display elements. The system is configured to diffract the portion of the light to form a holographic scene, while suppressing display zero order light in the holographic scene. The display zero order light can include at least one of reflected light at the gaps, diffracted light at the gaps, reflected light at the display elements, or reflected light at a display cover covering the display.

In some implementations, the system further includes a controller coupled to the display and configured to: modulate the display elements of the display with a hologram corresponding to holographic data to diffract the portion of the light to form the holographic scene corresponding to the holographic data. The hologram can be configured such that the display zero order light is suppressed in the holographic scene.

In some implementations, the system further includes a computing device configured to generate primitives of one or more objects corresponding to the holographic scene. The system can be configured to perform the methods as described above. The optical device can include one or more of the optical devices as described above.

In some implementations, the system further includes: an optically diverging device arranged downstream the optical device and configured to diverge the display zero order light in the holographic scene. The light illuminating the display is a collimated light. The display zero order light is collimated before arriving at the optically diverging device, and the hologram is configured such that the diffracted portion of the light is converging before arriving at the optically diverging device. The optically diverging device can includes the optically diverging component as described above.

In some implementations, the system further includes a two-dimensional (2D) screen arranged downstream the display. In some implementations, the optical device includes a beam splitter. In some implementations, the optical device includes a waveguide having an incoupler and an outcoupler. In some implementations, the optical device includes a lightguide including a light coupler and an optically diffractive component. The light coupler can include a coupling prism. The light coupler can also include a wedged substrate.

Another aspect of the present disclosure features a method of fabricating the system of as described above.

Another aspect of the present disclosure features an optical device including: at least two beam expanders configured to expand an input light beam in at least two dimensions to generate an output light beam by diffracting the input light beam to adjust a beam size of the input light beam in the at least two dimensions. The beam size can include a width and a height.

In some implementations, each of the at least two beam expanders includes a respective optically diffractive device. The input light beam can include light of a plurality of different colors, and the respective optically diffractive device can be configured to diffract the light of the plurality of different colors at respective diffracted angles that are substantially identical to each other.

In some examples, the respective optically diffractive device is configured such that, when the light of the different colors is incident on the respective optically diffractive device, the respective optical diffractive device separates light of individual colors of the different colors while suppressing crosstalk between the different colors.

In some implementations, the respective optically diffractive device includes: at least two optically diffractive components and at least one color-selective polarizer.

In some implementations, the respective optically diffractive device includes: at least two optically diffractive components and at least one reflective layer. The at least one reflective layer can be configured for total internal reflection of light of at least one color.

In some implementations, the respective optically diffractive device includes at least one of: one or more transmissive diffractive structures, or one or more reflective diffractive structures.

In some implementations, the at least two beam expanders include: a first one-dimensional beam expander configured to expand the input light beam in a first dimension of the at least two dimensions, to generate an intermediate light beam; and a second one-dimensional beam expander configured to expand the intermediate light beam in a second dimension of the at least two dimensions, to generate the output light beam. The intermediate light beam has a larger beam size than the input light beam in the first dimension and a same beam size as the input light beam in the second dimension, and the output light beam has a larger beam size than the intermediate light beam in the second dimension and a same beam size as the intermediate light beam in the first dimension.

In some implementations, the optical device is configured to couple the intermediate light beam from the first one-dimensional beam expander to the second one-dimensional beam expander using at least one of: a free-space in-air geometry, a monolithic or segmented substrate, or one or more coupling elements.

In some implementations, the intermediate input beam includes collinear collimated light of two or more colors, and the one or more coupling elements are configured to convert the collinear collimated light of the two or more colors to two or more independent collimated but not collinear light beams with corresponding colors of the two or more colors.

The present disclosure also describes methods, apparatus, devices, and systems for displaying three-dimensional (3D) objects, particularly by individually diffracting different colors of light. The present disclosure provides technology that can efficiently separate light of different colors or wavelengths to suppress (e.g., reduce or eliminate) crosstalk between the colors or wavelengths. The technology can also suppress light propagating without diffraction through an optically diffractive device and hitting at undesired angles onto a display, thereby suppressing undesired effects such as ghost images. The technology enables to reconstruct multi-color three-dimensional light fields or images with no or little crosstalk, sequentially or simultaneously. The technology enables to implement an illumination system to provide nearly normal polarized light beams of multiple different colors with relatively large incident angles. Accordingly, the technology enables to present light fields or images to viewers (e.g., observers or users) in front of a display without obstruction of an illuminator, and to reduce power loss, e.g., due to reflections, diffraction, and/or scattering. The technology also enables to implement compact optical systems for displaying three-dimensional objects.

The present disclosure provides technology that can overcome limitations present in known technologies. As an example, the technology disclosed herein can be implemented without the use of cumbersome wearable devices, such as "3D glasses." As another example, the technology disclosed herein can optionally be implemented without being limited by the accuracy of tracking mechanisms, the quality of the display devices, relatively long processing times and/or relatively high computational demands, and/or by an inability to display objects to multiple viewers simultaneously. As a further example, the technology can be implemented without specialized tools and software to develop contents that extend above and beyond the tools and software used in conventional 3D content creation. Various embodiments can exhibit one or more of the foregoing advantages. For example, certain implementations of the present disclosure can produce real-time, full color, genuine 3D images that appear to be real 3D objects in the world and can be viewed without encumbrances by multiple viewers simultaneously from different points.

One aspect of the present disclosure features a method including: for each of a plurality of primitives corresponding to an object in a three-dimensional (3D) space, determining an electromagnetic (EM) field contribution to each of a plurality of elements of a display by computing, in a 3D coordinate system, EM field propagation from the primitive to the element; and for each of the plurality of elements, generating a sum of the EM field contributions from the plurality of primitives to the element.

The EM field contribution can include at least one of a phase contribution or an amplitude contribution. The primitives can include at least one of a point primitive, a line primitive, or a polygon primitive. The primitives can include a line primitive including at least one of a gradient color, a textured color, or any surface shading effect. The primitives can also include a polygon primitive including at least one of a gradient color, a textured color, or any surface shading effect. The plurality of primitives can be indexed in a particular order.

In some implementations, the method further includes obtaining respective primitive data for each of the plurality of primitives. The respective primitive data of each of the plurality of primitives can include respective color information of the primitive, and the determined EM field contributions for each of the elements include information corresponding to the respective color information of the primitives. The color information can include at least one of a textured color or a gradient color. The respective primitive data of each of the plurality of primitives can include texture information of the primitive. The respective primitive data of each of the plurality of primitives can include shading information on one or more surfaces of the primitive. The shading information can include a modulation on at least one of color or brightness on the one or more surfaces of the primitive.

In some implementations, the respective primitive data of each of the plurality of primitives includes respective coordinate information of the primitive in the 3D coordinate system. Respective coordinate information of each of the plurality of elements in the 3D coordinate system can be determined based on the respective coordinate information of the plurality of primitives in the 3D coordinate system. The respective coordinate information of each of the elements can correspond to a logical memory address for the element stored in a memory.

Determining the EM field contribution to each of the plurality of elements for each of the plurality of primitives can include determining, in the 3D coordinate system, at least one distance between the element and the primitive based on the respective coordinate information of the element and the respective coordinate information of the primitive. In some examples, determining the EM field contribution to each of the plurality of elements for each of the plurality of primitives includes: determining a first distance between a first primitive of the plurality of primitives and a first element of the plurality of elements based on the respective coordinate information of the first primitive and the respective coordinate information of the first element; and determining a second distance between the first primitive and a second element of the plurality of elements based on the first distance and a distance between the first element and the second element. The distance between the first element and the second element can be predetermined based on a pitch of the plurality of elements of the display.

In some examples, at least one of the plurality of primitives is a line primitive including first and second endpoints, and determining at least one distance between the element and the primitive includes: determining a first distance between the element and the first endpoint of the line primitive; and determining a second distance between the element and the second point of the line primitive. In some examples, at least one of the plurality of primitives is a triangle primitive including first, second, and third endpoints, and determining at least one distance between the element and the primitive includes: determining a first distance between the element and the first endpoint of the triangle primitive; determining a second distance between the element and the second point of the triangle primitive; and determining a third distance between the element and the third point of the triangle primitive.

In some implementations, determining the EM field contribution to each of the plurality of elements for each of the plurality of primitives includes determining the EM field contribution to the element from the primitive based on a predetermined expression for the primitive and the at least one distance. In some cases, the predetermined expression is determined by analytically calculating the EM field propagation from the primitive to the element. In some cases, the predetermined expression is determined by solving Maxwell's equations. The Maxwell's equations can be solved by providing a boundary condition defined at a surface of the display. The boundary condition can include a Dirichlet boundary condition or a Cauchy boundary condition. The plurality of primitives and the plurality of elements can be in the 3D space, and a surface of the display can form a portion of a boundary surface of the 3D space. In some cases, the predetermined expression includes at least one of functions including a sine function, a cosine function, or an exponential function, and determining the EM field contribution includes identifying a value of the at least one of the functions in a table stored in a memory.

In some implementations, determining the EM field contribution to each of the plurality of elements for each of the plurality of primitives and generating the sum of the field contributions for each of the plurality of elements includes: determining first EM field contributions from the plurality of primitives to a first element of the plurality of elements and summing the first EM field contributions for the first element; and determining second EM field contributions from the plurality of primitives to a second element of the plurality of elements and summing the second EM field contributions for the second element. Determining the first EM field contributions from the plurality of primitives to the first element can include: determining an EM field contribution from a first primitive of the plurality of primitives to the first element in parallel with determining an EM field contribution from a second primitive of the plurality of primitives to the first element.

In some implementations, determining the EM field contribution to each of the plurality of elements for each of the plurality of primitives includes: determining first respective EM field contributions from a first primitive of the plurality of primitives to each of the plurality of elements; and determining second respective EM field contributions from a second primitive of the plurality of primitives to each of the plurality of elements, and generating the sum of the field contributions for each of the plurality of elements can include: accumulating the EM field contributions for the element by adding the second respective EM field contribution to the first respective EM field contribution for the element. Determining the first respective EM field contributions from the first primitive to each of the plurality of elements can be performed in parallel with determining the second respective EM field contributions from the second primitive to each of the plurality of elements.

Determining the EM field contribution to each of the plurality of elements for each of the plurality of primitives can include: determining a first EM field contribution from a first primitive of the plurality of primitives to a first element of the plurality of elements in parallel with determining a second EM field contribution from a second primitive of the plurality of primitives to the first element.

In some implementations, the method further includes: for each of the plurality of elements, generating a respective control signal based on the sum of the EM field contributions from the plurality of primitives to the element, the respective control signal being for modulating at least one property of the element based on the sum of the EM field contributions from the plurality of primitives to the element. The at least one property of the element can include at least one of a refractive index, an amplitude index, a birefringence, or a retardance. The respective control signal can include an electrical signal, an optical signal, a magnetic signal, or an acoustic signal. In some cases, the method further includes: multiplying a scale factor to the sum of the field contributions for each of the elements to obtain a scaled sum of the field contributions, and the respective control signal is generated based on the scaled sum of the field contributions for the element. In some cases, the method further includes:

normalizing the sum of the field contributions for each of the elements, and the respective control signal is based on the normalized sum of the field contributions for the element. The method can also include: transmitting the respective control signal to the element.

In some implementations, the method further includes: transmitting a control signal to an illuminator, the control signal indicating to activate the illuminator such that the illuminator emits light on the display. The control signal can be transmitted in response to determining a completion of obtaining the sum of the field contributions for each of the plurality of elements. The modulated elements of the display can cause the light to propagate in different directions to form a volumetric light field corresponding to the object in the 3D space. The volumetric light field can correspond to a solution of Maxwell's equations with a boundary condition defined by the modulated elements of the display. The light can include a white light, and the display can be configured to diffract the white light into light with different colors.

In some implementations, the method further includes representing values using fixed point number representations during calculation. Each of the values can be represented as integers with an implicit scale factor.

In some implementations, the method further includes performing a mathematical function using fixed point number representations. The mathematical function can include at least one of sine, cosine, and arc tangent. Performing the mathematical function can include receiving an expression in a first fixed point format, and outputting a value at a second fixed point format that has a level of accuracy different from that of the first fixed point format. Performing the mathematical function can include looking up a table for calculation of the mathematical function, wherein the table includes at least one of a fully enumerated look-up table, an interpolated table, a semi-table based polynomial functions, and a semi-table based on full minimax polynomials. Performing the mathematical function can include applying a specialized range reduction for an input. Performing the mathematical function can include transforming a trigonometric calculation from a range $[-\pi, \pi]$ into a signed 2's compliment representation in a range $[-1,1]$.

Another aspect of the present disclosure features a method that includes: obtaining respective primitive data of a plurality of primitives corresponding to an object in a three-dimensional (3D) space; calculating first respective electromagnetic (EM) field contributions from a first primitive of the plurality of primitives to each of a plurality of elements of a display; and calculating second respective EM field contributions from a second primitive of the plurality of primitives to each of the plurality of elements of the display. Calculating the first respective EM field contributions from the first primitive is at least partially in parallel with calculating the second respective EM field contributions from the second primitive.

In some implementations, calculating a first EM field contribution from the first primitive to a first element of the plurality of elements is in parallel with calculating a second EM field contribution from a second primitive of the plurality of primitives to the first element. The method can include calculating respective EM field contributions from each of the plurality of primitives to each of the plurality of elements. The calculation of the respective EM field contributions can be without at least one of: expanding geometry of the object into the plurality of elements; applying visibility tests before packing wavefronts; and decision making or communication between parallel calculations for different primitives. The calculation of the respective EM field contributions can be configured to cause at least one of: tuning parallel calculations for different primitives to speed, cost, size or energy optimization; reducing latency between initiating a draw and a result being ready for display; increasing accuracy using fixed point number representations; and optimizing computation speed by optimizing mathematical functions.

In some implementations, the method further includes representing values using fixed point number representations during calculation. Representing the values using the fixed point number representations can proceed without at least one of: denormalizing floats for gradual underflow; handling NaN results from operations including division by zero; altering floating point rounding modes; and raising floating point exceptions to an operating system.

In some implementations, the method further includes, for each of the plurality of elements, accumulating EM field contributions for the element by adding the second respective EM field contribution for the element to the first respective EM field contribution for the element.

In some implementations, the method further includes, for each of the plurality of elements, generating a respective control signal based on a sum of the EM field contributions from the plurality of primitives to the element, wherein the respective control signal is for modulating at least one property of the element based on the sum of the EM field contributions from the plurality of primitives to the element.

In some implementations, the method further includes scaling a first primitive adjacent to a second primitive by a predetermined factor such that a reconstruction of the first primitive does not overlap with a reconstruction of the second primitive. The predetermined factor can be determined at least partially based on a resolution of the display. The method can further include: obtaining respective primitive data for each of the plurality of primitives, wherein the respective primitive data of each of the plurality of primitives comprises respective coordinate information of the primitive in the 3D coordinate system; and determining new respective coordinate information of the first primitive based on the respective coordinate information of the first primitive and the predetermined factor. The method can further include determining an EM field contribution from the first primitive to each of the plurality of elements based on the new respective coordinate information of the first primitive. The method can further include scaling the second primitive by the predetermined factor. The first primitive and the second primitive can share a common part, wherein scaling the first primitive comprises scaling the common part of the first primitive. Scaling the first primitive can include scaling the first primitive in a predetermined direction.

Another aspect of the present disclosure features a method that includes: obtaining respective primitive data of a plurality of primitives corresponding to an object in a three-dimensional (3D) space; scaling a first primitive adjacent to a second primitive by a predetermined factor using the respective primitive data for the first primitive and the second primitive; and updating the respective primitive data for the first primitive based on a result of the scaling.

In some implementations, the respective primitive data of each of the plurality of primitives include respective coordinate information of the primitive in a 3D coordinate system, and updating the respective primitive data includes determining new respective coordinate information of the first primitive based on the respective coordinate information of the first primitive and the predetermined factor.

In some implementations, the predetermined factor is determined such that a reconstruction of the first primitive does not overlap with a reconstruction of the second primitive in the 3D space.

In some implementations, the scaling is performed such that a gap between reconstruction of the first primitive and the second primitive in the 3D space is big enough to separate the first and second primitives to minimize an overlapping effect and small enough to make the reconstruction appear seamless.

In some implementations, the predetermined factor is determined at least partially based on a resolution of the display or on an actual or assumed distance from the viewer to the display or to the z-depth of the primitives within the display's 3D space.

In some implementations, the method further includes storing the updated primitive data for the first primitive in a buffer.

In some implementations, the scaling is performed during a rendering process of the object for obtaining the respective primitive data of the plurality of primitives.

In some implementations, the method further includes transmitting updated primitive data for the plurality of primitives to a controller, wherein the controller is configured to determining respective electromagnetic (EM) field contributions from each of the plurality of primitives to each of a plurality of elements of a display based on the updated primitive data for the plurality of primitives.

In some implementations, the method further includes determining an EM field contribution from the first primitive to each of a plurality of elements of a display based on the updated primitive data of the first primitive.

In some implementations, the method further includes scaling the second primitive by the predetermined factor.

In some implementations, the first primitive and the second primitive share a common part, and scaling the first primitive comprises scaling the common part of the first primitive.

In some implementations, scaling the first primitive includes scaling the first primitive in a predetermined direction.

In some implementations, scaling the first primitive includes scaling a first part of the first primitive by a first predetermined factor, and scaling a second part of the second primitive by a second predetermined factor, where the first predetermined factor is different from the second predetermined factor.

Another aspect of the present disclosure features a method that includes: obtaining a plurality of discrete cosine transform (DCT) weights of an image to be mapped on a specified surface of a particular primitive of a plurality of primitives corresponding to an object in a three-dimensional (3D) space; and determining a respective EM field contribution from the particular primitive to each of a plurality of elements of a display by taking into consideration of an effect of the plurality of DCT weights of the image.

In some implementations, the method further includes: determining a resolution for the image to be mapped on the specified surface of the particular primitive; and determining the plurality of DCT weights of the image based on the resolution.

In some implementations, the method further includes decoding the DCT weights of the image to obtain a respective DCT amplitude for each pixel of the image.

In some implementations, the method further includes storing values associated with the respective DCT amplitudes of the pixels of the image together with primitive data of the particular primitive. Determining the respective EM field contribution can include calculating the respective EM field contribution from the particular primitive to each of the plurality of elements with the values associated with the respective DCT amplitudes of the pixels of the image.

In some implementations, the method further includes selecting particular DCT terms to be included in the determining of the respective EM field contribution, each of the particular DCT terms having a respective DCT weight higher than a predetermined threshold.

Another aspect of the present disclosure features a method that includes: obtaining information of a given primitive and an occluder of the given primitive, wherein the given primitive is within a plurality of primitives corresponding to an object in a three-dimensional (3D) space; and determining one or more particular elements of a plurality of elements of a display that do not contribute to a reconstruction of the given primitive as an effect of the occluder.

In some implementations, the method further includes storing the information of the particular elements with the information of the given primitive and the occluder.

In some implementations, the determining is performed during a rendering process of the object for obtaining primitive data of the plurality of primitives.

In some implementations, the method further includes transmitting the stored information of the particular elements with the information of the given primitive and the occluder to a controller configured to calculate electromagnetic (EM) contributions for the plurality of primitives to the plurality of elements of the display.

In some implementations, the method further includes, for each one of the particular elements, generating a sum of electromagnetic (EM) field contributions from the plurality of primitives to the one of the particular elements by excluding an EM field contribution from the given primitive to the one of the particular elements.

In some implementations, the method further includes, for each of the plurality of elements other than the particular elements, generating a respective sum of EM field contributions from the plurality of primitives to the element.

In some implementations, the method further includes masking an EM field contribution of the particular elements to the given primitive.

In some implementations, determining the one or more particular elements includes: connecting the given primitive to endpoints of the occluder; extending the connection to the display to determine intersections between the connection and the display; and determining a particular range defined by the intersections to be the particular elements that do not contribute to the reconstruction of the given primitive at the effect of the occluder.

Another aspect of the present invention features a method that includes: obtaining information of a given primitive and an occluder of the given primitive, wherein the given primitive is within a plurality of primitives corresponding to an object in a three-dimensional (3D) space; and for each of a plurality of elements of a display, determining a respective part of the given primitive that does not make an electromagnetic (EM) field contribution to the element as an effect of the occluder.

In some implementations, the method further includes storing the information of the respective part of the given primitive with the information of the given primitive and the occluder.

In some implementations, the determining is performed during a rendering process of the object for obtaining primitive data of the plurality of primitives.

In some implementations, the method further includes transmitting the stored information of the respective part of the given information with the information of the given primitive and the occluder to a controller configured to calculate electromagnetic (EM) contributions for the plurality of primitives to the plurality of elements of the display.

In some implementations, the method further includes masking an EM field contribution of each of the plurality of elements to the respective part of the given primitive.

In some implementations, the method further includes, for each of the plurality of elements, generating a sum of EM field contributions from the plurality of primitives to the element by excluding an EM field contribution from the respective part of the given primitive to the element. Generating the sum of EM field contributions from the plurality of primitives to the element can include subtracting the EM contribution of the respective part of the given primitive to the element from the sum of EM field contributions from the plurality of primitive to the element without the effect of the occluder. Generating the sum of EM field contributions from the plurality of primitives to the element can include summing EM field contributions from one or more other parts of the given primitive to the element, the respective part and the one or more other parts forming the given primitive.

In some implementations, determining a respective part of the given primitive that do not make an EM field contribution to the element as an effect of the occluder includes: connecting the element to endpoints of the occluder; determining intersections between the connection and the given primitive; and determining a particular part of the given primitive that is enclosed by the intersections to be the respective part of the given primitive that does not make the EM field contribution to the element at the effect of the occluder.

Another aspect of the present disclosure features a method that includes obtaining respective primitive data of each of a plurality of primitives corresponding to an object in a three-dimensional (3D) space; obtaining respective geometric specular information for each of the plurality of primitives; and storing the respective geometric specular information with respective primitive data for each of the plurality of primitives.

In some implementations, the respective geometric specular information for each of the plurality of primitives includes a reflectivity of a surface of the primitive upon a viewing angle.

In some implementations, the method further includes determining a respective EM field contribution from each of the plurality of primitives to each of a plurality of elements of a display by taking into consideration of the respective geometric specular information for the primitive.

Another aspect of the present disclosure features a method that includes: obtaining graphic data comprising respective primitive data for a plurality of primitives corresponding to an object in a three-dimensional (3D) space; determining, for each of the plurality of primitives, an electromagnetic (EM) field contribution to each of a plurality of elements of a display by calculating, in a 3D coordinate system, an EM field propagation from the primitive to the element; generating, for each of the plurality of elements, a sum of the EM field contributions from the plurality of primitives to the element; transmitting, for each of the plurality of elements, a respective control signal to the element, the control signal being for modulating at least one property of the element based on the sum of the EM field contributions to the element; and transmitting a timing control signal to an illuminator to activate the illuminator to illuminate light on the display such that the light is caused by the modulated elements of the display to form a volumetric light field corresponding to the object.

Another aspect of the disclosure features a method that includes: for each of a plurality of elements of a display, altering a respective control signal with a predetermined calibration value; applying the respective altered respective control signals to the plurality of elements of the display; measuring an output of light incident on the display; and evaluating the predetermined calibration value based on the measurement of the output of the light.

In some implementations, the predetermined calibration value is the same for each of the plurality of elements.

In some implementations, the method further includes converting the respective control signals of the plurality of elements by a digital-to-analog converter (DAC), wherein altering the respective control signals for the plurality of elements includes altering digital signals of the respective control signals with the predetermined calibration value.

In some implementations, the predetermined value comprises a plurality of bits.

In some implementations, the method further includes adjusting the predetermined calibration value based on a result of the evaluation. Adjusting the predetermined calibration value can include modifying one or more values of the plurality of bits. Adjusting the predetermined calibration value can include determining a combination of values of the plurality of bits based on the predetermined calibration value and another calibration value determined from a previous evaluation.

In some implementations, the output of the light comprises a phase change of the light or an intensity difference between the output of the light and a background.

In some implementations, the respective control signal of the element is determined based on a sum of electromagnetic (EM) field contributions from a plurality of primitives corresponding to an object to the element in a 3D space.

Another aspect of the disclosure features a method that includes, for each of a plurality of elements of a display: obtaining a respective sum of electromagnetic (EM) field contributions from a plurality of primitives in a three-dimensional (3D) space, the plurality of primitives corresponding to an object in the 3D space; applying a respective mathematical transform to the respective sum of EM field contributions for the element to obtain a respective transformed sum of EM field contributions for the element; determining a respective control signal based on the respective transformed sum of EM field contributions for the element; and modulating a property of the element based on the determined respective control signal for the element.

In some implementations, the method further includes: introducing light incident on the plurality of elements of the display; measuring a first output of the light; and adjusting one or more coefficients of the respective mathematical transforms of the plurality of elements based on a result of the measurement of the first output of the light. The method can further include: changing a depth of a holographic pattern corresponding to the object in view of the display; measuring a second output of the light; and adjusting the one or more coefficients of the respective mathematical transforms based on the first and second outputs. The method can further include: changing the plurality of primitives corresponding to a first holographic pattern to a second plurality of primitives corresponding to a second holographic pattern; measuring a second output of the light; and adjusting the one or more coefficients of the respective mathematical transforms based on the first and second outputs. The first holographic pattern and the second holographic pattern can correspond to the object. The second holographic pattern can correspond to a second object different from the object related to the first holographic pattern. The first output of the light can be measured by an imaging sensor (e.g., a point sensor or a spatially integrating sensor or a three-dimensional sensor such as a light-field sensor). The imaging sensor can be configured to use a machine vision algorithm to determine what is being displayed and calculate a fitness parameter. Each of the first and second holographic patterns can include a grid of dots or other fiducial elements, wherein the fitness parameter is at least one of: how close the dots or other fiducial elements are together; how close the dots or other fiducial elements are to their intended positions colors and intensities; how well centered the dots or other fiducial elements are positioned with respect to their intended positions, and how distorted the dots or other fiducial elements are.

In some implementations, the mathematical transform is derived from a Zernike polynomial expression.

In some implementations, the mathematical transforms for the plurality of elements vary element-by-element.

In some implementations the method further includes: reproducing a sample set of known colors and intensities by illuminating the display; measuring an output light using a colorimeter device which can be calibrated to CIE standard observer curves; and defining the output light of the display in a color space such as a CIE color space. The method can further include: determining a deviation of values of the defined output light from known standard values; and adapting illumination into the display or the generation of output colors and intensities by the display to bring them back into alignment, e.g., conformance with standard or desired values.

Another aspect of the disclosure features a method that includes: determining a cell gap of a liquid crystal (LC) display based on a pitch of display elements of the LC display; and calculating a minimum value of a birefringence of an LC mixture based on the cell gap and a predetermined retardance for the LC display.

In some implementations, the method further includes improving a switching speed of the LC display by keeping the birefringence of the LC mixture above the minimum value. Improving the switching speed can include at least one of: increasing dielectric anisotropy of the LC mixture; and decreasing the rotational viscosity of the LC mixture.

In some implementations, the LC display includes a liquid crystal on silicon (LCOS or LCoS) device having a silicon backplane.

In some implementations, the LC display includes: a liquid crystal layer; a transparent conductive layer on top of the liquid crystal layer as a common electrode; and a backplane comprising a plurality of metal electrodes on or electrically close to the bottom of the liquid crystal layer, wherein each of the plurality of metal electrodes is isolated from each other, and the backplane is configured to control a voltage of each of the plurality of metal electrodes.

Another aspect of the disclosure features a display that includes: a backplane; and a plurality of display elements on the backplane, wherein at least two of the plurality of display elements have different sizes.

In some implementations, a larger one of the at least two display elements comprises a buffer, and a smaller one of the at least two display elements comprises no buffer. The larger display element can be connected with a first plurality of display elements by a conductive line, wherein the buffer is configured to buffer a voltage applied on the conductive line such that the voltage is only applied to a second plurality of display elements within the first plurality of display elements, a number of the second plurality of display elements being smaller a number of the first plurality of display elements.

In some implementations, the buffer comprises an analog circuit in a form of a transistor or a digital circuit in a form of logic gates.

In some implementations, a size distribution of the plurality of display elements is substantially identical to a size of a smaller one of the at least two display elements.

In some implementations, the display is configured to be a liquid crystal on silicon device.

Another aspect of the disclosure features a display that includes: a backplane; and a plurality of display elements on the backplane, wherein at least two of the plurality of display elements have different shapes.

In some implementations, the backplane includes a respective circuit for each of the display elements, wherein the respective circuits for the at least two display elements have shapes corresponding to the different shapes of the at least two display elements.

In some implementations, a size distribution of the plurality of display elements is substantially identical to a predetermined size.

In some implementations, the display is configured to be a liquid crystal on silicon device.

Another aspect of the present disclosure features a method including: obtaining graphic data including respective primitive data for a plurality of primitives corresponding to an object in a three-dimensional (3D) space; determining, for each of the plurality of primitives, an electromagnetic (EM) field contribution to each of a plurality of elements of a display by calculating, in a 3D coordinate system, an EM field propagation from the primitive to the element; generating, for each of the plurality of elements, a sum of the EM field contributions from the plurality of primitives to the element; transmitting, for each of the plurality of elements, a respective control signal to the element, the control signal being for modulating at least one property of the element based on the sum of the EM field contributions to the element; and transmitting a timing control signal to an illuminator to activate the illuminator to illuminate light on the display such that the light is caused by the modulated elements of the display to form a volumetric light field corresponding to the object.

Other embodiments of the aspects include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Another aspect of the present disclosure features a device that includes: one or more processors; and a non-transitory computer readable storage medium in communication with the one or more processors and storing instructions executable by the one or more processors and upon such execution cause the one or more processors to perform one or more of the methods disclosed herein.

Another aspect of the present disclosure features a non-transitory computer readable storage medium storing instructions executable by one or more processors and upon such execution cause the one or more processors to perform the method according to one or more of the methods disclosed herein.

Another aspect of the present disclosure features a display including a plurality of elements; and a controller coupled to the display and configured to perform one or more of the methods disclosed herein. The controller can include a plurality of computing units, each of the computing units being configured to perform operations on one or more primitives of a plurality of primitives correspond to an object in a three-dimensional (3D) space. In some implementations, the controller is locally coupled to the display, and each of the computing units is coupled to one or more respective elements of the display and configured to transmit a respective control signal to each of the one or more respective elements. The computing units can be configured to operate in parallel.

The controller can include at least one of an application-specific integrated circuit (ASIC), a field-programmable gate array (FPGA), a programmable gate array (PGA), a central processing unit (CPU), a graphics processing unit (GPU), or standard or custom computing cells. The display can include a spatial light modulator (SLM) including a digital micro-mirror device (DMD) or a liquid crystal on silicon (LCOS or LCoS) device. The display can be configured to be phase modulated, amplitude modulated, or phase and amplitude modulated. The controller can be coupled to the display through a memory buffer.

In some implementations, the system includes an illuminator arranged adjacent to the display and configured to emit light on the display. The illuminator can be coupled to the controller and configured to be turned on/off based on a control signal from the controller.

In some cases, the illuminator is coupled to the controller through a memory buffer configured to control amplitude or brightness of one or more light emitting elements in the illuminator. The memory buffer for the illuminator can have a smaller size than a memory buffer for the display. A number of the light emitting elements in the illuminator can be smaller than a number of the elements of the display. The controller can be configured to simultaneously or sequentially activate the one or more light emitting elements of the illuminator.

The illuminator can be a coherent light source, a semi-coherent light source, or an incoherent light source. In some implementations, the illuminator is configured to emit a white light, and wherein the display is configured to diffract the white light into light with different colors. In some implementations, the illuminator includes two or more light emitting elements each configured to emit light with a different color. The controller can be configured to sequentially modulate the display with information associated with a first color during a first time period and modulate the display with information associated with a second color during a second, sequential time period, and the controller can be configured to control the illuminator to sequentially activate a first light emitting element to emit light with the first color during the first time period and a second light emitting element to emit light with the second color during the second time period.

In some implementations, the illuminator is arranged in front of a surface of the display and configured to emit the light on to the surface of the display with an incident angle within a range between 0 degree and 90 degrees, and the emitted light is diffracted from the display. In some cases, the emitted light from the illuminator includes collimated light. In some cases, the emitted light from the illuminator includes divergent light. In some cases, the emitted light from the illuminator includes convergent light. In some cases, the emitted light from the illuminator includes semi-collimated light.

In some implementations, the illuminator is arranged behind a rear surface of the display and configured to emit a divergent collimated, semi-collimated, or convergent light on the rear surface of the display, and the emitted light is transmitted through the display and diffracted out of the display from a front surface of the display.

In some implementations, the illuminator includes: a light source configured to emit the light; and a waveguide coupled to the light source and arranged adjacent to the display, the waveguide being configured to receive the emitted light from the light source and guide the emitted light to the display. In some cases, the light from the light source is coupled to the waveguide from a side cross-section of the waveguide through a light coupler. In some cases, the light source and the waveguide are integrated in a planar form and positioned on a surface of the display. The waveguide can be configured to guide the light to illuminate the display uniformly.

In some cases, the waveguide is positioned on or optically close to a rear surface of the display, and the light is guided to transmit into the display and transmitted and diffracted out of the display from a front surface of the display. The controller can be positioned on a rear surface of the waveguide. In some cases, the waveguide or lightguide is positioned on or optically close to a front surface of the display, and wherein the light is guided to be incident on the front surface of the display and reflected and diffracted back out through the front surface.

Another aspect of the present disclosure features a system including: a display including an array of elements; and an integrated circuit including an array of computing units, each of the computing units being coupled to one or more respective elements of the display and configured to: compute an electromagnetic (EM) field contribution from at least one primitive of a plurality of primitives to each of the array of elements; and generate, for each of the one or more respective elements, a respective sum of the EM field contributions from the plurality of primitives to the element.

Each of the computing units can be configured to: receive, from other computing units of the array of computing units, computed EM field contributions from other primitives of the plurality of primitives to each of the one or more respective elements; and generate, for each of the one or more respective elements, the respective sum of the EM field contributions by adding the received computed EM field contributions from the other primitives to the element.

Each of the computing units can be configured to generate, for each of the one or more respective elements, a respective control signal to modulate at least one property of the element based on the respective sum of the EM field contributions to the element.

In some implementations, the integrated circuit includes a respective accumulator configured to store an accumulation result of the computed EM field contribution from the plurality of primitives to each of the elements of the display. The integrated circuit can be configured to clear the accumulators at a beginning of a computation operation. In some examples, the integrated circuit includes a respective memory buffer for each of the elements, and the integrated circuit can be configured to accumulate the computed EM field contribution from the plurality of primitives to the element to obtain the respective sum of the EM field contributions as a final accumulation result in the respective accumulator and transfer the final accumulation result from the respective accumulator to the respective memory buffer for the element.

In some implementations, the system further includes an illuminator positioned between the integrated circuit and the display and configured to receive a control signal from the integrated circuit and illuminate light on the display based on the control signal, and the integrated circuit, the illuminator, and the display can be integrated as a single unit.

Another aspect of the present disclosure features a system, including: a computing device configured to generate data including respective primitive data of a plurality of primitives corresponding to an object in a three-dimensional (3D) space; and the system as disclosed herein. The system is configured to receive the graphic data from the computing device and process the graphic data for presenting the object in the 3D space. The computing device can include an application programming interface (API) configured to create the primitives with the respective primitive data by rendering a computer generated (CG) model of the object.

Another aspect of the present disclosure features an optical device, including: a first optically diffractive component; a second optically diffractive component; and a color-selective polarizer between the first and second optically diffractive components. When a first beam of light including a first color of light in a first polarization state is incident on the first optically diffractive component, the first optically diffractive component diffracts the first color of light in the first polarization state; when a second beam of light including a second color of light in a second polarization state is incident on the color-selective polarizer, the color-selective polarizer converts the second beam of light to a third beam of light including the second color of light in the first polarization state, the second color being different from the first color, and the second polarization state being different from the first polarization state; when the third beam of light is incident on the second optically diffractive component, the second optically diffractive component diffracts the second color of light in the first polarization state; and a diffraction efficiency with which the first optically diffractive component diffracts the second color of light in the second polarization state is substantially smaller than a diffraction efficiency with which the first optically diffractive component diffracts the first color of light in the first polarization state.

Another aspect of the present disclosure features an optical device including: a first optically diffractive component; a second optically diffractive component; and a color-selective polarizer between the first and second optically diffractive components. When a first color of light is incident on the first optically diffractive component at a first incident angle and in a first polarization state, the first optically diffractive component diffracts the first color of light at a first diffracted angle with a first diffraction efficiency; when a second color of light different from the first color of light is incident on the first optically diffractive component at a second incident angle in a second polarization state different from the first polarization state, the first optically diffractive component diffracts the second color of light with a diffraction efficiency that is substantially less than the first diffraction efficiency; when the second color of light in the second polarization state is incident on the color-selective polarizer, the color-selective polarizer rotates a polarization state of the second color of light from the second polarization state to the first polarization state; and when the second color of light is incident on the second optically diffractive component at the second incident angle and in the first polarization state, the second optically diffractive component diffracts the second color of light at a second diffracted angle with a second diffraction efficiency.

Another aspect of the present disclosure features an optical device including: a first optically diffractive component configured to: i) diffract a first color of light in a first polarization state incident at a first incident angle with a first diffraction efficiency at a first diffracted angle; and ii) diffract a second color of light in a second polarization state incident at a second incident angle with a diffraction efficiency that is substantially less than the first diffraction efficiency; a color-selective polarizer configured to rotate a polarization state of the second color of light in the second polarization state incident on the color-selective polarizer from the second polarization state to the first polarization state; and a second optically diffractive component configured to diffract the second color of light in the first polarization state incident at the second incident angle with a second diffraction efficiency at a second diffracted angle, where the color-selective polarizer is between the first and second optically diffractive components.

In some implementations, the second optically diffractive component is configured to diffract the first color of light in the second polarization state at the first incident angle with a diffraction efficiency substantially smaller than the second diffraction efficiency.

In some implementations, the first optically diffractive component, the color-selective polarizer, and the second optically diffractive component are sequentially stacked, such that the first color of light and the second color of light are incident on the first optically diffractive component before the second optically diffractive component.

In some implementations, the optical device further includes: a third optically diffractive component; and a second color-selective polarizer between the second and third optically diffractive components. The second color-selective polarizer is configured to: when a third color of light is incident in the second polarization state on the second color-selective polarizer, rotate a polarization state of the third color of light from the second polarization state to the first polarization state. The third optically diffractive component is configured to: when the third color of light is incident on the third optically diffractive component at a third incident angle and in the first polarization state, diffract the third color of light at a third diffracted angle with a third diffraction efficiency.

In some implementations, the color-selective polarizer is configured to rotate a polarization state of the first color of light from the first polarization state to the second polarization state, and the second color-selective polarizer is configured to rotate the polarization state of the second color of light from the first polarization state to the second polarization state, without rotation of the polarization state of the first color of light.

In some implementations, the optical device further includes: a third color-selective polarizer configured to rotate the polarization state of each of the first and second colors of light from the second polarization state to the first polarization state, without rotation of the polarization state of the third color of light. The third optically diffractive component is between the second and third color-selective polarizers.

In some implementations, the third optically diffractive component is configured to diffract each of the first and second colors of light incident in the second polarization state with a diffraction efficiency substantially smaller than the third diffraction efficiency. The first optically diffractive component is configured to diffract the third color of light incident in the second polarization state with a diffraction efficiency substantially smaller than the first diffraction efficiency, and the second optically diffractive component is configured to diffract each of the first and third colors of light incident in the second polarization state with a diffraction efficiency substantially smaller than the second diffraction efficiency.

In some implementations, the second color-selective polarizer includes a pair of a first sub-polarizer and a second sub-polarizer. The first sub-polarizer is configured to rotate the polarization state of the second color of light from the first polarization state to the second polarization state, without rotation of the polarization state of each of the first and third colors of light, and the second sub-polarizer is configured to rotate the polarization state of the third color of light from the second polarization state to the first polarization state, without rotation of the polarization state of each of the first and second colors of light.

In some implementations, the optical device further includes: a fourth color-selective polarizer configured to rotate a polarization state of the first color of light from the second polarization state to the first polarization state, without rotation of the polarization state of each of the second and third colors of light, where the first optically diffractive component is between the fourth color-selective polarizer and the color-selective polarizer.

In some implementations, each of the first, second, and third optically diffractive components includes a respective holographic grating formed in a recording medium. The recording medium can include a photosensitive polymer. The recording medium can be optically transparent. The respective holographic grating can be fixed in the recording medium.

In some implementations, each of the first, second, and third optically diffractive components includes a carrier film attached to a side of the recording medium. Each of the first, second, and third optically diffractive components can include a diffraction substrate attached to another side of the recording medium opposite to the carrier film.

In some cases, the carrier film of the first optically diffractive component is attached to a first side of the color-selective polarizer, and the diffraction substrate of the second optically diffractive component is attached to a second, opposite side of the color-selective polarizer, and the carrier film of the second optically diffractive component is attached to a first side of the second color-selective polarizer, and the diffraction substrate of the second optically diffractive component is attached to a second, opposite side of the second color-selective polarizer.

In some implementations, the optical device further includes a substrate, and the first optically diffractive component is between the substrate and the color-selective polarizer. In some implementations, the optical devices further includes: an anti-reflective coating on a surface of the substrate. In some implementations, the optical device includes: a front surface and a back surface, where the first color of light and the second color of light are incident on the front surface, and the optical device further includes: an anti-reflective coating on the back surface.

In some implementations, the optical device includes a plurality of optical components including the first optically diffractive component, the color-selective polarizer, and the second optically diffractive component, where adjacent two optical components of the plurality of components are attached together through a refractive index matching material.

In some implementations, each of the first and second optically diffractive components includes a respective Bragg grating formed in a recording medium, and the respective Bragg grating includes a plurality of fringe planes with a fringe tilt angle $\theta_t$ and a fringe spacing $\Lambda$ perpendicular to the fringe planes in a volume of the recording medium.

In some cases, the respective Bragg grating is configured such that, when an incident angle on the recording medium is an on-Bragg angle, a respective diffracted angle $\theta_m$ is satisfied with Bragg's equation as below:

$$m\lambda = 2n\Lambda \sin(\theta_m - \theta_t),$$

where $\lambda$ represents a respective wavelength of a color of light in vacuum, n represents a refractive index in the recording medium, $\theta_m$ represents $m^{th}$ diffraction order Bragg angle in the recording medium, and $\theta_t$ represents a fringe tilt in the recording medium.

In some cases, each of the first and second incident angles is substantially identical to the on-Bragg angle, and each of the first and second diffracted angles is substantially identical to first order Bragg angle.

In some cases, the fringe tilt angle of the respective Bragg grating is substantially identical to 45 degrees.

In some cases, a thickness of the recording medium is more than one order of magnitude larger than the fringe spacing. The thickness of the recording medium can be about 30 times larger than the fringe spacing.

In some cases, the first diffracted angle and the second diffracted angle are substantially identical to each other.

In some cases, each of the first and second diffracted angles is in a range from −10 degrees to 10 degrees. Each of the first and second diffracted angles can be substantially identical to 0 degrees. Each of the first and second diffracted angles can be in a range from −7 degrees to 7 degrees. Each of the first and second diffracted angles can be substantially identical to 6 degrees.

In some cases, each of the first and second incident angles is in a range from 70 degrees to 90 degrees. The first incident angle and the second incident angle can be substantially identical to each other.

In some cases, the first polarization state is s polarization, and the second polarization state is p polarization.

In some implementations, the first optically diffractive component is configured to diffract the second color of light incident in the second polarization state with the diffraction efficiency that is at least one order of magnitude smaller than the first diffraction efficiency.

In some implementations, the color-selective polarizer is configured not to rotate a polarization state of the first color of light.

In some implementations, the optical device further includes: a second color-selective polarizer configured to rotate a polarization state of the first color of light from the second polarization state to the first polarization state, without rotation of the polarization state of the second color of light, where the first optically diffractive component is between the second color-selective polarizer and the color-selective polarizer.

In some implementations, the first optically diffractive component includes a first diffractive structure, and the second optically diffractive component including a second diffractive structure, where the optical device includes a first reflective layer and a second reflective layer, where the first reflective layer is between the first and second diffractive structures, and the second diffractive structure is between the first and second reflective layers, where the first diffractive structure is configured to: i) diffract first and zero orders of the first color of light incident at the first incident angle on the first diffractive structure, the first order being diffracted at the first diffracted angle, and the zero order being transmitted at the first incident angle; and ii) transmit the second color of light incident at the second incident angle on the first diffractive structure, where the first reflective layer is configured to: i) totally reflect the first color of light incident on the first reflective layer at the first incident angle; and ii) transmit the second color of light incident on the first reflective layer at the second incident angle, where the second diffractive structure is configured to diffracts first and zero orders of the second color of light incident at the second incident angle on the second diffractive structure, the first order being diffracted at a second diffracted angle, and the zero order being transmitted at the second incident angle, and where the second reflective layer is configured to totally reflect the second color of light incident on the second reflective layer at the second incident angle.

Another aspect of the present disclosure features an optical device including: a first optically diffractive component including a first diffractive structure; a second optically diffractive component including a second diffractive structure; a first reflective layer; and a second reflective layer. The first reflective layer is between the first and second diffractive structures; the second diffractive structure is between the first and second reflective layers; when a first color of light is incident at a first incident angle on the first diffractive structure, the first diffraction structure diffracts first and zero orders of the first color, the first order being diffracted at a first diffracted angle, and the zero order being transmitted at the first incident angle; when a second color of light is incident at a second incident angle on the first diffractive structure, the first diffraction grating transmits the second color of light at the second incident angle; when the first color of light is incident on the first reflective layer at the first incident angle, the first reflective layer totally reflects the first color of light; when the second color of light is incident on the first reflective layer at the second incident angle, the reflective layer transmits the second color of light at the second incident angle; when the second color of light is incident at the second incident angle on the second diffractive structure, the second diffractive structure diffracts first and zero orders of the second color of light, the first order being diffracted at a second diffracted angle, and the zero order being transmitted at the second incident angle; and when the second color of light is incident on the second reflective layer at the second incident angle, the second reflective layer totally reflects the second color of light.

Another aspect of the present disclosure features an optical device including: a first optically diffractive component including a first diffractive structure configured to: i) diffract first and zero orders of a first color of light incident at a first incident angle on the first diffractive structure, the first order being diffracted at a first diffracted angle, and the zero order being transmitted at the first incident angle; and ii) transmit a second color of light incident at a second incident angle on the first diffractive structure; a first reflective layer configured to: i) totally reflect the first color of light incident on the first reflective layer at the first incident angle; and ii) transmit the second color of light incident on the first reflective layer at the second incident angle; a second optically diffractive component including a second diffractive structure configured to diffract first and zero orders of the second color of light incident at the second incident angle on the second diffractive structure, the first order being diffracted at a second diffracted angle, and the zero order being transmitted at the second incident angle; and a second reflective layer configured to totally reflect the second color of light incident on the second reflective layer at the second incident angle, where the first reflective layer is between the first and second diffractive structures, and the second diffractive structure is between the first and second reflective layers.

Another aspect of the present disclosure features an optical device including: a first optically diffractive component including a first diffractive structure configured to diffract a first color of light having a first incident angle at a first diffracted angle; a second optically diffractive component including a second diffractive structure configured to diffract a second color of light having a second incident angle at a second diffracted angle; a first reflective layer configured to totally reflect the first color of light having the first incident angle and transmit the second color of light having the second incident angle; and a second reflective layer configured to totally reflect the second color of light having the second incident angle, where the first reflective layer is between the first and second diffractive structures, and the second diffractive structure is between the first and second reflective layers.

In some implementations, the optical device further includes: a color-selective polarizer between the first and second diffractive structures. The first diffractive structure can be configured to: i) diffract the first color of light in a first polarization state incident at the first incident angle with a first diffraction efficiency; and ii) diffract the second color of light in a second polarization state incident at the second incident angle with a diffraction efficiency that is substantially less than the first diffraction efficiency. The color-selective polarizer can be configured to rotate a polarization state of the second color of light in the second polarization state incident on the color-selective polarizer from the second polarization state to the first polarization state. The second diffractive structure can be configured to diffract the second color of light in the first polarization state incident at the second incident angle with a second diffraction efficiency.

In some implementations, the optical device further includes: a side surface and an optical absorber attached to the side surface and configured to absorb totally reflected light of the first and second colors.

In some implementations, the first reflective layer is configured to have a refractive index smaller than that of a layer of the first optically diffractive component that is immediately adjacent to the first reflective layer, such that the first color of light having the first incident angle is totally reflected by an interface between the first reflective layer and the layer of the first optically diffractive component, without totally reflecting the second color of light having the second incident angle.

In some implementations, the first optically diffractive component includes a first carrier film and a first diffraction substrate attached to opposite sides of the first diffractive structure, the first carrier film being closer to the second diffractive structure than the first diffraction substrate, and the first carrier film can include the first reflective layer.

In some implementations, the second optically diffractive component includes a second carrier film and a second diffraction substrate attached to opposite sides of the second diffractive structure, the second diffraction substrate being closer to the first diffractive structure than the second carrier film, and the second reflective layer is attached to the second carrier film.

In some implementations, the optical device further includes: a third optically diffractive component including a third diffractive structure configured to diffract first and zero orders of a third color of light incident at a third incident angle on the third diffractive structure, the first order being diffracted at a third diffracted angle, and the zero order being transmitted at the third incident angle, and the second reflective layer is between the second diffractive structure and the third diffractive structure.

In some cases, each of the first and second reflective layers is configured to transmit the third color of light incident at the third incident angle.

In some implementations, the optical device further includes: a third reflective layer configured to totally reflect the third color of light incident at the third incident angle on the third reflective layer, where the third diffractive structure is between the second and third reflective layers.

In some implementations, the second optically diffractive components includes a second diffraction substrate and a second carrier film arranged on opposite sides of the second diffractive structure, the third optically diffractive component includes a third carrier film and a third diffraction substrate positioned on opposite sides of the third diffractive structure, and the second reflective layer is between the second and third carrier films.

In some implementations, each of the first and second diffractive structure includes a respective holographic grating formed in a recording medium. The recording medium can include a photosensitive polymer. The recording medium can be optically transparent.

In some implementations, each of the first and second optically diffractive components includes a respective Bragg grating formed in the recording medium, and the respective Bragg grating includes a plurality of fringe planes with a fringe tilt angle $\theta_t$ and a fringe spacing $\Lambda$ perpendicular to the fringe planes in a volume of the recording medium.

In some implementations, the respective Bragg grating is configured such that, when an incident angle on the recording medium is an on-Bragg angle, a respective diffracted angle $\theta_m$ is satisfied with Bragg's equation as below:

$$m\lambda=2n\Lambda \sin(\theta_m-\theta_t),$$

where $\lambda$ represents a respective wavelength of a color of light in vacuum, n represents a refractive index in the recording medium, $\theta_m$ represents $m^{th}$ diffraction order Bragg angle in the recording medium, $\theta_t$ represents the fringe tilt in the recording medium.

Each of the first and second incident angles can be substantially identical to a respective on-Bragg angle, and each of the first and second diffracted angles can be substantially identical to a respective first order Bragg angle.

In some implementations, a thickness of the recording medium is more than one order of magnitude larger than the fringe spacing. The thickness of the recording medium can be about 30 times larger than the fringe spacing.

In some cases, the first diffracted angle and the second diffracted angle are substantially identical to each other. In some examples, each of the first and second diffracted angles is in a range from −10 degrees to 10 degrees. In some examples, each of the first and second diffracted angles is substantially identical to 0 degrees. In some examples, each of the first and second diffracted angles is substantially identical to 6 degrees.

In some cases, the first incident angle is different from the second incident angle. In some cases, the first color of light has a wavelength smaller (or shorter) than the second color of light, and the first incident angle of the first color of light is larger (or longer) than the second incident angle of the second color of light. In some cases, each of the first and second incident angles is in a range from 70 degrees to 90 degrees.

In some implementations, the optical device includes a plurality of components including the first optically diffractive component and the second optically diffractive component, and adjacent two components of the plurality of components are attached together by an intermediate layer that includes at least one of a refractive index matching material, an OCA, a UV-cured or heat-cured optical glue, or an optical contacting material.

In some implementations, the second reflective layer includes the intermediate layer.

In some implementations, the optical device further includes a substrate having a back surface attached to a front surface of the first optically diffractive component. The substrate can include a side surface angled to the back surface and is configured to receive a plurality of different colors of light at the side surface. An angle between the side surface and the back surface of the substrate can be no less than 90 degrees. The substrate can be configured such that the plurality of different colors of light are incident on the side surface with an incident angle substantially identical to 0 degrees. In some cases, the substrate is wedged and includes a titled front surface, and an angle between the front surface and the side surface is less than 90 degrees.

Another aspect of the present disclosure features a system including: an illuminator configured to provide a plurality of different colors of light and any one of the optical devices described herein. The optical device is arranged adjacent to the illuminator and configured to receive the plurality of different colors of light from the illuminator and diffract the plurality of different colors of light.

In some implementations, the optical device is configured to diffract the plurality of different colors of light at respective diffracted angles that are substantially identical to each other.

In some examples, each of the respective diffracted angles is in a range of −10 degrees to 10 degrees.

In some implementations, the system further includes: a controller coupled to the illuminator and configured to control the illuminator to provide each of the plurality of different colors of light.

In some implementations, the system further includes: a display including a plurality of display elements, and the optical device is configured to diffract the plurality of colors of light to the display.

In some implementations, the controller is coupled to the display and configured to transmit a respective control signal to each of the plurality of display elements for modulation of at least one property of the display element.

In some implementations, the controller is configured to: obtain graphic data including respective primitive data for a plurality of primitives corresponding to an object in a three-dimensional space; determine, for each of the plurality of primitives, an electromagnetic (EM) field contribution to each of the plurality of display elements of the display; generate, for each of the plurality of display elements, a sum of the EM field contributions from the plurality of primitives to the display element; and generate, for each of the plurality of display elements, the respective control signal based on the sum of the EM field contributions to the display element.

Another aspect of the present disclosure features a system including: a display including a plurality of display elements and any one of the optical devices as described herein, and the optical device is configured to diffract a plurality of different colors of light to the display.

In some implementations, the optical device and the display are arranged along a direction. The optical device includes a front surface and a back surface along the direction, and the display includes a front surface and a back surface along the direction, and the front surface of the display is spaced from the back surface of the optical device.

In some implementations, the front surface of the display is spaced from the back surface of the optical device by a gap. At least one of the front surface of the display or the back surface of the optical device can be treated with an anti-reflection coating.

In some implementations, the system further includes a transparent protective layer on the back surface of the optical device.

In some implementations, the front surface of the display and the back surface of the optical device are attached together by an intermediate layer. The intermediate layer can be configured to have a refractive index lower than a refractive index of a layer of the optical device, such that each of the plurality of colors of light transmitted at zero order by the optical device is totally reflected at an interface between the intermediate layer and the layer of the optical device.

In some implementations, the system further includes a cover (e.g., a cover glass) on the front surface of the display, where the optical device is formed in the cover glass.

In some implementations, the optical device is configured to receive the plurality of colors of light at the front surface of the optical device.

In some implementations, the optical device includes a substrate in front of the optical device and is configured to receive the plurality of colors of light at a side surface of the substrate that is angled to a back surface of the substrate.

In some implementations, the optical device includes at least one diffractive grating supported by the substrate and configured to diffract the plurality of different colors of light towards the display.

In some implementations, the substrate includes a container filled with a liquid having a refractive index smaller than a recording medium of the diffractive grating.

In some implementations, the substrate is wedge-shaped and comprises a titled front surface. An angle between the front surface and the side surface can be less than 90 degree.

In some implementations, the optical device is configured to receive different portions of the plurality of different colors of light along different optical paths in the substrate and to diffract the different portions to illuminate different corresponding regions of the display. The different regions can include two or more of a lower region, an upper region, a left region, and a right region of the display. The different portions of the plurality of different colors of light can be provided by different corresponding illuminators. The optical device can be configured to receive different portions of the plurality of different colors of light from different corresponding side surfaces of the substrate.

In some examples, the optical device is configured to: receive a first portion of the plurality of different colors of light from a first side surface of the substrate to the back surface of the optical device and diffract the first portion to illuminate a first region of the display, and receive a second portion of the plurality of different colors of light from a second side surface of the substrate to the front surface of the optical device, reflect the second portion back to the back surface of the optical device, and diffract the second portion to illuminate a second region of the display. The first side surface and the second side surface can be a same side surface. The second portion of the plurality of different colors of light can be reflected by total internal reflection or a reflective grating in the optical device. The substrate can also include a partially reflective surface configured to separate an input light into the first portion and the second portion.

In some implementations, the optical device includes at least one diffractive grating arranged at the back surface of the optical device. The diffractive grating can include different sub-regions with different corresponding diffraction efficiencies. The diffractive grating can be configured to: diffract a first portion of the plurality of different colors of light incident at a first sub-region of the diffractive grating to illuminate a first region of the display and reflect a second portion of the plurality of different colors of light to the front back of the optical device that is further reflected back to the back surface of the optical device and incident at a second sub-region of the diffractive grating, and diffract the second portion to illuminate a second, different region of the display.

In some examples, the diffractive grating is configured such that the diffracted first portion and the diffracted second portion on the first region and the second region of the display have a substantially same optical power. The first and second regions of the display can have different reflectivities that are associated with first and second different diffraction efficiencies of the first and second sub-regions of the diffractive grating.

In some implementations, the diffractive grating includes a plurality of sub-regions that are tiled together. The sub-regions can be tiled along a horizontal direction.

In some cases, edges of the different sub-regions are configured to abut each other in an optically seamless manner. The different sub-regions can be formed by including one or more edge-defining elements in an optical path of at least one of a recording beam or an object beam during recording each sub-region in a recording medium, and the one or more edge-defining elements can include a square aperture, a rectangular aperture, or a plane-tiling aperture.

In some cases, two adjacent sub-regions of the diffractive grating abut with a gap. The display can include multiple tiled display devices, and the gap between the adjacent sub-regions of the diffractive grating is aligned with a gap between adjacent tiled display devices of the display.

In some cases, two adjacent different sub-regions have an overlap.

In some implementations, the diffractive grating is mechanically formed by using an embossed, nano-imprinted, or self-assembled structure.

In some implementations, the display has a width along a horizontal direction and a height along a vertical direction, both the horizontal direction and the vertical direction being perpendicular to the direction, and an aspect ratio between the width and the height can be larger than 16:9.

In some implementations, the optical device is configured to diffract a plurality of different colors of light at respective diffracted angles that are substantially identical to each other. In some examples, each of the respective diffracted angles is in a range of −10 degrees to 10 degrees.

In some implementations, the display is configured to diffract the diffracted colors of light back through the optical device.

In some implementations, an area of the optical device covers an area of the display.

In some implementations, the system further includes: an illuminator arranged adjacent to the optical device and configured to provide the plurality of colors of light to the optical device. The illuminator can include a plurality of light emitting elements each configured to emit a respective color of light.

In some implementations, centers of beams from the plurality of light emitting elements can be offset with respect to one another. The illuminator can be configured to provide a light beam with an elliptical beam profile or a rectangular beam profile. The illuminator can be configured to provide a light beam with a particular polarization orientation. The illuminator can include one or more optical components configured to independently control ellipticity and polarization orientation of each of the plurality of different colors of light.

In some implementations, the illuminator includes one or more optical components configured to control a uniformity of the plurality of different colors of light. The one or more optical components include apodizing optical elements or profile converters.

In some implementations, the system includes one or more anamorphic or cylindrical optical elements configured to increase a width of the plurality of different colors of light.

In some implementations, the system can further include: a prism element between the illuminator and the optical device and configured to receive the plurality of different colors of light from an input surface of the prism element; and one or more expansion gratings adjacent an exit surface of the prism element, each of the one or more expansion gratings configured to expand a beam profile of a different corresponding color of light by a factor in at least one dimension.

In some implementations, the system can further include: one or more reflectors downstream of the one or more expansion diffractive gratings, each of the one or more reflectors being configured to reflect a respective color of light into the optical device. A tilt angle of each of the one or more reflectors can be independently adjustable to cause a uniformity of diffraction from the optical device to the display.

The system can further include at least one of a color sensor or a brightness sensor configured to detect one or more optical properties of a holographic light field formed by the system, wherein the tilt angles of the one or more reflectors are adjustable based on the detected optical properties of the holographic light field. The one or more optical properties can include brightness uniformity, color uniformity, or white point.

In some implementations, the one or more reflectors are adjustable to correct for changes in alignment of components of the system.

In some implementations, an optical distance between the one or more reflectors and the optical device is configured such that each of the plurality of different colors of light is reflected by a corresponding reflector without transmission through one or more other reflectors.

In some implementations, the one or more reflectors are configured so that light illuminated at each of the one or more reflectors comes from a substantially different direction.

In some implementations, an angle between the prism element and a substrate of the optical device is adjustable to tilt a position of a holographic light field formed by the system.

In some implementations, the one or more expansion gratings are configured to at least partially collimate the plurality of different colors of light in one or two traverse directions.

In some implementations, the system further includes: a controller coupled to the illuminator and configured to control the illuminator to provide each of the plurality of colors of light. The controller can be coupled to the display and configured to transmit a respective control signal to each of the plurality of display elements for modulation of at least one property of the display element.

In some implementations, the controller is configured to: obtain graphic data including respective primitive data for a plurality of primitives corresponding to an object in a three-dimensional space; determine, for each of the plurality of primitives, an electromagnetic (EM) field contribution to each of the plurality of display elements of the display; generate, for each of the plurality of display elements, a sum of the EM field contributions from the plurality of primitives to the display element; and generate, for each of the plurality of display elements, the respective control signal based on the sum of the EM field contributions to the display element.

In some implementations, the controller is configured to: sequentially modulate the display with information associated with the plurality of colors of light in a series of time periods, and control the illuminator to sequentially emit each of the plurality of colors of light to the optical device during a respective time period of the series of time periods, such that each of the plurality of colors of light is diffracted by the optical device to the display and reflected by modulated display elements of the display to form a respective color three-dimensional light field corresponding to the object during the respective time period.

In some implementations, the controller is configured to modulate the display such that the respective color three-dimensional light field appears fully in front of the display, fully behind the display, or partially in front of the display and partially behind the display.

In some cases, the display includes a spatial light modulator (SLM) including a digital micro-mirror device (DMD) or a liquid crystal on silicon (LCOS) device.

In some implementations, the system further includes an optical polarizer arranged between the display and the optical device, wherein the optical polarizer is configured to change a polarization state of the plurality of different colors of light.

In some implementations, the optical device includes: an optical diffractive component configured to diffract light comprising the plurality of different colors of light to the display that is configured to diffract a portion of the light illuminating the display elements.

In some implementations, the optical device further includes: an optically redirecting component configured to transmit the portion of the light to form a holographic scene and to redirect display zero order light away from the holographic scene in a three-dimensional (3D) space, the display zero order light comprising reflected light from the display.

In some implementations, the optical redirecting component includes a plurality of redirecting holographic grating for the display zero order light of the plurality of different colors of light, and each of the plurality of redirecting holographic gratings is configured to diffract display zero order light of a respective color of light of the plurality of different colors of light at a respective diffractive angle towards a respective direction in the 3D space.

In some implementations, the optical diffractive component is configured to diffract the plurality of different colors of light to illuminate the display at an angle of about 0°, such that the optical diffractive component redirects the display zero order light reflected from the display away from the holographic scene.

In some implementations, a ratio between an amount of the display zero order light in the holographic scene with suppression of the optical diffractive component and the optically redirecting component and an amount of the display zero order light in the holographic scene without the suppression is less than 2%.

In some implementations, the optically redirecting component includes a one-dimensional suppression grating, and the holographic scene comprises a band corresponding to suppression of the display zero order light, and the system can be configured such that the band is outside of a viewing eyesight of a viewer.

Another aspect of the present disclosure features a system including: a display including a plurality of display elements; an optical device arranged adjacent to the display and configured to diffract light to the display; and a controller coupled to the display and configured to: obtain graphic data including respective primitive data for a plurality of primitives corresponding to an object in a three-dimensional space; determine, for each of the plurality of primitives, an electromagnetic (EM) field contribution to each of the plurality of display elements of the display by calculating, in a three-dimensional coordinate system, an EM field propagation from the primitive to the display element; generate, for each of the plurality of display elements, a sum of the EM field contributions from the plurality of primitives to the display element; and transmit, for each of the plurality of display elements, a respective control signal based on the sum of the EM field contributions to the display element for modulation of at least one property of the display element.

In some implementations, the optical device can include any one of the optical devices including at least one color-selective polarizer as describe herein.

In some implementations, the optical device includes any one of the optical devices including at least one reflective layer as described herein.

In some implementations, the optical device includes a holographic grating formed in a recording medium.

In some implementations, the optical device includes a plurality of holographic gratings formed on a recording medium, and each of the plurality of holographic gratings is configured to diffract light with a respective color having a respective incident angle to the display.

In some implementations, the optical device is arranged in front of the display and the display is configured to diffract the diffracted light back through the optical device to form a three-dimensional light field corresponding to the object.

In some implementations, the system further includes: an illuminator arranged adjacent to the optical device and configured to provide the light to the optical device.

In some implementations, the controller is configured to: sequentially modulate the display with information associated with a plurality of colors corresponding to a plurality of colors of light in a series of time periods, and control the illuminator to sequentially emit each of the plurality of colors of light to the optical device during a respective time period of the series of time periods, such that each of the plurality of colors of light is diffracted by the optical device to the display and reflected by modulated display elements of the display to form a respective color three-dimensional light field corresponding to the object during the respective time period.

Another aspect of the present disclosure features a method including: making any one of the optical devices as described herein.

Another aspect of the present disclosure features a method of making any one of the optical devices including at least one color-selective polarizer, including: forming the first optically diffractive component; forming the second optically diffractive component; and arranging the color-selective polarizer between the first optically diffractive component and the second optically diffractive component.

In some implementations, forming the first optically diffractive component includes: forming a first diffractive structure in a recording medium.

In some implementations, forming the first diffractive structure in the recording medium includes: recording a first holographic grating in the recording medium by illuminating a first recording object beam at a first recording object angle and a first recording reference beam at a first recording reference angle on the recording medium, where the first recording object beam and the first recording reference beam have a same wavelength and the same first polarization state.

In some examples, the first color of light includes a wavelength range wider than or identical to that of the first recording reference beam or the first recording object beam. In some examples, the first recording reference beam corresponds to a color different from a first color of the first color of light.

In some examples, the first incident angle of the first color of light is substantially identical to the first recording reference angle, and the first diffracted angle is substantially identical to the first recording object angle.

In some examples, the first recording reference angle is in a range from 70 degrees to 90 degrees. In some examples, the first recording reference angle is in a range from 80 degrees to 90 degrees. In some examples, the first recording object angle is in a range from −10 degrees to 10 degrees. In some examples, the first recording object angle is substantially identical to 6 degrees. In some examples, the first recording object angle is substantially identical to 0 degrees. In some examples, a sum of the first recording reference angle and the first recording object angle is substantially identical to 90 degrees.

In some implementations, a thickness of the recording medium is more than one order of magnitude larger than the wavelength of the first recording object beam. The thickness of the recording medium can be about 30 times larger than the wavelength of the first recording object beam.

In some implementations, forming the first diffractive structure in the recording medium includes: fixing the first diffractive structure in the recording medium.

In some implementations, the recording medium is between a carrier film and a diffraction substrate.

In some examples, the first diffracted angle and the second diffracted angle are substantially identical to each other. In some examples, the first incident angle and the second incident angle are substantially identical to each other.

In some implementations, arranging the color-selective polarizer between the first optically diffractive component and the second optically diffractive component includes: sequentially stacking the first optically diffractive component, the color-selective polarizer, and the second optically diffractive component, such that the first color of light and the second color of light are incident on the first optically diffractive component before the second optically diffractive component.

In some implementations, sequentially stacking the first optically diffractive component, the color-selective polarizer, and the second optically diffractive component includes: sequentially arranging the first optically diffractive component, the color-selective polarizer, and the second optically diffractive component on a substrate that is before the first optically diffractive component.

In some implementations, sequentially stacking the first optically diffractive component, the color-selective polarizer, and the second optically diffractive component includes: attaching the color-selective polarizer to the first optically diffractive component through a first intermediate layer; and attaching the second optically diffractive component to the color-selective polarizer through a second intermediate layer, where each of the first and second intermediate layers includes a respective refractive index matching material.

In some implementations, the method further includes: forming a third optically diffractive component configured to diffract a third color of light having the first polarization state and a third incident angle at a third diffracted angle with a third diffraction efficiency; and arranging a second color-selective polarizer between the second and third optically diffractive components, where the second color-selective polarizer is configured to rotate a polarization state of the third color of light from the second polarization state to the first polarization state.

In some implementations, the color-selective polarizer is configured to rotate a polarization state of the first color of light from the first polarization state to the second polarization state, and the second color-selective polarizer is configured to rotate the polarization state of the second color of light from the first polarization state to the second polarization state, without rotation of the polarization state of the first color of light.

In some implementations, the method further includes: arranging a third color-selective polarizer sequential to the third optically diffractive component such that the third optically diffractive component is between the second and third color-selective polarizers, where the third color-selective polarizer is configured to rotate the polarization state of each of the first and second colors of light from the second polarization state to the first polarization state, without rotation of the polarization state of the third color of light.

In some implementations, the method further includes: arranging a fourth color-selective polarizer before the first optically diffractive component such that the first optically diffractive component is between the fourth color-selective polarizer and the color-selective polarizer, where the fourth color-selective polarizer is configured to rotate a polarization state of the first color of light from the second polarization state to the first polarization state, without rotation of the polarization state of each of the second and third colors of light.

In some implementations, the first polarization state is s polarization, and the second polarization state is p polarization.

Another aspect of the present disclosure features a method of making any one of the optical devices including at least one reflective layer, including: forming the first optically diffractive component including the first diffractive structure; forming the second optically diffractive component including the second diffractive structure; arranging the first reflective layer between the first diffractive structure and the second diffractive structure, the second diffractive structure being sequential to the first diffractive structure along a direction; and arranging the second reflective layer sequential to the second diffractive structure along the direction.

In some implementations, the method further includes: forming an optical absorber on a side surface of the optical device, where the optical absorber is configured to absorb the totally reflected light of the first and second colors.

In some implementations, the first reflective layer is configured to have a refractive index smaller than that of a layer of the first optically diffractive component that is immediately adjacent to the first reflective layer, such that the first color of light having the first incident angle is totally reflected by an interface between the first reflective layer and the layer of the first optically diffractive component, without totally reflecting the second color of light having the second incident angle.

In some implementations, the method further includes: forming a third optically diffractive component including a third diffractive structure configured to diffract a third color of light having a third incident angle, where arranging the second reflective layer sequential to the second diffractive structure along the direction includes: arranging the second reflective layer between the second diffractive structure and the third diffractive structure along the direction. Each of the first reflective layer and the second reflective layer can be configured to transmit the third color of light having the third incident angle.

In some implementations, the method further includes: arranging a third reflective layer sequential to the third diffractive structure along the direction, where the third reflective layer is configured to totally reflect the third color of light having the third incident angle.

In some implementations, each of the first, second, and third optically diffractive components includes a respective carrier film and a respective diffraction substrate, and the first reflective layer includes a first carrier film of the first optically diffractive component. Arranging the first reflective layer between the first diffractive structure and the second diffractive structure can include: attaching a second diffraction substrate of the second optically diffractive component to the first carrier film of the first optically diffractive component by a first intermediate layer. Arranging the second reflective layer between the second diffractive structure and the third diffractive structure along the direction can include: attaching a second carrier film of the second optically diffractive component to a third carrier film of the third optically diffractive component by a second intermediate layer. The second reflective layer can include the second intermediate layer. The third reflective layer can be attached to a third diffraction substrate of the third optically diffractive component.

In some implementations, the method further includes: arranging the first optically diffractive component on a substrate that is before the first optically diffractive component along the direction, where the substrate includes a front surface and a back surface.

In some implementations, arranging the first optically diffractive component on the substrate includes: attaching a front surface of the first optically diffractive component to the back surface of the substrate through a refractive index matching material.

In some implementations, the substrate includes a side surface angled to the back surface of the substrate, and the substrate is configured to receive a plurality of different colors of light at the side surface. The substrate can be configured such that the plurality of different colors of light are incident on the side surface with an incident angle substantially identical to 0 degrees.

In some implementations, forming the first optically diffractive component including the first diffractive structure includes: forming the first diffractive structure in a recording medium.

In some implementations, forming the first diffractive structure in the recording medium includes: recording a first holographic grating in the recording medium by injecting a first recording object beam at a first recording object angle and a first recording reference beam at a first recording reference angle, where the first recording object beam and the first recording reference beam have a same wavelength and a same polarization state.

In some implementations, the first color of light includes a wavelength range wider than or identical to that of the first recording reference beam.

In some implementations, the first recording reference beam corresponds to a color different from a first color of the first color of light.

In some implementations, the first incident angle of the first color of light is substantially identical to the first recording reference angle, and the first diffracted angle is substantially identical to the first recording object angle.

In some examples, the first recording reference angle is in a range from 70 degrees to 90 degrees. In some examples, the first recording reference angle is in a range from 70 degrees to 80 degrees. In some examples, the first recording object angle is in a range from −10 degrees to 10 degrees.

In some implementations, a thickness of the recording medium is more than one order of magnitude larger than the wavelength of the first recording object beam. The thickness of the recording medium can be about 30 times larger than the wavelength of the first recording object beam.

In some implementations, forming the first diffractive structure in the recording medium includes: fixing the first diffractive structure in the recording medium.

In some implementations, the first incident angle is different from the second incident angle. In some examples, the first color of light has a wavelength smaller (or shorter) than the second color of light, and the first incident angle is larger (or longer) than the second incident angle.

Another aspect of the present disclosure features a method including: forming any one of the optical devices as described herein according to any one the methods as described above, and arranging the optical device and a display including a plurality of display elements, such that the optical device is configured to diffract a plurality of different colors of light to the display.

In some implementations, arranging the optical device and the display includes: spacing a back surface of the optical device from a front surface of the display by a gap.

In some implementations, the method further include: forming an anti-reflection coating on at least one of the front surface of the display or the back surface of the optical device.

In some implementations, arranging the optical device and the display includes: attaching a back surface of the optical device on a front surface of the display through an intermediate layer.

In some cases, the intermediate layer is configured to have a refractive index lower than a refractive index of a layer of the optical device, such that each of the plurality of different colors of light transmitted at zero order by the optical device is totally reflected at an interface between the intermediate layer and the layer of the optical device.

In some implementations, the optical device is configured to diffract the plurality of different colors of light at respective diffracted angles that are substantially identical to each other.

In some examples, each of the respective diffracted angles is in a range of −10 degrees to 10 degrees.

In some implementations, the display is configured to diffract the diffracted colors of light back through the optical device.

In some implementations, an area of the optical device covers an area of the display.

In some implementations, the optical device includes a substrate in front of the optical device and is configured to receive the plurality of different colors of light at a side surface of the substrate that is angled to a back surface of the substrate.

Another aspect of the present disclosure features a method including: using an optical device to convert an incoming beam including a plurality of different colors of light to individually diffracted colors of light. The optical device can be any one of the optical devices as described herein.

Another aspect of the present disclosure features a method including: transmitting at least one timing control signal to an illuminator to activate the illuminator to emit a plurality of different colors of light onto an optical device, such that the optical device converts the plurality of different colors of light to individually diffracted colors of light to illuminate a display including a plurality of display elements, where the optical device is any one of the optical devices as described herein; and transmitting, for each of the plurality of display elements of the display, at least one respective control signal to modulate the display element, such that the individually diffracted colors of light are reflected by the modulated display elements to form a multi-color three-dimensional light field corresponding to the respective control signals.

In some implementations, the method further includes: obtaining graphic data including respective primitive data for a plurality of primitives corresponding to an object in a three-dimensional space; determining, for each of the plurality of primitives, an electromagnetic (EM) field contribution to each of the plurality of display elements of the display by calculating, in a three-dimensional coordinate system, an EM field propagation from the primitive to the display element; generating, for each of the plurality of display elements, a sum of the EM field contributions from the plurality of primitives to the display element; and generating, for each of the plurality of display elements, the respective control signal based on the sum of the EM field contributions to the display element for modulation of at least one property of the display element, where the multi-color three-dimensional light field corresponds to the object.

In some implementations, the method includes: sequentially modulating the display with information associated with the plurality of different colors in a series of time periods, and controlling the illuminator to sequentially emit each of the plurality of different colors of light to the optical device during a respective time period of the series of time periods, such that each of the plurality of different colors of light is diffracted by the optical device to the display and reflected by the modulated display elements of the display to form a respective color three-dimensional light field corresponding to the object during the respective time period.

In some implementations, the plurality of different colors of light are diffracted by the optical device at a substantially same diffracted angle to the display. In some examples, the diffracted angle is within a range from −10 degrees to 10 degrees.

In some implementations, the illuminator and the optical device are configured such that the plurality of different colors of light are incident on the first optically diffractive component of the optical device with respective incident angles. In some examples, the respective incident angles are different from each other. In some examples, the respective incident angles are substantially identical to each other. In some examples, each of the respective incident angles is in a range from 70 degrees to 90 degrees.

Another aspect of the present disclosure features an optical device, including: at least two optically diffractive components and at least one color-selective polarizer, where the optical device is configured such that, when light of different colors is incident on the optical device, the optical device separates light of individual colors of the different colors while suppressing crosstalk between the different colors.

In some implementations, the optical device is configured such that, when the light of different colors is incident on the optical device, each of the optically diffractive components diffracts light of a respective color of the different colors.

In some implementations, the optical device is configured such that, in an output light beam diffracted by the optical device, a power of light of a particular color of the different colors is at least one order of magnitude higher than a power of light of one or more other colors of the different colors.

In some implementations, the at least one color-selective polarizer is configured to rotate a polarization state of light of at least one color of the different colors, such that light of a particular color of the different colors is incident in a first polarization state on a respective one of the optically diffractive components, while light of one or more other colors of the different colors is incident in a second polarization state different from the first polarization state on the respective one of the optically diffractive components.

Another aspect of the present disclosure features an optical device, including: at least two optically diffractive components and at least one reflective layer, where the optical device is configured such that, when light of different colors is incident on the optical device, the optical device separates light of individual colors of the different colors while suppressing crosstalk between the different colors, and where the at least one reflective layer is configured for total internal reflection of light of at least one of the different colors.

In some implementations, the optical device is configured such that an output light beam diffracted by the optical device includes only light of a particular color of the different colors without crosstalk from one or more other colors of the different colors.

In some implementations, the at least one reflective layer is configured to totally reflect zero order light of a particular color of the different colors transmitted by a respective one of the optically diffractive component, while transmitting one or more other colors of the different colors In some implementations, the optical device is configured such that, when the light of different colors is incident on the optical device, each of the optically diffractive components diffracts light of a respective color of the different colors.

Another aspect of the present disclosure features a display and any one of the optical devices as described herein, where the optical device is configured to diffract a plurality of different colors of light to the display.

Another aspect of the present disclosure features an illuminator configured to provide a plurality of different colors of light and any one of the optical devices as described herein, where the optical device is configured to diffract the plurality of different colors of light from the illuminator.

Another aspect of the present disclosure features a system including: a display and an optical device including one or more transmissive diffractive structures for diffracting light to the display.

In some implementations, the display is a reflective display configured to diffract the light back through the optical device. In some implementations, the system further includes an illuminator configured to provide the light to the optical device, where the illuminator is arranged in a front side of the transmissive diffractive structures of the optical device.

In some implementations, the display is a transmissive display configured to diffract the light forwards through the optical device. In some implementations, the system further includes an illuminator configured to provide the light to the optical device, where the illuminator is arranged in a rear side of the transmissive diffractive structures of the optical device.

In some implementations, each of the one or more transmissive diffractive structures is configured to diffract a respective color of a plurality of different colors.

In some implementations, the optical device further includes one or more reflective diffractive structures, and each of the one or more transmissive diffractive structures and the one or more reflective diffractive structures is configured to diffract a respective color of a plurality of different colors.

Another aspect of the present disclosure features a system including: a display and an optical device including one or more reflective diffractive structures for diffracting light to the display.

In some implementations, the display is a reflective display configured to diffract the light back through the optical device. In some implementations, the system further includes an illuminator configured to provide the light to the optical device, where the illuminator is arranged in a rear side of the reflective diffractive structures of the optical device.

In some implementations, the display is a transmissive display configured to diffract the light forwards through the optical device. In some implementations, the system further includes an illuminator configured to provide the light to the optical device, where the illuminator is arranged in a front side of the reflective diffractive structures of the optical device.

In some implementations, each of the one or more reflective diffractive structures is configured to diffract a respective color of a plurality of different colors.

In some implementations, the optical device further includes one or more transmissive diffractive structures, and each of the one or more transmissive diffractive structures and the one or more reflective diffractive structures is configured to diffract a respective color of a plurality of different colors.

Another aspect of the present disclosure features an optical device, including: a plurality of optically diffractive components including at least one transmissive diffractive structure and at least one reflective diffractive structure, where the optical device is configured such that, when light of different colors is incident on the optical device, the optical device separates light of individual colors of the different colors while suppressing crosstalk between the different colors.

In some implementations, each of the transmissive diffractive structure and the reflective diffractive structure is configured to light of a respective color of the different colors.

In some implementations, the optical device further includes: at least one reflective layer configured for total internal reflection of light of at least one of the different colors.

In some implementations, the optical device further includes: at least one color-selective polarizer configured to rotate a polarization state of light of at least one color of the different colors, such that light of a particular color of the different colors is incident in a first polarization state on a respective one of the optically diffractive components, while light of one or more other colors of the different colors is incident in a second polarization state different from the first polarization state on the respective one of the optically diffractive components.

Another aspect of the present disclosure features a system including: a display and an optical device according to any one of the optical devices as described herein, where the optical device is configured to diffract a plurality of different colors of light to the display.

Another aspect of the present disclosure features a system including: an illuminator configured to provide a plurality of different colors of light and an optical device according to any one of the optical devices as described herein, where the optical device is configured to diffract the plurality of different colors of light from the illuminator.

In the present disclosure herein, the term "primitive" refers to a basic nondivisible element for input or output within a computing system. The element can be a geometric element or a graphical element. The term "hologram" refers to a pattern displayed by (or uploaded to) a display which contains amplitude information or phase information, or some combination thereof, regarding an object. The term "holographic reconstruction" refers to a volumetric light field (e.g., a holographic light field) from a display when illuminated.

The details of one or more implementations of the subject matter of this specification are set forth in the accompanying drawings and associated description. Other features, aspects, and advantages of the subject matter will become apparent from the description, the drawings, and the claims.

It is to be understood that various aspects of implementations can be combined in different manners. As an example, features from certain methods, devices, or systems can be combined with features of other methods, devices, or systems.

DESCRIPTION OF DRAWINGS

FIG. 1C illustrates an example system for 3D displays.

FIG. 5E illustrates another example system for 3D display including a transmissive display with waveguide illumination.

FIG. 5I illustrates another example system for 3D display including a reflective display with optically diffractive illumination using a reflective field grating based structure.

FIG. 8 illustrates an example of recording a diffractive grating with a large reference angle in a recording medium.

FIG. 14A is a flowchart of an example process of fabricating an optical device including holographic gratings and corresponding color-selective polarizers.

FIG. 14B is a flowchart of an example process of fabricating an optical device including holographic gratings and corresponding reflective layers.

Like reference numbers and designations in the various drawings indicate like elements.

DETAILED DESCRIPTION

Figure 1A:
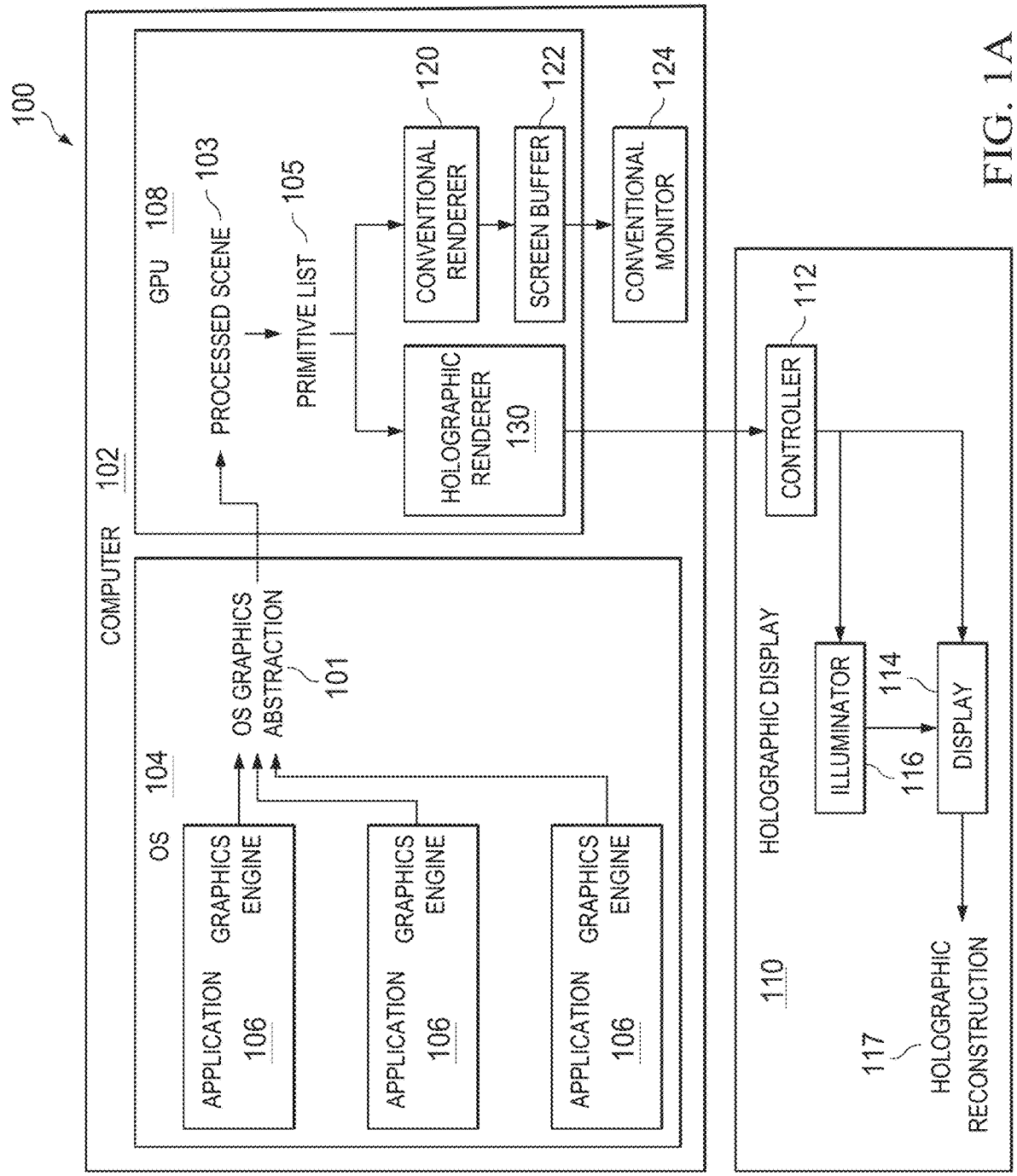
FIG. 1A illustrates a schematic diagram of an example system including a holographic display.

Implementations of the present disclosure feature technologies for enabling 3D displays of complex computer-generated scenes as genuine holograms. The technologies provide a novel and deterministic solution to real time dynamic computational holography based upon Maxwell's Equations for electromagnetic fields, which can be represented as Maxwell holography. The calculation (or computation) in Maxwell holography can be represented as Maxwell holographic calculation (or Maxwell holographic computation). In embodiments, the disclosure approaches a hologram as a Dirichlet or Cauchy boundary condition problem for a general electric field, utilizing tools including field theory, topology, analytic continuation, and/or symmetry groups, which enables to solve for holograms in real time without the limitations of legacy holographic systems. In embodiments, the technologies can be used to make phase-only, amplitude-only, or phase-and-amplitude holograms, utilizing spatial light modulators (SLMs) or any other holographic devices.

Implementations of the present disclosure can provide: 1) a mechanism of approximation of a hologram as an electromagnetic boundary condition, using field theory and contact geometry, instead of classic optics; 2) derivation and implementation into computer codes and application programming interfaces (APIs) of the electromagnetic boundary condition approach to computational holography, that is, implementation of the hologram calculation as a 2D analytic function on a plane of the hologram and subsequent discretization into parallel algorithms; and/or 3) implementation of a complete set of fully 3D, holographic versions of standard computer graphics primitives (e.g., point, line, triangle, and texture triangle), which can enable full compatibility with standard existing computer graphics tools and techniques. The technologies can enable devices to display general existing content that is not specifically created for holography, and simultaneously allows existing content creators to create holographic works without having to learn special techniques, or use special tools.

Particularly, the technologies disclosed herein can involve the use of a mathematical formulation (or expression) of light as an electromagnetic (EM) phenomenon in lieu of the mathematical formulation of classical optics that is commonly used in computational holography, e.g., the Gerchberg-Saxton (G-S) algorithm. The mathematical formulation disclosed herein is derived from Maxwell's Equations. In embodiments, the technologies disclosed herein involve treating the displayed image as an electromagnetic field and treating a hologram as a boundary value condition that produces the electromagnetic field (e.g., a Dirichlet problem). Additionally, a desired image can be constructed using a primitive paradigm ubiquitous in computer graphics, allowing, for example, the technologies to be used to display any 3D imagery as a holographic reconstruction, e.g., a holographic light field, instead of as a projective image on a 2D screen. Compared to depth point clouds technologies that suffer from bandwidth limitations, the technologies can avoid these limitations and use any suitable types of primitives, e.g., a point primitive, a line primitive, or a polygon primitive such as a triangle primitive. Moreover, the primitives can be rendered with color information, texture information, and/or shading information. This can help achieve a recording and compression scheme for CG holographic content including holographic videos.

In embodiments, the technologies disclosed herein use Maxwell's Equations to compute generated holograms as a boundary condition problem for modeling an electromagnetic field, which can remove dependency on the fast Fourier transform (FFT) and its inherent limitations, remove dependency on collimated light sources such as lasers or light emitting diodes (LEDs), and/or remove limitations of previous approaches to computational holography and non-deterministic solutions.

In embodiments, the technologies disclosed herein can be optimized for computational simplicity and speed through a mathematical optimization process that constrains independent inputs to a surface of the hologram, depending on parameters of computer-generated (CG) primitives needed to build the scene. This allows work to be performed in a highly parallel and highly optimal fashion in computing architectures, e.g., application specific integrated circuits (ASIC) and multicore architectures. The process of computing the hologram can be considered as a single instruction that executes on input data in a form of a computer-generated imagery (CGI) scene, and can theoretically be completed in a single clock cycle per CGI primitive.

In embodiments, the technologies disclosed herein treat a holographic scene as an assembly of fully 3D holographic primitive apertures which are functionally compatible with the standard primitives of conventional 3D graphics as employed in, for example, video games, movies, television, computer displays, or any other display technologies. The technologies can enable efficient implementation of these aperture primitives in hardware and software without limitations inherent in standard implementations of computational holography. Amplitude and color of the primitives can be automatically computed. Computational complexity can increase linearly with phase element number n, compared to $n^2$ or $n*\log(n)$ in standard computational holography. The images created are fully 3D and not an assemblage of planar images, and the technologies do not require iterative amplitude correction with unknown numbers of steps. Moreover, the generated holograms do not have "conjugate" images that take up space on the holographic device.

As the holographic primitives are part of a special collection of mathematical objects, they can be relatively simple and relatively fast to compute, and they can be uniquely suited to parallel, distributed computing approaches. The computability and parallelism can allow for interactive computation of large holograms to design large area holographic devices of theoretically unlimited size, which can act as holographic computer displays, phone displays, home theaters, and even holographic rooms. Moreover, the holograms can fill large areas with light, e.g., rendering large shaded areas in 3D, without limitations associated with conventional holographic computation methods which can cause elements to appear in outline instead of solid. Furthermore, the relatively simple and relatively fast computation allows for the display of real-time holograms at interactive speeds that are not constrained by $n^2$ computational load and by iterative amplitude correction.

In embodiments, the technologies can realize natural computability on modern ASIC and multicore architectures and can realize complete compatibility with modern graphics hardware, modern graphics software, and/or modern graphics tools and tool chains. For example, the technologies can implement clear and simple holographic APIs and enable high performance rendering of arbitrary CG models using conventional 3D content creation tools, e.g., 3ds Max®, SOLIDWORKS®, Maya®, or Unity, through the APIs. The APIs can enable developers or users to interact with a holographic device, e.g., a light modulator or holographic system. The holographic APIs can create computer graphics primitives as discrete holographic scene primitives, allowing for rich holographic content generation utilizing general purpose and specially designed holographic computation hardware. The creation of a mathematical and computational architecture can allow holograms to be rendered using the tools and techniques used to make conventional 3D content and software applications. The optimization of the mathematical and computational architecture can allow for performant embodiments of conventional graphics and renderings to be displayed as holographic reconstructions.

Algorithms in the technologies disclosed herein are relatively simple to implement in hardware. This not only allows the computational speeds needed for high quality rendering that users expect, but it also allows the algorithms to be implemented in relatively simple circuits, e.g., ASIC gate structures, as part of a holographic device. Accordingly, bandwidth issues that can plague high density displays can become irrelevant, as computation of scenes can be spread across the computing architecture built into the display device (e.g., built-in-computation) instead of having to be computed remotely and then written to each display element (or display pixel) of the display for each frame of content. It also means that the number of display elements, and thus the size of a holographic display, can be relatively unbounded by constraints that severely limit other technologies.

The technologies disclosed herein can enable multiple interactive technologies using structured light to be implemented relatively simply and relatively inexpensively in different applications, including, for example, solid-state light detection and ranging (LIDAR) devices, 3D printing and machining, smart illuminators, smart microdisplays, optical switching, optical tweezers, or any other applications demanding structured light. The technologies disclosed herein can be also used for optical simulations, e.g., for grating simulations.

FIG. 1A illustrates a schematic diagram of an example system 100 for 3D displays. The system 100 includes a computing device 102 and a holographic display device (or a Maxwell holographic display device) 110. The computing device 102 is configured to prepare data for a list of primitives corresponding to an object, e.g., a 3D object, and transmit the data to the holographic display device 110 via a wired or wireless connection, e.g., USB-C connection or any other high speed serial connection. The holographic display device 110 is configured to compute electromagnetic (EM) field contributions from the list of primitives to display elements of a display (e.g., a modulator) in the holographic display device 110, modulate the display elements with a pattern, e.g., a hologram, based on the computed EM field contributions on the display, and display upon illumination a light field corresponding to the object in 3D, e.g., a holographic reconstruction. Herein, the hologram refers to the pattern displayed on the display which contains amplitude information or phase information, or some combination thereof, regarding the object. The holographic reconstruction refers to a volumetric light field (e.g., a holographic light field) from the display when illuminated.

The computing device 102 can be any appropriate type of device, e.g., a desktop computer, a personal computer, a notebook, a tablet computing device, a personal digital assistant (PDA), a network appliance, a smart mobile phone, a smartwatch, an enhanced general packet radio service (EGPRS) mobile phone, a media player, a navigation device, an email device, a game console, or any appropriate combination of any two or more of these computing devices or other computing devices.

The computing device 102 includes an operating system (OS) 104 that can include a number of applications 106 as graphics engines. The applications 106 can process or render a scene, e.g., any arbitrary CG model using standard 3D content creation tools, e.g., 3ds Max®, SOLIDWORKS®, Maya®, or Unity. The scene can correspond to one or more real or imaginary 3D objects or a representation of objects. The applications 106 can operate in parallel to render the scene to obtain an OS graphics abstraction 101 which can be provided to a graphics processing unit (GPU) 108 for further processing. In some implementations, the OS graphics abstraction 101 is provided to the holographic display device 110 for further processing.

The GPU 108 can include a specialized electronic circuit designed for rapid manipulation of computer graphics and image processing. The GPU 108 can process the graphics abstraction 101 of the scene to get processed scene data 103 which can be used to obtain a list of primitives 105, e.g., indexed in a particular order. The primitives can include at least one of a point primitive, a line primitive, or a polygon primitive. In some implementations, the GPU 108 includes a video driver configured to generate the processed scene data 103 and the list of primitives 105.

In some implementations, the GPU 108 includes a conventional renderer 120, by which the list of primitives 105 can be rendered by conventional rendering techniques, e.g., culling and clipping, into a list of items to draw on a conventional monitor 124, e.g., a 2D display screen. The list of items can be sent via a screen buffer 122 to the conventional monitor 124.

In some implementations, the GPU 108 includes a holographic renderer 130 to render the list of primitives 105 into graphic data to be displayed by the holographic display device 110. The graphic data can include the list of primitives and corresponding primitive data. For example, the graphic data can include a hex code for each primitive.

In some implementations, the GPU 108 includes both the conventional renderer 120 and the holographic renderer 130. In some implementations, the GPU 108 includes the conventional renderer 120 and the holographic display device 110 includes the holographic renderer 130.

The corresponding primitive data for a primitive can also include color information (e.g., a textured color, a gradient color or both), texture information, and/or shading information. The shading information can be obtained by any customary CGI surface shading method that involves modulating color or brightness of a surface of the primitive.

The primitive data of a primitive can include coordinate information of the primitive in a 3D coordinate system, e.g., Cartesian coordinate system XYZ, polar coordinate system, cylindrical coordinate system, and spherical coordinate system. As discussed with further detail below, the display elements in the holographic display device 110 can also have corresponding coordinate information in the 3D coordinate system. The primitives at coordinate locations can represent a 3D object adjacent to the display elements, e.g., in front of the display elements, behind the display elements, or straddling the display elements.

As an example, the primitive is a shaded line, e.g., a straight line that changes smoothly from one color to another across its span. The primitive needs four elements of data to be rendered: two end points, and color information (e.g., a RGB color value) at each end point. Assume that a hex code for the line is a0, and the line stretches from a first end point (0.1, 0.1, 0.1) to a second end point (0.2, 0.2, 0.2) in the 3D coordinate system, with the color ½ Blue: RGB=(0,0,128) at the first end point and the color full Red: RGB=(255,0,0) at the second end point. The holographic renderer determines how much and what kind of data to expect for each primitive. For the line, the primitive data for the shaded line in the primitive stream can be a set of instructions as below:

```
0xa0       // hex code for the shaded line
0x3dccccd  // first vertex at (0.1, 0.1, 0.1) float (single)
0x3dccccd
0x3dccccd
0x000080   // first vertex color is (0, 0, 128)
0x3e4ccccd // second vertex at (0.2, 0.2, 0.2) float (single)
0x3e4ccccd
0x3e4ccccd
0xff0000   // second vertex color is (255, 0, 0)
```

There are a total of 31 hex words in the primitive data for the shaded line primitive. It can be an extremely efficient way to transmit a complex scene, and the primitive data can further be compressed. Since each primitive is a deterministic Turing step, there is no need for terminators. Different from a traditional model where this line primitive is simply drawn on a 2D display screen, the primitive data for the line is transmitted to the holographic display device 110 that can compute a hologram and display a corresponding holographic reconstruction presenting a line floating in space.

In some implementations, the computing device 102 transmits non-primitive based data, e.g., a recorded light field video, to the holographic display device 110. The holographic display device 110 can compute sequential holograms to display the video as sequential holographic reconstructions in space. In some implementations, the computing device 102 transmits CG holographic content simultaneously with live holographic content to the holographic display device 110. The holographic display device 110 can also compute corresponding holograms to display the contents as corresponding holographic reconstructions.

As illustrated in FIG. 1A, the holographic display device 110 includes a controller 112 and a display 114. The controller 112 can include a number of computing units or processing units. In some implementations, the controller 112 includes ASIC, field programmable gate array (FPGA) or GPU units, or any combination thereof. In some implementations, the controller 112 includes the holographic renderer 130 to render the list of primitives 105 into the graphic data to be computed by the computing units. In some implementations, the controller 112 receives the OS graphics abstraction 101 from the computing device 102 for further processing. The display 114 can include a number of display elements. In some implementations, the display 114 includes a spatial light modulator (SLM). The SLM can be a phase SLM, an amplitude SLM, or a phase and amplitude SLM. In some examples, the display 114 is a digital micromirror device (DMD) or a liquid crystal on silicon (LCOS) device. In some implementations, the holographic display device 110 includes an illuminator 116 adjacent to the display 114 and configured to emit light toward the display 114. The illuminator 116 can include one or more coherent light sources, e.g., lasers, one or more semi-coherent light sources, e.g., LEDs (light emitting diodes) or superluminescent diodes (SLEDs), one or more incoherent light sources, or a combination of such sources.

Different from a conventional 3D graphics system, which takes a 3D scene and renders it on to a 2D display device, the holographic display device 110 is configured to produce a 3D output such as a holographic reconstruction 117 in a form of a light field, e.g., a 3D volume of light. In a hologram, each display element can contribute to every part of the holographic reconstruction of the scene. Hence, for the holographic display device 110, each display element potentially needs to be modulated for every part of the scene, e.g., each primitive in the list of primitives generated by the GPU 108, for complete holographic reproduction of the scene. In some implementations, modulation of certain elements can be omitted or simplified based on, for example, an acceptable level of accuracy in the reproduced scene or in some region of the scene.

In some implementations, the controller 112 is configured to compute an EM field contribution, e.g., phase, amplitude, or both, from each primitive to each display element, and generate, for each display element, a sum of the EM field contributions from the list of primitives to the display element. This can be done either by running through every primitive and accruing its contribution to a given display element, or by running through each display element for each primitive, or by a hybrid blend of these two techniques.

The controller 112 can compute the EM field contribution from each primitive to each display element based on a predetermined expression for the primitive. Different primitives can have corresponding expressions. In some cases, the predetermined expression is an analytic expression, as discussed with further detail below in relation to FIGS. 3A-3C. In some cases, the predetermined expression is determined by solving Maxwell's Equations with a boundary condition defined at the display 114. The boundary condition can include a Dirichlet boundary condition or a Cauchy boundary condition. Then, the display element can be modulated based on the sum of the EM field contributions, e.g., by modulating at least one of a refractive index, an amplitude index, a birefringence, or a retardance of the display element.

If values of an EM field, e.g., a solution to the Maxwell Equations, at each point on a surface that bounds the field are known, an exact, unique configuration of the EM field inside a volume bounded by a boundary surface can be determined. The list of primitives (or a holographic reconstruction of a corresponding hologram) and the display 114 define a 3D space, and a surface of the display 114 forms a portion of a boundary surface of the 3D space. By setting EM field states (e.g., phase or amplitude or phase and amplitude states) on the surface of the display 114, for example, by illuminating light on the display surface, the boundary condition of the EM field can be determined. Due to time symmetry of the Maxwell Equations, as the display elements are modulated based on the EM field contributions from the primitives corresponding to the hologram, a volumetric light field corresponding to the hologram can be obtained as the holographic reconstruction.

For example, a line primitive of illumination at a specific color can be set in front of the display 114. As discussed in further detail below with respect to FIG. 3B, an analytic expression for a linear aperture can be written as a function in space. Then the EM field contribution from the line primitive on a boundary surface including the display 114 can be determined. If EM field values corresponding to the computed EM field contribution are set in the display 114, due to time-symmetry of the Maxwell Equations, the same linear aperture used in the computation can appear at a corresponding location, e.g., a coordinate position of the linear primitive in the 3D coordinate system and with the specific color.

In some examples, as discussed in further detail below with respect to FIG. 3B, suppose that there is a line of light between two points A and B in the 3D space. The light is evenly lit and has an intensity I per line distance l. At each infinitesimal dl along the line from A to B, an amount of light proportional to I*dl is emitted. The infinitesimal dl acts as a delta (point) source, and the EM field contribution from the infinitesimal dl to any point on a boundary surface around a scene corresponding to a list of primitives can be determined. Thus, for any display element of the display 114, an analytic equation that represents the EM field contribution at the display element from the infinitesimal segment of the line can be determined. A special kind of summation/integral that marches along the line and accrues the EM field contribution of the entire line to the EM field at the display element of the display can be determined as an expression. Values corresponding to the expression can be set at the display element, e.g., by modulating the display element and illuminating the display element. Then, through time reversal and a correction constant, the line can be created in the same location defined by points A and B in the 3D space.

In some implementations, the controller 112 is coupled to the display 114 through a memory buffer. The control signal 112 can generate a respective control signal based on the sum of the EM field contributions to each of the display elements. The control signal is for modulating the display element based on the sum of the EM field contributions. The respective control signals are transmitted to the corresponding display elements via the memory buffer.

In some implementations, the controller 112 is integrated with the display 114 and locally coupled to the display 114. As discussed with further detail in relation to FIG. 1B, the controller 112 can include a number of computing units each coupled to one or more respective display elements and configured to transmit a respective control signal to each of the one or more respective display elements. Each computing unit can be configured to perform computations on one or more primitives of the list of primitives. The computing units can operate in parallel.

In some implementations, the illuminator 116 is coupled to the controller 112 and configured to be turned on/off based on a control signal from the controller 112. For example, the controller 112 can activate the illuminator 116 to turn on in response to the controller 112 completing the computation, e.g., all the sums of the EM field contributions for the display elements are obtained. As noted above, when the illuminator 116 emits light on the display 114, the modulated elements of the display cause the light to propagate in different directions to form a volumetric light field corresponding to the list of primitives that correspond to the 3D object. The resulting volumetric light field corresponds to a solution of Maxwell's equations with a boundary condition defined by the modulated elements of the display 114.

In some implementations, the controller 112 is coupled to the illuminator 116 through a memory buffer. The memory buffer can be configured to control amplitude or brightness of light emitting elements in the illuminator. The memory buffer for the illuminator 116 can have a smaller size than a memory buffer for the display 114. A number of the light emitting elements in the illuminator 116 can be smaller than a number of the display elements of the display 114, as long as light from the light emitting elements can illuminate over substantially a total surface of the display 114. For example, an illuminator having 64×64 OLEDs (organic light emitting diodes) can be used for a display having 1024×1024 elements. The controller 112 can be configured to simultaneously activate a number of lighting elements of the illuminator 116.

In some implementations, the illuminator 116 is a monochromatic light source configured to emit a substantially monochromatic light, e.g., a red light, a green light, a yellow light, or a blue light. In some implementations, the illuminator 116 includes two or more light emitting elements, e.g., lasers or light emitting diodes (LEDs), each configured to emit light with a different color. For example, the illuminator 116 can include red, green, and blue lighting elements. To display a full-color 3D object, three or more separate holograms for colors including at least red, green, and blue, can be computed. That is, at least three EM field contributions from corresponding primitives to the display elements can be obtained. The display elements can be modulated sequentially based on the at least three EM field contributions and the illuminator 116 can be controlled to sequentially turn on the at least red, green and blue lighting elements sequentially. For example, the controller 112 can first transmit a first timing signal to turn on a blue lighting element and transmit first control signals corresponding to a blue hologram to display elements of the display 114. After the blue hologram on the display 114 is illuminated with the blue light for a first period of time, the controller 112 can transmit a second timing signal to turn on a green lighting element and transmit second control signals corresponding to a green hologram to display elements of the display 114. After the green hologram on the display 114 is illuminated with the green light for a second period of time, the controller 112 can transmit a third timing signal to turn on a red lighting element and transmit third control signals corresponding to a red hologram to display elements of the display 114. After the red hologram on the display 114 is illuminated with the red light for a third period of time, the controller 112 can repeat the above steps. Depending on temporal coherence-of vision effect in an eye of a viewer, the three colors can be combined in the eye to give an appearance of full color. In some cases, the illuminator 116 is switched off during a state change of the display image (or holographic reconstruction) and switched on when a valid image (or holographic reconstruction) is presented for a period of time. This can also depend on the temporal coherence of vision to make the image (or holographic reconstruction) appear stable.

In some implementations, the display 114 has a resolution small enough to diffract visible light, e.g., on an order of 0.5 µm or less. The illuminator 116 can include a single, white light source and the emitted white light can be diffracted by the display 114 into different colors for holographic reconstructions.

As discussed in further detail below with respect to FIGS. 5A-5K, there can be different configurations for the system 100. The display 114 can be reflective or transmissive. The display 114 can have various sizes, ranging from a small scale (e.g., 1-10 cm on a side) to a large scale (e.g., 100-1000 cm on a side). Illumination from the illuminator 116 can be from the front of the display 114 (e.g., for a reflective or transflective display) or from the rear of the display 114 (e.g., for a transmissive display). The holographic display device 110 can provide uniform illumination across the display 114. In some implementations, an optical waveguide, as illustrated in FIGS. 5D-5G, can be used to evenly illuminate a surface of the display 114. In some examples, the controller 112, the illuminator 116, and the display 114 can be integrated together as a single unit. The integrated single unit can include the holographic renderer 130, e.g., in the controller 112.

In some implementations, an optically diffractive device, e.g., a field grating device or a lightguide device as illustrated in FIGS. 5H to 5K, can be configured to diffract light from the illuminator 116 into the display 114, and the display 114 can then diffract the light to a viewer's eyes. In some examples, the light from the illuminator 116 can be incident on the optically diffractive device with a large incident angle from a side, such that the illuminator 116 does not block the viewer's view of the display 114. In some examples, the diffracted light from the optically diffractive device can be diffracted at a nearly normal incident angle into the display, such that the light can relatively uniformly illuminate the display and be diffracted to the viewer's eyes with reduced (e.g., minimized) loss.

Figure 1B:
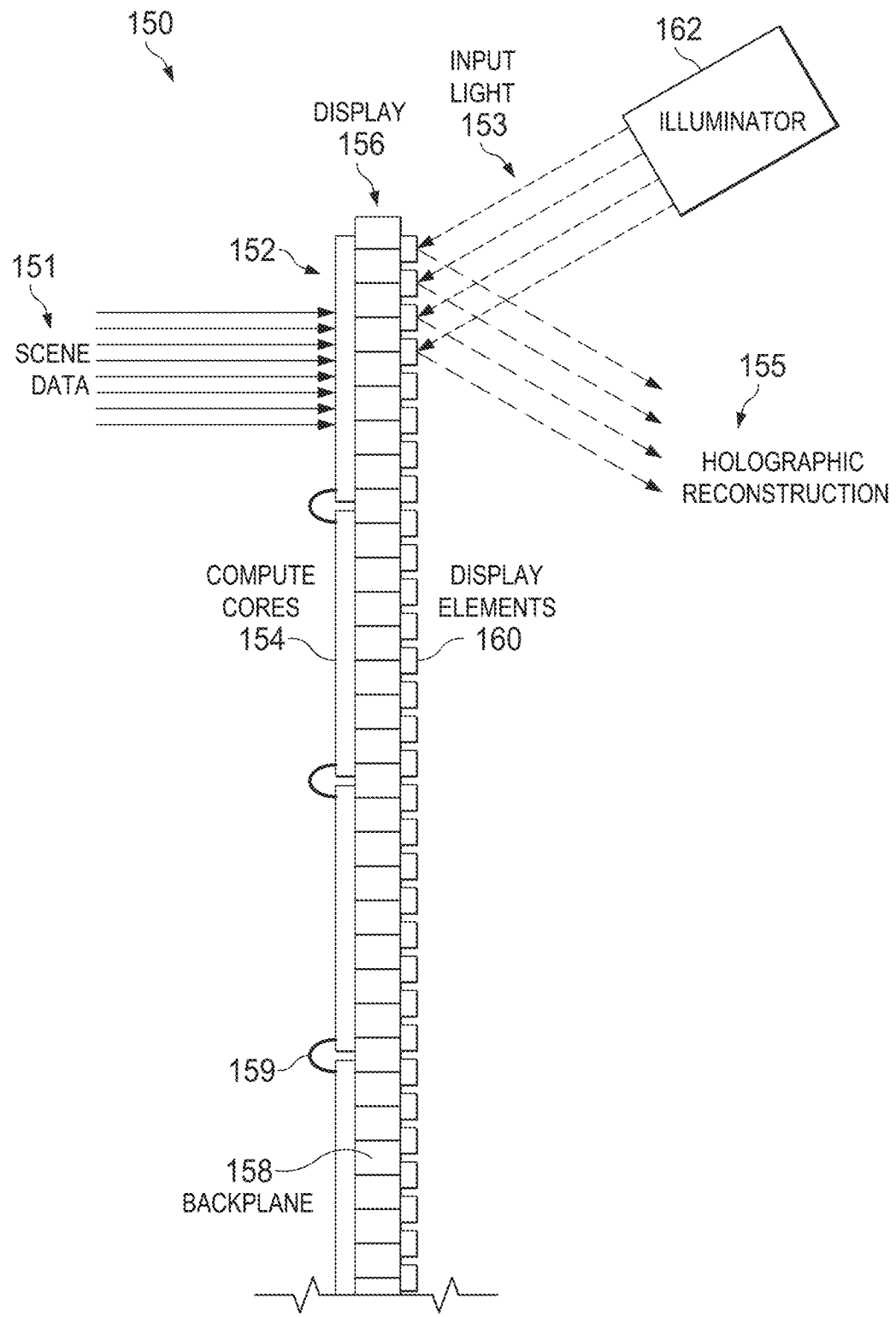
FIG. 1B illustrates a schematic diagram of an example holographic display.

FIG. 1B illustrates a schematic diagram of an example holographic display device 150. The holographic display device 150 can be similar to the holographic display device 110 of FIG. 1A. The holographic display device 150 includes a computing architecture 152 and a display 156. The computing architecture 152 can be similar to the controller 112 of FIG. 1A. The computing architecture 152 can include an array of parallel computing cores 154. A computing core can be connected to an adjacent computing core via a communication connection 159, e.g., a USB-C connection or any other high speed serial (or parallel) connection. The connections 159 can be included in a data distribution network through which scene data 151 (e.g., scene primitives) can be distributed among the computing cores 154.

The display 156 can be similar to the display 114 of FIG. 1A, and can include an array of display elements 160 positioned on a backplane 158. The display elements 160 can be arranged on a front side of the backplane 158 and the computing cores 154 can be arranged on a back side of the backplane 158. The backplane 158 can be a substrate, e.g., a wafer. The computing cores 154 can be either on the same substrate as the display 156 or bonded to the back side of the display 156.

Each computing core 154 can be connected to a respective tile (or array) of display elements 160. Each computing core 154 can be configured to perform computations on respective primitives of a number of primitives in the scene data 151 in parallel with one or more other computing cores. In some examples, the computing core 154 is configured to compute an EM field contribution from each of the respective primitives to each of the array of display elements 160 and generate a sum of EM field contributions from the number of primitives to each of the respective tiles of display elements 160. The computing core 154 can receive, from other computing cores of the array of computing cores 154, computed EM field contributions from other primitives of the number of primitives to each of the respective tile of display elements 160, and generate the sum of EM field contributions based on the received computed EM field contributions. The computing core 154 can generate a control signal for each of the respective tile of display elements to modulate at least one property of each of the respective tile of display elements 160 based on the sum of EM field contributions to the display element.

As noted above, the computing architecture 152 can also generate a control signal to an illuminator 162, e.g., in response to determining that the computations of the sums of the EM field contributions from the number of primitives to each of the display elements have been completed. The illuminator 162 emits an input light 153 to illuminate the modulated display elements 160 and the input light 153 is diffracted by the modulated display elements 160 to form a volumetric light field e.g., a holographic light field 155, corresponding to the scene data 151.

As illustrated in FIG. 1B, the tiles of display elements 160 can be interconnected into a larger display. Correspondingly, computing cores 154 can be interconnected for data communication and distribution. Note that a parameter that changes in the holographic calculations between any given two display elements is their physical locations. Thus, the task of computing the hologram can be shared between the corresponding computing cores 154 equally, and the entire display 150 can operate at the same speed as a single tile, independent of the number of tiles.

FIG. 1C illustrates an exemplary system 170 for displaying objects in a 3D space. The system 170 can include a computing device, e.g., the computing device 102 of FIG. 1A, and a holographic display device 172, e.g., the holographic display 110 of FIG. 1A or 150 of FIG. 1B. A user can use an input device, e.g., a keyboard 174 and/or a mouse 176, to operate the system 170. For example, the user can create a CG model for a 2D object 178 and a 3D object 180 through the computing device. The computing device or the holographic display device 172 can include a holographic renderer, e.g., the holographic renderer 130 of FIG. 1A, to render the CG model to generate corresponding graphic data for the 2D object 178 and the 3D object 180. The graphic data can include respective primitive data for a list of primitives corresponding to the objects 178 and 180.

The holographic display device 172 can include a controller, e.g., the controller 112 of FIG. 1A or 152 of FIG. 1B, and a display 173, e.g., the display 114 of FIG. 1A or 156 of FIG. 1B. The controller can compute a respective sum of EM field contributions from the primitives to each display element of the display 173 and generate control signals for modulating each display element based on the respective sum of EM field contributions. The holographic display device 172 can further include an illuminator, e.g., the illuminator 116 of FIG. 1A or the illuminator 162 of FIG. 1B. The controller can generate a timing control signal to activate the illuminator. When light from the illuminator illuminates a surface of the display 173, the modulated display elements can cause the light to propagate in the 3D space to form a volumetric light field corresponding to a holographic reconstruction for the 2D views of object 178 and a holographic reconstruction for the 3D object 180. Thus, the 2D views of object 178 and the 3D holographic reconstruction of the object 180 are displayed as respective holographic reconstructions floating in the 3D space in front of, behind, or straddling the display 173.

In some implementations, the computing device transmits non-primitive based data, e.g., a recorded light field video, to the holographic display device 172. The holographic display device 172 can compute and generate corresponding holograms, e.g., a series of sequential holograms, to display as corresponding holographic reconstructions in the 3D space. In some implementations, the computing device transmits a CG holographic content simultaneously with live holographic content to the holographic display device 172. The holographic display device 172 can also compute and generate corresponding holograms to display the contents as corresponding holographic reconstructions in the 3D space.

Figure 2:
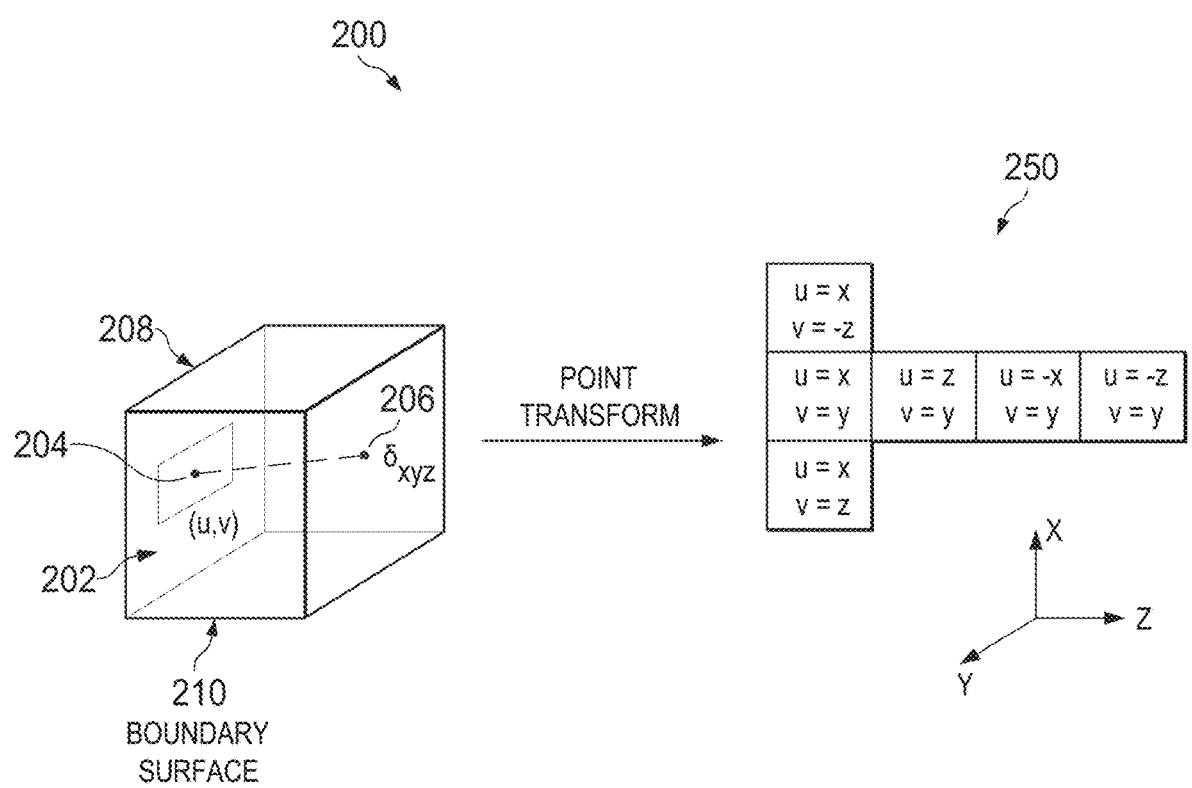
FIG. 2 illustrates an example configuration for electromagnetic (EM) propagation calculation.

FIG. 2 illustrates an exemplary configuration 200 for electromagnetic (EM) field calculation. A display 202, e.g., an LCOS device, including an array of elements 204 and a list of primitives including a point primitive 206 are in a 3D space 208. The 3D space 208 includes boundary surfaces 210. In a 3D coordinate system XYZ, the point primitive 206 has coordinate information (x, y, z). Each display element 204 lies in a flat plane with respect to other display elements 204 and has a 2D position (u, v). The display element 204 also has a location in the 3D space. By a mathematical point transformation, the 2D position (u, v) can be transferred into six coordinates 250 in the 3D coordinate system. That is, a surface of the display 202 forms a portion of the boundary surfaces 210. Thus, EM field contributions from the list of primitives to a display element computed by defining a boundary condition at the surface of the display 202 represent a portion of the total EM field contributions from the primitives to the display element. A scale factor, e.g., six, can be multiplied to a sum of the EM field contributions for each of the display elements to obtain a scaled sum of the field contributions, and the display element can be modulated based on the scaled sum of the field contributions.

Exemplary EM Field Contributions for Primitives

Primitives can be used for computer graphics rendering. Each type of primitive in computer graphics corresponds in the formulation of the technologies disclosed herein to a discrete mathematical function that defines a single holographic primitive for a graphical element added to a hologram. Each type of primitive can correspond to an expression for calculating an EM field contribution to a display element. A primitive can be a point primitive, a line primitive, or a polygon (e.g., a triangle) primitive. As illustrated below, an analytic expression can be derived by calculating EM field propagation from a corresponding primitive to a display element of a display.

Figure 3A:
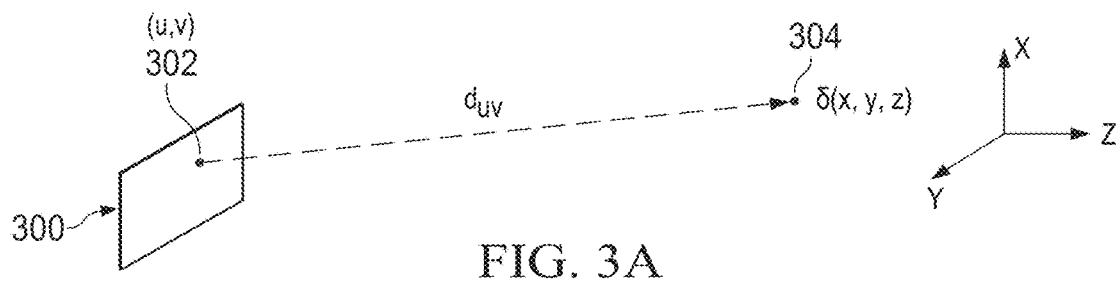
FIG. 3A illustrates an example EM propagation for a point primitive relative to an element of a display.

FIG. 3A illustrates an example EM propagation from a point primitive 304 to an element 302 of a display 300. In a 3D coordinate system XYZ, it is assumed that z coordinate is 0 across the display 300, which means negative z values are behind the display 300 and positive z values are in front of the display 300. The point primitive 304 has a coordinate (x, y, z), and the display element 302 has a coordinate (u, v, 0). A distance $d_{uv}$ between the point primitive 304 and the display element 302 can be determined based on their coordinates.

The point primitive 304 can be considered as a point charge with time varying amplitude. According to electromagnetic theory, an electric field E generated by such a point charge can be expressed as:

$$|E| \propto \frac{\exp(i2\pi d/\lambda)}{d^2}, \quad (1)$$

where $\lambda$ represents a wavelength of an EM wave, and d represents a distance from the point charge.

Thus, the electric field $E_{u,v}$ at the display element (u,v) can be expressed as:

$$|E_{u,v}| \propto \frac{I}{d_{uv}^2} \exp(i2\pi d_{uv}/\lambda), \quad (2)$$

where I represents a relative intensity of the holographic primitive electric field at the display element contributed from the point primitive 304.

As discussed above with respect to FIG. 2, a surface of the display 300 forms only a portion of a boundary surface for the EM field. A scale factor $\delta$ can be applied to the electric field $E_{u,v}$ to get a scaled electric field $E_\varphi(u, v)$ at the display element that adjusts for the partial boundary as follows:

$$E_\varphi(u, v) \propto \frac{\delta I}{d_{uv}^2} \exp(i2\pi d_{uv}/\lambda), \quad (3)$$

where $\delta \cong [6+\varepsilon]$, $0 < \varepsilon \le 1$.

Figure 3B:
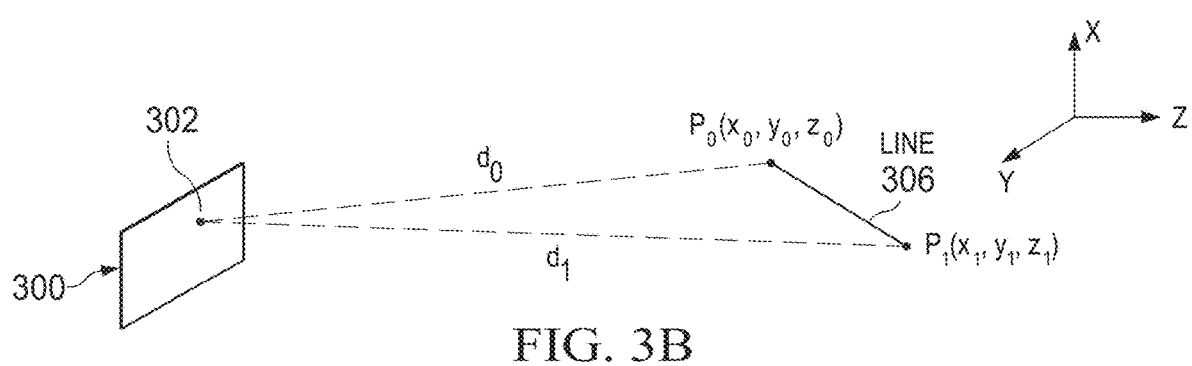
FIG. 3B illustrates an example EM propagation for a line primitive relative to an element of a display.

FIG. 3B illustrates an example of EM propagation from a line primitive 306 to the display element 302 of the display 300 in the 3D coordinate system XYZ. As noted above, the display element 302 can have a coordinate (u, v, 0), where z=0. The line primitive 306 has two endpoints $P_0$ with coordinate $(x_0, y_0, z_0)$ and $P_1$ with coordinate $(x_1, y_1, z_1)$. A distance $d_0$ between the endpoint $P_0$ and the display element can be determined based on their coordinates. Similarly, a distance $d_1$ between the endpoint $P_1$ and the display element can be determined based on their coordinates. A distance $d_{01}$ between the two endpoints $P_0$ and $P_1$ can be also determined, e.g., $d_{01} = d_1 - d_0$.

As discussed above, a line primitive can be treated as a superposition or a linear deformation, and a corresponding analytic expression for the line primitive as a linear aperture can be obtained as a distributed delta function in space. This analytic expression can be a closed expression for continuous 3D line segments as holograms.

Figure 3C:
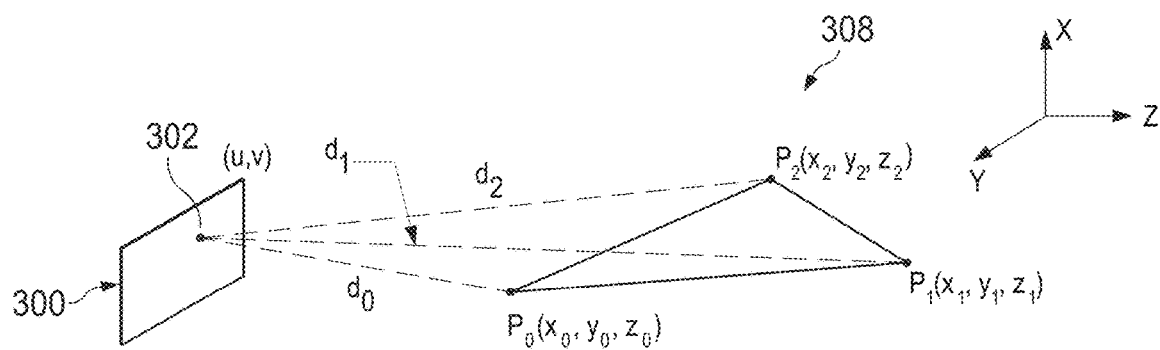
FIG. 3C illustrates an example EM propagation for a triangle primitive relative to an element of a display.

FIG. 3C illustrates an example EM propagation from a triangle primitive 308 to the display element 302 of the display 300 in the 3D coordinate system XYZ. As noted above, the display element 302 can have a coordinate (u, v, 0), where z=0. The triangle primitive 308 has three endpoints: $P_0$ $(x_0, y_0, z_0)$, $P_1$ $(x_1, y_1, z_1)$, and $P_2$ $(x^2, y_2, z_2)$. Distance do, $d_1$, and $d_2$ between the display element and the endpoints $P_0$, $P_1$, and $P_2$ can be respectively determined based on their coordinates.

Similar to the line primitive in FIG. 3B, the triangle primitive can be treated as a continuous aperture in space and an analytical expression for the EM field contribution of the triangle primitive to the display element can be obtained by integration. This can be simplified to obtain an expression for efficient computation.

Exemplary Computations for Primitives

As discussed above, a controller, e.g., the controller 112 of FIG. 1A, can compute an EM field contribution from a primitive to a display element based on an analytical expression that can be determined as shown above. As an example, the EM field contribution for a line primitive is computed as below.

Each display element in a display has a physical location in space, and each display element lies in a flat plane with respect to other display elements. Assuming that the display elements and their controllers are laid out as is customary in display and memory devices, a simple mathematical point transformation can be used to transform a logical location of a given display element based on a logical memory address for the display element in a processor to an actual physical location of the display element in the space. Therefore, as the logical memory addresses of the display elements are looped over in a logical memory space of the processor, corresponding actual physical locations in the space across the surface of the display can be identified.

As an example, if the display has a 5 μm pitch in both x and y, each logical address increment can move 5 μm in the x direction, and when an x resolution limit of the display is reached, the next increment will move back to the initial x physical location and increment the y physical location by 5 μm. The third spatial coordinate z can be assumed to be zero across the display surface, which means that the negative z values are behind the display, and the positive z values are in front of the display.

To begin the line calculation, a type of scaled physical distance between the current display element and each of the two points of the line primitive can be determined to be do and $d_1$. As a matter of fact, $d_0$ and $d_1$ can be calculated once per primitive, as every subsequent calculation of the distances across display elements is a small perturbation of an initial value. In this way, this computation is performed in one dimension.

An example computation process for each primitive can include the following computation codes:

$$DD=f(d1, d0),$$

$$iscale=SS*COLOR*Alpha1,$$

$$C1=-2*iscale*sin(DD/2)*sin(Alpha2)*cos(Alpha3),$$

$$C2=-2*iscale*sin(DD/2)*sin(Alpha2)*sin(Alpha4),$$

where SS, Alpha1, Alpha2, Alpha3, and Alpha4 are pre-computed constants, COLOR is the RGB color value passed in with the primitive, and all values are scalar, single precision floats. Both the sine and cosine functions can be looked up in tables stored in the controller to improve computation efficiency.

The results in C1 and C2 are then accumulated for each primitive at each display element, e.g., in an accumulator for the display element, and can be normalized once at the end of the computations for the display elements. At this point, as noted above, the controller can transmit a first control signal to the display elements to modulate the display elements based on the computed results and a second control signal to an illuminator to turn on to emit light. Accordingly, a holographic reconstruction (or a holographic light field) is visible to a viewer. When illuminated, the modulated display elements can cause the light to produce a crisp, continuous color line in three dimensional space.

In some implementations, the computation codes include a hex code for clearing previous accumulations in the accumulator, e.g., at the beginning of the codes. The computation codes can also include a hex code for storing the accumulator results into a respective memory buffer for each display element, e.g., at the end of the codes. In some implementations, a computing device, e.g., the computing device 102 of FIG. 1A, transmits a number of background or static primitive hex codes to the controller at an application startup or an interval between displaying frames that does not affect a primary display frame rate. The computing device can then transmit one or more combinations of the hex codes potentially along with other foreground or dynamic primitives at a much higher rate to the controller that can form a corresponding control signal to modulate the display elements of the display.

The computation process can be orders of magnitude simpler and faster than the most efficient line drawing routines in conventional 2D display technology. Moreover, this computation algorithm scales linearly with the number of display elements. Thus, scaling computing units of the controller as a 2D networked processing system can keep up with computation needs of an increasing surface area of the display.

Exemplary Computation Implementations

A Maxwell holographic controller, e.g., the controller 112 of FIG. 1A, can compute an EM field contribution from a primitive to a display element based on an analytical expression that can be determined as shown above. The controller can be implemented in, for example, an ASIC, an FPGA or GPU, or any combination thereof.

In a modern GPU pipeline, a GPU takes descriptions of geometric figures as well as vertex and fragment shader programs to produce color and depth pixel outputs to one or more output image surfaces (called render targets). The process involves an explosive fan-out of information where geometry is expanded into shading fragments, followed by a visibility test to select whether work needs to be done on each of these fragments. A fragment is a record that contains all the information involved to shade that sample point, e.g., barycentric coordinates on the triangle, interpolated values like colors or texture coordinates, surface derivatives, etc. The process of creating these records then rejecting those that do not contribute to the final image is the visibility test. Fragments that pass the visibility test can be packed into work groups called wavefronts or warps that are executed in parallel by the shader engines. These produce output values that are written back to memory as pixel values, ready for display, or for use as input textures for later rendering passes.

In Maxwell holography, the rendering process can be greatly simplified. In Maxwell holographic calculations, every primitive can contribute to every display element. There is no need to expand geometry into pixels and no need to apply visibility tests before packing wavefronts. This can also remove the need for decision making or communication between Maxwell holographic pipelines and allow computation to become a parallel issue with a number of possible solutions each one tuned to speed, cost, size or energy optimization. The graphics pipeline is significantly shorter with fewer intermediate steps, no data copying or movement, and fewer decisions leading to lower latency between initiating a draw and the result being ready for display. This can allow Maxwell holographic rendering to create extremely low latency displays. As discussed below, this can allow Maxwell holographic calculations to increase accuracy, for example, by using fixed point numbers in the Maxwell holographic pipeline, and to optimize computation speed, for example, by optimizing mathematical functions.

Using Fixed Point Numbers

When calculating an EM contribution from each primitive at each display element (or "phasel"), intermediate calculations involve producing very large numbers. These large numbers involve special handling as they also need to retain the fractional parts during the calculation.

Floating point values have the disadvantage that they are most accurate close to the origin (zero on the number line) and lose one bit of accuracy every power-of-two when moving away from the origin. For numbers close in the range [−1,1], the accuracy of floating point values can be exquisite, but once reaching numbers in the tens of millions, e.g., reaching the point where single-precision 32-bit IEEE-754 floating point values have no fractional digits remaining, the entire significand (a.k.a mantissa) is used to represent the integer part of the value. However, it is the fractional part of large numbers that Maxwell holography is particularly interested in retaining.

In some cases, fixed point numbers are used in the Maxwell holographic calculations. Fixed point number representations are numbers where the decimal point does not change on a case-by-case basis. By choosing the correct numbers of bits for the integer and fractional parts of a number, the same number of fractional bits can be obtained regardless of the magnitude of the number. Fixed point numbers are represented as integers with an implicit scale factor, e.g., 14.375 can be represented as the number 3680

(0000111001100000 base-2) in a 16-bit fixed point value with 8 fractional bits. This can be also represented as an "unsigned 16.8" fixed point number, or u16.8 for short. Negative numbers can have one additional sign bit and are stored in "2s compliment" format. In such a way, the accuracy of the calculation can be greatly improved.

Optimization to Mathematical Functions

As shown above, Maxwell holographic calculations involve the use of transcendental mathematical functions, e.g., sine, cosine, arc tangent, etc. In a CPU, these functions are implemented as floating point library functions that can use specialized CPU instructions, or on a GPU as floating point units in the GPU. These functions are written to take arguments as a floating point number and the results are returned in the same floating point representation. These functions are built for the general case, to be accurate where floats are accurate, to be correctly rounded and to cope with every edge case in the floating point number representation (+/−Infinity, NaN, signed zero, and denormal floats).

In Maxwell holographic calculations, with the fixed point representation, there is no need to use denormal floats for gradual underflow, no need to handle NaN results from operations like division by zero, no need to alter the floating point rounding modes, and no need to raise floating point exceptions to the operating system. All of these allow simplifying (and/or optimizing) the transcendental mathematical functions, for example, as discussed below.

In some cases, optimizations can be made to take arguments in one fixed point format and return the value to a different level of accuracy, e.g., input s28.12 and output s15.14. This can be especially desirable when calculating the sine of large values in the 10s of millions, the input argument can be large but the output can only need to represent the value range $[-1,1]$, or arctangent which takes in any value but return values in the range $[-\pi/2, \pi/2]$.

In some cases, optimization can be made to freely implement the transcendental functions as fully enumerated lookup tables, as interpolated tables, as semi-table based polynomial functions, or as semi-table based full minimax polynomials, depending on the input range involved. It also allows to apply specialized range reduction methods that cope with large inputs, which the general purpose GPU pipeline calculation can skip for speed.

In some cases, another optimization can be transforming trigonometric calculations from the range $[-\pi, \pi]$ into a signed 2's compliment representation in the range $[-1,1]$ which has the advantage of not requiring expensive modulo $2\pi$ division operations.

Exemplary Implementations for Occlusion

Occlusion is often viewed as a difficult and important topic in computer graphics, and even more so in computational holography. This is because, in at least some cases, while the occlusion problem in projective CGI is static, what is hidden and what is visible in holographic systems depend on the location, orientation, and direction of a viewer. Wave approaches of G-S holography or its derivatives have been developed to address the holographic occlusions. However, masking or blocking contributions from parts of a scene that are behind other parts of a scene can be very complicated and computationally expensive in the G-S methodology.

In Maxwell holography, the occlusion issue can be addressed comparatively easily, because which display elements (e.g., phasels) correspond to which primitives is completely deterministic and trivial. For example, whether or not a given display element contributes to a reconstruction of a given primitive can be determined as the calculation for the given primitive is performed. After determining that a number of display elements do not contribute to the given primitive due to occlusion, when calculating a sum of EM contributions to one of the number of display elements, the EM contribution from the given primitive is omitted from the calculation of the sum of EM contributions to the one of the number of display elements.

Figure 3D:
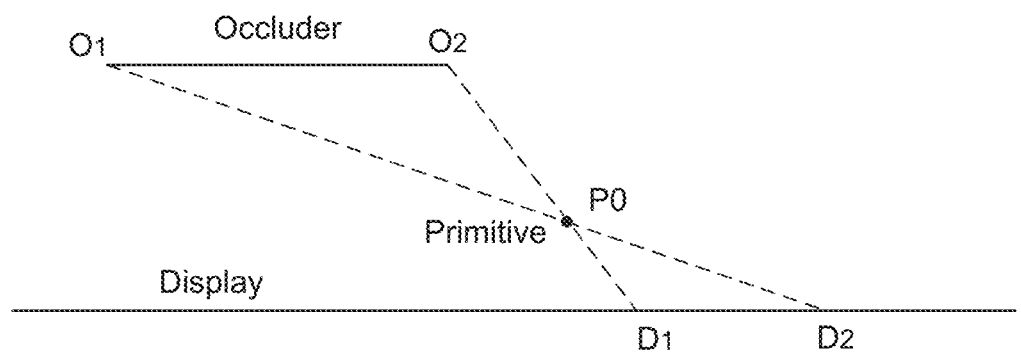
FIG. 3D illustrates an example implementation of Maxwell holographic occlusion for a point primitive with a line primitive as an occluder.
Figure 3E:
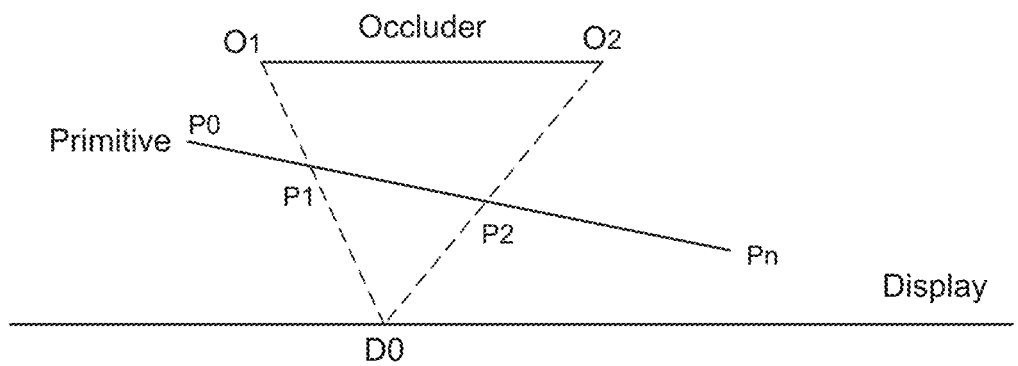
FIG. 3E illustrates an example implementation of Maxwell holographic occlusion for a line primitive with another line primitive as an occluder.
Figure 3F:
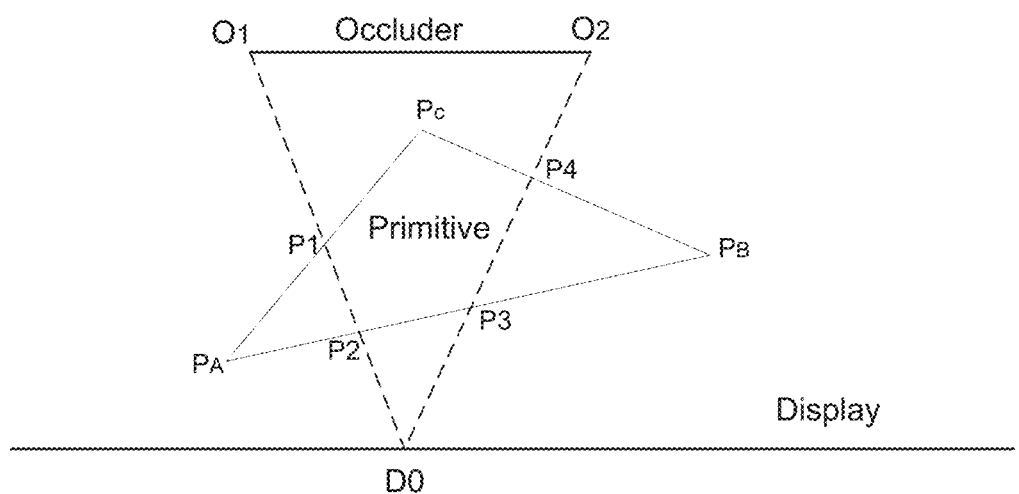
FIG. 3F illustrates an example implementation of Maxwell holographic occlusion for a triangle primitive with a line primitive as an occluder.

For illustration only, FIGS. 3D-3F show a determination of display elements not contributing to a given primitive (a point in FIG. 3D, a line in FIG. 3E, and a triangle in FIG. 3F) with a line primitive as an occluder. The line primitive has a starting point O1 and an ending point O2.

As illustrated in FIG. 3D, a point primitive P0 is behind the occluder and closer to the display. By extending lines connecting O1-P0 and O2-P0, a range of display elements from D1 to D2 in the display is determined, which do not contribute to the reconstruction of the point primitive P0.

In some examples, the coordinate information of O1, O2, and P0 is known, e.g., stored in a "Z" buffer calculated by a GPU (e.g., the GPU 108 of FIG. 1A) prior to the scene being transmitted to the Maxwell holographic controller (e.g., the controller 112 of FIG. 1A). For example, in an XZ plane with y=0, the coordinate information can be O1 (Ox1, Oz1), O2 (Ox2, Oz2), and P0 (Px, Pz), with Oz1=Oz2=Oz. Based on the coordinate information, the coordinate information of D1 and D2 can be determined to be $$Dx1=Px+\rho(Px-Ox2), Dx2=Dx1+\rho(Ox2-Ox1) \quad (4),$$

where $\rho=Pz/(Oz-Pz)$, and Dz1=Dz2=0.

The information of D1 and D2 can be stored as additional information in an "S" buffer for the Maxwell holographic controller, besides the information in a Z buffer for the point primitive P0. In such a way, the additional information can be used to trivially mask the contributions of specific display elements (within the range from D1 to D2) to the specific primitive P0 in the indexed primitive list.

FIG. 3E illustrates a determination of how a specific display element contributes to a line primitive with an occluder before (or in front of) the line primitive. By connecting the specific display element D0 to the starting point $O_1$ and the ending point $O_2$ of the occluder, two point primitives P1 and P2 on the line primitive are determined as the intersection points. Thus, the specific display element D0 does not contribute to the reconstruction of the part of the line primitive from P1 to P2 on the line primitive. Accordingly, when calculating the sum of EM contributions to the specific display element D0, the EM contributions from the part P1-P2 of the line primitive is not calculated.

This can be implemented in two ways. In the first way, the EM contributions from the part P0-P1 and the part P2-Pn to the specific display element D0 are summed as the EM contributions of the line primitive to the specific display element D0, by considering the occlusion from the occluder. In the second way, the EM contribution from the whole line primitive P0-Pn is calculated, together with the EM contribution from the part P1-P2, and a difference between the two calculated EM contributions can be considered as the EM contribution of the line primitive to the specific display element D0 by considering the occlusion from the occluder. The coordinate information of P1 and P2 or the part P1-P2 can be stored, as the part of the line primitive that does not contribute to the specific display element D0, in the "S" buffer of the Maxwell holographic controller, together with the information of the occluder and other information in the "Z" buffer of the GPU.

FIG. 3F illustrates a determination of how a specific display element contributes to a triangle primitive with an occluder before the triangle primitive. By connecting the specific display element D0 to the starting point O1 and the ending point O2 of the occluder, four point primitives P1, P2, P3, and P4 on sides of the triangle primitive are determined as the intersection points. Thus, the specific display element D0 does not contribute to the reconstruction of the part of the triangle primitive enclosed by the points P1, P2, P3, P4, $P_C$. Accordingly, when calculating the sum of EM contributions to the specific display element D0, the EM contributions from the part P1-P2-P3-P4-$P_C$ of the triangle primitive is not calculated. That is, only the EM contributions from the first triangle formed by points $P_A$, P1 and P2 and the second triangle formed by points $P_B$, P3, and P4 are summed as the EM contribution of the triangle primitive $P_A$-$P_B$-$P_C$ by considering the occlusion of the occluder. The coordinate information of P1, P2, P3, and P4 or the triangle primitives $P_A$-P1-P2 and $P_B$-P3-P4 can be stored, as the part of triangle primitive $P_A$-$P_B$-$P_C$ that contributes to the specific display element D0, in the "S" buffer of the Maxwell holographic controller, together with the information of the occluder and other information in the "Z" buffer of the GPU.

The implementations of occlusion in Maxwell holography enables to convert the "Z" buffer in the GPU to the "S" buffer in the Maxwell holographic controller, and can mask the contributions of specific primitives (or specific parts of the primitives) in the indexed primitive list to a specific display element. This not only provides accurate, physically correct occlusion, it also saves computation time, as the primitives that do not contribute to a given display element can be ignored and computation can move on to computation for the next display element. The "S" buffer can contain additional information related to diffraction efficiency of the display.

The "S" buffer can also include rendering features such as Holographic specular highlights, in which a reflectivity of a surface is dependent upon the viewing angle. In traditional CGI, specular highlights are dependent only on the orientation of the rendered object, whereas in a Maxwell holographic context, the direction from which the object is viewed also plays a part. Therefore, the geometric specular information can be encoded in the "S" buffer as an additive (specular) rather than a subtractive (occlusion) contribution. In Maxwell holography, the mathematics for holographic specular highlights can be substantially the same as that for holographic occlusion.

Exemplary Implementations for Stitching

When light illuminates a display modulated with EM contributions from a list of primitives of a 3D object, the modulated display causes the light to propagate in different directions to form a volumetric light field corresponding to the primitives. The volume light field is the Maxwell holographic reconstruction. Two adjacent primitives in the 3D object, e.g., two triangle primitives, have a shared side (e.g., edge or surface). During the reconstruction, a stitching issue may raise, where the light intensity of the shared side can be doubled due to the reconstructions of the two adjacent primitives separately. This may affect the appearance of the reconstructed 3D object.

Figure 3G:
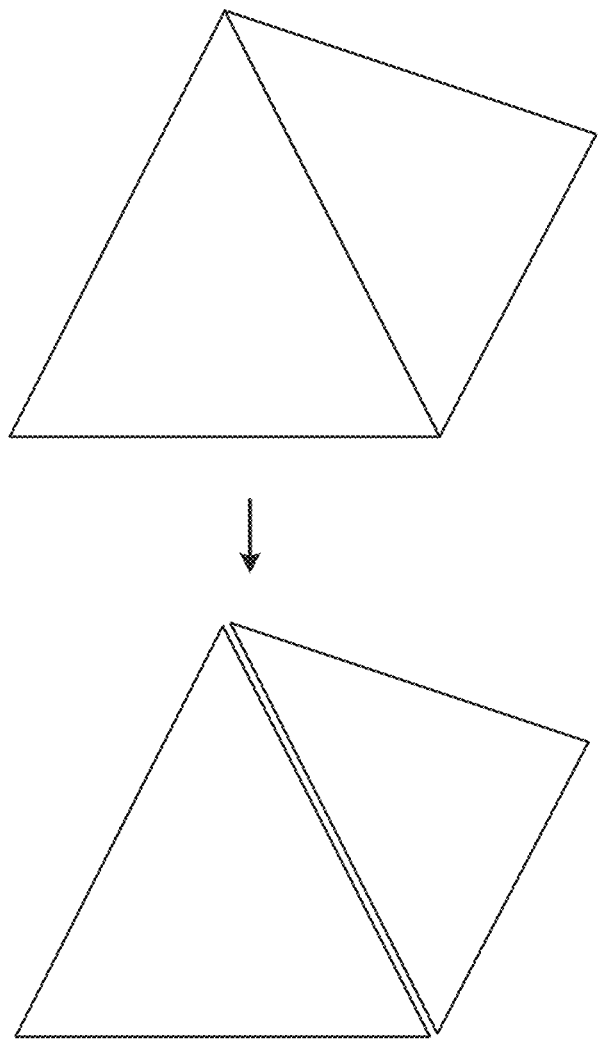
FIG. 3G illustrates an example implementation of Maxwell holographic stitching.

To address the stitching issue in Maxwell holography, as illustrated in FIG. 3G, the adjacent primitives can be scaled down by a predetermined factor, so that a gap can be formed between the adjacent primitives. In some cases, instead of scaling down the two adjacent primitives, only one primitive or a part of the primitive is scaled down. For example, a line of a triangle primitive can be scaled down to separate from another triangle primitive. In some cases, the scaling can include scaling different parts of a primitive with different predetermined factors. The scaling can be designed such that the gap is big enough to separate the adjacent primitives to minimize the stitching issue and small enough to make the reconstructed 3D object appear seamless. The predetermined factor can be determined based on information of the display and of the viewer, e.g., a maximum spatial resolution of the holographic light field and, in the case of a part of a primitive appearing entirely or partially behind the display, a minimum distance from the viewer to that part of the primitive.

In some cases, the scaling operation can be applied to primitive data of a primitive obtained from the holographic renderer, e.g., the holographic renderer 130 of FIG. 1A, and the scaled primitive data of the primitive is sent to the Maxwell holographic controller, e.g., the controller 112 of FIG. 1A. In some cases, the controller can perform the scaling operation on the primitive data obtained from the holographic renderer, before calculating EM contributions of the primitives to the display elements of the display.

Exemplary Implementations for Texture Mapping

Texture mapping is a technique developed in computer graphics. The basic idea is to take a source image and apply it as a decal to a surface in a CGI system, enabling detail to be rendered into the scene without the need for the addition of complex geometry. The texture mapping can include techniques for the creation of realistic lighting and surface effects in the CGI system, and can refer universally to the application of surface data to triangular meshes.

In Maxwell holography, flat shaded and also interpolated triangular meshes can be rendered in genuine 3D using the analytic relationship between arbitrary triangles in space and a phase map on a holographic device. However, to be compatible with modern rendering engines, the ability to map information on the surface of these triangles is desirable. This can present a real problem, in that the speed of the method is derived from the existence of the analytic mapping, which does not admit data-driven amplitude changes.

Discrete Cosine Transform (DCT) is an image compression technique and can be considered as the real-valued version of the FFT (Fast Fourier transform). DCT depends on an encode-decode process that assigns weights to cosine harmonics in a given image. The result of an encode is a set of weights equal in number to the number of pixels in the original image, and if every weight is used to reconstruct an image, there will be no loss in information. However, in many images, acceptable reconstructions can be made from a small subset of the weights, enabling large compression ratios.

The decode (render) process of the DCT in two dimensions involves a weighted double sum over every DCT weight and every destination pixel. This can be applied to Maxwell holography for texture mapping. In Maxwell holography, triangle rendering involves a "spiked" double integral, in phase space, to determine the phase contribution of any individual phasel to the triangle in question. The integral can be folded into a double sum which mirrors the one in the DCT reconstruction, and then re-derive the analytic triangle expression in terms of the DCT weights. This implementation of DCT technique in Maxwell holographic calculations enables to draw full, texture mapped triangles, to employ image compression to the data for the rendered texture triangles, and to take advantage of existing toolsets that automatically compress texture and image data using DCT such as JPEG.

In some implementations, to draw a Maxwell holographic textured triangle, a spatial resolution desired for the mapping on a specified surface is first calculated. Then a texture with the resolution is supplied, and DCT compressed with angular and origin information to correctly orient it on the triangle is obtained. Then, the triangle corners and a list of DCT weights are included in the indexed primitive list and sent to the Maxwell holographic controller. The DCT weights can be included in the EM contributions of the triangle primitive to each display element. The texture triangle can be n times slower than a flat triangle, where n is the number of (nonzero) DCT weights that are sent with the primitive. Modern techniques for "fragment shading" can be implemented in the Maxwell holographic system, with the step of the DCT encode replacing the filter step for traditional projective rendering.

As an example, the following expression shows the DCT weights $B_{pq}$ for an image:

$$B_{pq} \equiv \sigma_p \sigma_q \sum_{m=0}^{M-1} \sum_{n=0}^{N-1} A_{mn} \cos\left[\frac{\pi(2m+1)p}{2M}\right] \cos\left[\frac{\pi(2n+1)q}{2N}\right], \quad (5)$$

where $\sigma_p = \begin{cases} 1/\sqrt{M} & p=0 \\ \sqrt{2/M} & \text{else} \end{cases}, \sigma_q = \begin{cases} 1/\sqrt{N} & q=0 \\ \sqrt{2/N} & \text{else} \end{cases}$, M and N are corners of a rectangular image, and (p, q) is a DCT term.

By decoding, the amplitude value $A_{mn}$ can be obtained as follows:

$$A_{mn} = \sum_{m=0}^{M-1} \sum_{n=0}^{N-1} \sigma_p \sigma_q A^*_{mn}, \quad (6)$$

where $A^*_{mn} = B_{pq} \cos\left[\frac{\pi(2m+1)p}{2M}\right] \cos\left[\frac{\pi(2n+1)q}{2N}\right]$.

When calculating the EM contribution of the textured triangle primitive to a display element (e.g., a phasel), a DCT term with a corresponding DCT weight $A^*_{mn}$ can be included in the calculation as follows:

$$\varphi_{pq} = \sum_{y=0}^{Y} \sum_{x=0}^{X} A^*_{mn} T, \quad (7)$$

where X, Y are corners of the triangle in the coordinate system, T corresponds to the EM contribution of the triangle primitive to the display element, and $\varphi_{pq}$ is the partial contribution for non-zero term $B_{pq}$ in the DCT. The number of (p,q) DCT terms can be selected by considering both the information loss in reconstruction and the information compression.

Exemplary Process

Figure 4:
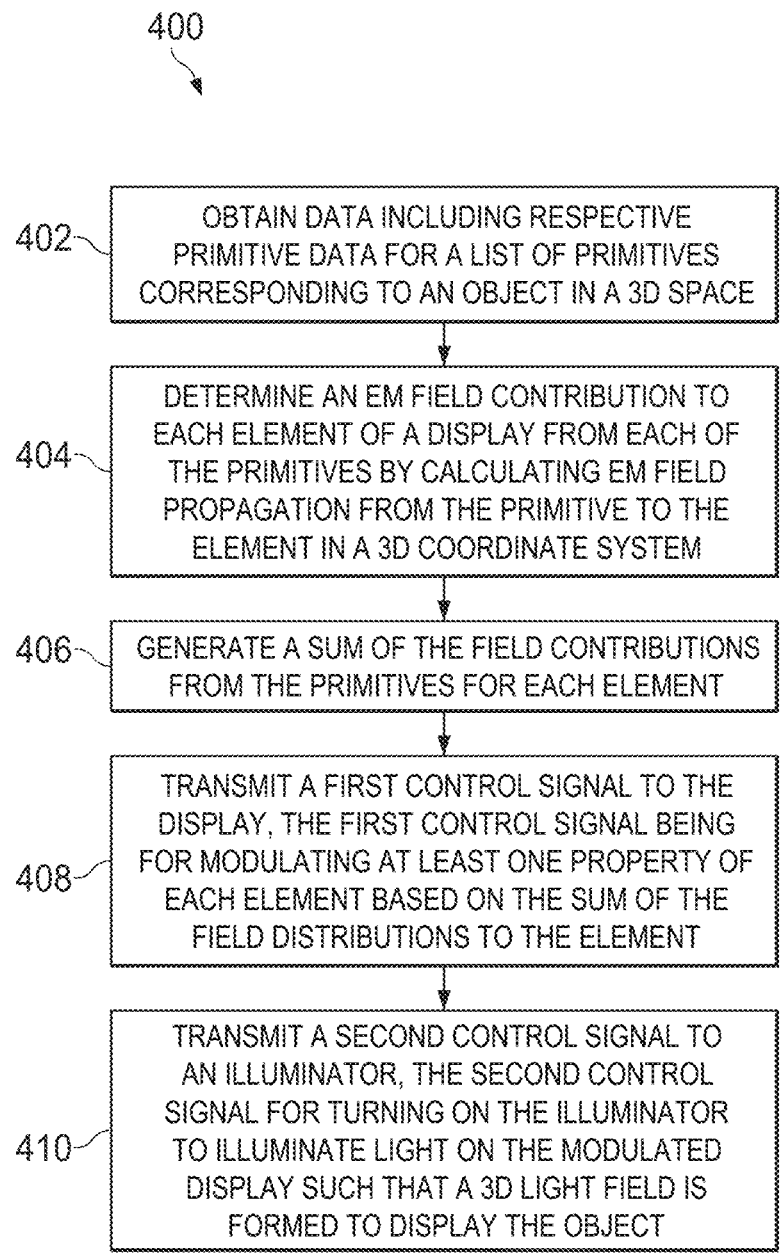
FIG. 4 is a flowchart of an example process of displaying an object in 3D.

FIG. 4 is a flowchart of an exemplary process 400 of displaying an object in 3D. The process 400 can be performed by a controller for a display. The controller can be the controller 112 of FIG. 1A or 152 of FIG. 1B. The display can the display 114 of FIG. 1A or 156 of FIG. 1B.

Data including respective primitive data for primitives corresponding to an object in a 3D space is obtained (402). The data can be obtained from a computing device, e.g., the computing device 102 of FIG. 1A. The computing device can process a scene to generate the primitives corresponding to the object. The computing device can include a renderer to generate the primitive data for the primitives. In some implementations, the controller generates the data itself, e.g., by rendering the scene.

The primitives can include at least one of a point primitive, a line primitive, or a polygon primitive. The list of primitives is indexed in a particular order, e.g., by which the object can be reconstructed. The primitive data can include color information that has at least one of a textured color, a gradient color, or a constant color. For example, the line primitive can have at least one of a gradient color or a textured color, or a constant color. The polygon primitive can also have at least one of a gradient color, a textured color, or a constant color. The primitive data can also include texture information of the primitive and/or shading information on one or more surfaces of the primitive (e.g., a triangle). The shading information can include a modulation on at least one of color or brightness on the one or more surfaces of the primitive. The primitive data can also include respective coordinate information of the primitive in the 3D coordinate system.

The display can include a number of display elements, and the controller can include a number of computing units. Respective coordinate information of each of the display elements in the 3D coordinate system can be determined based on the respective coordinate information of the list of primitives in the 3D coordinate system. For example, a distance between the display and the object corresponding to the primitives can be predetermined. Based on the predetermined distance and the coordinate information of the primitives, the coordinate information of the display elements can be determined. The respective coordinate information of each of the display elements can correspond to a logical memory address for the element stored in a memory. In such a way, when the controller loops in a logical memory address for a display element in a logical memory space of the controller, a corresponding actual physical location for the display element in the space can be identified.

An EM field contribution from each of the primitives to each of the display elements is determined by calculating EM field propagation from the primitive to the element in the 3D coordinate system (404). The EM field contribution can include at least one of a phase contribution or an amplitude contribution.

As illustrated above with respect to FIGS. 3A-3C, at least one distance between the primitive and the display element can be determined based on the respective coordinate information of the display element and the respective coordinate information of the primitive. In some cases, for each primitive, the at least one distance can be calculated or computed just once. For example, the controller can determine a first distance between a first primitive of the primitives and a first element of the display elements based on the respective coordinate information of the first primitive and the respective coordinate information of the first element and determining a second distance between the first primitive and a second element of the elements based on the first distance and a distance between the first element and the second element. The distance between the first element and the second element can be predetermined based on a pitch of the plurality of elements of the display.

The controller can determine the EM field contribution to the display element from the primitive based on a predetermined expression for the primitive and the at least one distance. In some cases, as illustrated above with respect to FIGS. 3A-3C, the predetermined expression can be determined by analytically calculating the EM field propagation from the primitive to the element. In some cases, the predetermined expression is determined by solving Maxwell's equations. Particularly, the Maxwell's equations can be solved by providing a boundary condition defined at a surface of the display. The boundary condition can include a Dirichlet boundary condition or a Cauchy boundary condition. The primitives and the display elements are in the 3D space, and the surface of the display forms a portion of a boundary surface of the 3D space. The predetermined expression can include at least one of functions that include a sine function, a cosine function, and an exponential function. During computation, the controller can identify a value of the at least one of the functions in a table stored in a memory, which can improve a computation speed. The controller can determine the EM field contribution to each of the display elements for each of the primitives by determining a first EM field contribution from a first primitive to a display element in parallel with determining a second EM field contribution from a second primitive to the display element.

For each of the display elements, a sum of the EM field contributions from the list of primitives to the display element is generated (406).

In some implementations, the controller determines first EM field contributions from the primitives to a first display element and sums the first EM field contributions for the first element and determining second EM field contributions from the primitives to a second display element and sums the second EM field contributions for the second display element. The controller can include a number of computing units. The controller can determine an EM field contribution from a first primitive to the first element by a first computing unit in parallel with determining an EM field contribution from a second primitive to the first element by a second computing unit.

In some implementations, the controller determines first respective EM field contributions from a first primitive to each of the display elements and determine second respective EM field contributions from a second primitive to each of the display elements. Then the controller accumulates the EM field contributions for the display element by adding the second respective EM field contribution to the first respective EM field contribution for the display element. Particularly, the controller can determine the first respective EM field contributions from the first primitive to each of the display elements by using a first computing unit in parallel with determining the second respective EM field contributions from the second primitive to each of the display elements by using a second computing unit.

A first control signal is transmitted to the display, the first control signal being for modulating at least one property of each display element based on the sum of the field distributions to the display element (408). The at least one property of the element includes at least one of a refractive index, an amplitude index, a birefringence, or a retardance.

The controller can generate, for each of the display elements, a respective control signal based on the sum of the EM field contributions from the primitives to the element. The respective control signal is for modulating the at least one property of the element based on the sum of the EM field contributions from the primitives to the element. That is, the first control signal includes the respective control signals for the display elements.

In some examples, the display is controlled by electrical signals. Then the respective control signal can be an electrical signal. For example, an LCOS display includes an array of tiny electrodes whose voltage is individually controlled as element intensities. The LCOS display can be filled with a birefringent liquid crystal (LC) formulation that changes its refractive index as an applied voltage changes. Thus, the respective control signals from the controller can control the relative refractive index across the display elements and accordingly the relative phase of light passing through or reflected by the display.

As discussed above, the display surface forms a part of the boundary surface. The controller can multiple a scale factor to the sum of the field contributions for each of the elements to obtain a scaled sum of the field contributions, and generate the respective control signal based on the scaled sum of the field contributions for the element. In some cases, the controller can normalize the sum of the field contributions for each of the elements, e.g., among all the elements, and generate the respective control signal based on the normalized sum of the field contributions for the element.

A second control signal is transmitted to an illuminator as a control signal for turning on the illuminator to illuminate light on the modulated display (410). The controller can generate and transmit the second control signal in response to determining a completion of obtaining the sum of the field contributions for each of the display elements. Due to time symmetry (or conservation of energy), the modulated elements of the display can cause the light to propagate in different directions to form a volumetric light field corresponding to the object in the 3D space. The volumetric light field can correspond to a solution of Maxwell's equations with a boundary condition defined by the modulated elements of the display.

In some implementations, the illuminator is coupled to the controller through a memory buffer configured to control amplitude or brightness of one or more light emitting elements in the illuminator. The memory buffer for the illuminator can have a smaller size than a memory buffer for the display. A number of the light emitting elements in the illuminator can be smaller than a number of the elements of the display. The controller can be configured to activate the one or more light emitting elements of the illuminator simultaneously.

In some examples, the illuminator includes two or more light emitting elements each configured to emit light with a different color. The controller can be configured to sequentially modulate the display with information associated with a first color during a first time period and modulate the display with information associated with a second color during a second, sequential time period, and to control the illuminator to sequentially turn on a first light emitting element to emit light with the first color during the first time period and a second light emitting element to emit light with the second color during the second time period. In such a way, a multi-color object can be displayed in the 3D space.

In some examples, the display has a resolution small enough to diffract light. The illuminator can emit a white light into the display which can diffract the white light into light with different colors to thereby display a multi-color object.

Exemplary Systems

Figure 5A:
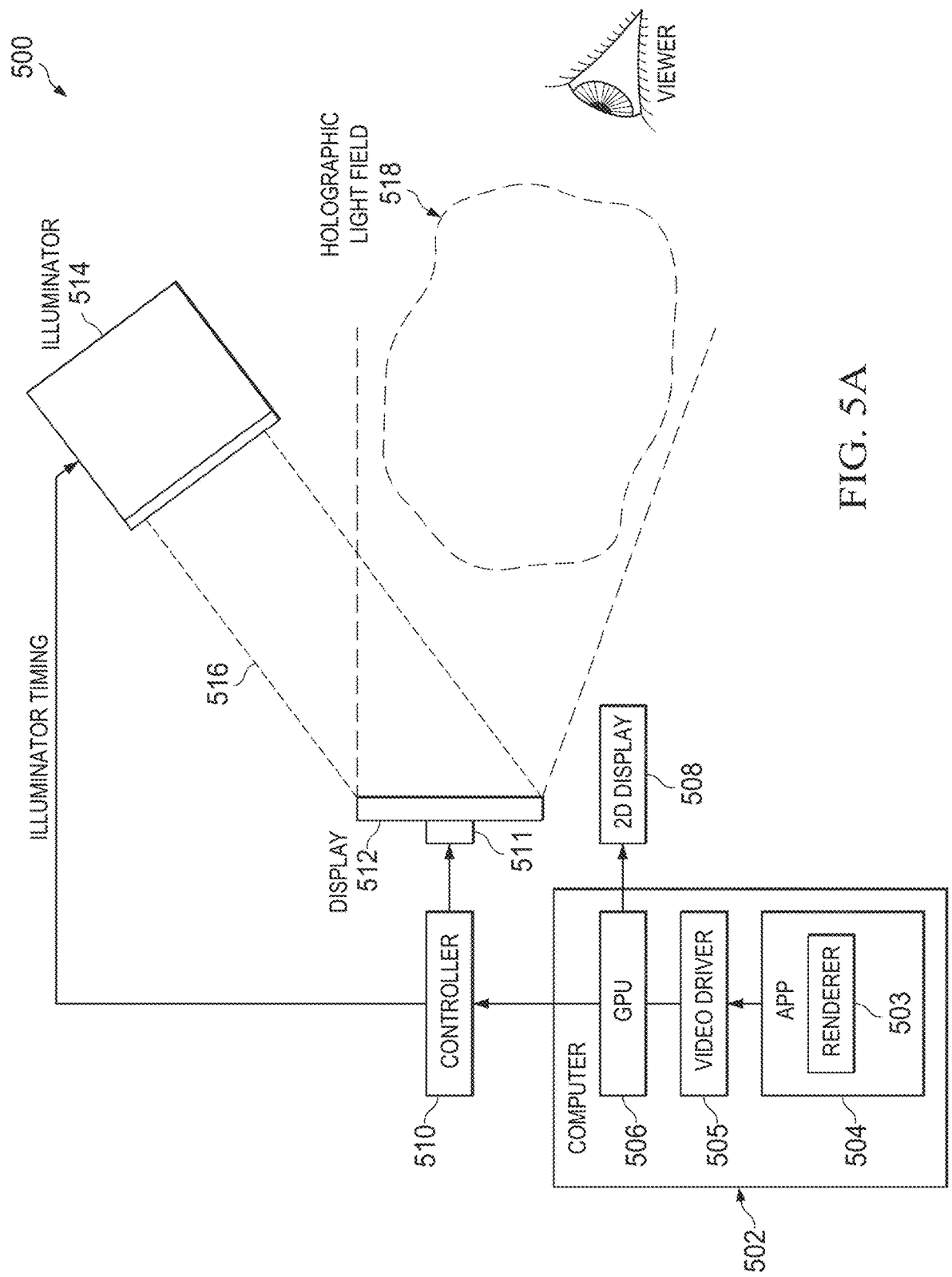
FIG. 5A illustrates an example system for 3D display including a reflective display with front illumination.
Figure 5B:
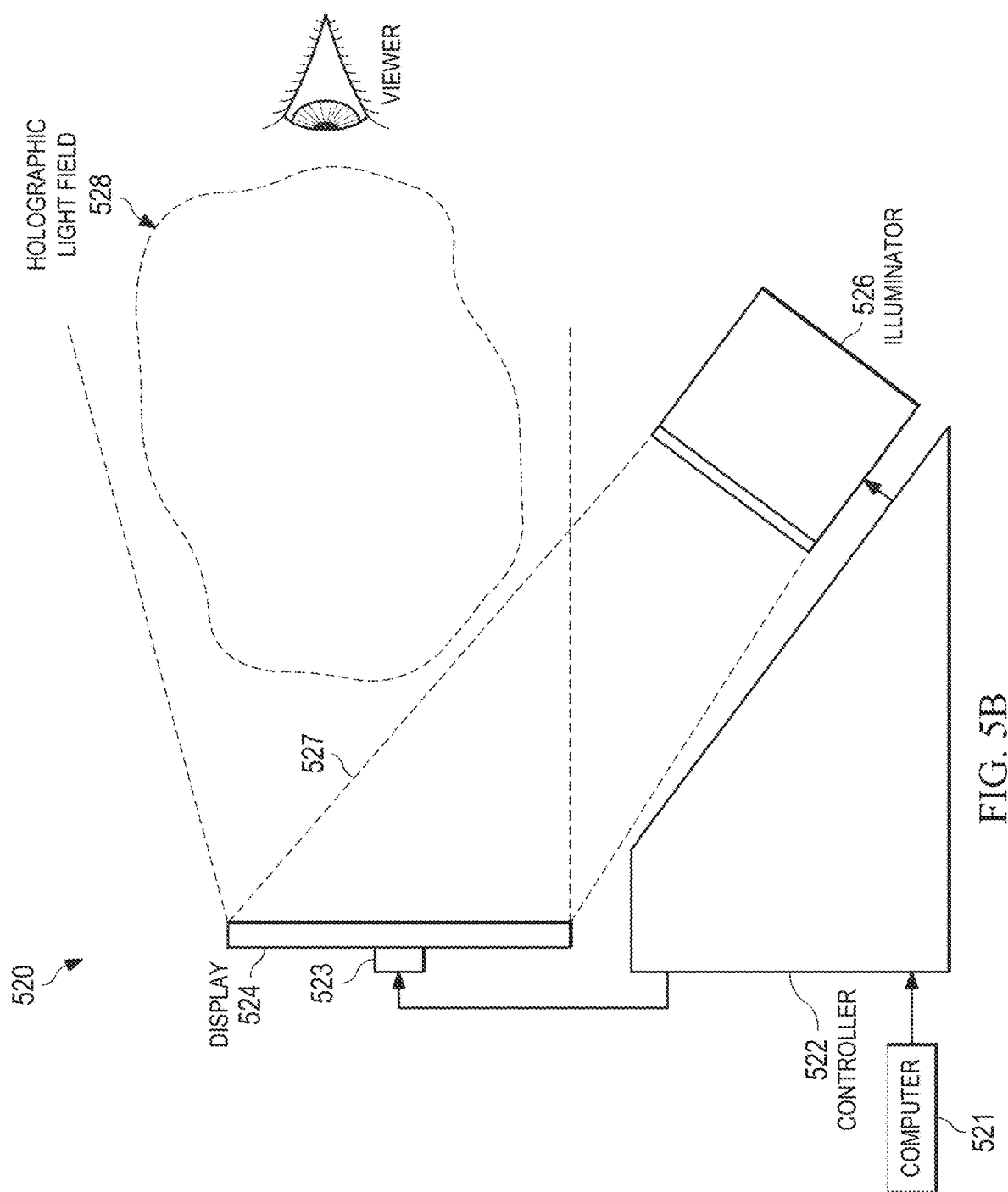
FIG. 5B illustrates another example system for 3D display including a reflective display with front illumination.
Figure 5C:
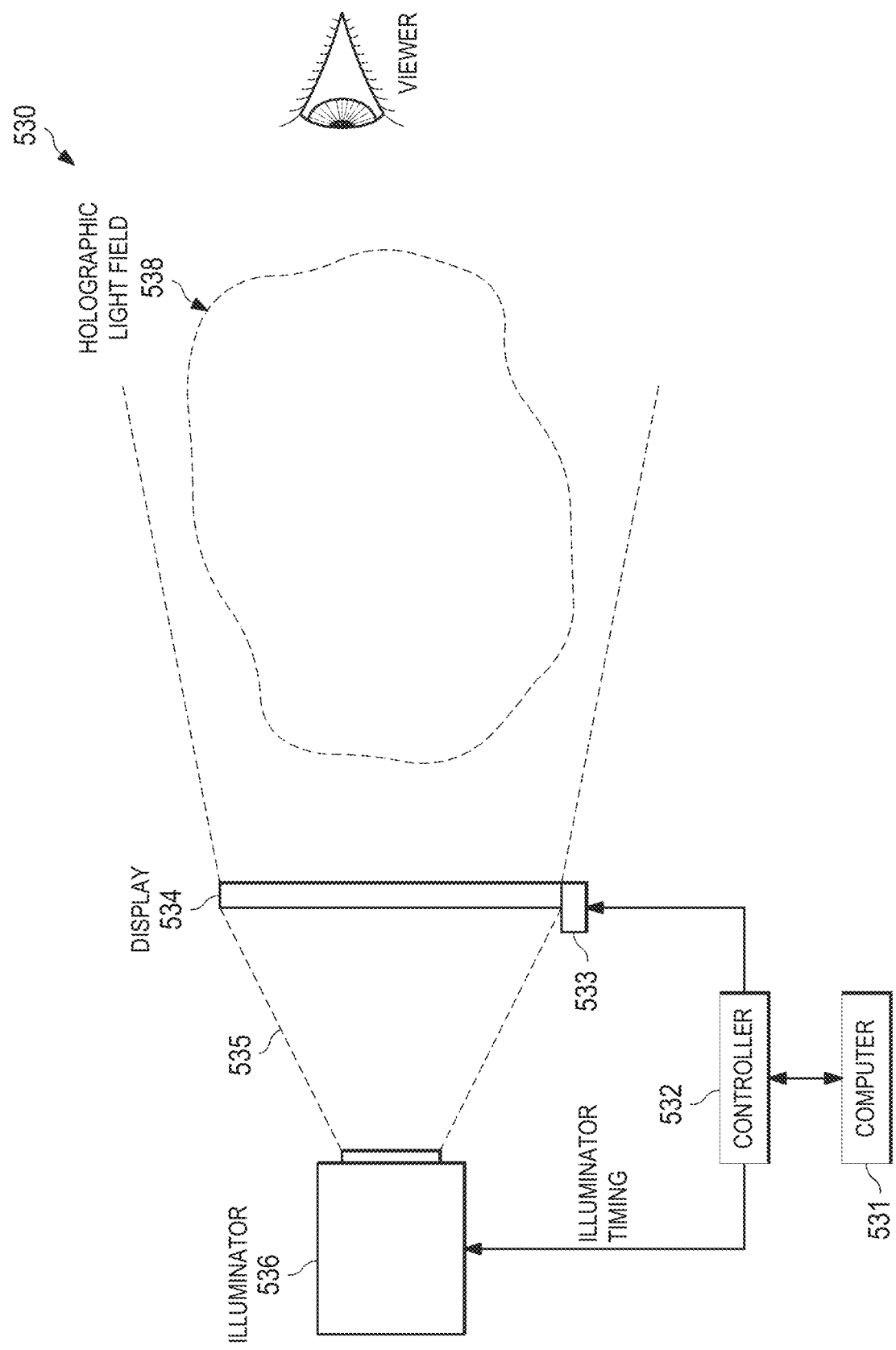
FIG. 5C illustrates another example system for 3D display including a transmissive display with back illumination.
Figure 5D:
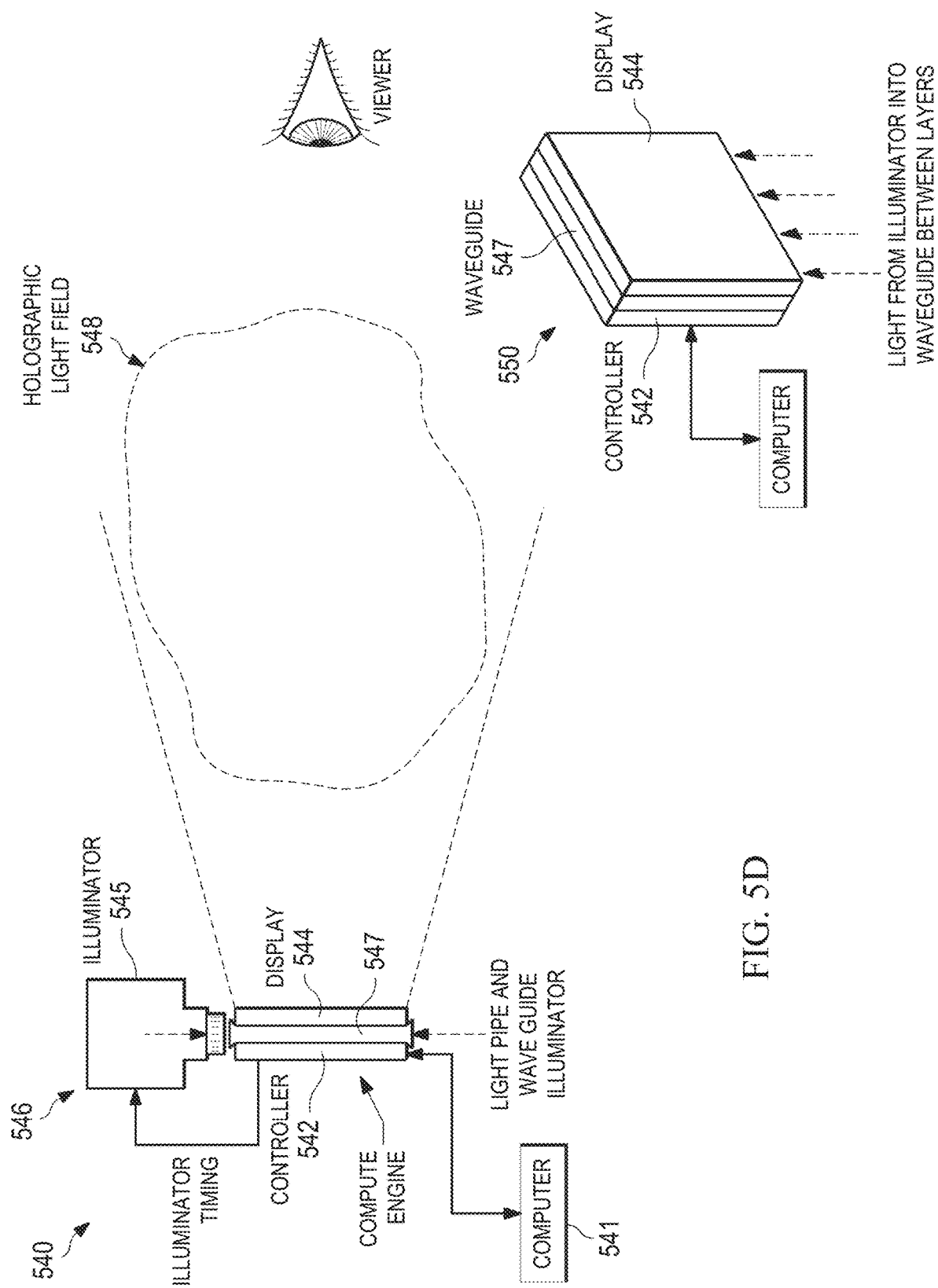
FIG. 5D illustrates another example system for 3D display including a transmissive display with waveguide illumination.
Figure 5F:
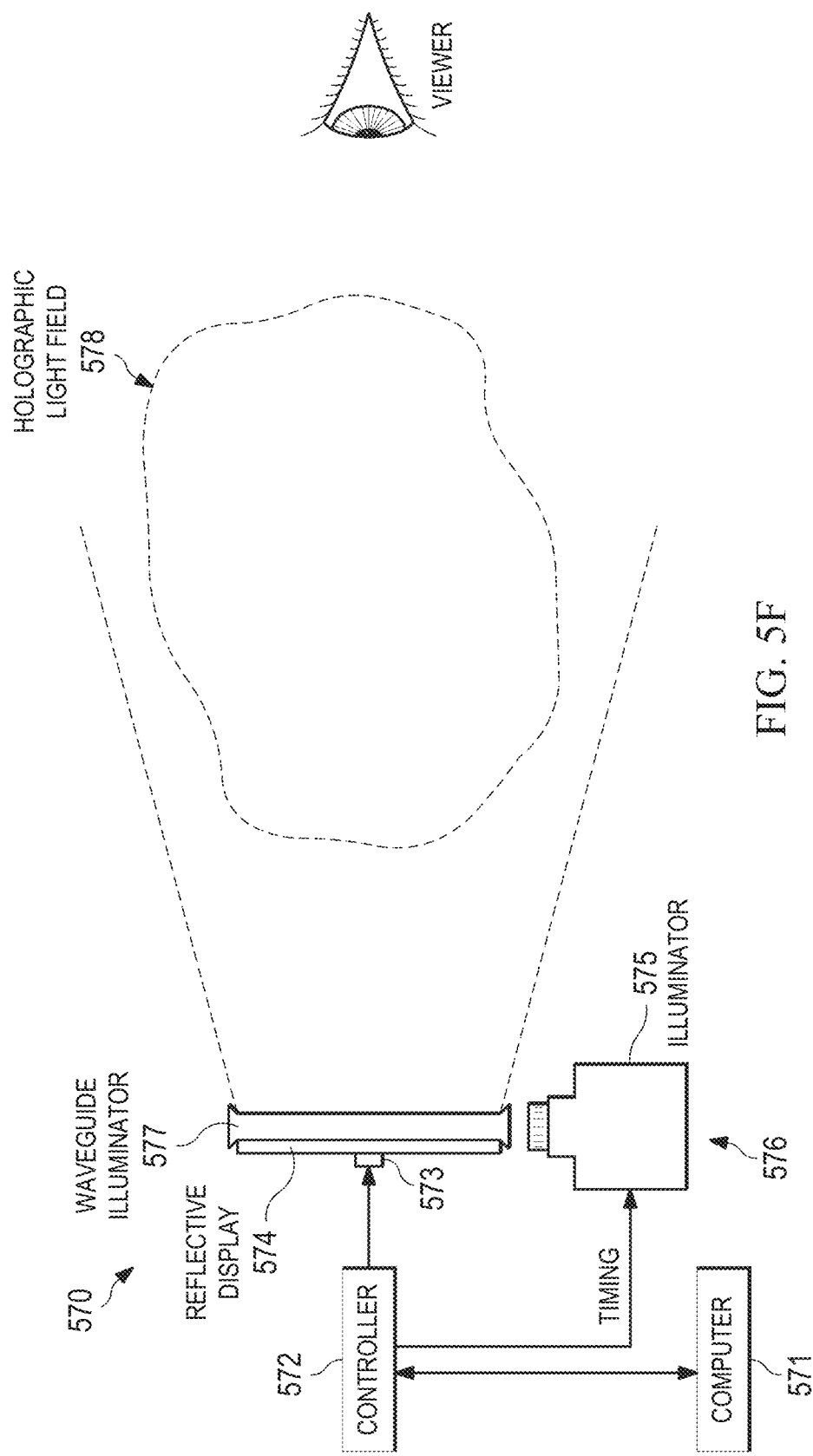
FIG. 5F illustrates another example system for 3D display including a reflective display with waveguide illumination.
Figure 5G:
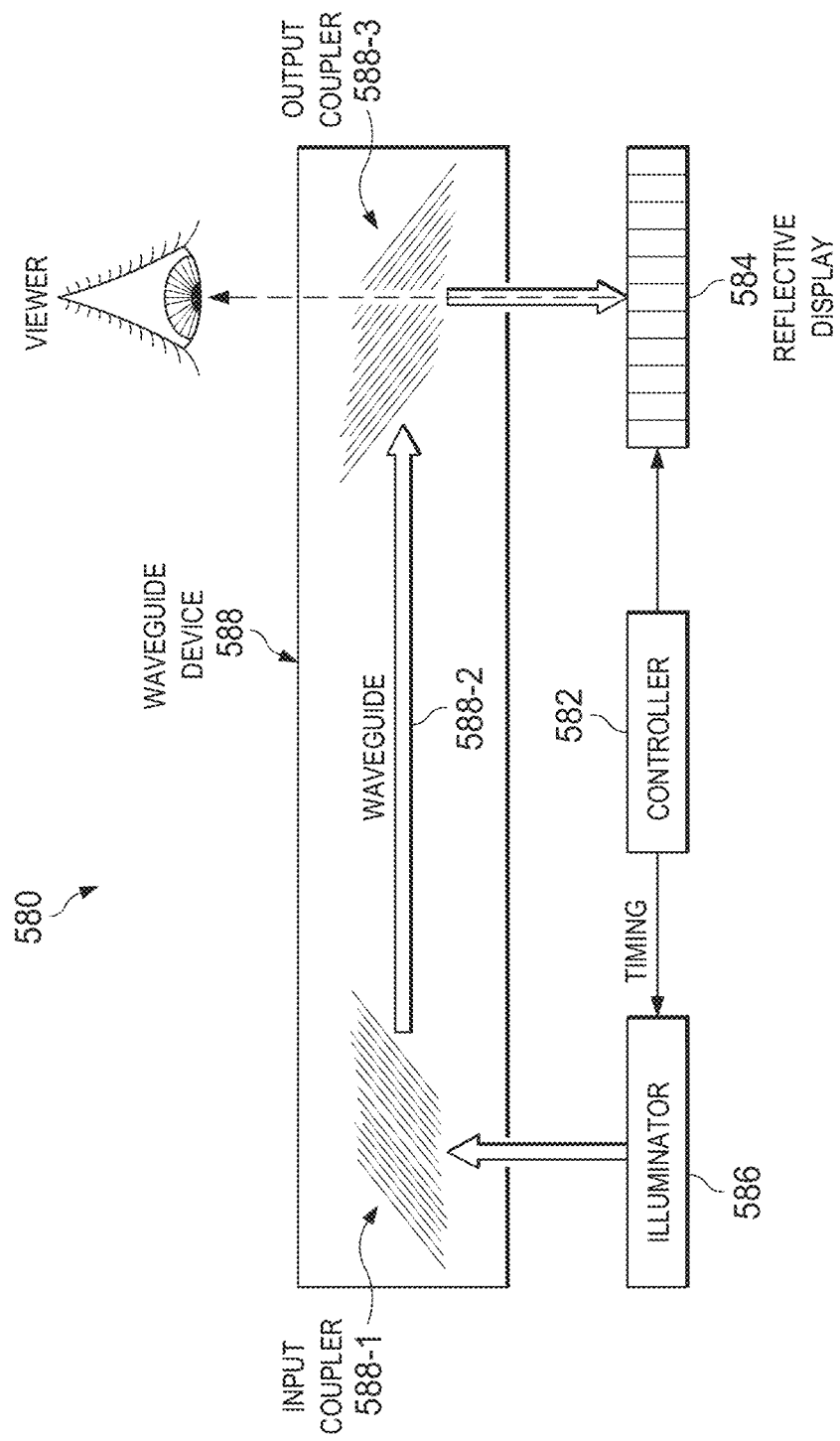
FIG. 5G illustrates another example system for 3D display including a reflective display with waveguide illumination.
Figure 5H:
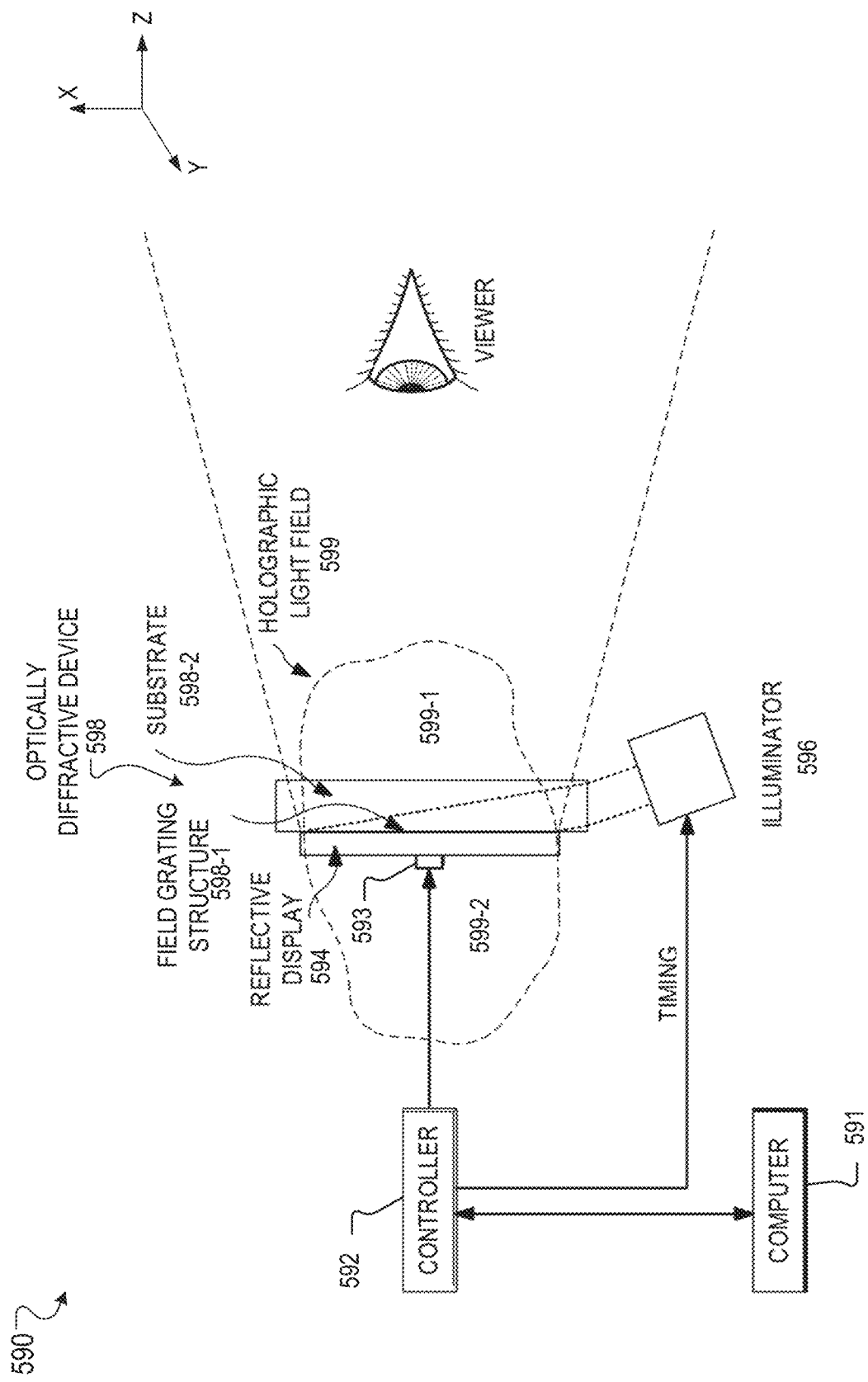
FIG. 5H illustrates another example system for 3D display including a reflective display with optically diffractive illumination using a transmissive field grating based structure.
Figure 51:
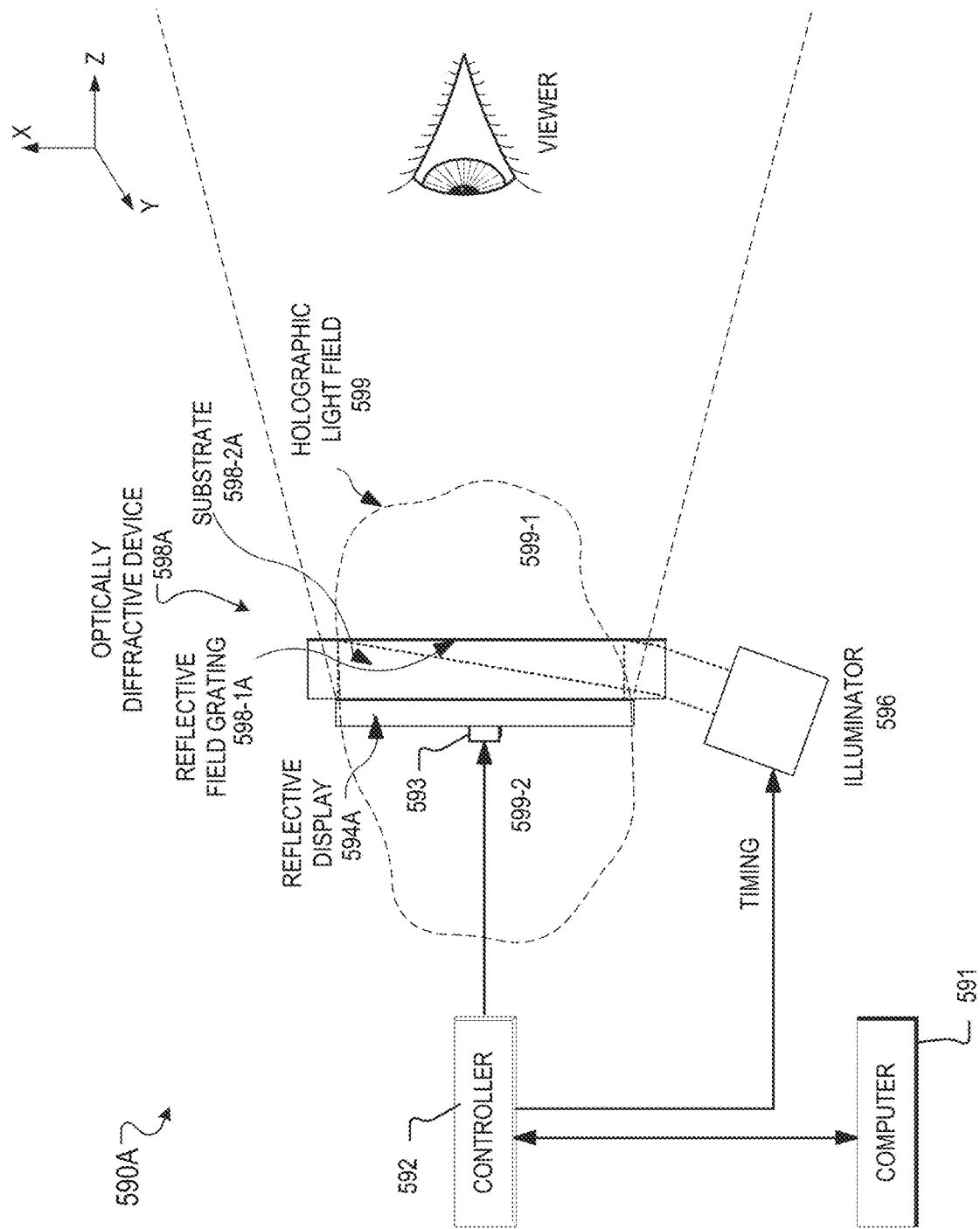
Figure 5J:
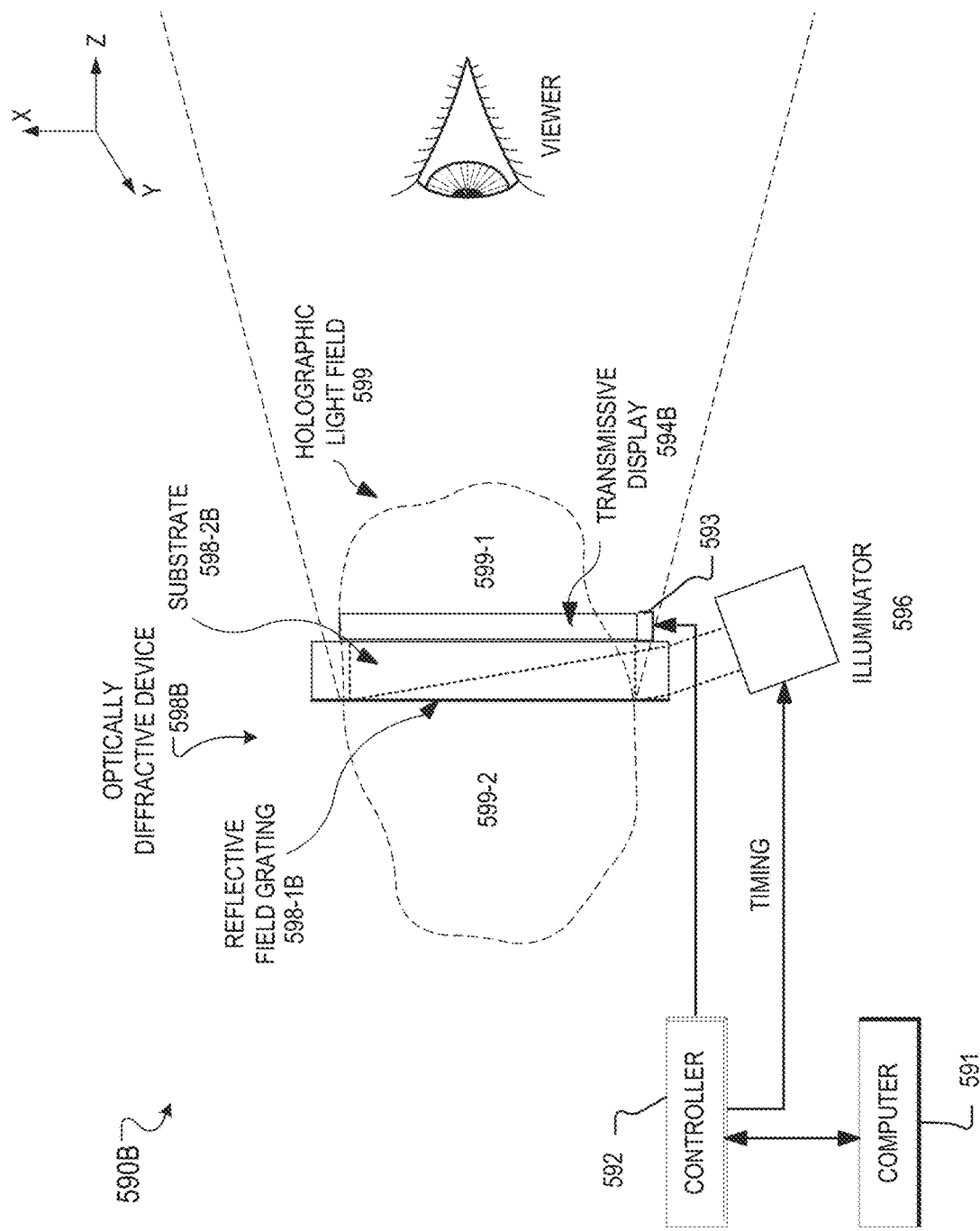
FIG. 5J illustrates another example system for 3D display including a transmissive display with optically diffractive illumination using a reflective field grating based structure.
Figure 5K:
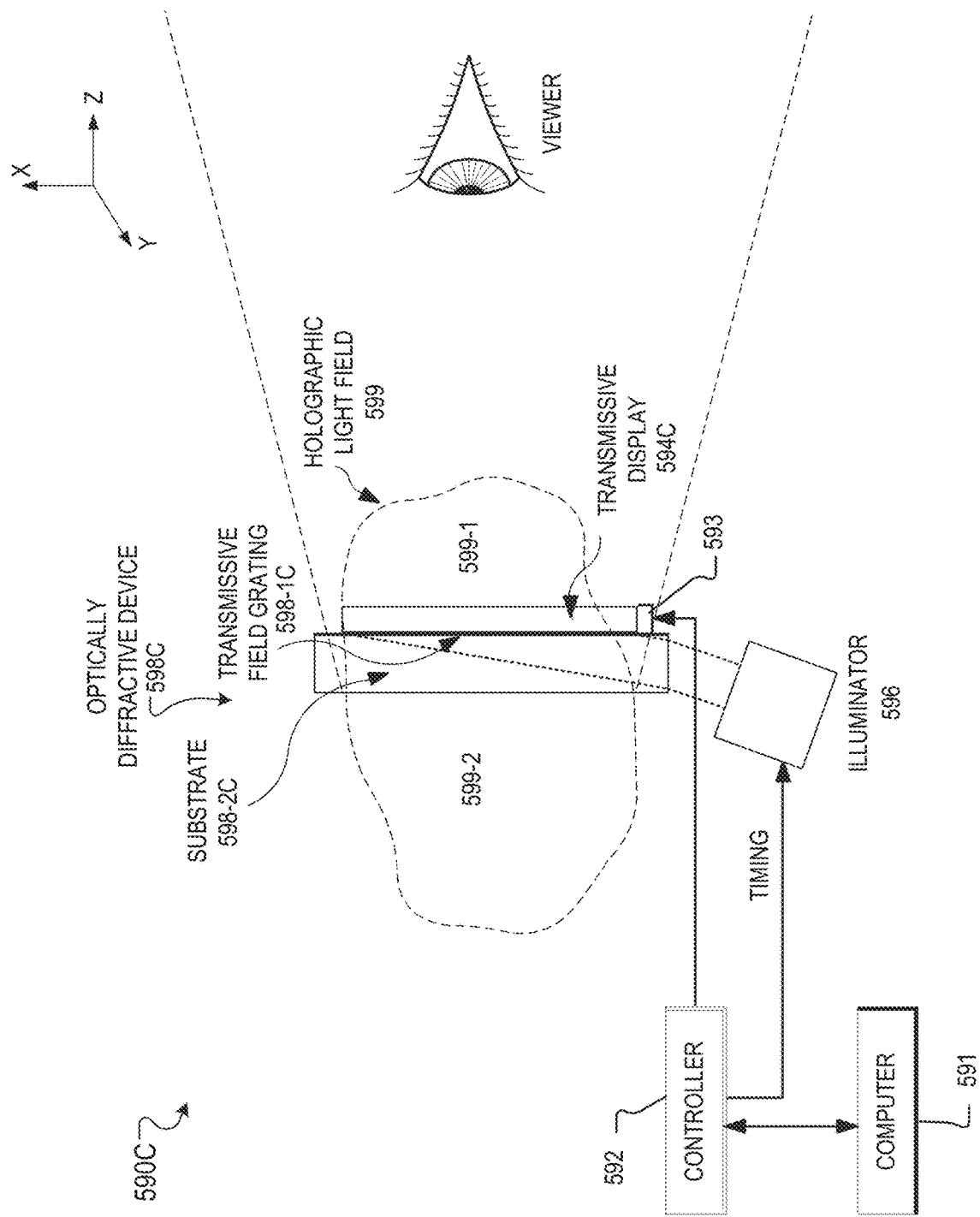
FIG. 5K illustrates another example system for 3D display including a transmissive display with optically diffractive illumination using a transmissive field grating based structure.

FIGS. 5A-5K show implementations of example systems for 3D displays. Any one of the systems can correspond to, for example, the system 100 of FIG. 1A. FIGS. 5A and 5B show example systems having reflective displays with front illumination. FIG. 5C shows an example system having a transmissive display with back illumination. FIGS. 5D and 5E show example systems having transmissive displays with waveguide illumination. FIGS. 5F and 5G show example systems having reflective displays with waveguide illumination. FIGS. 5H and 5I show example systems having reflective displays with optically diffractive illumination using a transmissive grating structure (FIG. 5H) and a reflective grating structure (FIG. 5I). FIGS. 5J and 5K show example systems having transmissive displays with optically diffractive illumination using a reflective grating structure (FIG. 5J) and a transmissive grating structure (FIG. 5K).

FIG. 5A illustrates a system 500 with a reflective display with front illumination. The system 500 includes a computer 502, a controller 510 (e.g., an ASIC), a display 512 (e.g., an LCOS device), and an illuminator 514. The computer 502 can be the computing device 102 of FIG. 1A, the controller 510 can be the controller 112 of FIG. 1A, the display 512 can be the display 114 of FIG. 1A, and the illuminator 514 can be the illuminator 116 of FIG. 1A.

As illustrated in FIG. 5A, the computer 502 includes an application 504 that has a renderer 503 for rendering a scene of an object. The rendered scene data is processed by a video driver 505 and then a GPU 506. The GPU 506 can be the GPU 108 of FIG. 1A and can be configured to generate a list of primitives corresponding to the scene and respective primitive data. For example, the video driver 505 can be configured to process the rendered scene data and generate a list of primitives. As noted above, the GPU 506 can include a conventional 2D renderer, e.g., the conventional 2D renderer 120 of FIG. 1A, to render the primitives into a list of items to draw on a 2D display 508. The GPU 506 or the controller 510 can include a holographic renderer, e.g., the holographic renderer 130 of FIG. 1A, to render the list of primitives into graphic data to be displayed by the display 512.

The controller 510 is configured to receive the graphic data from the computer 502, compute EM field contributions from the list of primitives to each of elements of the display 512, and generate a respective sum of the EM field contributions from the primitives to each of the elements. The controller 510 can generate respective control signals to each of the display elements for modulating at least one property of the display element. The controller can transmit the respective control signals to the display elements of the display 512 through a memory buffer 511 for the display 512.

The controller 510 can also generate and transmit a control signal, e.g., an illumination timing signal, to activate the illuminator 514. For example, the controller 510 can generate and transmit the control signal in response to determining that the computations of the sums of EM field contributions from the primitives to the display elements are completed. As noted above, the controller 510 can transmit the control signal to the illuminator 514 via a memory buffer. The memory buffer can be configured to control amplitude or brightness of light emitting elements in the illuminator 514 and activate the light emitting elements simultaneously or sequentially.

As illustrated in FIG. 5A, the illuminator 514 can emit a collimated light beam 516 that is incident on a front surface of the display 512 at an incident angle in a range between 0 degrees and almost ±90 degrees. The emitted light beam is diffracted from the display 512 to form a holographic light field 518, corresponding to the object, which can be seen by a viewer.

FIG. 5B illustrates another system 520 with another reflective display 524 with front illumination. Compared to the system 500 of FIG. 5A, the system 520 has a larger reflective display 524. To accommodate this, or for other packaging or aesthetic reasons, a display controller 522 is included in a housing that can be a support or enclosure for an illuminator 526. The controller 522 is similar to the controller 510 of FIG. 5A and can be configured to receive graphic data from a computer 521, compute EM field contributions from primitives to each of display elements of the display 524, and generate a respective sum of the EM field contributions from the primitives to each of the display elements. The controller 522 then generates respective control signals to each of the display elements for modulating at least one property of the display element and transmits the respective control signals to the display elements of the display 524 through a memory buffer 523 for the display 524.

The controller 522 also transmits a control signal to the illuminator 526 to activate the illuminator 526. The illuminator 526 emits a divergent or semi-collimated light beam 527 to cover a whole surface of the display 524. The light beam 524 is diffracted by the modulated display 524 to form a holographic light field 528.

FIG. 5C illustrates a system 530 with a transmissive display 534 with back illumination. The transmissive display 534, for example, can be a large scale display. The system 530 includes a controller 532 which can be similar to the controller 510 of FIG. 5A. The controller 532 can be configured to receive graphic data from a computer 531, compute EM field contributions from primitives to each of display elements of the display 534, and generate a respective sum of the EM field contributions from the primitives to each of the display elements. The controller 532 then generates respective control signals to each of the display elements for modulating at least one property of the display element and transmits the respective control signals to the display elements of the display 534 through a memory buffer 533 for the display 534.

The controller 532 also transmits a control signal to an illuminator 536 to activate the illuminator 536. Different from the system 500 of FIG. 5A and the system 520 of FIG. 5B, the illuminator 536 in the system 530 is positioned behind a rear surface of the display 534. To cover a large surface of the display 534, the illuminator 536 emits a divergent or semi-collimated light beam 535 on to the rear surface of the display 534. The light beam 535 is transmitted through and diffracted by the modulated display 534 to form a holographic light field 538.

FIG. 5D illustrates another system 540 with a transmissive display 544 with waveguide illumination. The system 540 also includes a controller 542 and an illuminator 546. The controller 542 can be similar to the controller 510 of FIG. 5A, and can be configured to receive graphic data from a computer 541, perform computation on the graphic data, generate and transmit control signals for modulation to the display 544 and a timing signal to activate the illuminator 546.

The illuminator 546 can include a light source 545 and include or be optically attached to a waveguide 547. Light emitted from the light source 545 can be coupled to the waveguide 547, e.g., from a side cross-section of the waveguide. The waveguide 547 is configured to guide the light to illuminate a surface of the display 544 uniformly. The light guided by the waveguide 547 is incident on a rear surface of the display 544 and transmitted through and diffracted by the display 544 to form a holographic light field 548.

Different from the system 500 of FIG. 5A, 520 of FIG. 5B, 530 of FIG. 5C, in the system 540, the controller 542, the display 544, and the waveguide 547 are integrated together into a single unit 550. In some cases, the waveguide 547 and the light source 545 can be integrated as an active waveguide illuminator in a planar form, which can further increase a degree of integration of the single unit 550. As discussed above, the single unit 500 can be connected or tiled with other similar units 550 to form a larger holographic display device.

FIG. 5E illustrates another system 560 with another transmissive display 564 with waveguide illumination. Compared to the system 540, the transmissive display 564 can potentially implement a display that is larger than the transmissive display 544. For example, the transmissive display 564 can have a larger area than a controller 562, and to accommodate this, the controller 562 can be positioned away from the display 564. The system 560 includes an illuminator 566 that has a light source 565 and a waveguide 567. The waveguide 567 is integrated with the display 564, e.g., optically attached, to a rear surface of the display 564. In some implementations, the display 564 is fabricated on a front side of a substrate and the waveguide 567 can be fabricated on a back side of the substrate.

The controller 562 can be similar to the controller 510 of FIG. 1A and configured to receive graphic data from a computer 561, perform computation on the graphic data, generate and transmit control signals for modulation to the display 564 through a memory buffer 563 and a timing signal to activate the light source 565. Light emitted from the light source 565 is guided in the waveguide 567 to illuminate the rear surface of the display 564 and transmitted and diffracted through the display 564 to form a holographic light field 568.

FIG. 5F illustrates another system 570 with a reflective display 574 with waveguide illumination. The reflective display 574, for example, can be a large display. A waveguide 577 of an illuminator 576 is positioned on a front surface of the reflective display 574. A controller 572, similar to the controller 510 of FIG. 5A, can be configured to receive graphic data from a computer 571, perform computation on the graphic data, generate and transmit control signals for modulation to the display 574 through a memory buffer 573 and a timing signal to activate a light source 575 of the illuminator 576. Light coupled from a waveguide 577 of the illuminator 576 is guided to be incident on the front surface of the display 574 and diffracted by the display 574 to form a holographic light field 578.

FIG. 5G illustrates another system 580 with a reflective display 584 with another type of waveguide illumination using a waveguide device 588. A controller 582, similar to the controller 510 of FIG. 5A, is configured to generate and transmit controls signals corresponding to holographic data (images and/or videos) for modulation of the display 584 and transmit a timing signal to activate an illuminator 586. The illuminator 586 can provide one or more colors of light that can be collimated. The waveguide device 588 is positioned in front of the illuminator 586 and the display 584. The waveguide device 588 can include an input coupler 588-1, a waveguide 588-2, and an output coupler 588-3. The input coupler 588-1 is configured to couple the collimated light from the illuminator 586 into the waveguide 588-2. The light then travels inside the waveguide 588-2 via total internal reflection and is incident at the end of the waveguide 588-2 on the output coupler 588-3. The output coupler 588-3 is configured to couple out the light into the display 584. The light then illuminates the display elements of the display 584 that are modulated with corresponding control signals and is diffracted by the reflective display 584 and reflected back (e.g., by a back mirror of the display 584) through the waveguide device 588 (e.g., the output coupler 588-3) to form a holographic light field corresponding to the holographic data in front of a viewer.

In some examples, light is coupled out by the output coupler 588-3 at an angle normal to the waveguide device 588 and/or a front surface of the reflective display 584. In some examples, each of the input coupler 588-1 and the output coupler 588-2 can include a grating structure, e.g., a Bragg grating. The input coupler 588-1 and the output coupler 588-2 can include a similar diffraction grating with different fringe tilt angle. In some examples, the illuminator 586 provides a single color of light, and the input coupler 588-1 and the output coupler 588-2 includes a diffraction grating for the color. In some examples, the illuminator 586 provides multiple colors of light, e.g., red, green and blue light beams, and the input coupler 588-1 and the output coupler 588-2 can include a multilayer stack of three corresponding diffraction gratings (or a single layer having the three corresponding diffraction gratings) that respectively couple in or couple out the different color light beams.

FIG. 5H illustrates another system 590 with a reflective display 594 with optically diffractive illumination using an optically diffractive device 598. The optically diffractive device 598 can be considered as a lightguide device for guiding light. The optically diffractive device 598 can be a transmissive field grating based structure that can include one or more transmissive holographic gratings. The reflective display 594 can be a reflective LCOS device. A controller 592, similar to the controller 510 of FIG. 5A, can be configured to receive graphic data corresponding to one or more objects from a computer 591, perform computation on the graphic data, and generate and transmit control signals for modulation to the display 594 through a memory buffer 593. The controller 592 can be also coupled to an illuminator 596 and be configured to provide a timing signal to activate the illuminator 596 to provide light. The light is then diffracted by the optically diffractive device 598 to be incident on the display 594 and then diffracted by the display 594 to form a holographic light field 599 corresponding to the one or more objects. The display 594 can include a back mirror on the back of the display 594 and can reflect the light towards the viewer. The optically diffractive device 598 can be optically transparent. The illuminator 596 can be positioned below the display 594, which can allow the illuminator 596 to be mounted or housed with other components of the system 590 and to be below an eyeline of the viewer.

As discussed with further details below, Bragg selectivity allows off-axis illumination light to be diffracted from the optically diffractive device 598 towards the display 594 while the returning light diffracted from the display 594 can be close to on axis and hence be off-Bragg to the gratings in the optically diffractive device 598 and hence can pass through the optically diffractive device 598 almost perfectly to the viewer without being diffracted again by the gratings in the optically diffractive device 598. In some implementations, the light from the illuminator 596 can be incident on the optically diffractive device 598 with a large incident angle from a side of the display 594, such that the illuminator 596 does not block the viewer's view and is not intrusive into the holographic light field 599. The incident angle can be a positive angle or a negative angle with respect to a normal line of the display 594. For illustration, the incident angle is presented as a positive angle. For example, the incident angle can be in a range from 70 degrees to 90 degrees, e.g., in a range from 80 degrees to 90 degrees. In a particular example, the incident angle is 84 degrees. The diffracted light from the optically diffractive device 598 can be diffracted at close to normal incidence into the display 594, such that the light can uniformly illuminate the display 594 and can be diffracted back near-normally through the optically diffractive device 598 to the viewer's eyes with minimized power loss due to undesired reflections, diffractions, and/or scatterings within or at the surfaces of the optically diffractive device 598. In some examples, the diffracted angle from the optically diffractive device 598 to the reflective display 594 can be in a range of −10° (or 10 degrees) to 10° (or 10 degrees), e.g., from −7° to 7°, or from 5° to 7°. In a particular example, the diffracted angle is 6°. In another example, the diffracted angle is 0°.

In some implementations, as illustrated in FIG. 5H, the optically diffractive device 598 is arranged in front of the reflective display 594, e.g., along the Z direction towards the viewer. The optically diffractive device 598 can include a field grating structure 598-1 positioned on a substrate 598-2. A back surface of the field grating structure 598-1 faces a front surface of the reflective display 594, and a front surface of the field grating structure 598-1 is attached to the substrate 598-2. The light from the illuminator 596 can be incident on the front surface of the field grating structure 598-1 through the substrate 598-2, e.g., from a side surface of the substrate 598-2. For example, the substrate 598-2 can have a wedged side surface, e.g., as illustrated with further details in FIG. 12C, such that the light at a large incident angle can have less reflection loss.

As discussed with further details below, if a diffraction efficiency of a diffractive structure, e.g., a holographic grating, is less than 100%, light incident at an incident angle can be diffracted by the diffractive structure into zero and first orders. Light of first order (or first order light) is diffracted by the diffractive structure at a diffracted angle towards the display to therein diffract again to reconstruct a holographic light field 599. The first order can be also called first diffraction order. Light in the zero order (or zero order light, or undiffracted light, or the undiffracted order) is undiffracted (or undeflected) by the diffractive structure and transmitted by the diffractive structure at an angle corresponding to the incident angle. The zero order light may cause an undesired effect such as a ghost image, e.g., when the zero order light is incident upon the reflective display 598-1 directly or subsequent to reflection off surfaces within the optically diffractive device 598.

To eliminate the undesired effect, the field grating structure 598-1 can be spaced from the display 594. In some implementations, a back surface of the field grating structure 598-1 is spaced from a front surface of the display 594 by a gap. The gap can have any suitable distance, e.g., 1 mm. The gap can be filled with air or any lower-refractive-index material to satisfy total internal reflection (TIR) on an interface. For example, air has a refractive index (e.g., n≈1.0) which is much smaller than that of a back layer of the field grating structure 598-1 (e.g., n≈1.5) and hence any residual light at the incident angle (e.g., >70°) can be totally internally reflected by the back surface of the field grating structure 598-1 when the incident angle is larger than a critical angle (e.g., ≈41.8° for n≈1.5). That is, the residual light at the incident angle cannot reach the reflective display 594 to cause the undesired effect. In some examples, at least one of the front surface of the reflective display 594 or the back surface of the field grating structure 598-1 is treated with an anti-reflection coating, which can substantially reduce a part of the holographic light field reflected from the reflective display 594 back towards the reflective display 594 from the back of the field grating structure 598-1 which otherwise could cause further ghost images. In some examples, the back surface of the field grating structure 598-1 can be protected by an additional layer, e.g., a glass layer.

In some implementations, instead of being spaced with a gap, the back surface of the field grating structure 598-1 can be attached to the front surface of the reflective display 594 using an intermediate layer. The intermediate layer can be an optically clear adhesive (OCA) layer with a refractive index substantially lower than that of the back layer of the field grating structure 598-1, such that total internal reflection (TIR) can occur and the residual zero order light can be totally reflected at the interface between the intermediate layer and the back layer of the field grating structure 598-1 back into the optically diffractive structure 598.

In some implementations, the field grating structure 598-1 and the display 594 can be separated with a gap so that any residual light cannot reach the display 594. The gap can be filled with any suitable transparent material, index-matching fluid, or OCA. In some implementations, the field grating structure 598-1 can be formed in a cover layer (e.g., a cover glass) of the display 594.

In some cases, to illuminate a whole surface of the reflective display 594 by light diffracted from an active area of the field grating structure 598-1, the active area of the field grating structure 598-1 can be no smaller than an area of the whole surface of the reflective display 594. In some implementations, the field grating structure 598-1 and the reflective display 594 have a rectangular shape with a height along the X direction and a width along the Y direction. The active area of the field grating structure 598-1 can have a height no smaller than a height of the reflective display 594 and a width no smaller than a width of the reflective display 594. If there is a substantial gap between the field grating structure 598-1 and the reflective display 594, the field grating structure 598-1 and the substrate 598-2 can be enlarged further so that an expanding cone (or frustrum) of light from the reflective display 594, e.g., the holographic light field 599, can be seen through the front of the optically diffractive device 598 over an entire vertical and horizontal field of view (around the +Z axis) of the holographic light field 599. The substrate 598-2 can be a little wider and higher than the field grating structure 598-1.

As light is incident on the field grating structure 598-1 at a substantially off-axis angle in a dimension, e.g. the Z direction, the light can be narrower by the cosine of the incidence angle in that dimension. The light from the illuminator 596 can have a narrow rectangular shape incident into the field grating structure 598-1 which can then expand the light to a large rectangular shape incident into the reflective display 594. One or more optical components, e.g., mirrors, prisms, optical slabs, and/or optical fillers, can be arranged between and within the illuminator 596, the optically diffractive structure 598, and the reflective display 594 to further expand the light and to filter its bandwidth. In some examples, the expanded light can have a beam area somewhat smaller than the active area of the reflective display 594, such that the edges and surrounding area of the illuminated area of the reflective display 594 are not noticeable in reflection or scatter towards the viewer. In some examples, the expanded light can have a beam area somewhat larger than the active area of the reflective display 594, such that the edges of the illuminated area of the reflective display 594 are fully illuminated even if the edges of the expanded light are not uniform, e.g. because of diffraction off masking edges.

In some implementations, the controller 592 can obtain graphic data including respective primitive data for a plurality of primitives corresponding to an object in a three-dimensional space, determine, for each of the plurality of primitives, an electromagnetic (EM) field contribution to each of a plurality of display elements of the reflective display 594, generate, for each of the plurality of display elements, a sum of the EM field contributions from the plurality of primitives to the display element, and generate, for each of the plurality of display elements, the respective control signal based on the sum of the EM field contributions to the display element.

In some implementations, the illuminator 596 can include one or more color light emitting elements, e.g., red, blue, or green color lasers (or LEDs), configured to emit light of corresponding colors. The optically diffractive device 598 can be configured to diffract a plurality of different colors of light at respective diffracted angles that are substantially identical to each other. Each of the respective diffracted angles can be in a range of 0° to ±10°, e.g., substantially identical to 0°, + or −1°, + or −2°, + or −3°, + or −4°, + or −5°, + or −6°, + or −7°, + or −8°, + or −9°, or + or −10°.

In some implementations, the controller 592 is configured to sequentially modulate the display 594 with information associated with a plurality of colors of light in a series of time periods. For example, the information can include a series of color holograms or color images. The controller 592 can control the illuminator 596 to sequentially emit each of the plurality of colors of light to the optically diffractive device 598 during a respective time period of the series of time periods, such that each of the plurality of colors of light is diffracted by the optically diffractive device 598 to the reflective display 594 and diffracted by modulated display elements of the reflective display 594 to form a respective color three-dimensional holographic light field 599 corresponding to the object during the respective time period. Depending on temporal coherence-of vision effect in an eye of a viewer, the plurality of colors can be combined in the eye to give an appearance of full color. In some cases, the illuminator 596 is switched off among different light emitting elements during a state change of the display image (or holographic reconstruction) such as during black-insertion subframes between color subframes or during blanking or retrace periods of a video source or during LC rise, fall, or DC-balancing inversion transitions, or during system warm-up, or when the intended holographic light field is completely black, or during a calibration procedure, and is switched on when a valid image (or holographic reconstruction) is presented for a period of time. This can also rely on persistence of vision to make the image (or holographic reconstruction) appear stable and flicker-free.

If a part of the holographic light field 599 appears in front of the display 594, as illustrated by a light field 599-1 in FIG. 5H, that part of the holographic light field 599 is a real part of the reconstructed image or holographic reconstruction (also called a real image or a real holographic reconstruction). When a viewer sees a point of light in front of the display 594, there really is light being reflected from the display 594 to that point. If a part of the light field 599 appears to the viewer to be behind (or inside) the display 594, as illustrated by a light field 599-2 in FIG. 5H, that part of the holographic light field 599 is a virtual part of the reconstructed image or holographic reconstruction (also called a virtual image or a virtual holographic reconstruction). When the viewer sees a point of light which appears to be behind or inside the display 594, there is actually no light being diffracted from the display 594 to that virtual point: rather, part of the light diffracted from the display 594 appears to be originated at that virtual point.

The computer 591 and/or the controller 592 can be configured to adjust a computation (e.g., by equations) of the information (e.g., a two-dimensional hologram, image, or pattern) to be modulated in the display 594 to move the reconstructed holographic light field 599 back and forth along a direction (e.g., the Z direction) normal to the display 594. The computation can be based on a holographic rendering process, e.g., as illustrated in FIGS. 2 and 3A-3G. In some cases, the holographic light field 599 can be fully in front of the display 594. In some cases, the holographic light field 599 can appear to be all behind the display 594. In some cases, as illustrated in FIG. 5H, the holographic light field can have one part in front of the display 594, e.g., the real part 599-1, and another part appearing to be behind the display, e.g., the virtual part 599-2. That is, the light field 599 can appear to straddle a surface of the display 594, which can be called image planning.

Figure 7A:
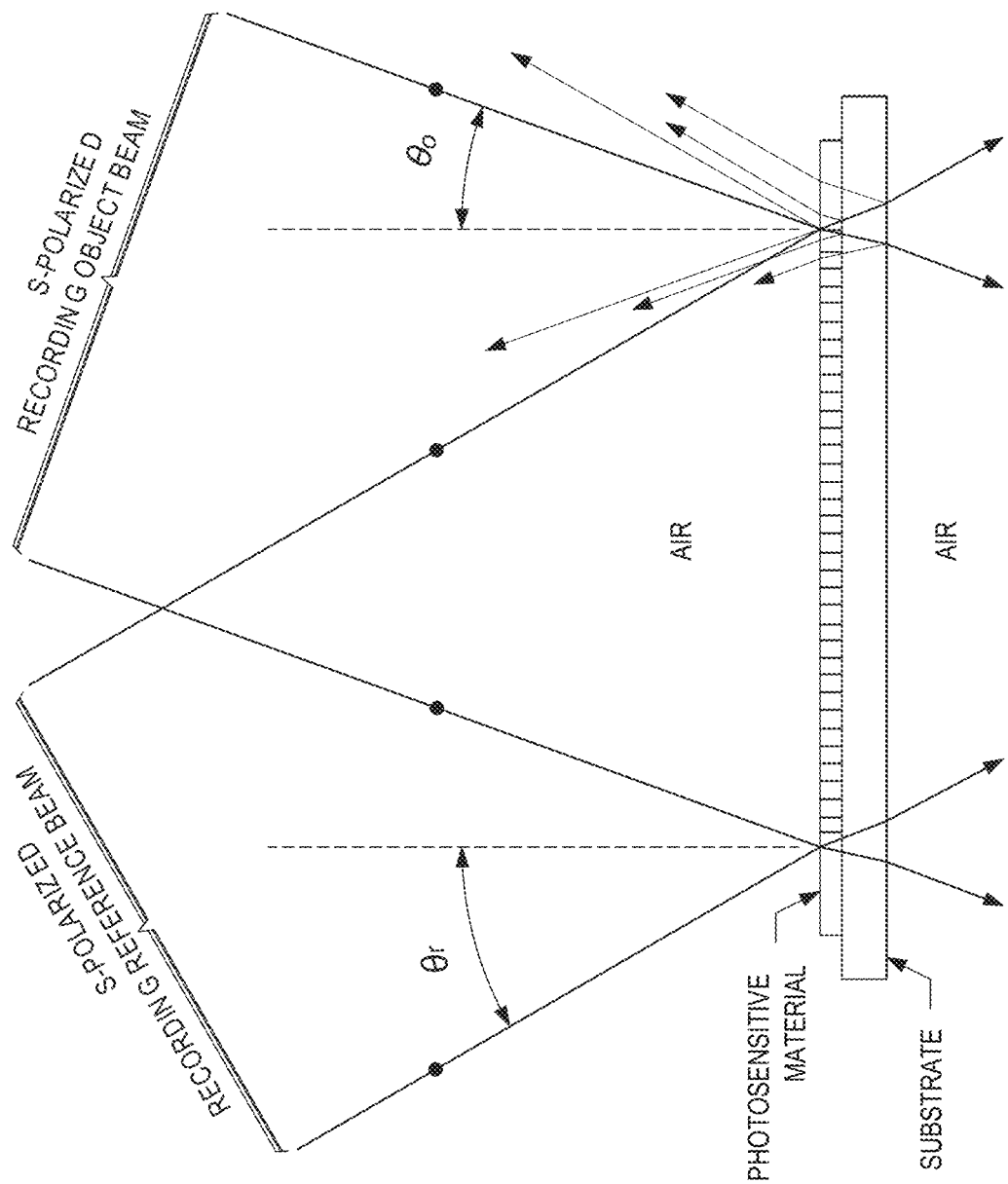
FIG. 7A illustrates an example of recording a grating in a recording medium.
Figure 7B:
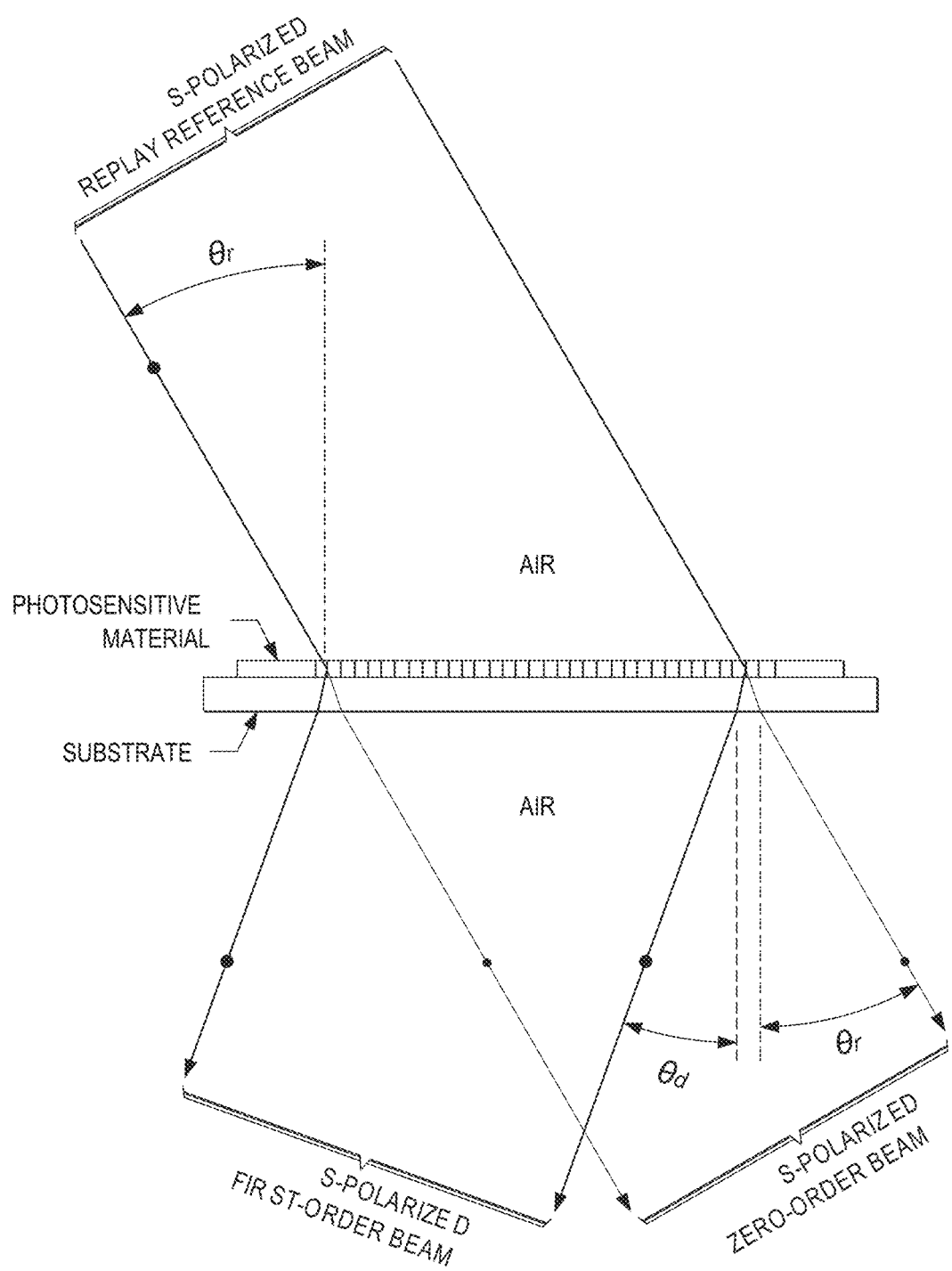
FIG. 7B illustrates an example of diffracting a replay reference beam by the grating of FIG. 7A.
Figure 7C:
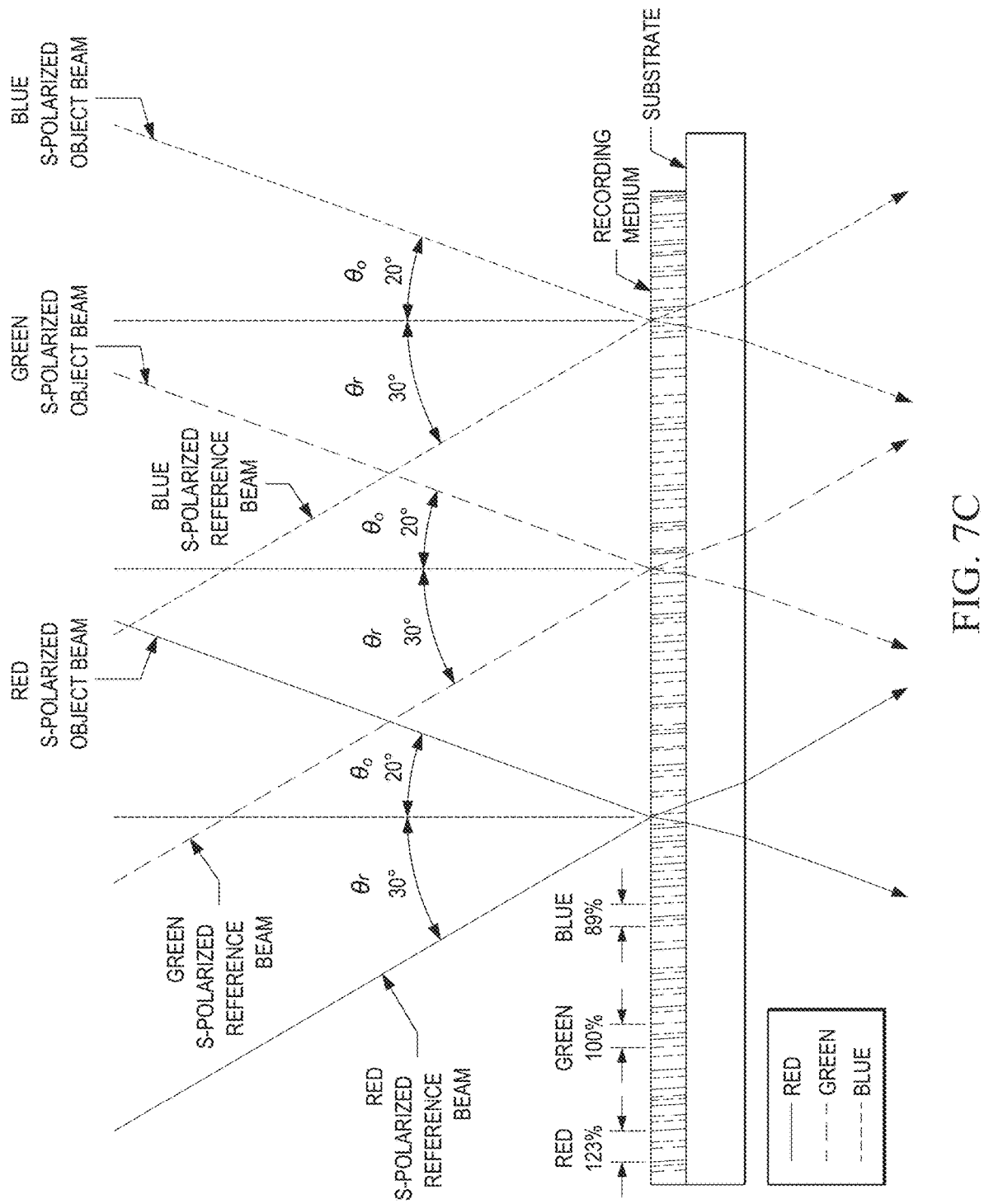
FIG. 7C illustrates an example of recording gratings for different colors in a recording medium using different colors of light.
Figure 7D:
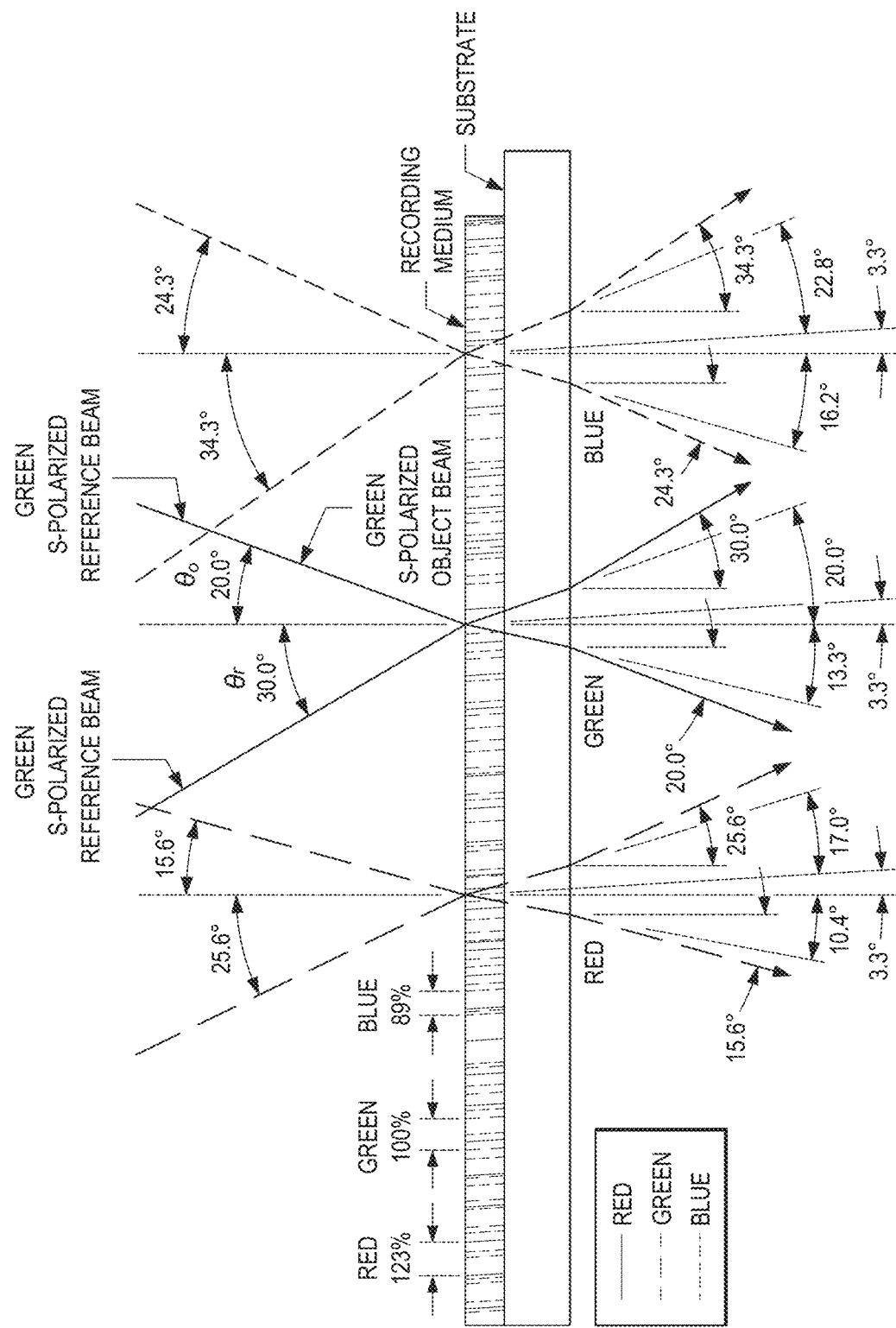
FIG. 7D illustrates an example of recording gratings for different colors in a recording medium using a same color of light.
Figure 7E:
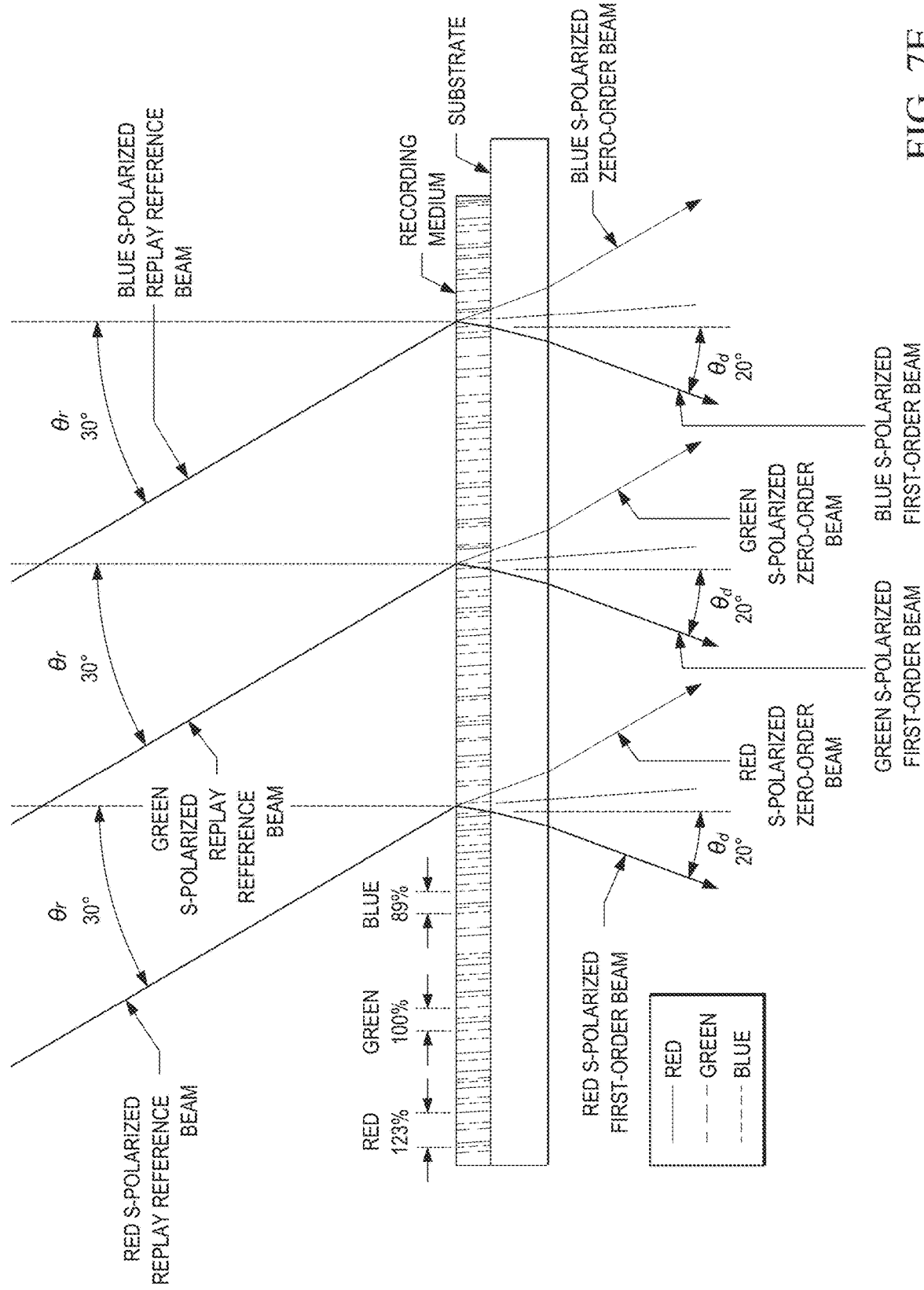
FIG. 7E illustrates an example of diffracting replay reference beams of different colors by gratings for different colors.

The optically diffractive device 598 can be implemented in different configurations. In some implementations, the optically diffractive device 598 includes a holographic grating, e.g., a Bragg grating, for a particular color, e.g., as illustrated in FIGS. 7A, 7B, and 8, and the holographic light field 599 can correspond to the particular color. In some implementations, the optically diffractive device 598 includes multiple holographic gratings for different colors in a single recording layer, e.g., as illustrated in FIGS. 7C, 7D and 7E.

Figure 7F:
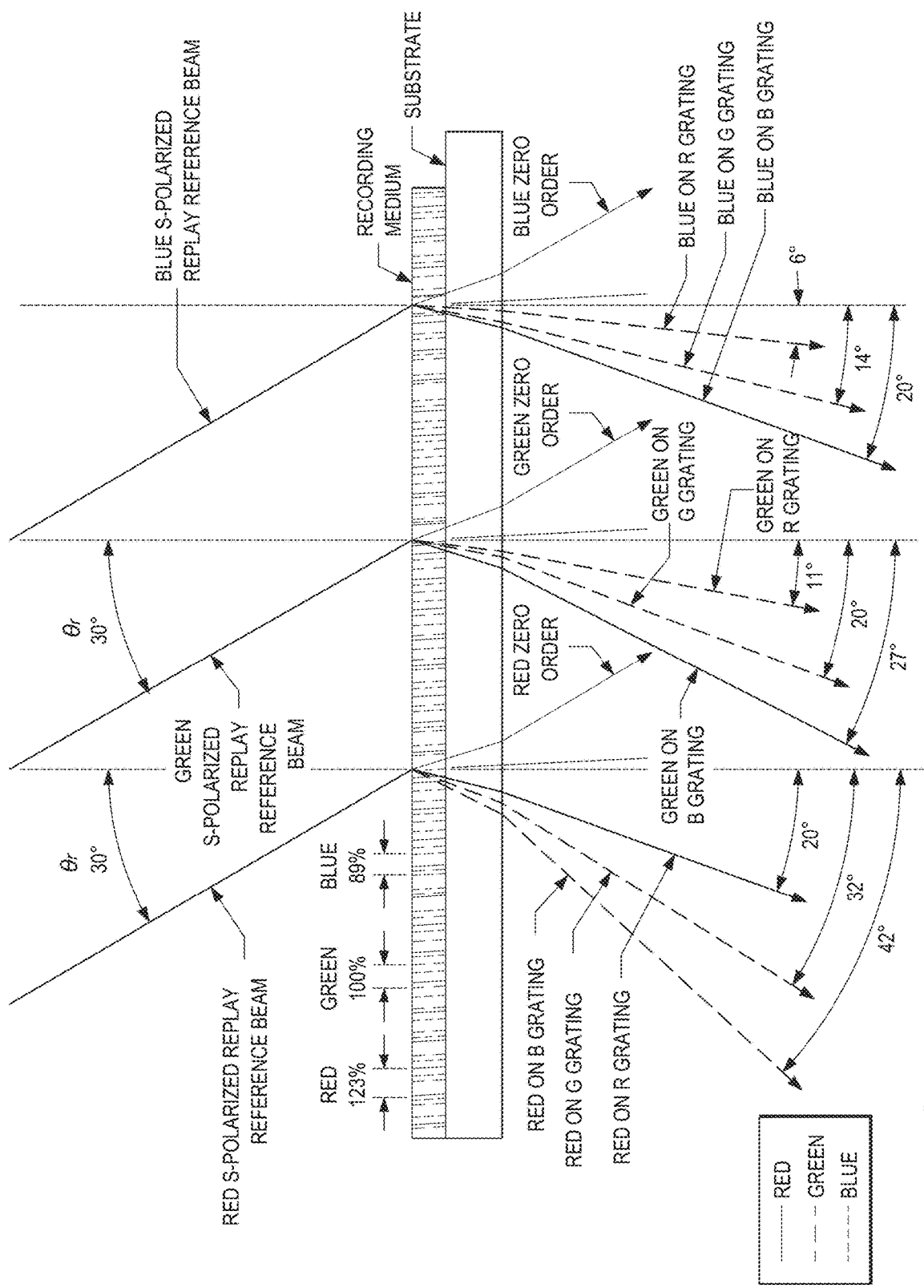
FIG. 7F illustrates an example of crosstalk among diffracted beams of different colors.
Figure 9A:
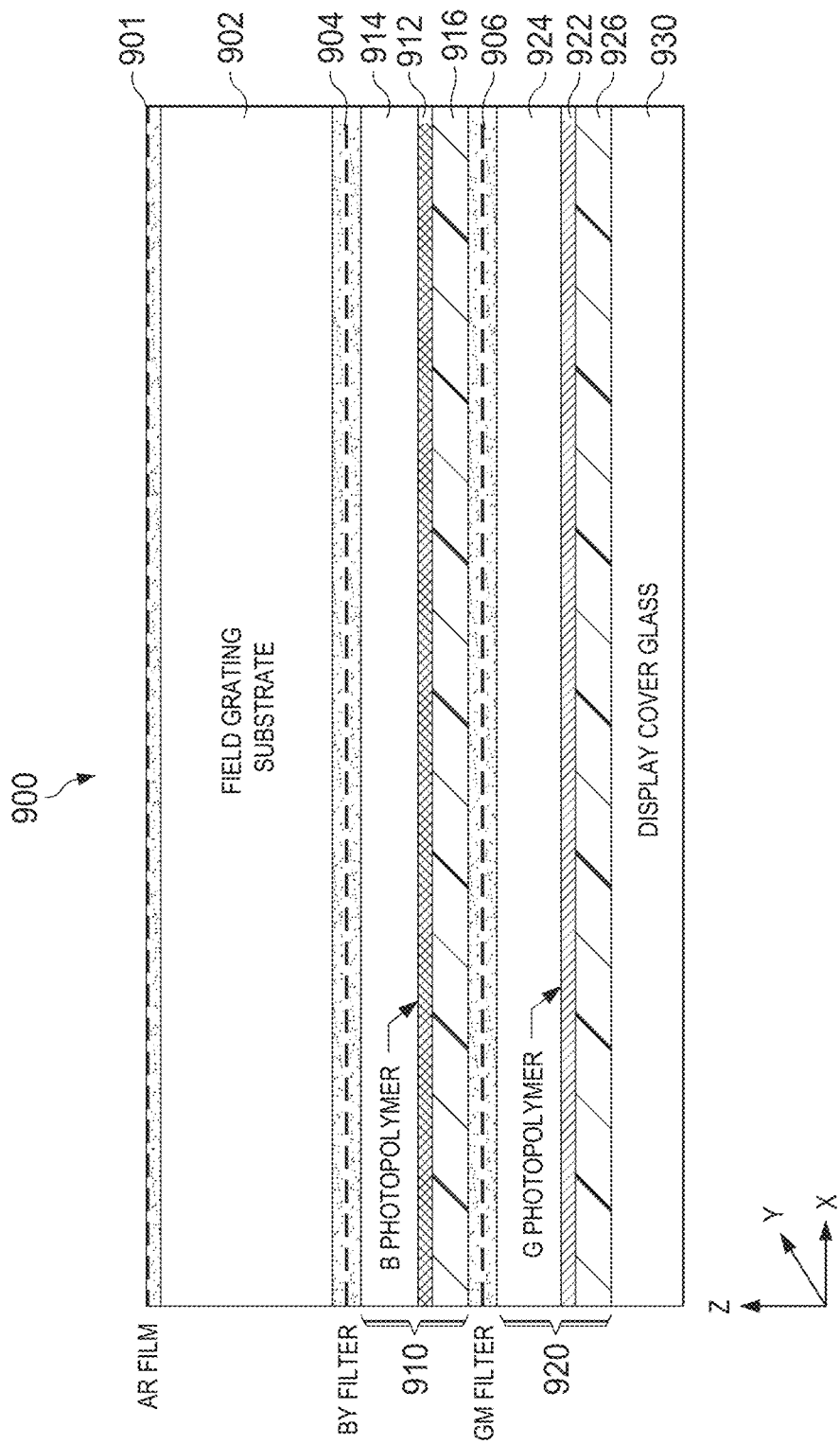
FIG. 9A illustrates an example optical device, including diffractive gratings for two colors and corresponding color-selective polarizers, for individually diffracting the two colors of light.
Figure 9B:
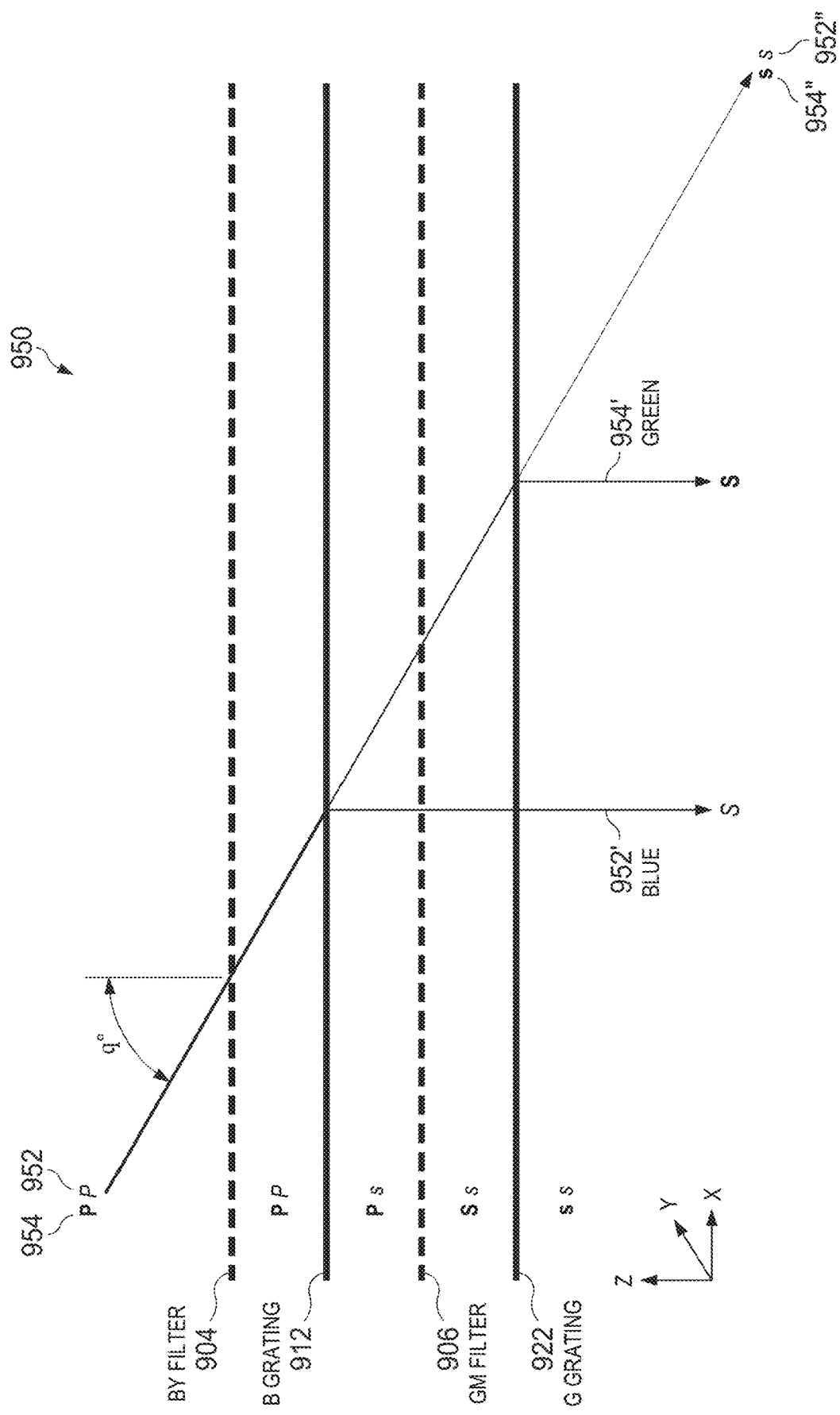
FIG. 9B illustrates an example of diffracting the two colors of light by the optical device of FIG. 9A.
Figure 10A:
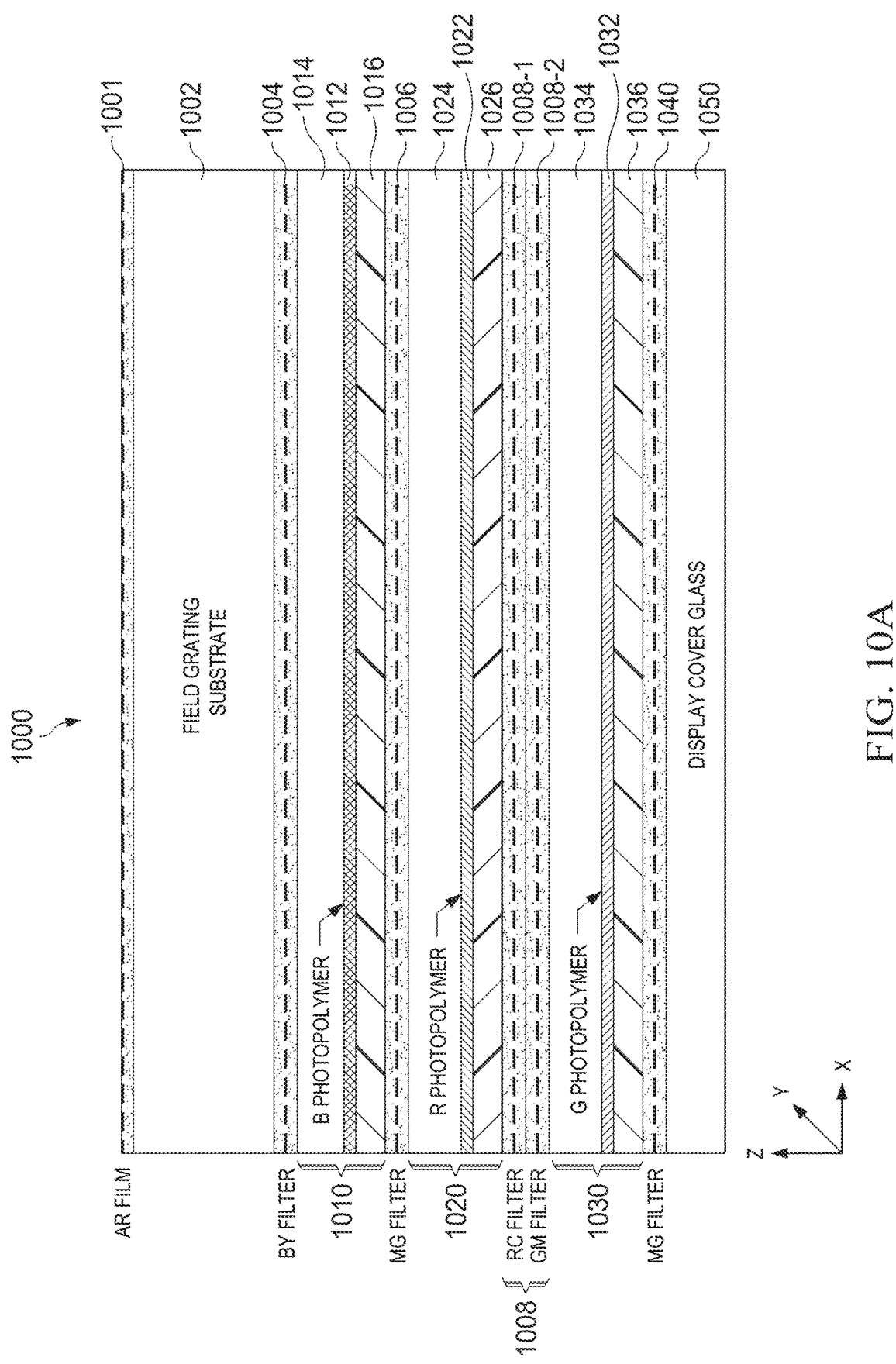
FIG. 10A illustrates an example optical device, including diffractive gratings for three colors and corresponding color-selective polarizers, for individually diffracting the three colors of light.
Figure 10B:
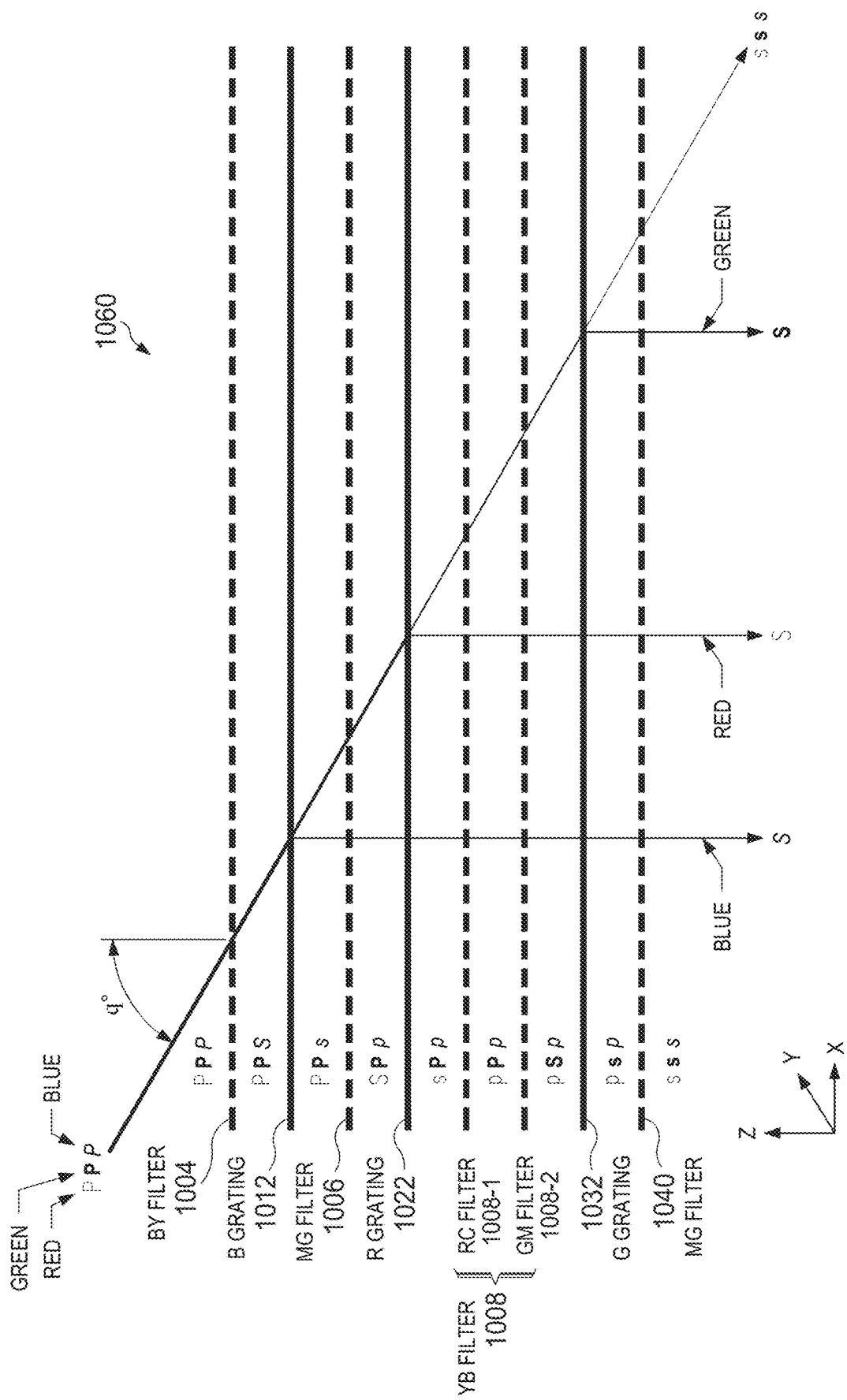
FIG. 10B illustrates an example of diffracting the three colors of light by the optical device of FIG. 10A.
Figure 11:
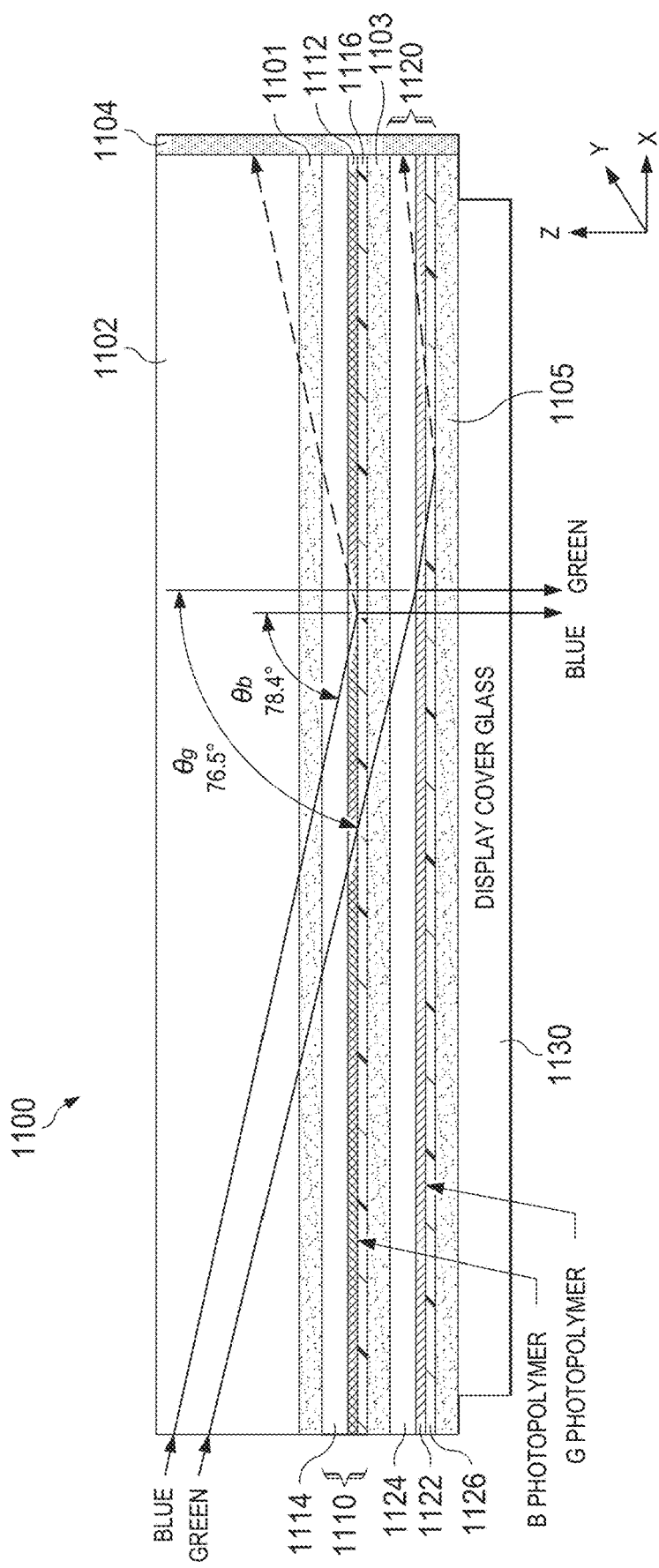
FIG. 11 illustrates an example optical device, including diffractive gratings for two colors and corresponding reflective layers, for individually diffracting the two colors of light.
Figure 12A:
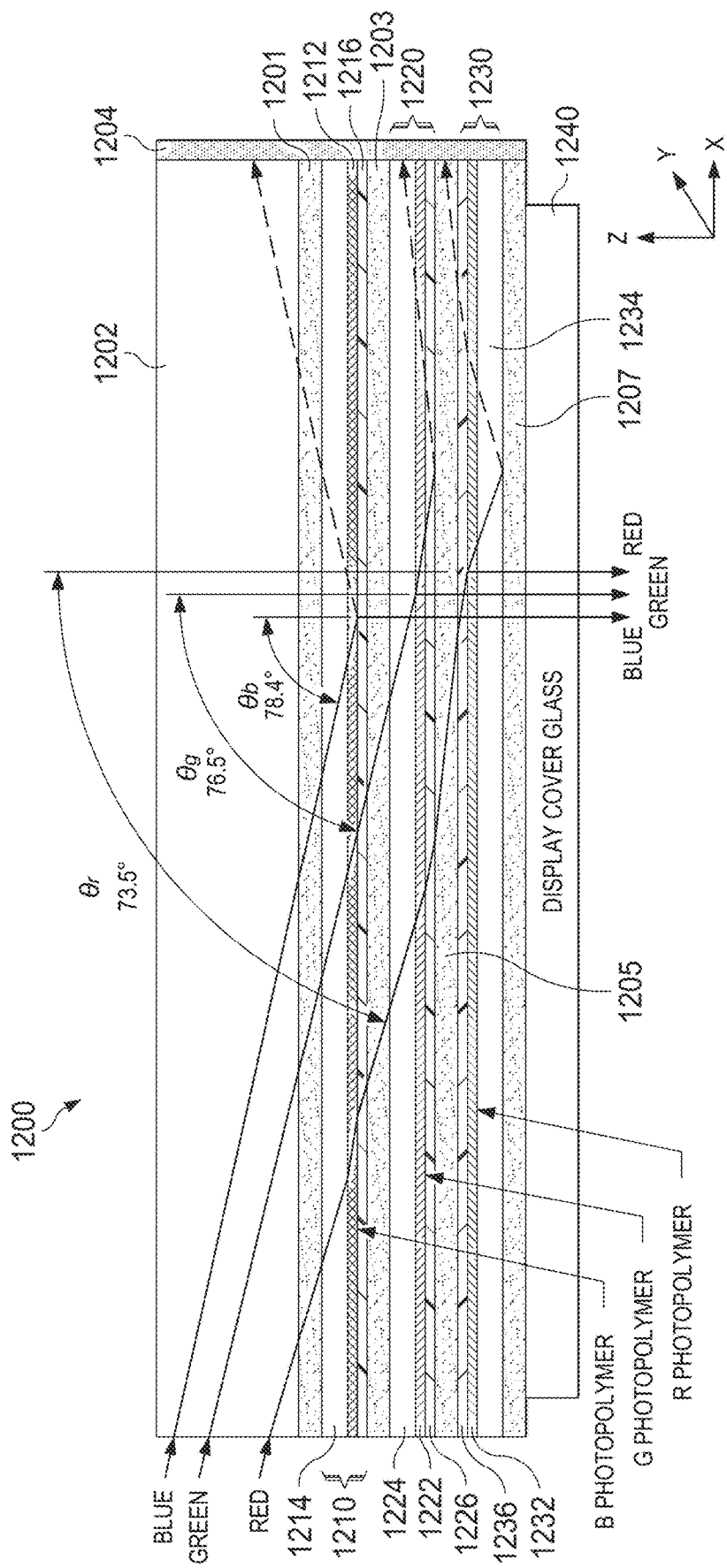
FIG. 12A illustrates an example optical device, including diffractive gratings for three colors and corresponding reflective layers, for individually diffracting the three colors of light.
Figure 12B:
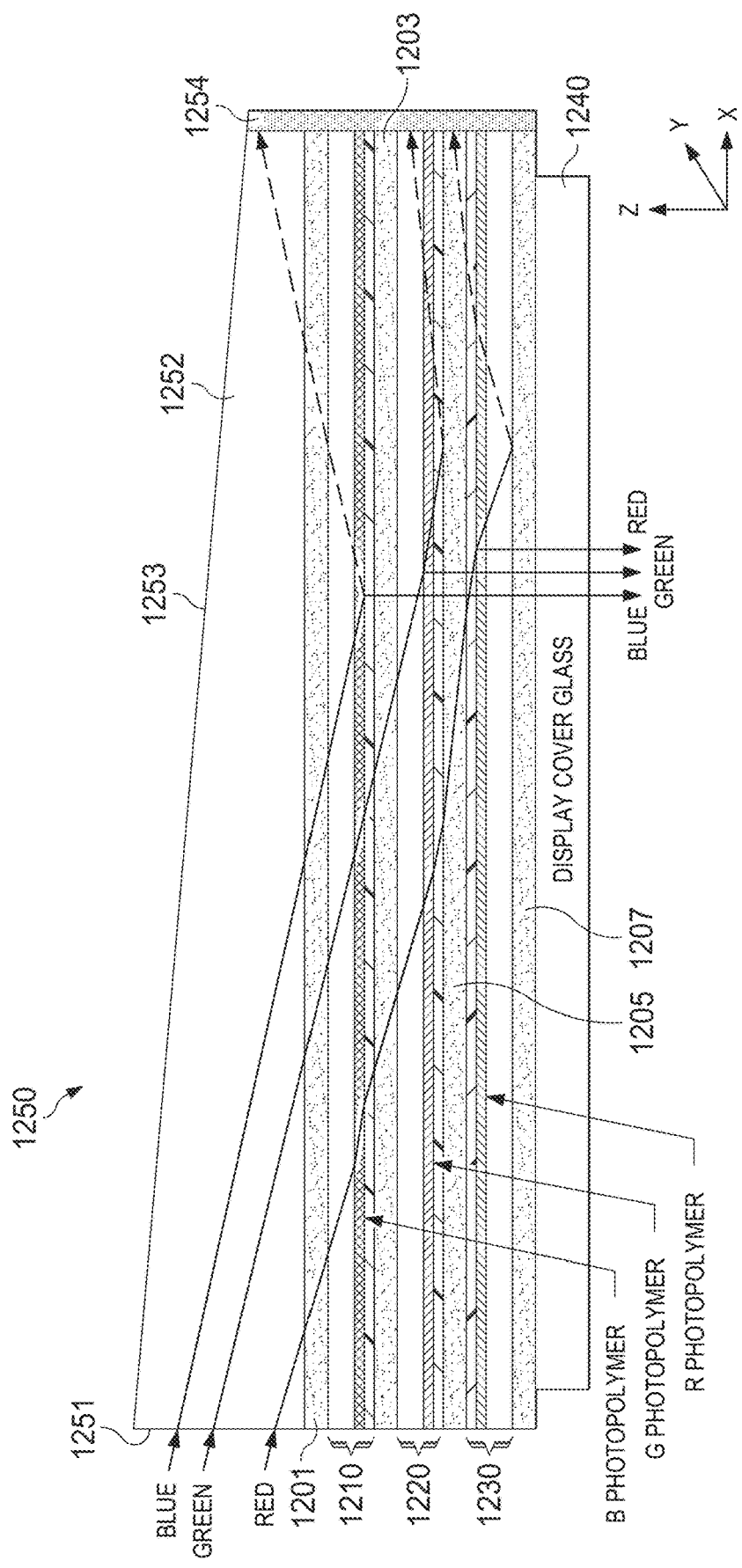
FIG. 12B illustrates another example optical device including diffractive gratings for three colors and corresponding reflective layers with a wedged substrate.
Figure 12C:
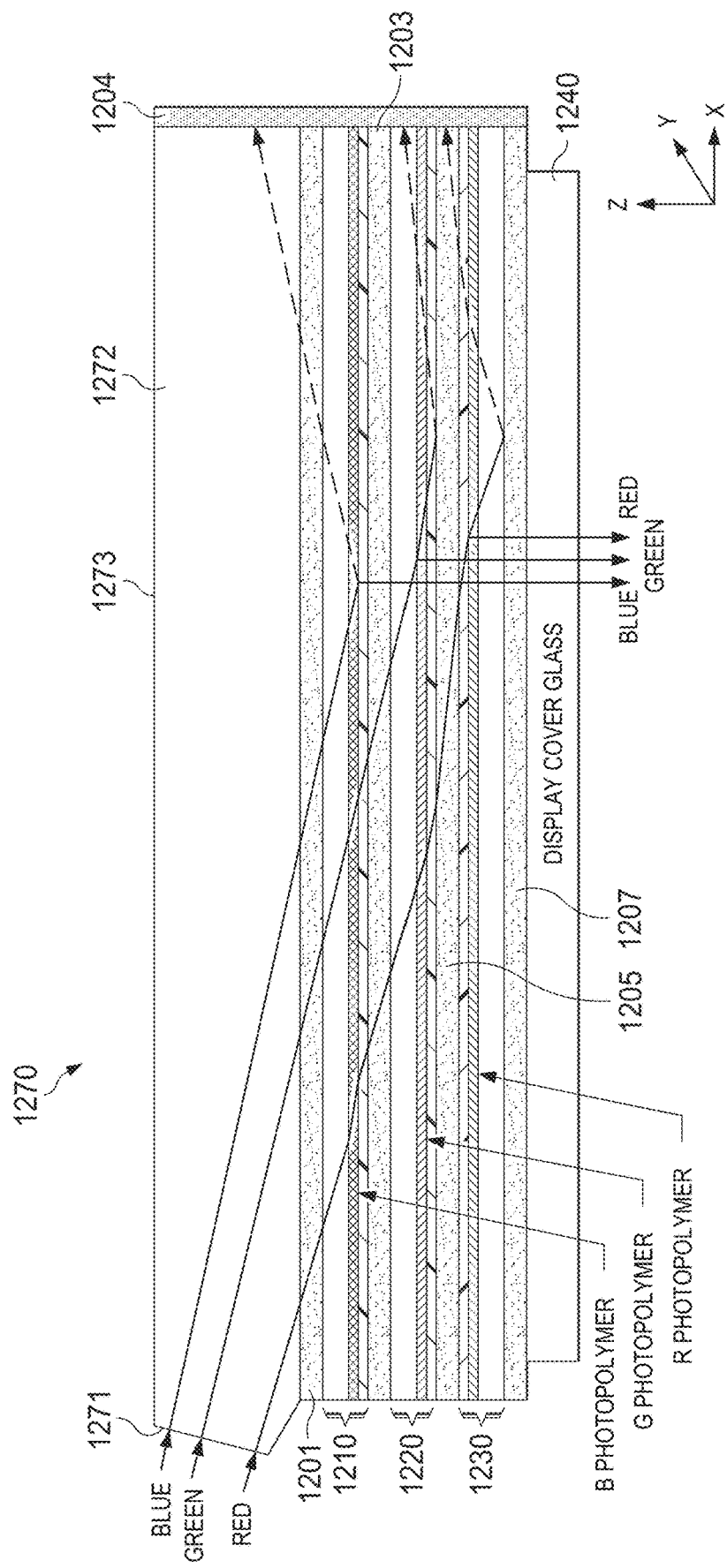
FIG. 12C illustrates a further example optical device including diffractive gratings for three colors and corresponding reflective layers with a wedged input face.

In some implementations, the optically diffractive device 598 includes multiple holographic gratings for different colors in different recording layers, e.g., as illustrated in FIGS. 9A to 12C. As illustrated in FIG. 7F, a grating for a particular color can diffract not only light of the particular color, but also light of other colors, which can cause crosstalk among the different colors. In some examples, as described with further details below with respect to FIGS. 9A to 10B, the optically diffractive device 598 can include multiple holographic gratings with one or more color-selective polarizers to suppress (e.g., eliminate or minimize) color crosstalk. In some examples, as described with further details below with respect to FIGS. 11 to 12C, the optically diffractive device 598 can include multiple holographic gratings with one or more reflective layers for light of different colors incident at respective incident angles to suppress color crosstalk and zero order light. In some examples, the optically diffractive device 598 can include multiple holographic gratings with one or more color-selective polarizers, e.g., as illustrated in FIGS. 9A to 10B, and one or more reflective layers, e.g., as illustrated in FIGS. 11 to 12C, to suppress color crosstalk and zero order diffraction. Each of the color-selective polarizers can be configured for a single color or multiple colors. Each of the reflective layers can be configured for a single color or multiple colors.

FIG. 5I illustrates another system 590A with a reflective display 594A with optically diffractive illumination using an optically diffractive device 598A. The reflective display 594A can be the same as the reflective display 594 of FIG. 5H. Different from the optically diffractive device 598 of the system 590 of FIG. 5H, the optically diffractive device 598A of the system 590A has a reflective field grating based structure that can include a reflective field grating structure 598-1A and a substrate 598-2A. The substrate 598-2A can be a glass substrate. The reflective field grating structure 598-1A can include one or more reflective holographic gratings for one or more different colors. The reflective field grating structure 598-1A is arranged on a front surface of the substrate 598-2A, e.g., along Z direction. An illuminator 596 is arranged behind the reflective field grating structure 598-1A and configured to illuminate light on the reflective field grating structure 598-1A at a large incident angle. The light is diffracted back (along—Z direction) to the reflective display 594A that further diffracts the light back through the optically diffractive device 598A to form a holographic light field 599.

FIG. 5J illustrates another system 590B with a transmissive display 594B with optically diffractive illumination using an optically diffractive device 598B. The transmissive display 594B can be the same as the transmissive display 534 of FIG. 5C, 544 of FIG. 5D, or 564 of FIG. 5E. Similar to the optically diffractive structure 598A of FIG. 5I, the optically diffractive structure 598B can be a reflective field grating based structure that can include a reflective field grating structure 598-1B and a substrate 598-2B. The substrate 598-2B can be a glass substrate. The reflective field grating structure 598-1B can include one or more reflective holographic gratings for one or more different colors. Different from the optically diffractive structure 598A of FIG. 5I, the reflective field grating structure 598-1B in the optically diffractive structure 598B is arranged on a back surface of the substrate 598-2B. An illuminator 596 is arranged before the reflective field grating structure 598-1B and configured to illuminate light on the reflective field grating structure 598-1B at a large incident angle. The light is diffracted back (along—Z direction) to the transmissive display 594B that further diffracts the light to form a holographic light field 599.

FIG. 5K illustrates another system 590C with a transmissive display 594C with optically diffractive illumination using an optically diffractive device 598C. The transmissive display 594C can be the same as the transmissive display 594C of FIG. 5J. Similar to the optically diffractive structure 598 of FIG. 5H, the optically diffractive structure 598C can be a transmissive field grating based structure that can include a transmissive field grating structure 598-1C and a substrate 598-2C. The substrate 598-2C can be a glass substrate. The transmissive field grating structure 598-1C can include one or more transmissive holographic gratings for one or more different colors. Different from the optically diffractive structure 598 of FIG. 5H, the transmissive field grating structure 598-1C in the optically diffractive structure 598C is arranged on a front surface of the substrate 598-2C. An illuminator 596 is arranged behind the transmissive field grating structure 598-1C and configured to illuminate light on the transmissive field grating structure 598-1C at a large incident angle. The light is diffracted forward (along +Z direction) to the transmissive display 594C that further diffracts the light to form a holographic light field 599.

As discussed above, FIGS. 5H to 5K show different combinations of reflective/transmissive displays and reflective/transmissive field grating based optically diffractive devices. In some cases, placing an optically diffractive device on a rear side of a display can provide better protection for photopolymers if the photopolymers have not already been protected by their inherent structures or by additional glass layers. In some cases, a transmissive grating can be mechanically and optically closer to a display, and light from the transmissive grating to the display can travel a shorter distance, than from a reflective grating, which can reduce alignment, coverage, dispersion, and/or scatter issues. In some cases, transmissive gratings can have a greater wavelength tolerance and a lesser angular tolerance than reflective gratings. In some cases, transmissive grating can be less likely to mirror ambient illumination towards a viewer, e.g., ceiling lights and illuminated keyboards. In some cases, with a transmissive display, a viewer can get closer to the display, and the holographic light field may be projected closer to the display. In some cases, for a transmissive display, a glass substrate for the transmissive display can have a proven manufacturing capability up to >100" diagonal with near-seamless tiling for cinema and architectural sizes. In some cases, reflective and transflective displays can embed a controller, e.g., Maxwell holography circuitry, behind display elements, and transmissive displays can incorporate the controller or circuitry behind inter-pixel (or inter-phasel) gaps. In some cases, reflective and transflective displays can enable light to double-pass display elements (e.g., liquid crystal material) and can have twice the refractive index change of transmissive displays that uses a single-pass through the liquid crystal material. A transflective display can represent a display with an optical layer that reflects transmitted light.

Exemplary Display Implementations

As noted above, a display in Maxwell holography can be a phase modulating device. A phase element of the display (or a display element) can be represented as a phasel. For illustration only, a liquid crystal on silicon (LCOS) device is discussed below to function as the phase modulating device. The LCOS device is a display using a liquid crystal (LC) layer on top of a silicon backplane. The LCOS device can be optimized to achieve minimum possible phasel pitch, minimum cross-talk between phasels, and/or a large available phase modulation or retardance (e.g., at least $2\pi$).

A list of parameters can be controlled to optimize the performance of the LCOS device, including a birefringence of LC mixture ($\Delta n$), a cell gap (d), a dielectric anisotropy of the LC mixture ($\Delta \varepsilon$), a rotational viscosity of the LC mixture ($\eta$), and the maximum applied voltage between the silicon backplane and a common electrode on top of the LC layer (V).

There can be a fundamental trade-off that exists between parameters of the liquid crystal material and structure. For example, a fundamental bounding parameter is the available phase modulation or retardance (Re), which can be expressed as:

$$Re = 4\pi \cdot \Delta n \cdot d / \lambda \qquad (8),$$

where $\lambda$ is the wavelength of an input light. If the retardance Re needs to be at least $2\pi$ for a red light with a wavelength of about 0.633 μm, then $$\Delta n \cdot d \gtrsim 0.317 \text{ μm} \qquad (9).$$

The above expression implies that there is a direct trade-off between cell gap (d) and birefringence ($\Delta n$) of the LC mixture for any given wavelength ($\lambda$).

Another bounding parameter is the switching speed, or the switching time (T) it takes for the liquid crystal (LC) molecules in an LC layer to reach the desired orientation after a voltage is applied. For example, for real-time video (~60 Hz) using a 3-color field sequential color system, a minimum of 180 Hz modulation of the LC layer is involved, which puts an upper bound on the LC switching speed of 5.6 milliseconds (ms). Switching time (T) is related to a number of parameters including the liquid crystal mixture, the cell gap, the operating temperature, and the applied voltage.

First, T is proportional to $d^2$. As the cell gap d is decreased, the switching time decreases as the square. Second, the switching time is also related to the dielectric anisotropy ($\Delta\varepsilon$) of the liquid crystal (LC) mixture, with a higher dielectric anisotropy resulting in a shorter switching time and a lower viscosity (which may be temperature dependent) also resulting in a shorter switching time.

A third bounding parameter can be the fringing field. Due to the high electron mobility of crystalline silicon, an LCOS device can be fabricated with a very small phasel size (e.g., less than 10 μm) and with submicron inter-phasel gaps. When the adjacent phasels are operated at different voltages, the LC directors near the phasel edges are distorted by the lateral component of the fringing field, which significantly degrades the electro-optic performance of the device. In addition, as the phasel gap becomes comparable to the incident light wavelength, diffraction effects can cause severe light loss. The phasel gap may need to be kept at less than or equal to a phasel pitch to keep phase noise within an acceptable level.

In some examples, the LCOS device is designed to have a phasel pitch of 2 μm and a cell gap of approximately 2 μm if the fringe field bounding condition is observed. According to the above expression $\Delta n \cdot d \geq 0.317$ μm, hence $\Delta n$ needs to be equal to 0.1585 or greater, which is achievable using current liquid crystal technology. Once the minimum birefringence for a given phasel pitch is determined, the LC can be optimized for switching speed, e.g., by increasing the dielectric anisotropy and/or decreasing the rotational viscosity.

Nonuniform Phasels Implementations for Displays

In an LCOS device, a circuit chip, e.g., a complementary metal-oxide-semiconductor (CMOS) chip or equivalent, controls the voltage on reflective metal electrodes buried below the chip surface, each controlling one phasel. A common electrode for all the phasels is supplied by a transparent conductive layer made of indium tin oxide on the LCOS cover glass. The phasels can have identical sizes and same shape (e.g., square). For example, a chip can have 1024×768 (or 4096×2160) phasels, each with an independently addressable voltage. As noted above, when the inter-phasel gap becomes comparable to the incident light wavelength, diffraction effects can appear due to the periodic structure of the LCOS device, which may cause severe light loss and a strong periodic structure in the diffracted light.

Figure 6A:
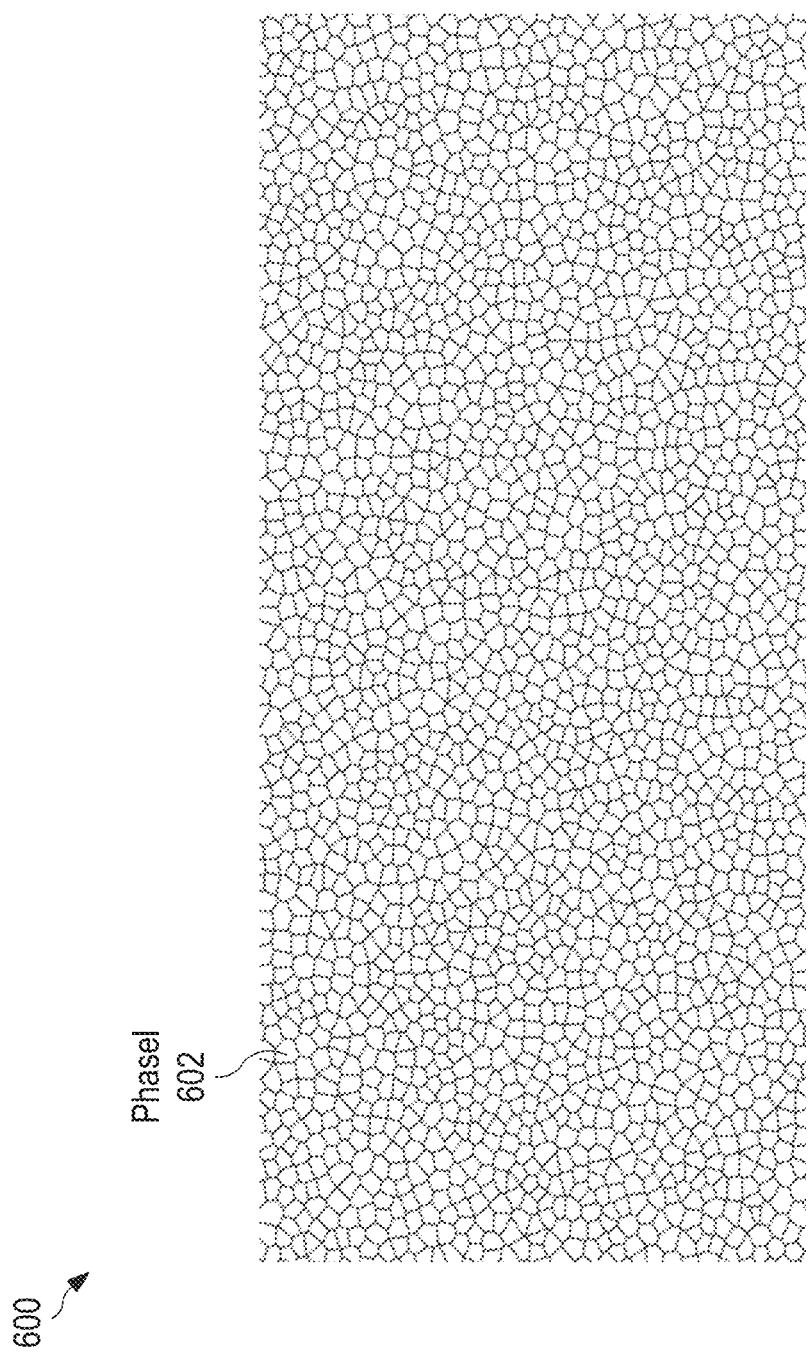
FIG. 6A illustrates an example display with display elements having nonuniform shapes.

In Maxwell holographic calculations, each phasel receives a sum of EM contributions from each primitive and is relatively independent from each other. Thus, the phasels of the LCOS device in Maxwell holography can be designed to be different from each other. For example, as illustrated in FIG. 6A, the LCOS device 600 can be made of a number of nonuniform (or irregular) phasels 602. At least two phasels 602 have different shapes. The nonuniform shapes of the phasels 602 can greatly reduce or eliminate diffractive aberrations (e.g., due to the periodic structure in the diffracted light), among other effects, and thus improve image quality. Although the phasels can have nonuniform shapes, the phasels can be designed to have a size distribution with an average (e.g., about 3 μm) that satisfies a desired spatial resolution. The silicon backplane can be configured to provide a respective circuit (e.g., including a metal electrode) for each of the phasels according to the shape of the phasel.

In an array of phasels in an LCOS device, to select a specific phasel, a first voltage is applied to a word line connecting a row of phasels including the specific phasel and a second voltage is applied to a bit line connecting a column of phasels including the specific phasel. As each phasel has a resistance and/or a capacitance, the operational speed of the LCOS device can be limited by the switching (or rise and fall times) of these voltages.

Figure 6B:
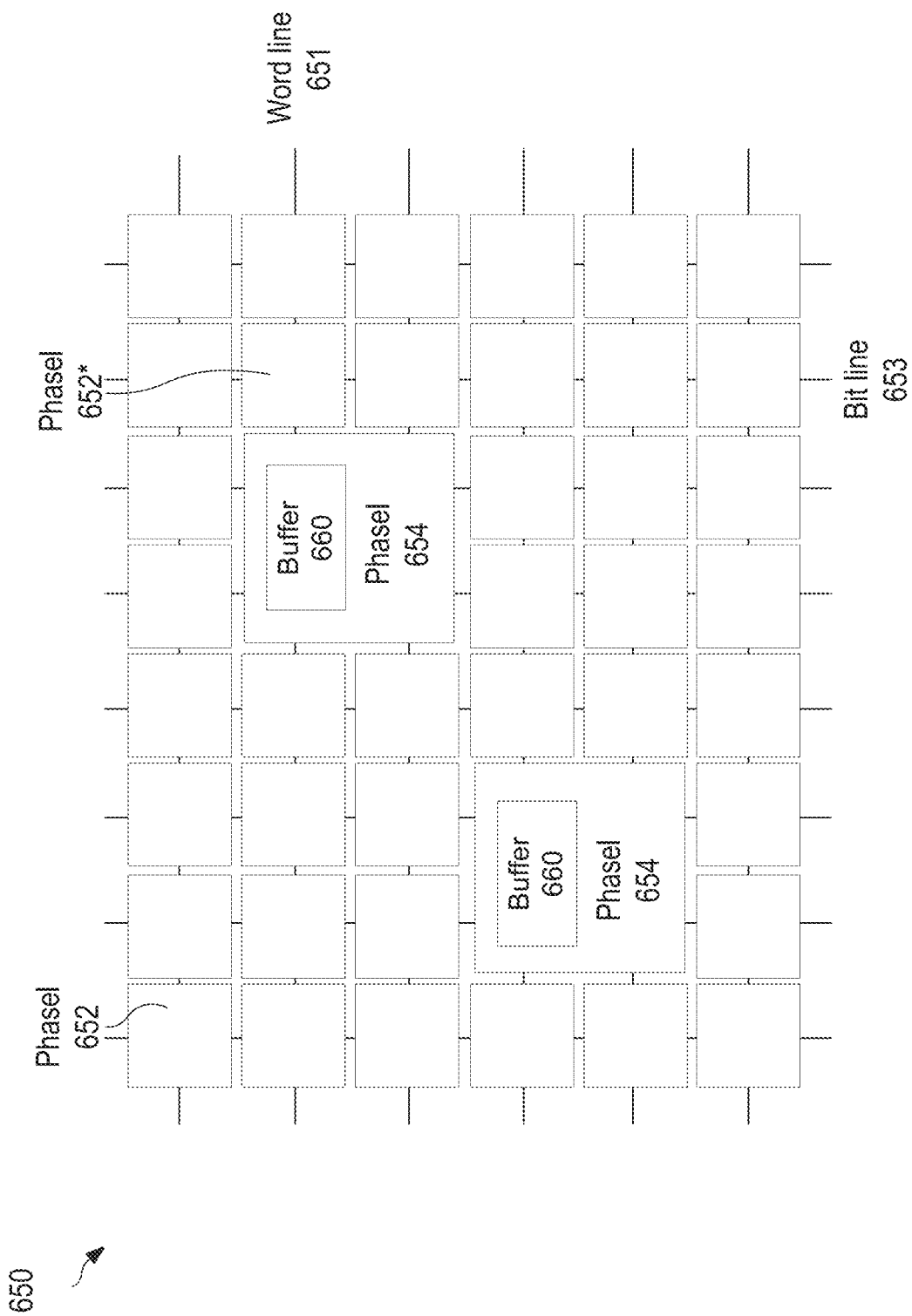
FIG. 6B illustrates an example display with display elements having different sizes.

As noted above, in Maxwell holography, the phasels can have different sizes. As illustrated in FIG. 6B, an LCOS device 650 is designed to have one or more phasels 654 having a size larger than the other phasels 652. All of the phasels can still have a size distribution that satisfies the desired resolution. For example, 99% of the phasels have a size of 3 μm, and only 1% of the phasels have a size of 6 μm. The larger size of the phasel 654 allows to arrange at least one buffer 660 in the phasel 654 besides other circuitry same as in the phasel 652. The buffer 660 is configured to buffer the applied voltage such that the voltage is only applied to a smaller number of phasels within a row or column of phasels. The buffer 660 can be an analog circuit, e.g., made of a transistor, or a digital circuit, e.g., made of a number of logic gates, or any combination thereof.

For example, as illustrated in FIG. 6B, a voltage is applied to a word line 651 and another voltage is applied to a bit line 653 to select a particular phasel 652*. The phasel 652* is in the same row as the larger phasel 654 including the buffer 660. The voltage is mainly applied to the first number of phasels in the row and before the larger phasel 654 and obstructed by the buffer 660 in the larger phasel 654. In such a way, the operational speed of the LCOS device 650 can be improved. With the larger size of the phasels 654, other circuitry can be also arranged in the LCOS device 650 to further improve the performance of the LCOS device 650. Although the phasels 654 and the phasels 652 in FIG. 6B have square shape, the phasels can also have different shapes as illustrated in FIG. 6A as long as there are one or more phasels 654 having a larger size than the other phasels 652.

Exemplary Calibrations

The unique nature of Maxwell holography in the present disclosure allows for the protection of calibration techniques that can create a significant competitive advantage in the actual production of high quality displays. A number of calibration techniques can be implemented to be combined with the Maxwell holographic computational techniques, including:

(i) using image sensors or light field sensors in conjunction with a Dirichlet boundary condition modulator and/or in conjunction with mechanical and software diffractive and non-diffractive calibration techniques;

(ii) software alignments and software calibrations including individual color calibrations and alignments with Dirichlet boundary condition modulators; and (iii) embedding silicon features in the boundary condition modulators that allow for photo detection (including power and color) and/or thermometry to be built directly into the modulator that when combined with Maxwell holography creates a powerful and unique approach to simplifying manufacturing calibration processes.

In the following, for illustration only, three types of calibrations are implemented for phase based displays, e.g., LCOS displays. Each phase element can be represented as a phasel.

Phase Calibration

An amount of phase added to light impinging upon an LCOS phase element (or phasel) can be known directly by a voltage applied to the LCOS phasel. This is due to the birefringent liquid crystal (LC) rotating in the presence of an electric field and thus changing its index of refraction and slowing down light to alter its phase. The altered phase can depend upon electrical characteristics of the liquid crystal (LC) and the silicon device in which the LC resides. Digital signals sent to the LCOS need to be transformed into correct analog voltages to achieve high quality holographic images. Phase calibration is involved for the LCOS device to ensure that a digital signal is properly transformed into an analog signal applied to the LC such that it produces the greatest amount of phase range. This conversion is expected to result in a linear behavior. That is, as the voltage is changed by fixed increments, the phase also changes by fixed increments, regardless of the starting voltage value.

In some cases, an LCOS device allows a user to alter a digital-to-analog converter (DAC) such that the user has a control over the amount of analog voltage output given a digital input signal. A digital potentiometer can be applied to each input bit. For example, if there are 8 input bits, there can be 8 digital potentiometers corresponding to each input bit. The same digital inputs from the digital potentiometers can be applied to all phasels of the LCOS device. Bits set to "1" activate a voltage, and bits set to "0" do not activate the voltage. All voltages from such "1" bits are summed together to obtain the final voltage sent to each phasel. There may also be a DC voltage applied in all cases such that all "0" bits results in a baseline non-zero voltage. Thus, the phase calibration of the LCOS device can be implemented by setting values of the digital potentiometers for the LCOS device. For example, as noted above, a controller can compute EM field contributions from a list of primitives to each of phasels of a display, generate a respective sum of the EM field contributions from the primitives to each of the phasels, and generate respective control signals to each of the phasels for modulating a phase of the phasel. The same digital inputs from the digital potentiometers can be applied to adjust the respective control signals to all of the phasels of the LCOS device, which is different from a phasel-by-phasel based phase calibration. The digital inputs can be set once for a duration of an operation of the LCOS device, e.g., for displaying a hologram.

To determine an optimal set of phase calibration values for the digital inputs, a genetic algorithm can be applied, where there are many input values that lead to one output value, such as phase range or holographic image contrast. This output value can be reduced to one number known as the fitness. The genetic algorithm can be configured to explore different combinations of input values until it achieves an output with the highest fitness. In some cases, the algorithm can take two or more of the most fit inputs and combine a number of their constituent values together to create a new input that has characteristics of the taken inputs but is different from each of the taken inputs. In some cases, the algorithm can alter one of these constituent values to something not from either of the taken fit inputs, which is represented as a "mutation" and can add a variety to the available fit inputs. In some cases, one or more optimal values can be found by taking advantage of the knowledge gained from prior measurements with good results while trying new values so the optimal values do not be restricted to a local maximum.

There can be multiple ways to calculate the fitness output value. One way is to calculate the phase change of the light given a set of digital inputs applied to all the phasels on the LCOS. In this scheme, the incident light can be polarized. Upon impinging upon the LCOS, the incident light's polarization can change depending on the rotation of the LC. The incident light can be diffracted back through another polarizer set to either the same polarization or 90 degrees different from the original polarization and then into a light detector. Therefore, when the LC rotation changes, the intensity as viewed from the light detector can change. Accordingly, the phase change of the light can be perceived indirectly through the intensity variations. Another way to calculate the phase change is to measure the intensity difference of a Maxwell holographic reconstruction from the background. This is most effective in a projective display. Measuring the intensity in such an instance may need the use of computer vision algorithms to identify the Maxwell holographic reconstruction and measure its intensity. Another way to determine the phase change is to measure or image it microscopically in an interferometric optical geometry.

Alignment Calibration

Light sources and other optical elements may not be adequately aligned within a holographic device and therefore may need to be aligned. Different liquid crystals (LC) and optically diffractive elements or diffractive optical elements can also behave differently for different wavelengths of the light sources. Moreover, especially the LC, diffractives, and light sources can change device to device and over time (aging and burn-in) and as a result of changes in the operating environment such as the operating temperature and mechanically induced deformation due to thermal or mechanical stress, giving different characteristics, e.g., object scaling, to the same input hologram when shown in a different base color or at a different time or in a different environment. Furthermore, certain hardware features can apply different optical effects to the output light, e.g., lensing, that also may need correction under these circumstances.

In some implementations, the problems described above can be addressed by applying mechanical translations, deformations, and rotations to one or more optical element. In some implementations, the problems described above can be addressed by applying a mathematical transform to a phase calculated for a phasel of a display. The phase is a respective sum of the EM field contributions from a list of primitives to the phasel. The mathematical transform can be derived from a mathematical expression, e.g., a Zernike polynomial, and can be varied by altering polynomial coefficients or other varying input values. The mathematical transform can vary phasel-by-phasel as well as by color. For example, there is a Zernike polynomial coefficient that corresponds to the amount of tilt to be applied to the light after it diffracts off of the display.

To determine these coefficients/input values, a hardware and software setup can be created where a 2D camera, a photometer, a light field camera, and/or other photometric or colorimetric instrumentation is pointed at a reflective or diffusely transmissive surface illuminated by the LCOS in the case of a projective display or pointed into the LCOS in the case of a direct-view display. One or more holographic test patterns and objects can be sent to the display and measured by the measuring instrument or instruments. 2D cameras or 3D (light field) cameras or camera arrays can use machine vision algorithms to determine what is being displayed and then calculate its fitness. For example, if a grid of dots is the test pattern, then the fitness can be determined by a statistical measure of how close they are together, how centered they are on their intended positions, how much distortion they exhibit (e.g., scale or pincushion), etc. There can be different fitness values for different performance characteristics. Depending on these values, corrections can be applied, e.g., in the form of changing coefficients to the Zernike polynomial, until the fitness reaches a predetermined satisfactory level or passes a visual or task-oriented A/B test. These test patterns can be rendered at different distances to ensure that alignment is consistent for objects at different distances, and not just at one 3D point or plane in particular. Such depth-based calibrations can involve iterative processes that involve altering the depth of the holographic test pattern or elements therein, as well as the position of the reflective or diffusely transmissive surface, and where the previous calibrations can be repeated until converging upon a solution that works at multiple depths. Finally, white dots can be displayed to show the effectiveness of the calibration.

Color Calibration

In displays, holographic or otherwise, it is important that, when any two units are rendering the same image, colors match between displays and additionally match colors defined by television (TV) and computer display standards, like the Rec.709 standard for high-definition television (HDTV) or the sRGB color space of computer monitors. Different batches of hardware components, e.g., LEDs and laser diodes, can exhibit different behaviors for the same inputs and can output different colors when perceived by the human eye. Therefore, it is important to have a color standard to which all display units can be calibrated.

In some implementations, an objective measurement of color specified by measurements of intensity and chromaticity can be obtained by measuring color intensity against Commission internationale de l'éclairage (CIE) Standard Observer curves. By requesting that each display reproduces a sample set of known colors and intensities, then measuring the output light using a colorimeter device calibrated to the CIE Standard Observer curves, the color output of a device in a chosen CIE color space can be objectively defined. Any deviation of the measured values from the known good values can be used to adapt the output colors on the display to bring it back into alignment or conformance, which can be implemented using an iterative measure-adapt-measure feedback loop. Once a Maxwell holographic device produces accurate outputs for a given set of inputs, the final adaptations can be encoded as look-up tables for the illuminators that map input values to output intensities, and color matrix transformations that transform input colors to output color space values. These calibration tables can be embedded in the device itself to produce reliable objective output colors. Multiple such tables can be provided for each of a multitude of operating temperature ranges. Multiple such tables can be provided for each of a multitude of different regions of the active surface of the LCOS. Calibration values can be interpolated between tables for adjacent temperature ranges and/or adjacent surface regions.

Additionally, given an LCOS device with fine enough features to control diffraction with sub-wavelength accuracy, there may be no need for tri-stimulus illumination (e.g., linear mixes of red, green, and blue), and the LCOS device can be illuminated with a single wide spectrum light source and selectively tune the phasels output to produce tri-, quad-, even N-stimulus output colors which, combined with spatial dithering patterns, can reproduce a more complete spectral output of a color rather than the common tri-stimulus approximation. Given a sufficiently wide spectrum illuminator this allows Maxwell holography to produce any reflected color that lies inside the spectral focus of the human visual system or outside the spectral focus for infrared (IR) or ultraviolet (UV) structured light.

Exemplary Holographic Gratings

FIGS. 7A-7F illustrate implementations of example holographic gratings that can be included in an optically diffractive device (or a lightguide device), e.g., the optically diffractive device 598 of FIG. 5H, 598A of FIG. 5I, 598B of FIG. 5J, or 598C of FIG. 5K. FIGS. 7A and 7B illustrate recording and replaying a holographic grating in a recording medium with a single color. FIGS. 7C and 7D illustrate recording three different color holographic gratings in a recording medium with three different colors of light (FIG. 7C) and replaying them with a single color of light (FIG. 7D). FIGS. 7E and 7F illustrate replaying three different color holographic gratings in a recording medium with three different colors of light, and FIG. 7F illustrates color crosstalk among diffracted light of different colors. Any one of a recording reference light beam, a recording object light beam, a replaying reference light beam, and a diffracted light beam is a polarized light beam that can be s polarized or p polarized.

FIG. 7A illustrates an example of recording a holographic grating in a recording medium. The recording medium can be a photosensitive material, e.g., a photosensitive polymer or photopolymer, silver halide, or any other suitable material. The recording medium can be arranged on a substrate, e.g., a glass substrate. The substrate can be transparent or not transparent during the recording. In some implementations, the photosensitive material can be adhered to a carrier film, e.g., a TAC (cellulose triacetate) film. The photosensitive material with the carrier film can be laminated on the substrate, with the photosensitive material between the carrier film and the substrate.

In transmission holography, a recording reference beam and a recording object beam are incident from the same side on a same region of the recording medium with a recording reference angle $\theta_r$ and a recording object angle $\theta_o$, respectively. Each of the reference and object beams can start in air, pass through the photosensitive material, and then pass on into and through the substrate, exiting into air. The recording reference beam and the recording object beam have the same color, e.g., green color, and same polarization state, e.g., s polarized. Both of the beams can originate from a laser source with high spatial and temporal coherence so that the beams interfere strongly to form a standing pattern where the beams overlap. Within the recording medium, the pattern is recorded as a fringe pattern, e.g., a grating, including multiple parallel interference planes, as illustrated as tilted solid lines in FIG. 7A, at a fringe tilt angle $\theta_t$ that satisfies the following expression:

$$\theta_t = (\theta_o + \theta_r)/2 \tag{10},$$

where $\theta_t$ represents the fringe tilt angle in the recording medium during recording, $\theta_o$ represents the object angle in the recording medium during recording, and $\theta_r$ represents a reference angle in the recording medium during recording.

A fringe spacing (or fringe period) d on a surface of the recording medium can be expressed as:

$$d = \lambda_{record}/(n \sin \theta_{record}) \tag{11},$$

where $\lambda_{record}$ represents a recording wavelength (in vacuo), n represents the refractive index of the medium surrounding the grating (e.g., air with n=1.0), $\theta_{record}$ represents the inter-beam angle during recording and is identical to $|\theta_o - \theta_r|$, where $\theta_o$ represents the object incidence angle at a surface of the recording medium during recording and $\theta_r$ represents the reference incidence angle at the surface of the recording medium during recording. In some cases, the fringe spacing d has a size similar to a wavelength of a recording light, e.g., 0.5 μm. Thus, the fringe pattern can have a frequency f=1/d, e.g., about 2,000 fringes per mm. The thickness D of the recording medium can be more than one order of magnitude larger than the wavelength of the recording light. In some examples, the thickness of the recording medium D is about 30 times of the wavelength, e.g., about 16.0+/−2.0 μm. The carrier film can have a thickness larger than the recording medium, e.g., 60 μm. The substrate can have a thickness more than orders of magnitude larger than the recording medium, e.g., about 1.0 mm.

After the fringe pattern or grating is recorded in the recording medium, the fringe pattern can be fixed in the recording medium, e.g., for the example of a photopolymer by exposure of deep blue or ultraviolet (UV) light which can freeze the fringes in place and can also enhance the fringes' refractive index differences. The recording medium can shrink during the fixing. The recording medium can be selected to have a low shrinkage during the fixing, e.g., less than 2% or such shrinkage can be compensated for.

As each beam passes through an interface between materials of different refractive indices, some portion of the beam is reflected following Fresnel's laws, which give the percentage of power reflected at each transition. The reflection is polarization dependent. For light at a smaller incidence angle, e.g., 30°, the Fresnel reflections can be weaker. For light at a larger incident angle (e.g., 80°) and for s-polarized light, the Fresnel reflections can be stronger. When the incident angle reaches or is beyond a critical angle, total internal reflection (TIR) occurs, that is, the reflectivity is 100%. For example, from a transition from glass (n=1.5) to air (n=1.0), the critical angle is about 41.8°. Since the refractive index is dependent on polarization and weakly dependent on wavelength, reflected powers at large angles of incidence can become weakly wavelength dependent, and can become strongly polarization dependent.

FIG. 7B illustrates an example of diffracting a replay reference beam by the grating of FIG. 7A. For transmission holography, during replay the substrate is transparent. The substrate can be also an optically clear plastic, such as TAC or some other low-birefringence plastic. When the recorded grating in the recording medium is thin compared with the wavelength of the replay reference beam, e.g., the thickness of the recording medium is less than one order of magnitude larger than the replay wavelength, the grating's diffracted angle can be described by a grating equation as below:

$$m\lambda_{replay}=n\ d(\sin\theta_{in}-\sin\theta_{out}) \quad (12),$$

where m represents a diffraction order (integer), n represents the refractive index of the medium surrounding the grating, d represents the fringe spacing on the surface of the recording medium, $\theta_{in}$ represents the incident angle from the surrounding medium onto the grating, $\theta_{out}$ represents the output angle for the $m^{th}$ order from the grating back into the surrounding medium, and $\lambda_{replay}$ represents the replay wavelength in vacuo.

When the recorded grating is comparatively thick, for example, when the thickness of the recording medium is more than one order of magnitude (e.g., 30 times) larger than the replay wavelength, the grating can be called a volume grating or a Bragg grating. For volume gratings, Bragg selectivity can strongly enhance diffraction efficiency at a Bragg angle. The Bragg angle can be determined based on numerical solutions, e.g., rigorous couple-wave solutions, and/or experimentation and iteration. At off-Bragg angles, the diffraction efficiency can be substantially decreased.

The Bragg condition can be satisfied when an angle of incident onto the fringe planes equals the diffraction angle off of the fringe planes within the medium containing the fringe planes. The grating equation (12) can then become Bragg's equation:

$$m\lambda_{replay}=2n_{replay}\Lambda_{replay}\sin(\theta_m-\theta_t) \quad (13),$$

where m represents the diffraction order (or Bragg order), $n_{replay}$ represents the refractive index in the medium, $\Lambda_{replay}$ represents the fringe spacing in the recording medium, $\theta_m$ represents the $m^{th}$ Bragg angle in the recording medium, $\theta_t$ represents the fringe tilt in the recording medium, and $\Lambda_{replay}$ can be identical to $d\cos\theta_r$.

The Bragg condition can be automatically satisfied for volume gratings recorded and replayed with the same angles and wavelengths (assuming no shrinkage during processing). For example, as illustrated in FIG. 7B, a volume grating is recorded and replayed with the same wavelength (e.g., green color) and reference angle (e.g., $\theta_r$), and the grating can diffract out a first order replay beam at the angle of the recording object beam. A fraction of the incident light beam can pass through the grating as an undeflected or undiffracted zero order light beam. If the zero order light beam gets to a display such as a reflective LCOS device, the light beam can cause undesired effects, e.g., ghost images.

If the replay reference angle is not changed but the replay reference wavelength is changed, a diffraction efficiency η of a Bragg grating in a recording medium can be expressed as:

$$\eta \propto 2D_{replay}\sin\theta_{Bragg}^2\delta\lambda\cos\theta_{tilt.replay}/(\lambda_{Bragg}^2\cos\theta_{Bragg}) \quad (14),$$

where η represents diffraction efficiency, $D_{replay}$ represents a thickness of the recording medium (after shrinkage) during replay, $\theta_{Bragg}$ represents a replay reference angle (after shrinkage) at Bragg for an intended replay wavelength $\lambda_{Bragg}$, $\delta\lambda$ represents an error in a replay wavelength, that is, $\delta\lambda=|\lambda_{replay}-\lambda_{Bragg}|$, and $\theta_{tilt.replay}$ represents the fringe tilt in the recording medium during replay (after shrinkage). All λ are values in vacuo.

FIG. 7C illustrates an example of recording gratings for different colors in a recording medium using different colors of light. As illustrated, three fringe patterns (or gratings) can be recorded in a single recording medium, e.g., sequentially or simultaneously. A fringe pattern corresponds to a replay color (e.g., red, green, or blue) and can be recorded with a different wavelength. The recording reference beam and the recording object beam have the same polarization state. Each beam can be s polarized. The recording reference beams for each color can be incident upon the single recording medium at the same reference beam angle $\theta_r$ (e.g., +30°). The recording object beams for each color can be incident upon the single recording medium at the same object beam angle $\theta_o$ (e.g., −20°).

The fringe plane tilt $\theta_t$ for each grating during recording can be the same, as $\theta_t$ is independent of wavelength, e.g., $\theta_t=(\theta_o+\theta_r)/2$. The fringe spacing d perpendicular to the fringe planes during recording can be different for each grating, as d depends on wavelength. In some examples, as illustrated in FIG. 7C, the fringe spacings are in proportion red:green:blue≈123%:100%:89% corresponding to example wavelengths of 640 nm:520 nm:460 nm.

FIG. 7D illustrates an example of recording gratings for different colors in a recording medium using a same color of light. Similar to FIG. 7C, three fringe patterns are recorded in a single photopolymer, one fringe pattern for each replay color. Different from FIG. 7C, the three fringe patterns in FIG. 7D can be recorded using the same wavelength, e.g., green light. To achieve this, the recording object beams for each replay color can be incident upon the single recording medium at different object beam angles, and the recording reference beams for each replay color can be incident upon the single recording photopolymer at different reference beam angles. The fringe tilt and fringe spacing in FIG. 7D for a replay color can match the fringe tilt and fringe spacing for that same replay color in FIG. 7C.

FIG. 7E illustrates an example of diffracting replay reference beams of different colors by gratings for different colors. The gratings can be recorded as illustrated in FIG. 7C or 7D. Similar to FIG. 7B, for a replay color, when the recording wavelength is the same as the replay wavelength and the replay reference angle is a first Bragg angle of a grating for the replay color, the grating diffracts a first order of the replay reference beam at a diffracted angle identical to a recording object angle, and transmits a zero order of the replay reference beam at the replay reference angle. Due to Bragg selectivity, the power of the replay reference beam at the first order can be substantially larger than the power of the replay reference beam at the zero order. The three replay reference beams can have the same incident angles, e.g., 30°, and the first order diffracted beams can have the same diffracted angles, e.g., 20°.

Replay reference angles for each color can be neither equal to one another, nor equal to the angles for the color used during recording. For example, for green color, a grating can be recorded at 532 nm, e.g., using a high-power high-coherence green laser such as a frequency-doubled diode-pumped YaG laser, and then be replayed at 520±10 nm using a green laser diode. In some cases, the green laser having the wavelength of 532 nm can also be used to record the required fringe pattern for replay using a cheap red laser diode at 640±10 nm. For blue color, a grating can be recorded at 442 nm using a HeCd laser, and be replayed using a 460±2 nm blue laser diode.

FIG. 7F illustrates an example of crosstalk among diffracted beams of different colors. Despite Bragg selectivity, each color can also slightly diffract off the gratings recorded for each other color, which may cause crosstalk among these colors. Compare to FIG. 7E providing only first order diffraction for a corresponding color, FIG. 7F provides the first order diffraction of each color off each grating.

For example, as illustrated in FIG. 7F, red grating, green grating, and blue gratings for red, green, and blue colors are respectively recorded. When the red light is incident at the same reference angle 30° on the red grating, the diffracted angle of the red light at first order is 20°; but when the red light is incident at the same reference angle 30° on the green grating, the diffracted angle of the red light at first order is 32°; and when the red light is incident at the same reference angle 30° on the blue grating, the diffracted angle of the red light at first order is 42°. Thus, diffracted light can be present at unintended angles, and color crosstalk occurs. Similarly, when the green light is incident at the reference angle 30° on the green grating, the diffracted angle of the green light at first order is 20°; but when the green light is incident at the same reference angle 30° on the red grating, the diffracted angle of the green light at first order is 11°; and when the green light is incident at the same reference angle 30° on the blue grating, the diffracted angle of the green light at first order is 27°. Thus, diffracted light can be present at unintended angles, and color crosstalk occurs. Similarly, when the blue light is incident at the reference angle 30° on the blue grating, the diffracted angle of the blue light at first order is 20°; but when the blue light is incident at the same reference angle 30° on the red grating, the diffracted angle of the blue light at first order is 6°; and when the blue light is incident at the same reference angle 30° on the green grating, the diffracted angle of the blue light at first order is 14°. Thus, diffracted light can be present at unintended angles, and color crosstalk occurs. Accordingly, when a single color of light, e.g., green light, is incident on the three gratings in the recording medium, the three gratings diffract the single color of light to have a first diffracted green light at a diffracted angle of 20°, a second diffracted green light at a diffracted angle of 27°, and a third diffracted green light at a diffracted angle at 11°. The two unintended angles of each color of diffracted light can generate undesired effects.

In some cases, instead of recording the three different gratings for three different colors in a single recording layer, the three different gratings can instead be stored in three separated recording layers that are stacked together. Similar to FIG. 7F, color crosstalk can occur when three colors of light are incident at the same incident angle on any one of the gratings. Implementations of the present disclosure provide methods and devices for suppressing the color crosstalk in multiple grating stacks, as illustrated with further details in FIGS. 9A to 12C.

FIG. 8 illustrates an example of recording a holographic grating with a large reference angle in a recording medium. Using a large replay reference beam angle can allow a thin replay system. Also, a replay output beam, that is, the diffracted angle at first order, can be normal to a display. Thus, the recording object beam can be close to normal incidence, as illustrated in FIG. 8.

For Bragg diffraction, the Fresnel reflections for p- and for s-polarized light are both low at each fringe plane, but at an angle of incidence of 45°, s polarization can be reflected orders of magnitude more strongly than p polarization. Thus, if the incidence angle of the replay reference on to the fringes in the recording medium is close to 45°, then Bragg resonance off the fringes can be highly polarization sensitive, strongly favoring s-polarization. The recording object beam can be near normal incident on the recording medium, such that the reconstructed object beam or the diffracted replay beam can be at near normal incidence on a display. As the fringe tilt in the recording medium is the average of the in-medium recording object and reference angles, to achieve, at replay, an incidence angle onto the fringes of close to 45° and hence high polarization selectivity, a recording reference angle approaching 90° in the recording medium can be used. An interbeam angle between the recording object beam and recording reference beam can be close to 90°. For example, the interbeam angle is 84° as illustrated in FIG. 8, and the fringe tilt of the fringe planes in the recording beam is 42°, and the incident angle of the replay reference beam onto the fringe planes is 48°, which corresponds to a polarization sensitivity of about 90:1.

In some cases, to obtain a replay output (or first order) diffracted angle to be 0°, the recording object beam can be not identical to 0°, but close to 0°, which can be achieved by taking into consideration a combination of shrinkage of a recording medium during its processing and a slight wavelength difference between a recording wavelength and a replaying wavelength. For example, the recording object angle can be in a range from −10° to 10°, e.g., a range from −7° to 7°, or 5° to 7°. In some examples, the recording object angle is 0°. In some examples, the recording object angle is 6°.

In some implementations, to achieve large enough inter-beam angles, e.g., close to 90°, during recording, a prism is applied such that each recording beam enters the prism through a prism face where its incidence angle into the prism is close to the normal of that face of the prism, and thus refraction and Fresnel losses become both negligible. The prism can be index matched to the recording medium's cover film or substrate at an interface, such that the index mismatch is negligible at the interface, and refraction and Fresnel losses can be also negligible at the interface.

Exemplary Optically Diffractive Devices

FIGS. 9A-12C show implementations of example optically diffractive devices. Any one of the devices can correspond to, for example, the optically diffractive device 598 of FIG. 5H or 598C of FIG. 5K. The optically diffractive devices are configured to individually diffract light with a plurality of colors to suppress (e.g., reduce or eliminate) color crosstalk among diffracted light and/or to suppress zero order undiffracted light. FIGS. 9A to 10B show example optically diffractive devices including color-selective polarizers. The color-selective polarizers can selectively change a polarization of a selected color, such that a single color of light can have s polarization to achieve high diffraction efficiency at first order while other colors of light have p polarization thus lower diffraction efficiency at the first order. FIGS. 11 to 12C show example optically diffractive devices including reflective layers. The reflective layers can selectively totally reflect a single color of light of zero order while transmitting other colors of light.

Optically Diffractive Devices with Color-Selective Polarizers

FIG. 9A illustrates an example optically diffractive device 900 including holographic gratings for two colors and corresponding color-selective polarizers, and FIG. 9B illustrates an example 950 of diffracting the two colors of light by the optically diffracted device 900 of FIG. 9A. For illustration, the device 900 is configured for green and blue colors of light.

The optically diffractive device 900 includes a first optically diffractive component 910 having a first diffractive grating (B grating) 912 for blue color of light and a second optically diffractive component 920 having a second diffractive grating (G grating) 922 for green color of light. Each of the diffractive gratings can be between a carrier film, e.g., a TAC film, and a substrate, e.g., a glass substrate. The carrier film can be after the diffractive grating and the substrate can be before the diffractive grating along the Z direction, or vice versa. As illustrated in FIG. 9A, the first optically diffractive component 910 includes a substrate 914 and a carrier film 916 on opposite sides of the B grating 912, and the second optically diffractive component 920 includes a substrate 924 and a carrier film 926 on opposite sides of the G grating 922. The optically diffractive device 900 can include a field grating substrate 902 on which the first and second optically diffractive components 910 and 920 are stacked. An anti-reflection (AR) coating 901 can be attached to or applied on a surface of the field grating substrate 902 to reduce reflection at the surface.

The optically diffractive device 900 can also include one or more layers of optically-clear index-matched adhesive (OCA), UV-cured or heat-cured optical glues, optical contacting, or index matching fluid to attach or stick together adjacent layers or components, e.g., the field grating substrate 902 and the BY filter 904, the BY filter 904 and the first diffractive component 910 (or the substrate 914), the first diffractive component 910 (or the carrier film 916) and the GM filter 906, and/or the GM filter 906 and the second diffractive components 920 (or the substrate 924). An order of the carrier film 914 or 916, the substrate 916 or 926, and the OCA layers can be determined based on their refractive indices at a wavelength of a replay light to reduce refractive index mismatch at interfaces and thus reduce Fresnel reflections at the interfaces.

Each of the first and second diffractive gratings can be a holographic grating (e.g., volume grating or Bragg grating) independently recorded and fixed (e.g., cured) in a recording medium, e.g., a photosensitive polymer. A thickness of the recording medium can be more than one order of magnitude larger than a recording wavelength, e.g., about 30 times. Similar to what is illustrated in FIG. 7A or FIG. 8, a recording reference light beam incident at a recording reference angle and a recording object light beam incident at a recording object angle on the recording medium can interfere in the recording medium to form the diffractive grating. Then, similar to what is illustrated in FIG. 7B, a replaying reference light beam can be diffracted by the recorded diffractive grating at first order and zero order. The recording light beams and the replaying light beam can have the same s polarization state. A replaying wavelength of the replaying light beam can be substantially identical to a recording wavelength of the recording light beams.

In some examples, the replay incident angle can be substantially identical to the recording reference angle (or a Bragg angle), and a Bragg condition can satisfy. Light of first order (or first order light) is diffracted at a diffracted angle substantially close to the recording object angle, and light of zero order (or zero order light) is undiffracted and transmitted at the replay incident angle. Due to Bragg selectivity, the power of the first order light can be substantially higher than the power of the zero order light. The power of the zero order light (e.g., residual light or depleted light) depends on the diffraction efficiency of the diffractive grating. The higher the diffraction efficiency is, the lower the power of the zero order light is. In some examples, the recording reference angle, the recording object angle, the replay incident angle, the recording wavelength, and the replay wavelength can be configured such that the replay output angle (or diffracted angle at first order) is substantially close to 0° or normal to the grating. The diffracted angle can be in a range of −10° to 10°, e.g., in a range of −7° to 7°, 0° to 10°, or 5° to 7°. In a particular example, the diffracted angle is 6°.

Also, due to polarization sensitivity, the diffraction efficiency for s polarized light of a first color (e.g., blue color) incident at a replay reference angle and diffracted with first order at the diffracted angle can be substantially higher than the diffraction efficiency for p polarized light of the same color incident at the replay reference angle diffracted with first order at the diffracted angle. As illustrated in FIG. 7F, a second color of light (e.g., green color) incident at the same replay incident angle as the first color of light is diffracted at a diffraction angle different from the diffraction angle of the first color of light. Thus, due to both Bragg sensitivity and polarization sensitivity, the diffraction efficiency for the first color of light incident in s polarization state at the reply incident angle and diffracted with first order can be substantially higher than the diffraction efficiency for the second color of light incident in p polarization state at the same replay incident angle or at a different replay incident angle.

The optically diffractive device 900 can be configured to suppress crosstalk between diffracted light beams of blue and green colors. For example, when the B grating 912 is positioned in front of the G grating 922 in the device 900 along the Z direction, light is incident on the B grating 912 prior to being incident on the G grating 922. The optically diffractive device 900 can be configured such that blue color of light is incident on the B grating 912 in s polarization state and the green color of light is incident on the B grating 912 in p polarization state and the green color of light is incident on the G grating 922 in s polarization state. In some cases, the optically diffractive device 900 can also be configured such that the residual blue color of light is incident on the G grating 922 in p polarization state.

In some implementations, as shown in FIGS. 9A and 9B, the optically diffractive device 900 can include a color-selective polarizer 906 (also known as a color-selective retarder or filter) between the first diffractive grating 912 and the second diffractive grating 922 (or between the first diffractive component 910 and the second diffractive component 920). The color-selective polarizer 906 can include a GM filter configured to rotate a polarization state of green color of light by 90 degrees, e.g., from p polarization state to s polarization state, but without rotation of a polarization state of blue color of light.

In some implementations, as shown in FIGS. 9A and 9B, the optically diffractive device 900 can include another color-selective polarizer 904 in front of the first diffractive grating 912 and the second diffractive grating 922 along the Z direction. The color-selective polarizer 904 can include a BY filter configured to rotate a polarization state of blue color of light by 90 degrees from p polarization state to s polarization state, but without rotation of a polarization state of green color of light.

As shown in FIGS. 9A and 9B, both blue color of light 952 and green color of light 954 can be incident in p polarization state, simultaneously or sequentially, into the optically diffractive device 900. The two colors of light can have a same incident angle $\theta°$. When the blue color of light 952 and the green color of light 954 are first incident on the BY filter 904, the color-selective polarizer 904 rotates the p polarization state of the blue color of light to s polarization state, without rotation of the polarization state of the green color of light, such that the blue color of light is incident on the B grating 912 in s polarization state and the green color of light is incident on the B grating 912 in p polarization state. The B grating 912 diffracts the blue color of light in s polarization state into first order blue color of light 952' at a diffracted angle with a first diffraction efficiency and transmits zero order blue color of light 952" at the incident angle. Due to polarization sensitivity and Bragg sensitivity, the B grating 912 diffracts the green color of light 954 in p polarization state with a diffraction efficiency substantially smaller than the first diffraction efficiency, and most of the green color of light 954 in p polarization state transmits through the B grating 912. The color-selective polarizer 906 rotates p polarization state of the green color of light into s polarization state, without rotation of s polarization state of the blue color of light, such that the G grating 922 diffracts the green color of light in s polarization into first order green color light 954' at a diffracted angle with a second diffraction efficiency and transmits zero order green color of light 954" at the incident angle. Thus, the diffracted blue color of light 952' and green color of light 954' exit out of the optically diffracted device 900 with the same s polarization state and with the same diffracted angle, e.g., in a range from −10° to 10° or −7° to 7°, or substantially close to 0° or normal to the device 900.

As shown in FIG. 5H, the optically diffractive device 900 can be positioned in front of a cover glass 930 of a display, e.g., the display 594 of FIG. 5H, along the Z direction. As discussed above in FIG. 5H, the optically diffractive device 900 can be attached to the cover glass 930 with an OCA layer or index-matching oil, or spaced with a gap such as an air gap. The diffracted blue color of light 952' and green color of light 954' can be incident in the same s polarization state and at the same incident angle (e.g., at substantially normal incidence) into the display. The display can diffract the blue color of light 952' and the green color of light 954' back into and through the optically diffractive device 900. The blue color of light and green color of light diffracted from the display cannot significantly be further diffracted by the optically diffractive device 950 as they are incident on the diffractive gratings 912 and 922 at an angle far off-Bragg.

The display 594 can be illuminated by light polarized in a direction of the display's alignment layer or a direction perpendicular to the display's alignment layer. The display can be rotated in its own plane between horizontal and vertical orientations, hence which polarization is required depends on which orientation the display is in. In some implementations, the display can be illuminated with p polarized light. The blue color of light and green color of light diffracted from the optically diffractive device 900 can be incident in the same p polarization state on the display. The optically diffractive device 900 can include an additional color-selective polarizer after the G grating 922 to rotate the s polarization state of each of the blue color of light 952' and the green color of light 954' to p polarization state.

In some implementations, the blue color of light is incident in s polarization state and the green color of light is incident in p polarization state into the optically diffractive device 900, and the optically diffractive device 900 can include no BY filter 904 before the B grating 912 to rotate the polarization state of the blue color of light.

In some implementations, the zero order undiffracted (or transmitted) blue color of light and/or the zero order undiffracted (or transmitted) green color of light can be totally internally reflected by one or more reflective layers arranged in the optically diffractive device 900, as discussed with further details in FIGS. 11 to 12C.

FIG. 10A illustrates an example optically diffractive device 1000, including holographic gratings for three colors and corresponding color-selective polarizers, for individually diffracting the three colors of light. FIG. 10B illustrates an example of diffracting the three colors of light by the optical device of FIG. 10A. Compared to FIGS. 9A and 9B, the optically diffractive device 1000 includes an additional diffractive component for an additional color and different color-selective polarizers for the three colors. For illustration, the device 1000 is configured for blue, red, and green colors of light.

As illustrated in FIG. 10A, the optically diffractive device 1000 can be arranged in front of a cover glass 1050 of a display, e.g., the display 594 of FIG. 5H, along the Z direction. The optically diffractive device 1000 includes a first diffractive component 1010, a second diffractive component 1020, and a third diffractive component 1030 that can be sequentially stacked together on a field grating substrate 1002 along the Z direction. An AR film 1001 can be applied to or coated on a front surface of the field grating substrate 1002 to reduce reflection of light. Each of the first, second, and third diffractive components 1010, 1020, 1030 can include a respective substrate 1014, 1024, 1034, a respective diffractive grating 1012, 1022, 1032, and a respective carrier film 1016, 1026, 1036. The respective diffractive grating 1012, 1022, 1032 is between the respective substrate 1014, 1024, 1034 and the respective carrier film 1016, 1026, 1036. In some cases, the respective substrate 1014, 1024, 1034 is in front of the respective carrier film 1016, 1026, 1036 along the Z direction. In some cases, the respective carrier film 1016, 1026, 1036 is in front of the respective substrate 1014, 1024, 1034 along the Z direction.

Each of the first, second, and third diffractive gratings 1012, 1022, and 1032 can be configured to: diffract a single color of light in s polarization state incident at an incident angle with a diffraction efficiency substantially higher, e.g., more than one order of magnitude, two orders of magnitude, or three orders of magnitude, than a diffraction efficiency where the diffractive grating diffracts another color of light in p polarization state incident at a same or different incident angle. Each of the first, second, and third diffractive gratings 1012, 1022, and 1032 can be a holographic grating, e.g., a volume grating or a Bragg grating. Each of the first, second, and third diffractive gratings 1012, 1022, and 1032 can be independently recorded and fixed in a recording medium, e.g., a photosensitive polymer or a photopolymer.

The optically diffractive device 1000 can include multiple color-selective polarizers for the three colors of light. In some implementations, a BY filter 1004 is between a field grating substrate 1002 and the first diffractive grating 1012 of the first diffractive component 1010 and configured to rotate a polarization state of blue color of light, without rotation of a polarization state of each of red and green colors of light. A MG filter 1006 is between the first and second diffractive gratings 1012 and 1022 (or between the first and second diffractive components 1010 and 1020) and configured to rotate a polarization state of each of blue and red colors of light, without rotation of a polarization state of green color of light. A YB filter 1008 is between the second and third diffractive gratings 1022 and 1032 (or between the second and third diffractive components 1020 and 1030) and configured to rotate a polarization state of each of red and green colors of light, without rotation of a polarization state of blue color of light. An MG filter 1040 is after the third diffractive grating 1032 (or the third diffractive component 1030) and configured to rotate a polarization state of each of red and blue colors of light, without rotation of a polarization state of green color of light.

In some implementations, a color-selective polarizer is composed of two or more sub-polarizers. The sub-polarizers can be arranged in any desired order. For example, the YB filter 1008 can be composed of a RC filter 1008-1 and a GM filter 1008-2. The RC filter 1008-1 can be arranged before the GM filter 1008-2, or vice versa. The RC filter 1008-1 is configured to rotate a polarization state of red color of light, without rotation of a polarization state of each of green and blue colors of light, and the GM filter 1008-2 is configured to rotate a polarization state of green color of light, without rotation of a polarization state of each of red and blue colors of light.

Adjacent layers or components in the optically diffractive device 1000 can be attached together using one or more intermediate layers of OCA, UV-cured or heat-cured optical glues, optical contacting, or index matching fluid. As discussed in FIG. 5H, the optically diffractive device 1000 can be attached to the display cover glass 1050 through an intermediate layer or spaced with a gap, e.g., an air gap.

The optically diffractive device 1000 is configured to diffract the three colors of light (red, green, and blue) out at a same diffracted angle (e.g., substantially normal incidence) with a same polarization state (e.g., s or p) towards the display. The three colors of light can be input into the optically diffractive device 1000 at a same incident angle θ°, e.g., substantially identical to be a Bragg angle. In some cases, the three colors of light can be incident at different angles to match a Bragg angle of each color's grating. The three colors of light can be in beams large enough to illuminate the whole region of the gratings. The three colors of light can be input into the optically diffractive device 1000 in a same polarization state (e.g., s or p). In some cases, a color of light is incident from an opposite side (e.g., at −θ°) or from the Y direction. Each color grating can be rotated to match the direction of its corresponding color replay reference light. A corresponding color-selective polarizer can be independent of the rotation of the color grating.

FIG. 10B illustrates an example 1060 of diffracting the three colors of light (blue, red, green) by the optically diffractive device 1000 of FIG. 10A. The three colors of light are incident into the optically diffractive device 1000 at the same incident angle θ° and in the same p polarization state.

As shown in FIG. 10B, the BY filter 1004 rotates the p polarization state of the blue color of light to s polarization state, without rotation of the p polarization state of each of the red and green colors of light. The B grating 1012 diffracts the blue color of light in the s polarization state into first order at the diffracted angle and zero order at the incident angle. The green and red colors of light incident in p polarization state at the incident angle transmit through the B grating 1012.

The MG filter 1006 rotates the s polarization state of the blue color of light to p polarization state, and the p polarization state of the red color of light to s polarization state, without rotation of the p polarization state of the green color of light. The R grating 1022 diffracts the red color of light in the s polarization state into first order at the diffracted angle and zero order at the incident angle. The residual blue color of light at zero order and the green color of light incident in p polarization state at the incident angle transmit through the R grating 1022.

The RC filter 1008-1 in the YB filter 1008 rotates the s polarization state of the red color of light top polarization state, without rotation of the p polarization state of each of the green and blue colors of light. The GM filter 1008-2 of the YB filter 1008 rotates the p polarization state of the green color of light to s polarization state, without rotation of the p polarization of each of the red and blue colors of light. The residual blue color of light at zero order, the residual red color of light at zero order, and the green color of light transmit through the RC filter 1008-1 and the GM filter 1008-2.

The G grating 1032 diffracts the green color of light in the s polarization state into first order at the diffracted angle and zero order at the incident angle. The residual blue color of light and the residual red color of light incident in p polarization state at the incident angle transmit through the G grating 1032.

The MG filter 1040 rotates the p polarization state of each of the red and blue colors of light to s polarization state, without rotation of the s polarization state of the green color of light. The diffracted blue, red, and green colors of light in the s polarization state at the same diffracted angle propagate out of the optically diffractive device 1000. The residual blue color of light, the residual red color of light, and the residual green color of light at zero order are also in s polarization state and at the incident angle transmit through the MG filter 1040.

In some implementations, the optically diffractive device 1000 can have a larger size than the display. The residual blue, red, green colors of light at zero order can propagate at a large angle out of the device 1000 and into air. In some implementations, as discussed with further details below in FIGS. 11 to 12C, the optically diffractive device 1000 can include one or more reflective layers between or after diffractive gratings for total internal reflection of corresponding colors of light at zero order.

Exemplary Optically Diffractive Devices with Reflective Layers

FIGS. 11 to 12C show example optically diffractive devices including reflective layers. The reflective layers can selectively totally reflect a single color of light at zero order while transmitting other colors of light. Each of the optically diffractive devices includes multiple gratings each for a different color of light. Each color of light can be incident at a different replay reference angle on a corresponding grating, such that each color of light undiffracted (or transmitted) by the grating at zero order undergoes total internal reflection (TIR) from an interface subsequent to the grating which diffracts out the color of light at first order at a same diffracted angle (e.g., substantially normal), but prior to the subsequent gratings (if any) in the device. The other colors of light can transmit at the corresponding replay reference angles through the grating.

FIG. 11 illustrates an example optically diffractive device 1100, including diffractive gratings for two colors and corresponding reflective layers, for individually diffracting the two colors of light. For illustration, the device 1100 is configured for green and blue colors of light.

The optically diffractive device 1100 includes a first diffractive component 1110 having a first diffractive grating 1112 for blue color and a second diffractive component 1120 having a second diffractive grating 1122 for green color. Each of the first and second diffractive gratings 1112, 1122 can be a holographic grating, e.g., a Bragg grating or a volume grating. Each of the first and second diffractive gratings 1112 and 1122 can be independently recorded and fixed in a recording medium, e.g., a photosensitive material such as a photopolymer.

The first diffractive component 1110 and the second diffractive component 1120 can be stacked together on a field grating substrate 1102 along a direction, e.g., the Z direction. The field grating substrate 1102 can be an optically transparent substrate, e.g., a glass substrate. The optically diffractive device 1100 can be in front of a display such as LCOS, e.g., the display 594 of FIG. 5H. For example, the optically diffractive device 1100 can be arranged on a cover glass 1130 of the display through an intermediately layer or spaced by a gap, e.g., an air gap.

Similar to the first and second diffractive components 910, 920 in FIGS. 9A and 9B, each of the first and second diffractive components 1110 and 1120 can include a respective substrate 1114, 1124 and a respective carrier film 1116, 1126 on opposite sides of the respective diffractive grating 1112, 1122. The respective diffractive grating 1112, 1122 is between the respective substrate 1114, 1124 and the respective carrier film 1116, 1126. The respective substrate 1114, 1124 and the respective carrier film 1116, 1126 can be arranged in an order to reduce refractive index mismatch and thus undesired Fresnel reflection. The respective substrate 1114, 1124 can be a glass substrate that can have a refractive index same as or close to the refractive index of the field grating substrate 1102. The respective carrier film 1116, 1126 can be a TAC film. The TAC film can have a lower refractive index than a photosensitive polymer used to record diffractive gratings 1112 and 1122. In some examples, the respective substrate 1114, 1124 is arranged before the carrier film 1116, 1126.

Adjacent layers or components in the optically diffractive device 1100 can be attached together using one or more intermediate layers of OCA, UV-cured or heat-cured optical glues, optical contacting, or index matching fluid. For example, the first diffractive component 1110 (e.g., the substrate 1114) can be attached to the field grating substrate 1102 through an intermediate layer 1101, e.g., an OCA layer. The first and second diffractive components 1110 and 1120, e.g., the carrier film 1116 and the substrate 1124, can be attached together through another intermediate layer 1103, e.g., an OCA layer. The optically diffractive device 1100 (e.g., the carrier film 1126) can be attached to the cover glass 1130 of the display through an intermediate layer 1105, e.g., an OCA layer.

As shown in FIG. 11, each of the first and second diffractive gratings 1112, 1122 is configured to diffract a corresponding color of light incident at a respective incident angle into first order at a respective diffracted angle and zero order at the respective incident angle, and transmit another color of light at a different incident angle, e.g., due to Bragg selectivity. Thus, there can be no crosstalk between the different colors of light individually diffracted at corresponding diffractive gratings. Each color of light can be polarized. The polarization state of the different colors of light diffracted at first order can be the same, e.g., s or p. The respective diffracted angles for the different colors of light can be same, e.g., substantially normal.

The optically diffractive device 1100 can include a first reflective layer (or blocking layer) between the first grating 1112 and the second grating 1122. The first grating 1112 is configured to diffract blue color of light incident at a first incident angle $\theta_b$, e.g., 78.4°, into first order at a diffracted angle, e.g., 0° and zero order at the first incident angle. The first reflective layer, e.g., a refractive index of the first reflective layer, is configured to totally reflect the blue color of light diffracted at the first incident angle but to transmit the green color of light incident at a second incident angle $\theta_g$, e.g., 76.5°. For example, the refractive index of the first reflective layer is lower than the refractive index of a layer immediately before the first reflective layer, e.g., the first grating 1112. The first reflective layer can be a suitable layer between the first grating 1112 and the second grating 1122. In some examples, the first reflective layer is the carrier film 1116, as shown in FIG. 11.

Similarly, the optically diffractive device 1100 can include a second reflective layer after the second grating 1112 and before the display cover glass 1130. The second grating 1112 is configured to diffract green color of light incident at the second incident angle $\theta_g$, e.g., 76.5°, into first order at a diffracted angle, e.g., 0° and zero order at the second incident angle. The second reflective layer, e.g., a refractive index of the second reflective layer, is configured to totally reflect the green color of light diffracted at the second incident angle. The second reflective layer can be a suitable layer between the second grating 1122 and the cover glass 1130. In some examples, the second reflective layer is the intermediate layer 1105, as shown in FIG. 11.

The totally reflected blue and green colors of light by the corresponding reflective layers are reflected back into the optically diffractive device 1100 to a side of the optically diffractive device 1100. As illustrated in FIG. 11, a surface of the side can be coated with an optical absorber 1104, e.g., a black coating, to absorb the totally reflected blue and green colors of light diffracted at zero order by the corresponding diffractive gratings.

The field grating substrate 1102 can be thick enough such that the replay reference light beams of different colors can enter at its edge of the field grating substrate 1102. The field grating substrate 1102 can be also configured to fully contain the replay reference light beams such that a viewer or observer cannot insert a finger or other object into the replay reference light beams. The viewer thus cannot obstruct the replay reference light beams, which can improve laser safety as the viewer cannot get an eye (or a reflective or focusing element) into the full-power replay reference light beams. The optically diffractive device 1100 with the field grating substrate 1102 can be significantly more compact than if the replay reference light beams are incident upon the front surface of the optically diffractive device 1100 from air.

As the blue and green colors of light are incident at a relatively large replay reference angle (or incident angle), e.g., more than 70°, Fresnel reflection can be significant from layer interfaces (for both P and S polarization), and can rapidly increase with increasing replay reference angle. Since the optically diffractive device 1100 contains a number of interfaces between materials of different refractive indices, the Fresnel reflection losses from each such interface can add to substantially attenuate the replay output light, causing a substantially reduced replay-light power at each diffractive grating, especially the grating, e.g., the G grating 1122, closest to the display. In some examples, a replay reference angle (or an incident angle) for a particular color of light can be selected to be just large enough to reliably undergo TIR, but not much large so that the Fresnel losses can be reduced.

Figure 13A:
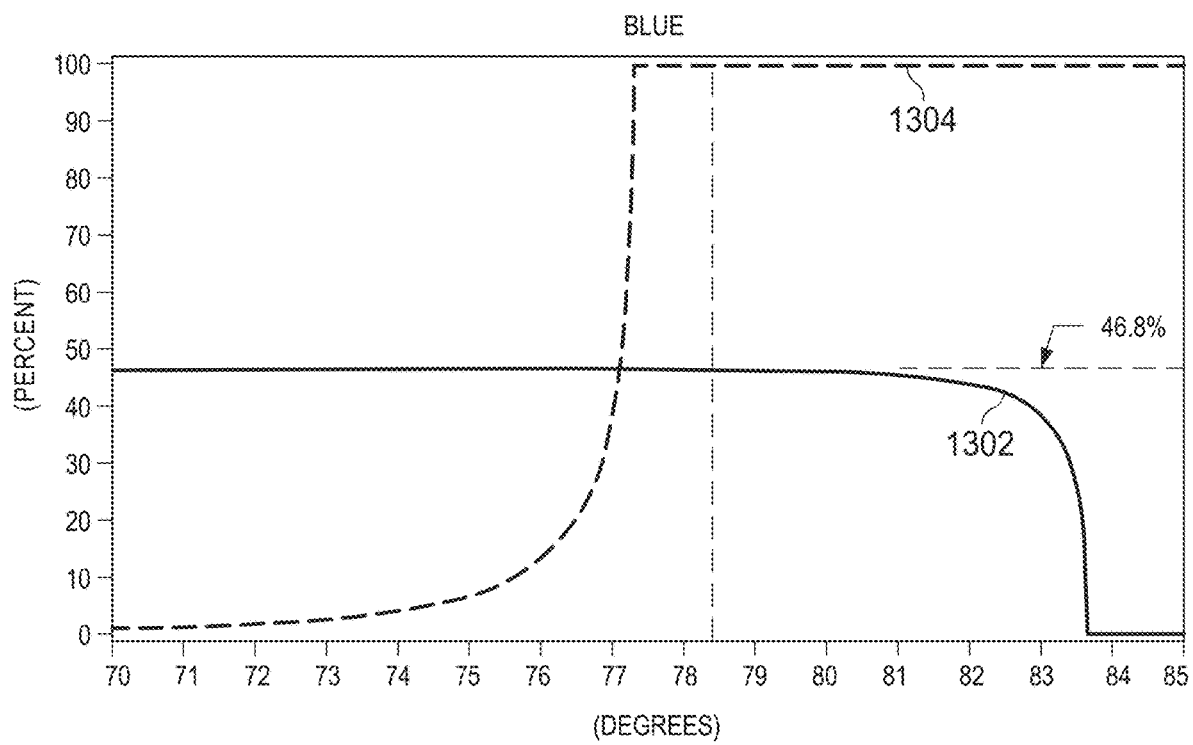
FIGS. 13A-13C illustrate relationships between diffracted and reflected beam power with different incident angles for a blue color of light (FIG. 13A), a green color of light (FIG. 13B), and a red color of light (FIG. 13C).
Figure 13B:
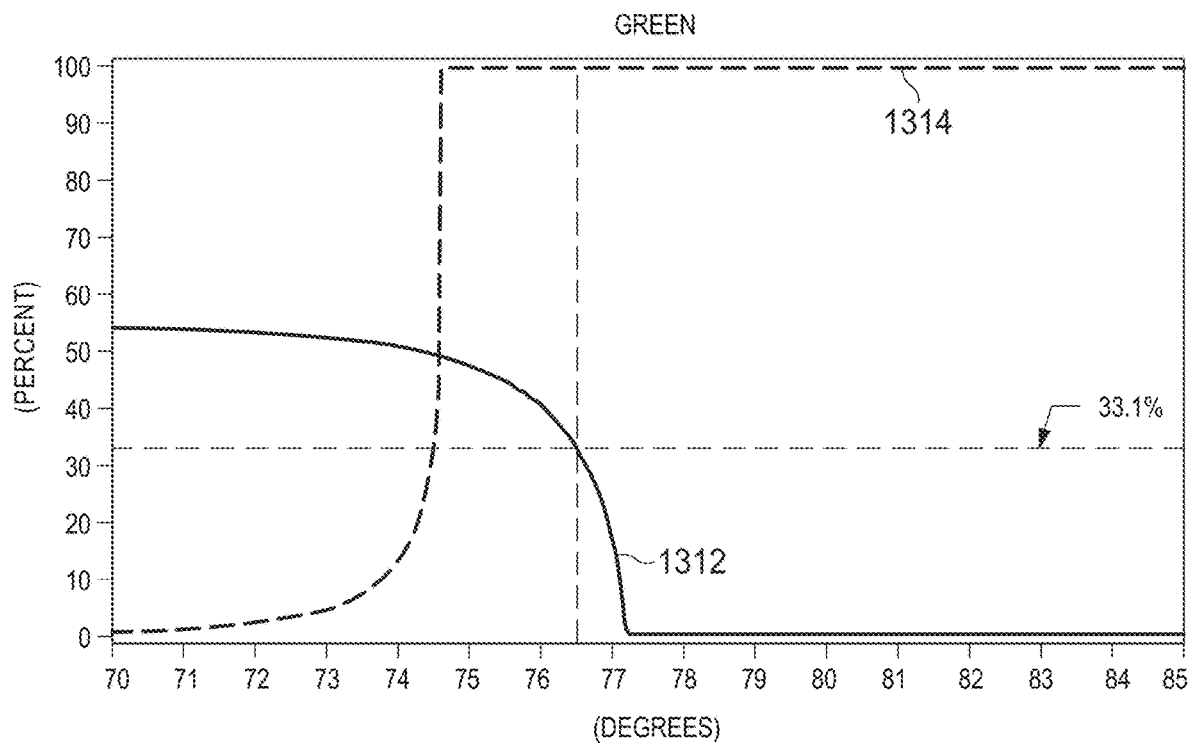
Figure 13C:
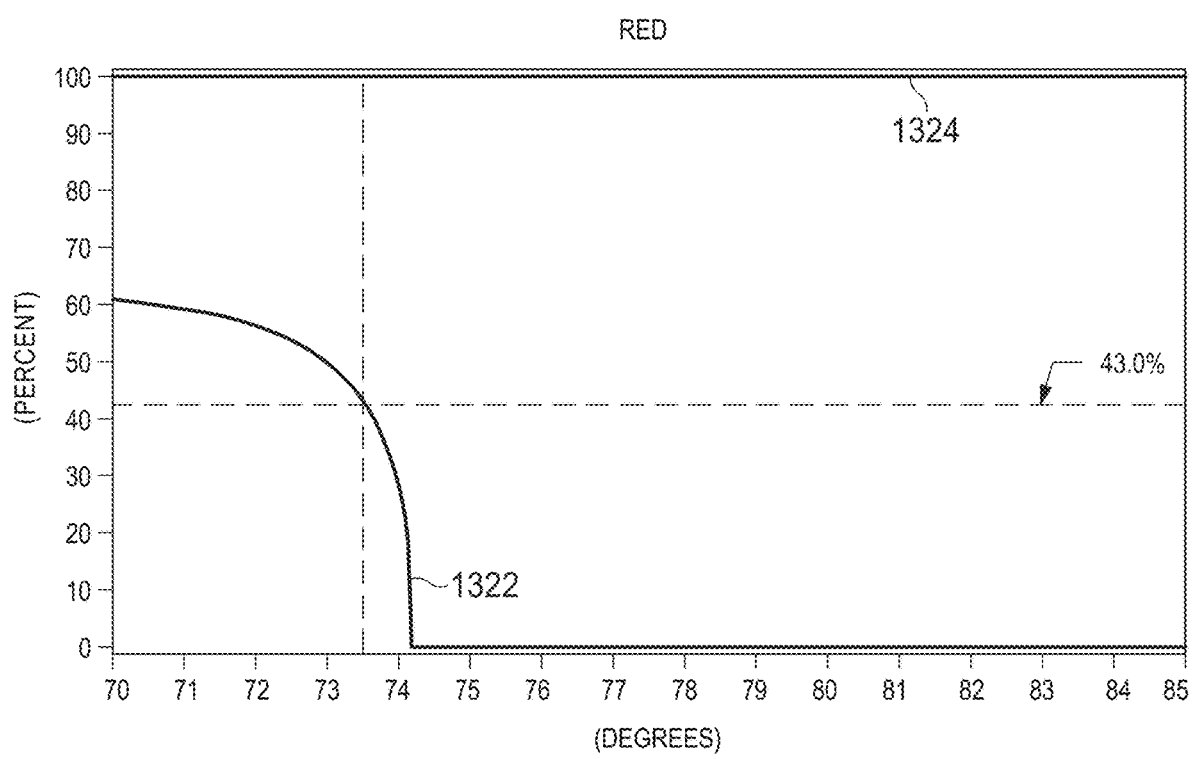

FIGS. 13A-13C illustrate relationships between diffracted (solid lines) and reflected or blocked (dashed lines) replay reference beam powers with different incident angles for blue color of light (FIG. 13A), green color of light (FIG. 13B), and red color of light (FIG. 13C). The diffracted replay reference beam power can be an illumination beam into a cover glass of a display, e.g., the display 594 of FIG. 5H, adjacent to an optically diffractive device, e.g., the optically diffractive device 598 of FIG. 5H.

As illustrated in FIG. 13A, for blue color of light, plot 1302 shows the diffracted replay reference beam power (or the display's blue illumination power) as a replay reference beam angle (e.g., an incident angle in glass) is increased, and plot 1304 shows the reflected replay reference beam power from a corresponding reflective layer as the replay reference beam angle is increased. As illustrated in FIG. 13B, for green color of light, plot 1312 shows the diffracted replay reference beam power (or the display's green illumination power) as a replay reference beam angle (e.g., an incident angle in glass) is increased, and plot 1314 shows the reflected replay reference beam power from a corresponding reflective layer as the replay reference beam angle is increased. As illustrated in FIG. 13C, for red color of light, plot 1322 shows the diffracted replay reference beam power (or the display's red illumination power power) as a replay reference beam angle (e.g., an incident angle in glass) is increased, and plot 1324 shows the reflected replay reference beam power from a corresponding reflective layer as the replay reference beam angle is increased.

Replay reference angles for different colors of light can be chosen to be large enough such that for each color of light, the corresponding reflective layer can totally reflect the color of light with a reflection of 100%, while the replay reference angles can be small enough such that the Fresnel losses do not substantially eliminate the diffracted replay reference beams or the illumination in the cover glass of the display. As an example, a diffraction efficiency of each grating is 50% for blue, 60% for green, and 70% for red. A bottom layer of the optically diffractive device is parallel to the cover glass of the display. A diffracted angle of the replay object beam for each color is −6°. As shown in FIGS. 13A, 13B, 13C, the net object beam powers inside the cover glass of the display are 46.8% for blue, 33.1% for green, and 43.0% for red, when the replay reference angle is 78.4° for blue color of light at 460 nm, 76.5° for green color of light at 520 nm, and 73.5° for red color of light at 640 nm.

FIG. 12A illustrates an example optically diffractive device 1200, including diffractive gratings for three colors and corresponding reflective layers, for individually diffracting the three colors of light. For illustration, the device 1200 is configured for blue, green and red colors of light.

The optically diffractive device 1200 includes a first diffractive component 1210 having a first diffractive grating 1212 for blue color, a second diffractive component 1220 having a second diffractive grating 1222 for green color, and a third diffractive component 1230 having a third diffractive grating 1232 for red color. Each of the first, second, and third diffractive gratings 1212, 1222, 1232 can be a holographic grating, e.g., a Bragg grating or a volume grating. Each of the first, second, and third diffractive gratings 1212, 1222, and 1232 can be independently recorded and fixed in a recording medium, e.g., a photosensitive material such as a photopolymer.

The first, second, and third diffractive components 1210, 1220, and 1230 can be stacked together on a field grating substrate 1202 along a direction, e.g., the Z direction. The field grating substrate 1202 can be an optically transparent substrate, e.g., a glass substrate. The optically diffractive device 1210 can be in front of a display such as LCOS, e.g., the display 594 of FIG. 5H. For example, the optically diffractive device 1200 can be arranged on a cover glass 1240 of the display through an intermediately layer or spaced by a gap, e.g., an air gap.

Similar to the first, second, and third diffractive components 1010, 1020, 1030 in FIGS. 10A and 10B, each of the first, second, and third diffractive components 1210, 1220, 1230 can include a respective substrate 1214, 1224, 1234 and a respective carrier film 1216, 1226, 1236 on opposite sides of the respective diffractive grating 1212, 1222, 1232. The respective diffractive grating 1212, 1222, 1232 is between the respective substrate 1214, 1224, 1234 and the respective carrier film 1216, 1226, 1236. The respective substrate 1214, 1224, 1234 and the respective carrier film 1216, 1226, 1236 can be arranged in an order to reduce refractive index mismatch and thus Fresnel reflection. The respective substrate 1214, 1224, 1234 can be a glass substrate that can have a refractive index same as or close to the refractive index of the field grating substrate 1202. The respective carrier film 1216, 1226, 1236 can be a TAC film. The TAC film can have a lower refractive index than a photosensitive polymer. In some examples, the respective substrate 1214, 1224 is arranged before the carrier film 1216, 1226. The substrate 1234 is arranged after the carrier film 1236.

Adjacent layers or components in the optically diffractive device 1100 can be attached together using one or more intermediate layers of OCA, UV-cured or heat-cured optical glues, optical contacting, or index matching fluid. For example, the first diffractive component 1210 (e.g., the substrate 1214) can be attached to the field grating substrate 1202 through an intermediate layer 1201, e.g., an OCA layer.

The first and second diffractive components 1210 and 1220, e.g., the carrier film 1216 and the substrate 1224, can be attached together through another intermediate layer 1203, e.g., an OCA layer. The second and third diffractive components 1220 and 1230, e.g., the carrier film 1226 and the carrier film 1236, can be attached together through another intermediate layer 1205, e.g., an OCA layer. The optically diffractive device 1200 (e.g., the substrate 1234) can be attached to the cover glass 1240 of the display through an intermediate layer 1207, e.g., an OCA layer.

As shown in FIG. 12A, each of the first, second, and third diffractive gratings 1212, 1222, 1232 is configured to diffract a corresponding color of light incident at a respective incident angle into first order at a respective diffracted angle and zero order at the respective incident angle, and transmit another color of light at a different incident angle, e.g., due to Bragg selectivity. Thus, there can be no or little crosstalk between the different colors of light individually diffracted at corresponding diffractive gratings. Each color of light can be polarized. The polarization state of the different colors of light diffracted at first order can be the same, e.g., s or p. The respective diffracted angles for the different colors of light can be same, e.g., substantially normal.

As discussed above in FIGS. 13A, 13B, 13C, different incident angles $\theta_b$, $\theta_g$, $\theta_r$ (or replay reference angles) for different colors of light (blue, green, and red) can be chosen, e.g., to be 78.4°, 76.5°, and 73.5°. The optically diffractive device 1200 can include a first reflective layer (or blocking layer) between the first grating 1212 and the second grating 1222. The first grating 1212 is configured to diffract blue color of light incident at the first incident angle $\theta_b$ into first order at a diffracted angle, e.g., 0°, and zero order at the first incident angle. The first reflective layer, e.g., a refractive index of the first reflective layer, is configured to totally reflect the blue color of light diffracted at the first incident angle but to transmit the green color of light incident at the second incident angle $\theta_g$ and the red color of light incident at the third incident angle $\theta_r$. For example, the refractive index of the first reflective layer is lower than the refractive index of a layer immediately before the first reflective layer, e.g., the first grating 1212. The first reflective layer can be a suitable layer between the first grating 1212 and the second grating 1222. In some examples, the first reflective layer is the carrier film 1216, as shown in FIG. 12A. Total internal reflection occurs on an interface between the first grating 1212 and the carrier film 1216. The totally reflected blue color of light undiffracted (or transmitted) at the zero order is reflected back to the layers above the first reflective layer and can be absorbed by an optical absorber 1204 coated on a side surface of the optically diffractive device 1200.

The optically diffractive device 1200 can include a second reflective layer (or blocking layer) between the second grating 1222 and the third grating 1232. The second grating 1222 is configured to diffract the green color of light incident at the second incident angle $\theta_g$ into first order at a diffracted angle, e.g., 0°, and zero order at the second incident angle. The second reflective layer, e.g., a refractive index of the second reflective layer, is configured to totally reflect the green color of light diffracted at the second incident angle but to transmit the red color of light incident at the third incident angle $\theta_r$. For example, the refractive index of the second reflective layer is lower than the refractive index of a layer immediately before the second reflective layer. The second reflective layer can be a suitable layer between the second grating 1222 and the third grating 1232. In some examples, the second reflective layer is the intermediate layer 1205, as shown in FIG. 12A. Total internal reflection occurs on an interface between the carrier film 1226 and the intermediate layer 1205. The totally reflected green color of light undiffracted (or transmitted) at the zero order is reflected back to the layers above the second reflective layer and can be absorbed by the optical absorber 1204.

The optically diffractive device 1200 can include a third reflective layer after the third grating 1232 and before the display cover glass 1240. The third grating 1232 is configured to diffract the red color of light incident at the third incident angle $\theta_r$ into first order at a diffracted angle, e.g., 0° and zero order at the third incident angle. The third reflective layer, e.g., a refractive index of the third reflective layer, is configured to totally reflect the red color of light diffracted at the third incident angle. The third reflective layer can be a suitable layer between the third grating 1232 and the cover glass 1240. In some examples, the third reflective layer is the intermediate layer 1207 between the substrate 1234 and the cover glass 1240, as shown in FIG. 12A. The totally reflected red color of light undiffracted (or transmitted) at the zero order is reflected back to the layers above the second reflective layer and can be absorbed by the optical absorber 1204.

The field grating substrate 1202 can be thick enough such that the replay reference light beams of different colors entering at its edge of the field grating substrate 1202. The field grating substrate 1202 can be also configured to fully contain the replay reference light beams such that a viewer or observer cannot insert a finger or other object into the replay reference light beams. The viewer thus cannot obstruct the replay reference light beams, which can improve laser safety as the viewer cannot get an eye (or a reflective or focusing element) into the full-power replay reference light beams. The optically diffractive device 1200 with the field grating substrate 1202 can be significantly more compact than if the replay reference light beams are incident upon the front surface of the optically diffractive device 1200 from air.

As shown in FIG. 12A, the field grating substrate 1202 can have a rectangular cross-section in the XZ plane. The different colors of light are incident from a side surface of the field grating substrate 1202. FIG. 12B illustrates another example optically diffractive device 1250 including a wedged field grating substrate 1252. A wedged angle between a side surface (or an input surface for light beams) 1251 of the substrate 1252 and a top layer 1253 of the substrate 1252 can be selected, and/or the side face can be AR coated, such that an optical path taken by any light beam returning to the field grating substrate 1252 from the optically diffractive device 1250 and the display can be conveniently blocked or attenuated or directed to reduce or eliminate reflections back into the optically diffractive device 1250 and the display. The optically diffractive device 1250 can include a corresponding optical absorber 1254 coated on an opposite side surface, which can be shorter than the optical absorber 1204 of FIG. 12A.

FIG. 12C illustrates a further example optically diffractive device 1270 including a field grating substrate 1272 having a wedged input face 1271. The wedged input face 1271 may be configured to reduce Fresnel losses of input light of different colors. The wedged input face 1271 may be configured such that the input light of different colors is incident on the input face 1271 at substantially normal incidence and incident on corresponding diffractive gratings at different incident angles (or replay reference angles). The wedged input face 1271 may be configured to refract input light of different colors to the desired angles of each color inside the diffractive device and from convenient directions and angles in air. For example, the wedged input face 1271 may have a wedge angle such that the in air angles cause the input beams to travel parallel to the front surface of the diffractive device or from the space behind the front surface of the diffractive device.

An AR coating can be formed on a front surface 1273 of the field grating substrate 1272 to reduce or eliminate the reflection of ambient light back towards a viewer. An AR coating can be also formed on a back face of the optically diffractive device 1270 closest to the display to reduce or eliminate the undesirable reflection of light reflected and/or diffracted from the display towards the viewer.

In some implementations, one or more layers in an optically diffractive device, e.g., the optically diffractive device 1100 of FIG. 11, 1200 of FIG. 12A, 1250 of FIG. 12B, or 1270 of FIG. 12C, can be slightly wedged, which can allow fine tuning of TIR and Fresnel reflection at each layer. The layers can be also configured to reduce or eliminate a visibility of Newton's rings or interference fringes which can occur between any pair of substantially parallel surfaces within the optically diffractive device when using narrow-band light sources, e.g., laser diodes.

Exemplary Fabrication Processes

FIG. 14A is a flowchart of an example process 1400 of fabricating an optically diffractive device including diffractive structures and corresponding color-selective polarizers. The optically diffractive device can be the optically diffractive device 598 of FIG. 5H, 598A of FIG. 5I, 598B of FIG. 5J, or 598C of 5K, the optically diffractive device 900 of FIGS. 9A and 9B, or the optically diffractive device 1000 of FIGS. 10A and 10B.

A first diffractive component for a first color is fabricated (1402). The first diffractive component can be the first diffractive component 910 of FIGS. 9A and 9B or 1010 of FIGS. 10A and 10B. The first diffractive component includes a first diffractive structure, e.g., the B grating 912 of FIGS. 9A and 9B or the B grating 1012 of FIGS. 10A and 10B, formed in a recording medium. The first diffractive structure is configured to diffract replay reference light of the first color (or the first color of light), which is incident in a first polarization state at a first incident angle on the first diffractive structure, at a first diffracted angle with a first diffraction efficiency. The first diffraction efficiency can be substantially higher than a diffraction efficiency with which the first diffractive structure diffracts the first color of light or another different color of light incident in a second polarization state different from the first polarization state at the first incident angle, e.g., due to polarization selectivity. The first polarization state can be s polarization, and the second polarization state can be p polarization.

The first diffractive structure can be a holographic grating, e.g., a volume grating or a Bragg grating. A thickness of the recording medium can be more than one order of magnitude larger than the wavelength of the first recording object beam, e.g., 30 times. In some examples, the first incident angle can be a Bragg angle. The first diffraction efficiency can be substantially higher than a diffraction efficiency with which the first diffractive structure diffracts the first color of light or another different color of light incident in the first or second polarization state at an incident angle different from the first incident angle, e.g., due to Bragg selectivity.

The recording medium can include a photosensitive material, e.g., a photosensitive polymer or photopolymer. The first diffractive structure can be formed by exposing the photosensitive material to a first recording object beam at a first recording object angle and simultaneously to a first recording reference beam at a first recording reference angle. The first recording object beam and the first recording reference beam can have a same wavelength, e.g., from a same light source, and the same first polarization state.

In some cases, the first color of light used for replay can include a wavelength range wider than or identical to that of the first recording reference beam or the first recording object beam. For example, the first recording reference beam and the first recording object beam can be light beams of a laser, and the first color of light for replay can be a light beam of a laser diode. In some cases, the first recording reference beam and the first recording object beam can correspond to a color different from the first color of the first color of light. For example, a green color laser light can be used to record a diffractive grating for a red color.

The first incident angle of the first color of light can be substantially identical to the first recording reference angle, and the first diffracted angle can be substantially identical to the first recording object angle. In some examples, the first recording reference angle is in a range from 70 degrees to 90 degrees, e.g., in a range from 80 degrees to 90 degrees. In some examples, the first recording object angle is in a range from −10 degrees to 10 degrees, e.g., −7 degrees to 7 degrees, 0 degrees or 6 degrees. In some examples, a sum of the first recording reference angle and the first recording object angle within the photosensitive material is substantially identical to 90 degrees.

The first diffractive structure can be fixed in the recording medium, e.g., by UV curing or heat curing. In some examples, the first diffractive component includes a carrier film, e.g., a TAC film, on the recording medium. In some examples, the first diffractive component includes a diffraction substrate, e.g., a glass substrate. The recording medium can be between a carrier film and a diffraction substrate.

A second diffractive component for a second color is fabricated (1404). The second diffractive component can be the second diffractive component 920 of FIGS. 9A and 9B or 1020 of FIGS. 10A and 10B. The second diffractive component includes a second diffractive structure, e.g., the B grating 922 of FIGS. 9A and 9B or the R grating 1022 of FIGS. 10A and 10B, formed in a second recording medium. The second diffractive structure is configured to diffract replay reference light of the second color (or the second color of light), which is incident in the first polarization state at a second incident angle on the second diffractive structure, at a second diffracted angle with a second diffraction efficiency. The second diffraction efficiency can be substantially higher than a diffraction efficiency with which the second diffractive structure diffracts the second color of light or another different color of light incident in the second polarization state at the second incident angle or an incident angle different from the second incident angle.

The second diffractive structure can be fabricated in a way similar to the first diffractive structure as described above. The first diffractive structure and the second diffractive structure can be independently fabricated. The second diffractive component can also include a carrier film and a diffraction substrate.

The first and second diffractive components can be configured such that the first diffracted angle and the second diffracted angle are substantially identical to each other, e.g., substantially normal. The first incident angle and the second incident angle can be substantially identical to each other.

A color-selective polarizer is arranged between the first and second optically diffractive components (1406). The color-sensitive polarizer can be the GM filter 906 of FIGS.

9A and 9B, or the MG filter 1006 of FIGS. 10A and 10B. The optically diffractive structure can include a field grating substrate, e.g., the substrate 902 of FIGS. 9A and 9B or the substrate 1002 of FIGS. 10A and 10B. The first optically diffractive component, the color-selective polarizer, and the second optically diffractive component can be sequentially stacked on the field grating substrate, such that the first color of light and the second color of light are incident on the first optically diffractive component before the second optically diffractive component. The color-selective polarizer can be configured to rotate a polarization state of the second color of light, e.g., from the second polarization state to the first polarization state, such that the second color of light can be incident in the first polarization state on the second diffractive structure. In some cases, the color-selective polarizer can rotate a polarization state of the first color of light. In some cases, the color-selective polarizer is configured not to rotate the polarization state of the first color of light.

In some implementations, an additional color-selective polarizer is arranged in front of the first diffractive component. For example, the additional color-selective polarizer can be between the field grating substrate and the first diffractive component. The additional color-selective polarizer can be the BY filter 904 of FIGS. 9A and 9B or the BY filter 1004 of FIGS. 10A and 10B. The additional color-selective polarizer is configured to rotate a polarization state of the first color of light, e.g., from the second polarization state to the first polarization state, such that the first color of light is incident in the first polarization state on the first diffractive structure. In some cases, the additional color-selective polarizer can rotate a polarization state of the second color of light, e.g., from the first polarization state to the second polarization state, such that the second color of light is incident in the second polarization state on the first diffractive structure. In some cases, the additional color-selective polarizer is configured not to rotate the polarization state of the second color of light, such that the second color of light is incident in the second polarization state on the first diffractive structure.

Adjacent components in the optically diffractive device can be attached together through an intermediate layer. The intermediate layer can be an OCA layer, a UV-cured or heat-cured optical glue, optical contacting, or an index-matching fluid.

In some implementations, the process 1400 can further include forming a third optically diffractive component. The third diffractive component includes a third diffractive structure, e.g., the G grating 1032 of FIGS. 10A and 10B, formed in a third recording medium. The third diffractive structure is configured to diffract replay reference light of a third color (or the third color of light), which is incident in the first polarization state at a third incident angle on the third diffractive structure, at a third diffracted angle with a third diffraction efficiency. The third diffraction efficiency can be substantially higher than a diffraction efficiency with which the third diffractive structure diffracts the third color of light or another different color of light incident in the third polarization state at the second incident angle or an incident angle different from the third incident angle.

The third diffractive structure can be fabricated in a way similar to the first diffractive structure as described above. The first, second, and third diffractive structures can be independently fabricated. The third diffractive component can also include a carrier film and a diffraction substrate. The first, second, and third diffractive components can be configured such that the first, second, and third diffracted angles are substantially identical to each other, e.g., substantially normal. The first, second, and third incident angles can be substantially identical to each other.

A second color-selective polarizer can be arranged between the second and third optically diffractive components. The second color-sensitive polarizer can be YG filter of FIGS. 10A and 10B. The second color-selective polarizer can be composed of two or more sub-polarizers, e.g., the RC filter 1008-1 and the GM filter 1008-2 of FIGS. 10A and 10B. In some examples, the second color-selective polarizer is first attached on the third diffractive component, and then the second color-selective polarizer can be attached to the second diffractive component. In some examples, the second color-selective polarizer can be first attached to the second diffractive component, and then the third diffractive component can be attached to the second color-selective polarizer. The second color-selective polarizer can be configured to rotate a polarization state of the third color of light from the second polarization state to the first polarization state, such that the third color of light is incident in the first polarization state on the third diffractive structure. The second color-selective polarizer can be configured to rotate the polarization state of the second color of light, e.g., from the first polarization state to the second polarization state, without rotation of the polarization state of the first color of light.

A third color-selective polarizer can be arranged sequential to the third optically diffractive component such that the third optically diffractive component is between the second and third color-selective polarizers. The third color-selective polarizer can be the MG filter 1040 of FIGS. 10A and 10B. The third color-selective polarizer is configured to rotate the polarization state of each of the first and second colors of light, e.g., from the second polarization state to the first polarization state, without rotation of the first polarization state of the third color of light, such that the diffracted first, second, and third colors of light have the same polarization state.

FIG. 14B is a flowchart of an example process 1450 of fabricating an optically diffractive device including diffractive structures and corresponding reflective layers. The optically diffractive device can be the optically diffractive device 598 of FIG. 5H, 598A of FIG. 5I, 598B of FIG. 5J, or 598C of 5K, the optically diffractive device 1100 of FIG. 11, or the optically diffractive device 1200 of FIG. 12A, 1250 of FIG. 12B, or 1270 of FIG. 12C.

A first optically diffractive component is formed (1452). The first diffractive component can be the first diffractive component 1110 of FIG. 11, 1210 of FIG. 12A, 12B, or 12C. The first diffractive component includes a first diffractive structure stored in a first recording medium. The first diffractive structure is configured to diffract a first color of light incident at a first incident angle into first order at a first diffracted angle and zero order at the first incident angle. A power of the first color of light at the first order can be substantially higher than the power of the first color of light at zero order.

The first diffractive structure can be a holographic grating, e.g., a volume grating or a Bragg grating. A thickness of the recording medium can be more than one order of magnitude larger than the wavelength of the first recording object beam, e.g., 30 times. In some examples, the first incident angle can be a Bragg angle. The first diffraction efficiency can be substantially higher than a diffraction efficiency with which the first diffractive structure diffracts the first color of light or another different color of light incident at an incident angle different from the first incident angle, e.g., due to Bragg selectivity. Light incident at a different incident angle can transmit through the first diffractive structure.

The recording medium can include a photosensitive material, e.g., a photosensitive polymer or photopolymer. The first diffractive structure can be formed similar to step 1402 of FIG. 14A, e.g., by exposing the photosensitive material to a first recording object beam at a first recording object angle and simultaneously to a first recording reference beam at a first recording reference angle. The first recording object beam and the first recording reference beam can have a same wavelength, e.g., from a same light source, and the same polarization state. The first incident angle of the first color of light can be substantially identical to the first recording reference angle, and the first diffracted angle can be substantially identical to the first recording object angle. In some examples, the first recording reference angle is in a range from 70 degrees to 90 degrees, e.g., in a range from 70 degrees to 80 degrees. In some examples, the first recording object angle is in a range from −10 degrees to 10 degrees, e.g., −7 degrees to 7 degrees, 0 degrees or 6 degrees. The first diffractive structure can be fixed in the recording medium, e.g., by UV curing or heat curing. In some examples, the first diffractive component includes a carrier film, e.g., a TAC film, on the recording medium. In some examples, the first diffractive component includes a diffraction substrate, e.g., a glass substrate. The recording medium can be between a carrier film and a diffraction substrate.

A second optically diffractive component is formed (1454). The second diffractive component can be the second diffractive component 1120 of FIG. 11, 1220 of FIG. 12A, 12B, or 12C. The second diffractive component includes a second diffractive structure stored in a second recording medium. The second diffractive structure is configured to diffract a second color of light incident at a second incident angle into first order at a second diffracted angle and zero order at the second incident angle. A power of the second color of light at the first order can be substantially higher than the power of the second color of light at the zero order.

The second diffractive structure can be fabricated in a way similar to the first diffractive structure in step 1452. The first diffractive structure and the second diffractive structure can be independently fabricated. The second diffractive component can also include a carrier film and a diffraction substrate.

The first and second diffractive components can be configured such that the first diffracted angle and the second diffracted angle are substantially identical to each other, e.g., substantially normal. The first incident angle and the second incident angle are different from each other. The first and second incident angles can be determined, e.g., according to what is described in FIGS. 13A-13C. In some examples, the first color of light has a wavelength smaller than the second color of light, and the first incident angle is larger than the second incident angle.

A first reflective layer is arranged between the first and second diffractive structures (1456). The first reflective layer can be the reflective layer 1116 of FIG. 11, or 1216 of FIG. 12A, 12B, or 12C. The first reflective layer is configured to totally reflect the first color of light incident at the first incident angle, such that the first color of light undiffracted (or transmitted) at the zero order can be reflected back into layers before the first reflective layer without propagating to a display behind the optically diffractive device. The first reflective layer can be configured to have a refractive index smaller than that of a layer of the first diffractive component that is immediately adjacent to the first reflective layer, such that the first color of light having the first incident angle is totally reflected by an interface between the first reflective layer and the layer of the first optically diffractive component, without totally reflecting the second color of light having the second incident angle. The first reflective layer can be any suitable layer between the first and second diffractive structures. For example, the first reflective layer can be the carrier film of the first diffractive component.

A second reflective layer is arranged behind the second diffractive structures (1458). The second reflective layer can be the reflective layer 1105 of FIG. 11, or 1205 of FIG. 12A, 12B, or 12C. The second reflective layer is configured to totally reflect the second color of light incident at the second incident angle, such that the second color of light undiffracted (or transmitted) at the zero order can be reflected back into layers before the second reflective layer without propagating to the display behind the optically diffractive device.

An optical absorber can be formed on a side surface of the optically diffractive device. The optical absorber can be the optical absorber 1104 of FIG. 11, 1204 of FIG. 12A, 12C, or 1254 of FIG. 12B. The optical absorber is configured to absorb the totally reflected light of the first and second colors.

In some implementations, a third optically diffractive component including a third diffractive structure is formed. The third diffractive component can be the third diffractive component 1230 of FIG. 12A, 12B, or 12C. The third diffractive structure can be the third diffractive structure 1232 of FIG. 12A, 12B, or 12C. The third diffractive structure is configured to diffract a third color of light incident at a third incident angle into first order at a third diffracted angle and zero order at the third incident angle. A power of the third color of light at the first order can be substantially higher than the power of the third color of light at zero order. The first, second, and third diffracted angle can be substantially identical to each other. The third incident angle can be different from the first and second incident angles. Each of the first and second reflective layers can be configured to transmit the third color of light having the third incident angle. The second reflective layer can be arranged between the second and third diffractive structures. The third diffractive structure can be fabricated in a way similar to the first diffractive structure in step 1452. The first, second, and third diffractive structures can be independently fabricated. The third diffractive component can also include a carrier film and a diffraction substrate.

A third reflective layer can be arranged behind the third diffractive structure. The third reflective layer can be the third reflective layer 1207 of FIG. 12A, 12B, or 12C. The third reflective layer is configured to totally reflect the third color of light having the third incident angle, such that the third color of light undiffracted (or transmitted) at zero order is reflected back to layers before the third reflective layer and can be absorbed by the optical absorber coated on the side surface of the optically diffractive device.

In some implementations, the first reflective layer includes a first carrier film of the first optically diffractive component. A second diffraction substrate of the second diffractive component is attached to the first carrier film of the first diffractive component by a first intermediate layer, e.g., an OCA layer. A second carrier film of the second diffractive component is attached to a third carrier film of the third optically diffractive component by a second intermediate layer, and the second reflective layer can include the second intermediate layer. The third reflective layer can be attached to a third diffraction substrate of the third diffractive component.

The process 1450 can include arranging the first diffractive component on a substrate that is before the first diffractive component. The substrate can be the field grating substrate 1102 of FIG. 11, 1202 of FIG. 12A, 1252 of FIG. 12B, or 1272 of FIG. 12C. The substrate can include a front surface and a back surface. A front surface of the first diffractive component can be attached to the back surface of the substrate through a refractive index matching material or an OCA layer.

In some examples, the substrate includes a side surface angled to the back surface of the substrate, and the substrate is configured to receive a plurality of different colors of light at the side surface. The substrate can be configured such that the plurality of different colors of light are incident on the side surface with an incident angle substantially identical to 0 degrees and incident on the back surface at respective replay reference angles.

Implementations of the present disclosure can provide a method of fabricating a device including an optically diffractive device and a display. The display can be the display 594 of FIG. 5H, 594A of FIG. 5I, 594B of FIG. 5J, or 594 of FIG. 5K. The optically diffractive device can be the optically diffractive device 598 of FIG. 5H, 598A of FIG. 5I, 598B of FIG. 5J, or 598C of 5K the optically diffractive device 900 of FIGS. 9A and 9B, the optically diffractive device 1000 of FIGS. 10A and 10B, the optically diffractive device 1100 of FIG. 11, or the optically diffractive device 1200 of FIG. 12A, 1250 of FIG. 12B, or 1270 of FIG. 12C.

The method can include forming the optically diffractive device according to the process 1400 of FIG. 14A or the process 1450 of FIG. 14B. In some implementations, the optically diffractive device can include one or more color-selective polarizers and one or more reflective layers for a plurality of different colors of light. The optically diffractive device can be fabricated according to a combination of the process 1400 and the process 1450.

The method can further include arranging the optically diffractive device and the display, such that the optically diffractive device is configured to diffract the plurality of different colors of light to the display.

In some implementations, the optically diffractive device and the display can be arranged such that a back surface of the optical device is spaced from a front surface of the display by a gap, e.g., an air gap. The method can further include forming an anti-reflection coating on at least one of the front surface of the display or the back surface of the optically diffractive device.

In some implementations, the optically diffractive device and the display are arranged by attaching the back surface of the optically diffractive device on the front surface of the display through an intermediate layer. The intermediate layer can be configured to have a refractive index lower than a refractive index of a layer of the optically diffractive device, such that each of the plurality of different colors of light diffracted at zero order by the optically diffractive device is totally reflected at an interface between the intermediate layer and the layer of the optically diffractive device.

The optically diffractive device is configured to diffract the plurality of different colors of light at respective diffracted angles that are substantially identical to each other. Each of the respective diffracted angles can be in a range of −10 degrees to 10 degrees, e.g., −7 degrees to 7 degrees, 0 degrees, or 6 degrees. The display can be configured to re-diffract the diffracted colors of light back through the optically diffractive device. An area of the optically diffractive device can cover an area of the display. The optically diffractive device can include a substrate in front of the optical device that can be configured to receive the plurality of different colors of light at a side surface of the substrate that is angled to a back surface of the substrate.

Implementations of the present disclosure can provide a method of operating an optically diffractive device. The optically diffractive device can be the optically diffractive device 598 of FIG. 5H, 598A of FIG. 5I, 598B of FIG. 5J, or 598C of 5K, the optically diffractive device 900 of FIGS. 9A and 9B, the optically diffractive device 1000 of FIGS. 10A and 10B, the optically diffractive device 1100 of FIG. 11, or the optically diffractive device 1200 of FIG. 12A, 1250 of FIG. 12B, or 1270 of FIG. 12C. The optically diffractive device can be operated to convert an incoming beam including a plurality of different colors of light to individually diffracted colors of light.

Implementations of the present disclosure can provide a method of operating a system including an optically diffractive device and a display. The optically diffractive device can be the optically diffractive device 598 of FIG. 5H, 598A of FIG. 5I, 598B of FIG. 5J, or 598C of 5K, the optically diffractive device 900 of FIGS. 9A and 9B, the optically diffractive device 1000 of FIGS. 10A and 10B, the optically diffractive device 1100 of FIG. 11, or the optically diffractive device 1200 of FIG. 12A, 1250 of FIG. 12B, or 1270 of FIG. 12C. The display includes a plurality of display elements. The display can be the display 594 of FIG. 5H, 594A of FIG. 5I, 594B of FIG. 5J, or 594C of FIG. 5K. The method can be performed by a controller, e.g., the controller 112 of FIG. 1A or 592 of FIG. 5H.

The method can include: transmitting at least one timing control signal to an illuminator to activate the illuminator to emit a plurality of different colors of light onto the optically diffractive device, such that the optically diffractive device converts the plurality of different colors of light to individually diffracted colors of light to illuminate the display and transmitting, for each of the plurality of display elements of the display, at least one respective control signal to modulate the display element, such that the individually diffracted colors of light are reflected by the modulated display elements to form a multi-color three-dimensional light field corresponding to the respective control signals.

In some implementations, the method can further include: obtaining graphic data comprising respective primitive data for a plurality of primitives corresponding to an object in a three-dimensional space, determining, for each of the plurality of primitives, an electromagnetic (EM) field contribution to each of the plurality of display elements of the display by calculating, in a three-dimensional coordinate system, an EM field propagation from the primitive to the display element, generating, for each of the plurality of display elements, a sum of the EM field contributions from the plurality of primitives to the display element, and generating, for each of the plurality of display elements, the respective control signal based on the sum of the EM field contributions to the display element for modulation of at least one property of the display element. The multi-color three-dimensional light field corresponds to the object.

In some implementations, the method include: sequentially modulating the display with information associated with the plurality of different colors in a series of time periods, and controlling the illuminator to sequentially emit each of the plurality of different colors of light to the optical device during a respective time period of the series of time periods, such that each of the plurality of different colors of light is diffracted by the optical device to the display and reflected by the modulated display elements of the display to form a respective color three-dimensional light field corresponding to the object during the respective time period.

The plurality of different colors of light can be diffracted by the optical device at a substantially same diffracted angle to the display. The diffracted angle can be within a range from 0 degrees to 10 degrees.

The illuminator and the optically diffractive device can be configured such that the plurality of different colors of light are incident on the first optically diffractive component of the optically diffractive device with respective incident angles. Each of the respective incident angles is in a range from 70 degrees to 90 degrees. In some cases, the respective incident angles are different from each other. In some cases, the respective incident angles are substantially identical to each other.

An optically diffractive device can include a plurality of diffractive gratings for a plurality of different colors. The gratings can include a transmissive grating, a reflective grating, or a combination thereof. For example, each of the optically diffractive devices shown in FIGS. 9A to 12C includes corresponding transmissive gratings for different colors. In some implementations, an optically diffractive device can include a combination of transmissive gratings and reflective gratings that can be configured for different colors. The optically diffractive device can be configured to diffract an incoming light towards a same direction, or back to an opposite direction.

Figure 15:
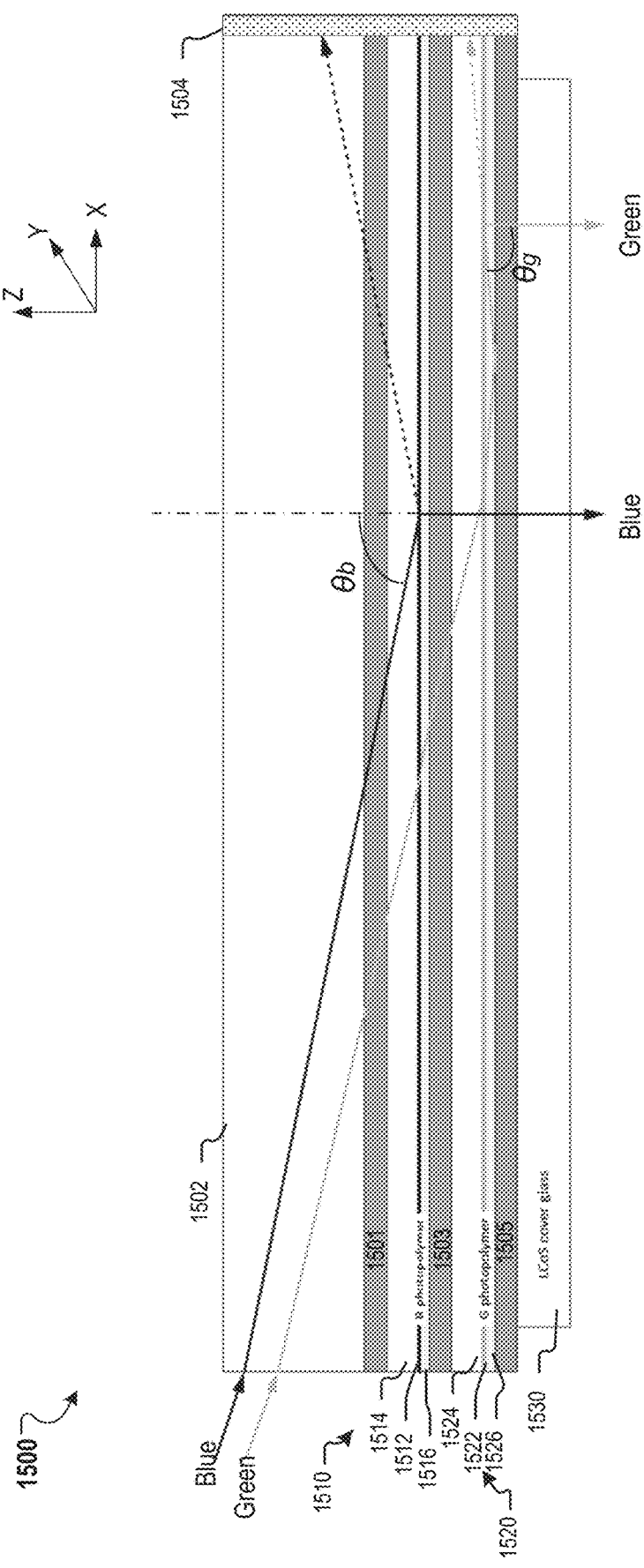
FIG. 15 illustrates an example optical device including a combination of transmissive and reflective diffractive gratings.

FIG. 15 illustrates an example optical device 1500, including a combination of transmissive and reflective diffractive gratings for two respective colors and corresponding reflective layers, for individually diffracting the two colors of light. The optical device 1500 can include a first diffractive component 1510 having a first diffractive grating 1512 for blue color and a second diffractive component 1520 having a second diffractive grating 1522 for green color. Each of the first and second diffractive gratings 1512, 1522 can be a holographic grating, e.g., a Bragg grating or a volume grating. However, the first diffractive grating 1512 for the blue color is configured to be a transmissive grating that diffracts light of blue color forward with respect to the light of blue color incident on the grating 1512, while the second diffractive grating 1522 for the green color is configured to be a reflective grating that reflects light of green color backward with respect to the light of green color incident on the grating 1522. Each of the first and second diffractive gratings 1512 and 1522 can be independently recorded and fixed in a recording medium, e.g., a photosensitive material such as a photopolymer.

The first diffractive component 1510 and the second diffractive component 1520 can be stacked together on a field grating substrate 1502 along a direction, e.g., the Z direction. The field grating substrate 1502 can be an optically transparent substrate, e.g., a glass substrate. The optically diffractive device 1500 can be in front of a display such as LCOS, e.g., the display 594 of FIG. 5H, 594A of FIG. 5I, 594B of FIG. 5J, or 594C of FIG. 5K. For example, the optically diffractive device 1500 can be arranged on a cover glass 1530 of the display through an intermediately layer or spaced by a gap, e.g., an air gap.

Similar to the first and second diffractive components 1110, 1120 in FIG. 11, each of the first and second diffractive components 1510 and 1520 can include a respective substrate 1514, 1524 and a respective carrier film 1516, 1526 on opposite sides of the respective diffractive grating 1512, 1522. The respective diffractive grating 1512, 1522 is between the respective substrate 1514, 1524 and the respective carrier film 1516, 1526. The respective substrate 1514, 1524 can be a glass substrate that can have a refractive index same as or close to the refractive index of the field grating substrate 1502. The respective carrier film 1516, 1526 can be a TAC film. The TAC film can have a lower refractive index than a photosensitive polymer used to record diffractive gratings 1512 and 1522. Adjacent layers or components in the optically diffractive device 1500 can be attached together using one or more intermediate layers of OCA, UV-cured or heat-cured optical glues, optical contacting, or index matching fluid. For example, the first diffractive component 1510 (e.g., the substrate 1514) can be attached to the field grating substrate 1502 through an intermediate layer 1501, e.g., an OCA layer. The first and second diffractive components 1510 and 1520, e.g., the carrier film 1516 and the substrate 1524, can be attached together through another intermediate layer 1503, e.g., an OCA layer. The optically diffractive device 1500 (e.g., the carrier film 1526) can be attached to the cover glass 1530 of the display through an intermediate layer 1505, e.g., an OCA layer.

As shown in FIG. 15, the first diffractive grating 1512 is configured to diffract a blue color of light incident at a first incident angle $\theta_b$, e.g., 78.4°, into first order at a respective diffracted angle, e.g., normal to the display, and zero order at the respective incident angle, and transmit a green color of light at a different incident angle, e.g., due to Bragg selectivity. Thus, there can be no crosstalk between the different colors of light individually diffracted at corresponding diffractive gratings. Each color of light can be polarized. The polarization state of the different colors of light diffracted at first order can be the same, e.g., s or p.

The optically diffractive device 1500 can include a first reflective layer (or blocking layer) between the first grating 1512 and the second grating 1522. The first grating 1512 is configured to diffract the blue color of light incident at the first incident angle $\theta_b$, e.g., 78.4°, into first order at a diffracted angle, e.g., 0° and zero order at the first incident angle. The first reflective layer, e.g., a refractive index of the first reflective layer, is configured to totally reflect the blue color of light diffracted at the first incident angle but to transmit the green color of light incident at a second incident angle. For example, the refractive index of the first reflective layer is lower than the refractive index of a layer immediately before the first reflective layer, e.g., the first grating 1512. The first reflective layer can be a suitable layer between the first grating 1512 and the second grating 1522. In some examples, the first reflective layer is the carrier film 1516, as shown in FIG. 15.

The optically diffractive device 1500 can include a second reflective layer after the second grating 1512 and before the display cover glass 1530. The second reflective layer can be the intermediate layer 1505 and be configured to reflect, e.g., totally, the green color of light back to the second grating 1512. The second grating 1512 is then configured to diffract the green color of light incident at the second incident angle $\theta_g$, e.g., 76.5°, into first order at a diffracted angle, e.g., 0°, back towards the display and zero order at the second incident angle back into the optically diffractive device 1500.

The totally reflected blue color of light by the reflective layer 1516 and the zero order transmitted green color of light are back into the optically diffractive device 1500 to a side of the optically diffractive device 1500. As illustrated in FIG. 15, a surface of the side can be coated with an optical absorber 1504, e.g., a black coating, to absorb the blue and green colors of light at zero order by the corresponding transmissive and reflective diffractive gratings 1512 and 1522.

Each of optically diffractive devices with color-selective polarizers (e.g., as illustrated in FIGS. 9A to 10B) and optically diffractive devices with reflective layers (e.g., as illustrated in FIGS. 11 to 12C and 15) can be considered as a one-dimensional beam expander. The one-dimensional beam expander can be configured to expand an input beam with a width and a height into an output beam with either the same width and a greater height or the same height and a greater width, e.g., by diffracting the input beam at one or more diffracted angles.

The techniques described herein can also be used to expand an input beam into an output beam which is both wider and higher than the input beam, e.g., with a two-dimensional beam expansion. The two-dimensional beam expansion can be achieved by using a two-dimensional beam expander (or a dual beam expander) having at least two one-dimensional beam expanders in series. For example, a first one-dimensional beam expander can be configured to expand an input beam in a first dimension, either width or height, producing an intermediate beam which is wider or higher than the input beam in the first dimension. A second one-dimensional beam expander can be configured to expand the intermediate beam in a second dimension, either height or width, to produce an output beam which is higher or wider than the intermediate beam in the second dimension. Thus, the output beam can be both wider and higher than the input beam in the first dimension and the second dimension.

In such a two-dimensional beam expander configuration, either one or both of the one-dimensional beam expanders can use the color-selective technique, and either one or both of the one-dimensional beam expanders can use the reflective layers technique. Each one-dimensional expander can use any of the detailed embodiments herein including reflective or refractive diffractive elements or a combination of reflective and refractive diffractive elements. The one-dimensional beam expanders can be positioned in a sequential order in any suitable arrangements or configurations.

In some implementations, the intermediate beam between two such one-dimensional expanders can be coupled from the first one-dimensional expander into the second one-dimensional expander using a free-space in-air geometry or through a monolithic or segmented substrate made, for example, of glass or acrylic, and embodying the geometry and functionality of the substrates of both expanders. This coupling can be achieved using one or more coupling elements between the two one-dimensional expanders. The coupling elements can include a mirror, mirrors, or a mirror and a beam-splitting dichroic component, or thin-film elements of further diffractive elements. The coupling elements can take collinear collimated output light of two or more colors from the first one-dimensional expander and convert the collinear collimated output light of the two or more colors to two or more independent collimated but not collinear intermediate beams, each for one of the colors, to satisfy the color-dependent angular input requirements, if any, of the second one-dimensional expander. Similarly, the first one-dimensional expander can have as its input either collinear collimated outputs of two or more light sources (e.g., laser diodes), each with a different color, or can have as its inputs two or more independent collimated but not collinear intermediate beams, each for one color from two or more light sources.

Display Zero Order Light Suppression

A display (e.g., LCoS) includes an array of display elements (e.g., pixels or phasels). There are gaps between the display elements on the display. The gaps occupy part of an area of the display, e.g., in a range from 5% to 10%. The gaps can be considered as dead gaps because display materials (e.g., liquid crystal) at these gaps are not controlled by an input control signal and thus no holographic information can be input into these gaps. In contrast, holographic information can be input into the display elements that are controlled (or modulated) to diffract light to reconstruct a holographic scene corresponding to the holographic information.

Figure 16:
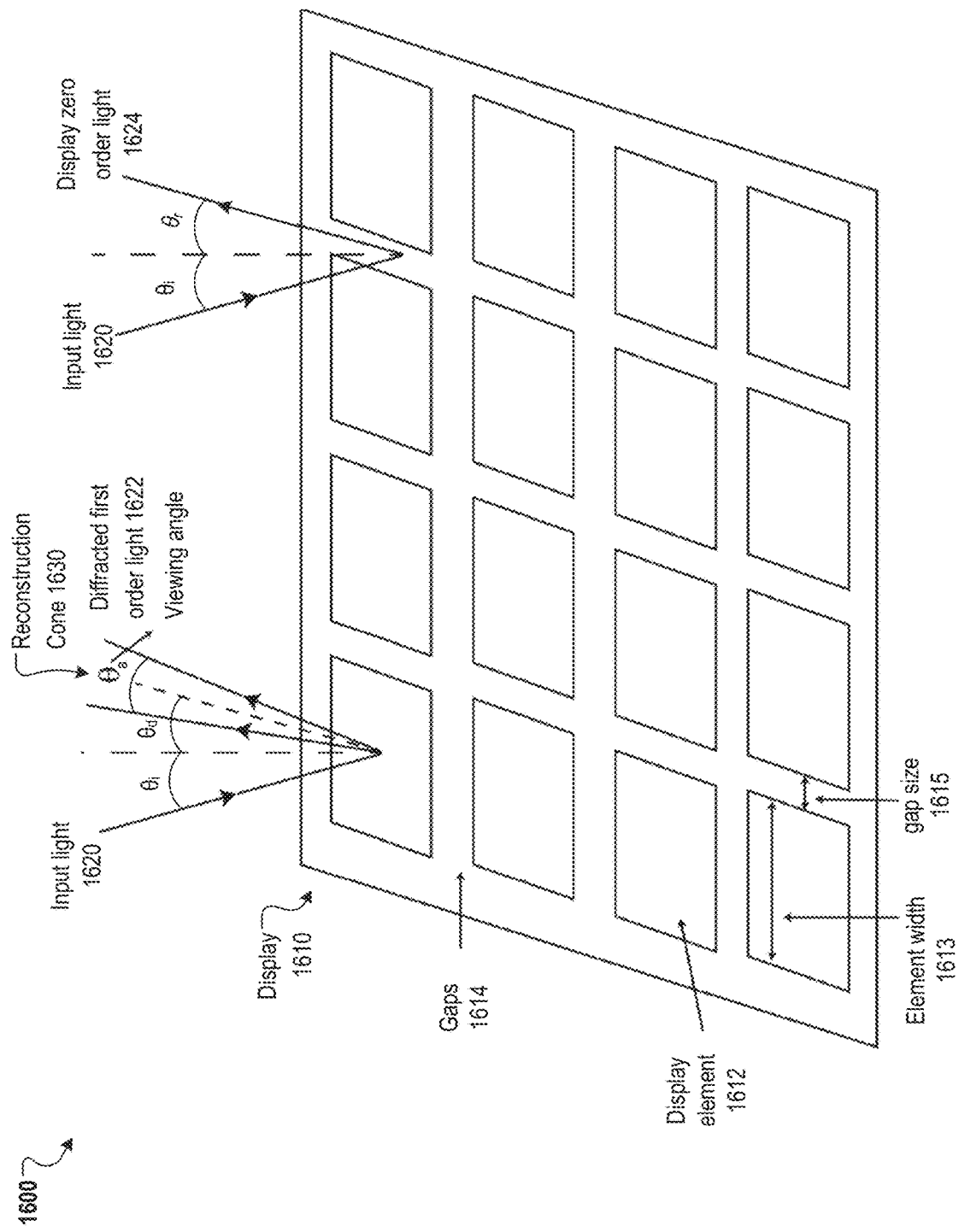
FIG. 16 illustrates an example of incident light being diffracted by display elements of a display and reflected at gaps between the display elements on the display.

FIG. 16 illustrates an example 1600 of incident light 1620 incident on a display 1610. The display 1610 can be the display 114 of FIG. 1A, the display 156 of FIG. 1B, the display 512 of FIG. 5A, the display 524 of FIG. 5B, the display 534 of FIG. 5C, the display 544 of FIG. 5D, the display 564 of FIG. 5E, the display 574 of FIG. 5F, the display 584 of FIG. 5G, the display 594 of FIG. 5H, the display 594A of FIG. 5I, the display 594B of FIG. 5J, the display 594C of FIG. 5K, the display 600 of FIG. 6A, or the display 650 of FIG. 6B. Other display arrangements are also possible.

As an example, the display 1610 can be an LCoS made of liquid crystal. The display 1610 includes an array of display elements 1612 (e.g., the display element 160 of FIG. 1B) that are spaced apart by gaps 1614. Each display element 1612 can have a square (or rectangular or any other suitable) shape that has an element width 1613, e.g., 5 µm. The display element 1612 can also be any other suitable shape, e.g., polygon. Adjacent display elements 1612 is separated by a gap 1614 with a gap size 1615, e.g., less than 0.5 µm.

The incident light 1620 can be a collimated light beam that can have a beam size larger than an entire area of the display 1610, such that the incident light 1620 can illuminate the entire area of the display 1610. When the incident light 1620 is incident on the display 1610 at an incident angle $\theta_i$, a first portion of the incident light 1620 (e.g., 90% to 95% of the light 1620) illuminates the display elements 1612 and a second portion of the incident light 1620 (e.g., 5% to 10% of the light 1620) illuminates the gaps 1614. When the display elements 1612 are modulated with holographic information (e.g., a hologram corresponding to holographic data), e.g., by voltages, the first portion of the incident light 1620 can be diffracted by the modulated display elements 1612 at first order with a diffraction angle $\theta_d$ to become diffracted first order light 1622.

The diffracted first order light 1622 forms a holographic light field that can be a reconstruction cone (or frustum) 1630 with a viewing angle $\theta_a$. The viewing angle $\theta_a$ is dependent on one or more characteristics of the display 1610 (e.g., the element pitch 1613) and one or more wavelengths of the incident light 1620. In some examples, a half of the viewing angle $\theta_a$ is within a range from 3° to 10°, e.g., 5°. For example, for the pitch d=3.7 µm, the viewing angle $\theta_a$ is about 7° in air for blue color of light ($\lambda$=460 nm) and about 10° in air for red color of light at ($\lambda$=640 nm). Light with a larger wavelength corresponds to a larger viewing angle.

As the gaps 1614 of the display 1610 are not modulated by any holographic information, the display 1610 at the gaps 1614 acts like a reflective mirror. When the second portion of the incident light 1620 is incident on the gaps 1614, the second portion of the incident light 1620 can be reflected at the gaps 1614 with a reflected angle $\theta_r$ that has an absolute value identical to that of the incident angle $\theta_i$. In the present disclosure herein, "A is identical to B" indicates that an absolute value of A is identical to that of B, and A's direction can be either the same or different from B's direction. The reflected second portion of the incident light 1620 can be considered as at least a part of display zero order light 1624. If the incident angle $\theta_i$ is less than the half of the apex angle $\theta_a$, e.g., $\theta_i=0°$, the display zero order light 1624 may undesirably appear in the reconstruction cone, which can affect an effect of the holographic scene.

The display zero order light can also include any other unwanted light from the display, e.g., diffracted light at the gaps, reflected light from the display elements, or reflected light from a display cover on the display. Higher orders of the display zero order light 1624 can include the diffracted light at the gaps. In some implementations, the display 1610 is configured to suppress the higher orders of the display zero order light, e.g., by including irregular or non-uniform display elements that have different sizes. The display elements can have no periodicity, and can form a Voronoi pattern, e.g., as illustrated in FIG. 6A.

In the present disclosure herein, for illustration purposes only, reflected second portion of the incident light is considered as a representative of display zero order light.

Figure 17A:
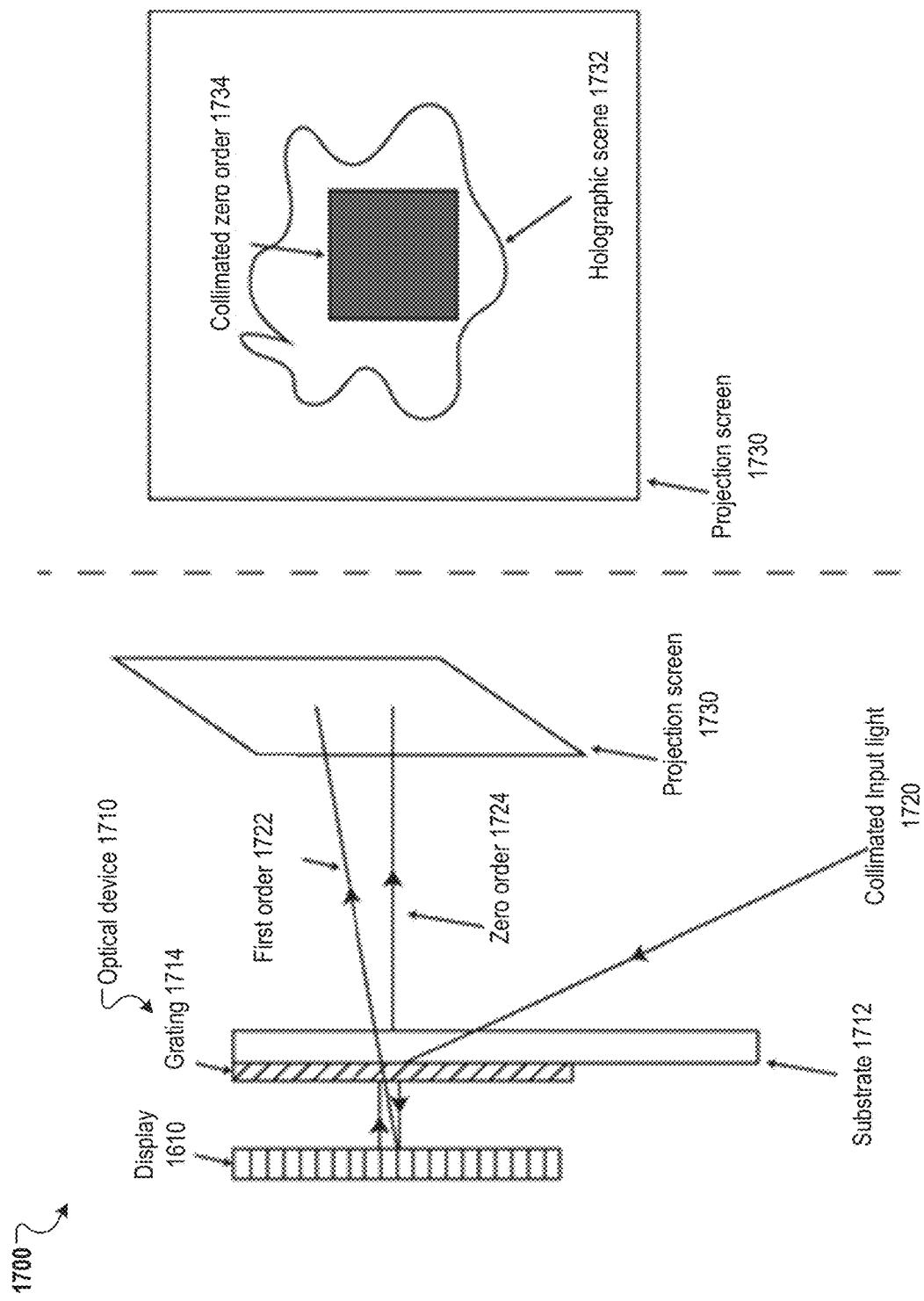
FIG. 17A illustrates an example of display zero order light within a holographic scene displayed on a projection screen.
Figure 17B:
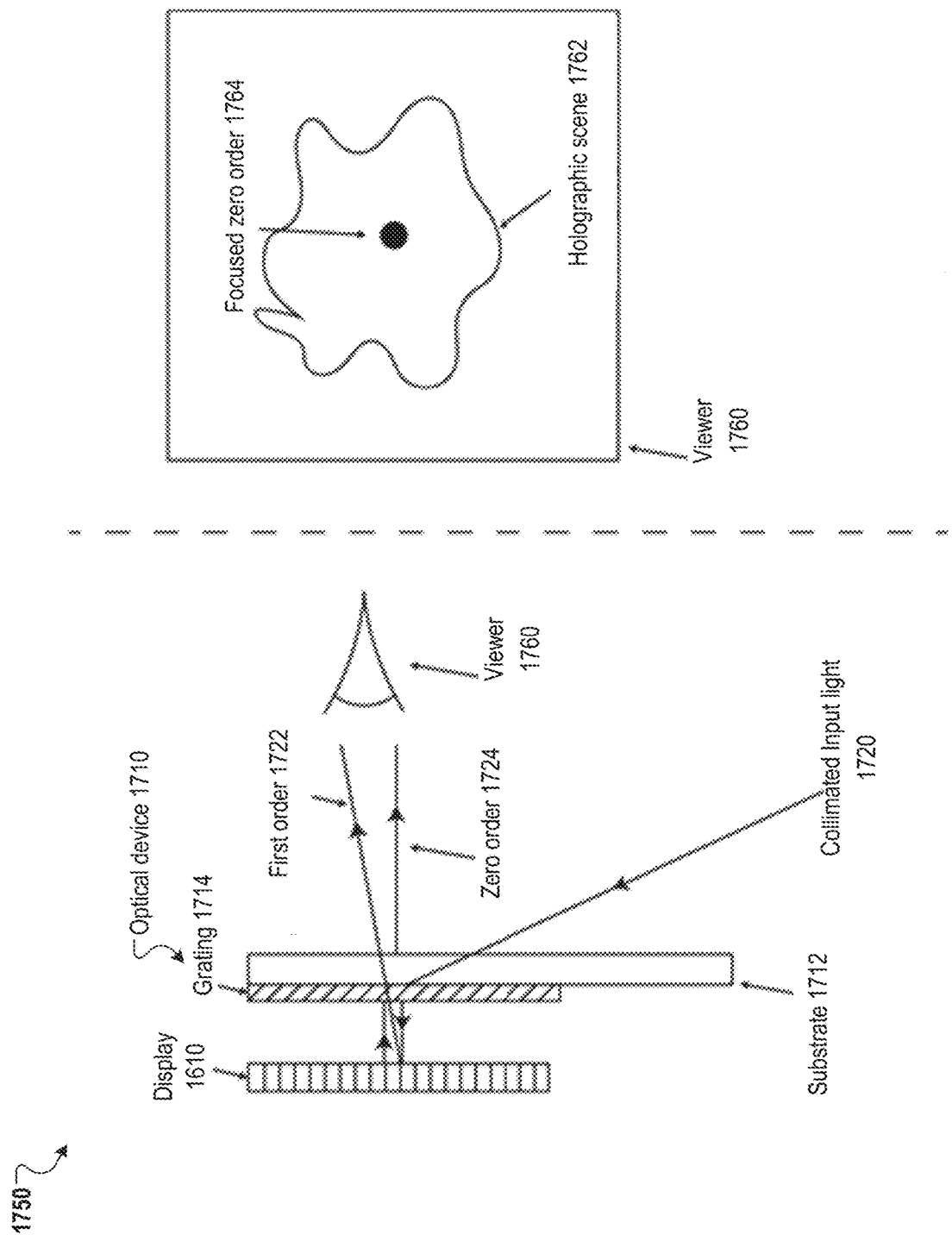
FIG. 17B illustrates an example of display zero order light within a holographic scene displayed on a viewer's eye.

FIGS. 17A-17B illustrate examples 1700, 1750 of display zero order light within a holographic scene displayed on a projection screen (FIG. 17A) and on a viewer's eye (FIG. 17B). Collimated input light 1720 is coupled by an optical device 1710 to illuminate the display 1610 at normal incidence, i.e., $\theta_i=0°$. The optical device 1710 can be a waveguide, a beam splitter, or an optically diffractive device. For illustration, the optical device 1710 is an optically diffractive device, e.g., the device 598 of FIG. 5H, that includes a grating 1714 formed on a substrate 1712. However, as noted above, reflective optical devices may be used.

A first portion of the input light 1720 is incident on the display elements 1612 of the display 1610 that are modulated with holographic information, and is diffracted by the display elements 1612 to become diffracted first order light 1722. A second portion of the input light 1720 is incident on the gaps 1614 of the display 1610, and is reflected at the gaps 1614 to become at least a part of display zero order light 1724. The diffracted first order light 1722 propagates in space to form a reconstruction cone with a viewing angle, e.g., 10°. As the incident angle, e.g., 0°, is less than a half of the viewing angle, e.g., 5°, the display zero order light 1724 propagating with a reflected angle identical to the incident angle, e.g., 0°, is within the reconstruction cone.

As illustrated in FIG. 17A, the diffracted first order light 1722 forms a three-dimensional holographic scene, a two-dimensional cross-section 1732 of which may be observed on a two-dimensional (2D) projection screen 1730 that is spaced away from the display 1610 along a direction perpendicular to the display 1610. The display zero order light 1724 appears to be collimated zero order light 1734 as an undesired image (e.g., having a rectangular shape) within the holographic scene 1732. As illustrated in FIG. 17B, the diffracted first order light 1722 forms a holographic scene 1762 on an eye of a viewer 1760. The display zero order light 1724 is focused by a lens of the eye of the viewer 1760 and appears to be focused zero order light 1764 as an undesired spot within the holographic scene 1762.

To improve an effect of a reconstructed holographic scene and thus a performance of a display system, it is desirable to suppress (or even eliminate) display zero order light in the reconstructed holographic scene. Implementations of the present disclosure provide multiple techniques, e.g., five techniques as described below, to suppress (or even eliminate) the display zero order light in the reconstructed holographic scene. The techniques can be applied individually or in a combination thereof.

The display zero order light can be suppressed in the reconstructed holographic scene with a light suppression efficiency. The light suppression efficiency is defined as one minus a ratio between an amount of the display zero order light in the holographic scene with the suppression using the technique described herein and an amount of display zero order light in the holographic scene without suppression. In some examples, the light suppression efficiency is more than a predetermined percentage, e.g., 50%, 60%, 70%, 80%, 90%, or 99%. In some examples, the light suppression efficiency is 100%. That is, all the display zero order light is eliminated in the holographic scene.

In a first technique referred to as "phase calibration," phases of display elements of a display can be adjusted to have a predetermined phase range, e.g., $[0, 2\pi]$. In such a way, a signal to noise ratio (S/N) between a holographic scene formed based on the calibrated phases and display zero order light can be increased.

Figure 18:
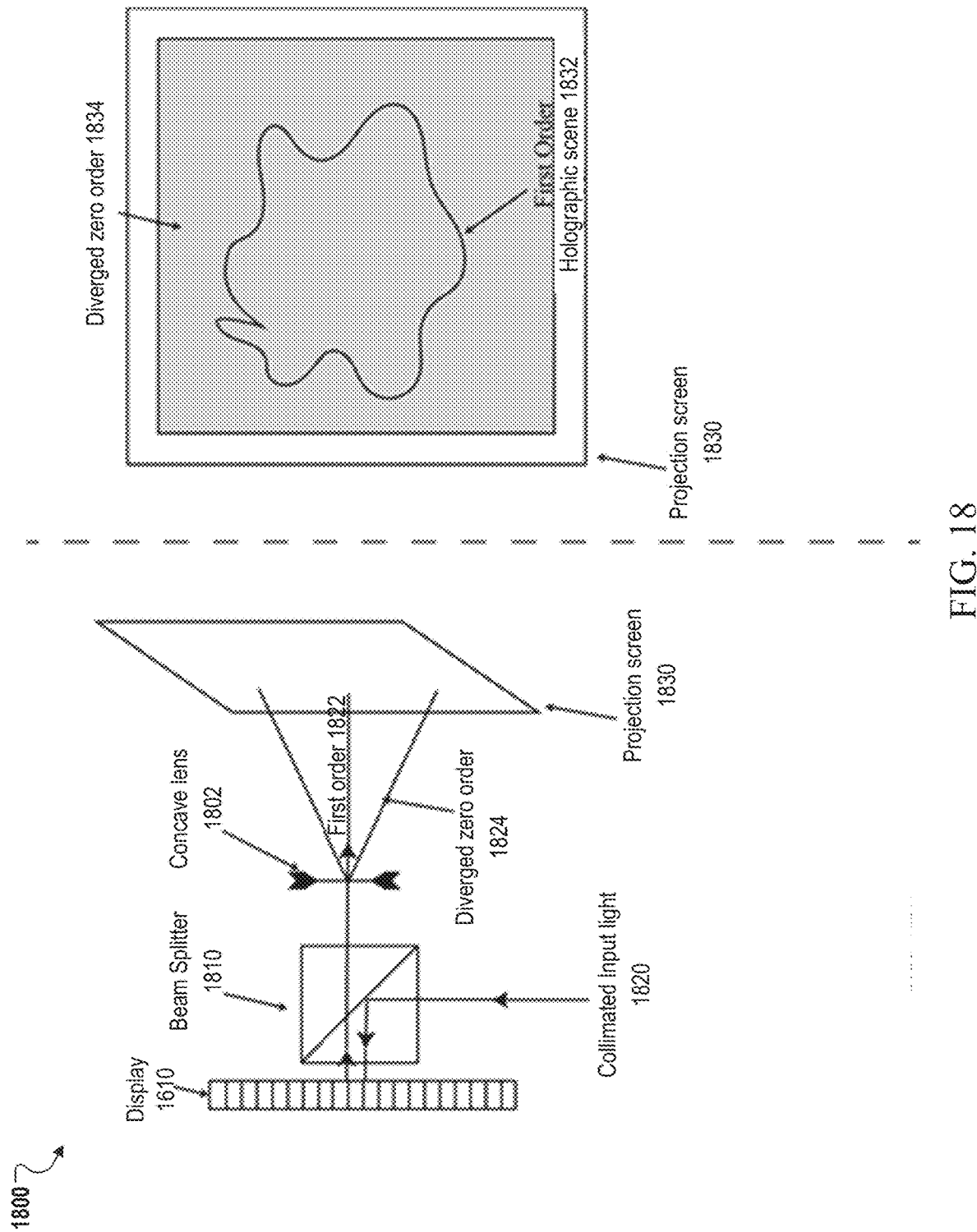
FIG. 18 illustrates an example of suppressing display zero order light in a holographic scene displayed on a projection screen by diverging the display zero order light.

In a second technique referred to as "zero order beam divergence," as illustrated in FIG. 18, a display zero order light beam is diverged by an optically defocusing device (e.g., a concave lens) to have a lower power density. In contrast, a hologram is preconfigured, such that collimated light beam incident on display elements modulated by the hologram is diffracted to become a converged light beam. The converged light beam is re-focused by the optically defocusing device to form a holographic scene with a higher power density. Thus, the display zero order light beam is diluted or suppressed in the holographic scene.

In a third technique referred to as "zero order light deviation," as illustrated in FIGS. 19A-19C, 20A-20B, 21, and 22, display zero order light is deviated away from a holographic scene. An optical device is configured to couple input light to illuminate a display at an incident angle larger than a half of a viewing angle of a reconstructed cone that forms the holographic scene. The display zero order light propagates away from the display at a reflected angle identical to the incident angle. A hologram corresponding to the holographic scene is preconfigured such that diffracted first order light propagates away from the display to form the reconstruction cone in a same way as that when the incident angle is 0°. Thus, the display zero order light is deviated from the reconstruction cone and accordingly the holographic scene.

Figure 23A:
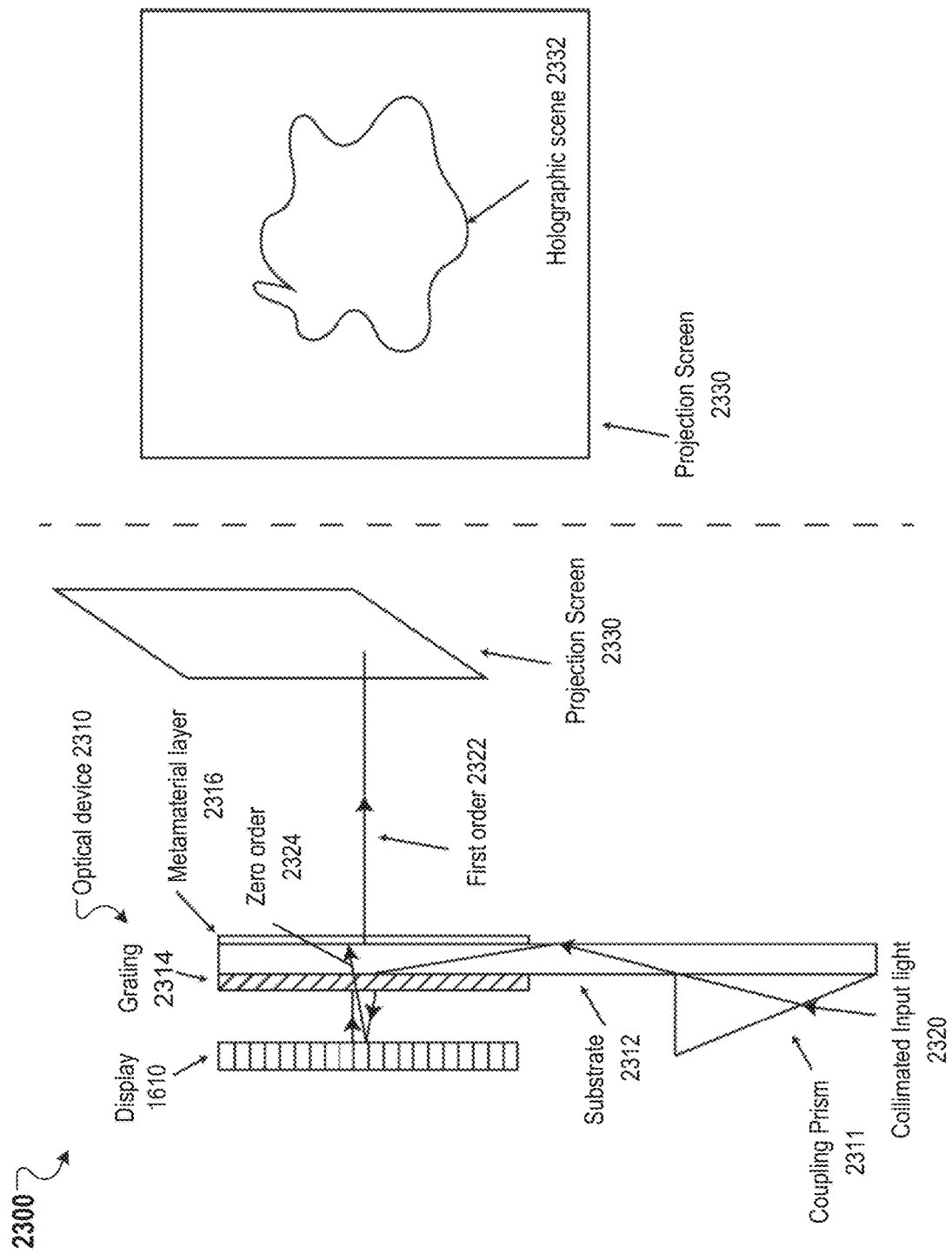
FIG. 23A illustrates an example of suppressing display zero order light in a holographic scene displayed on a projection screen by absorbing the display zero order light reflected from the display with a metamaterial layer.
Figure 23B:
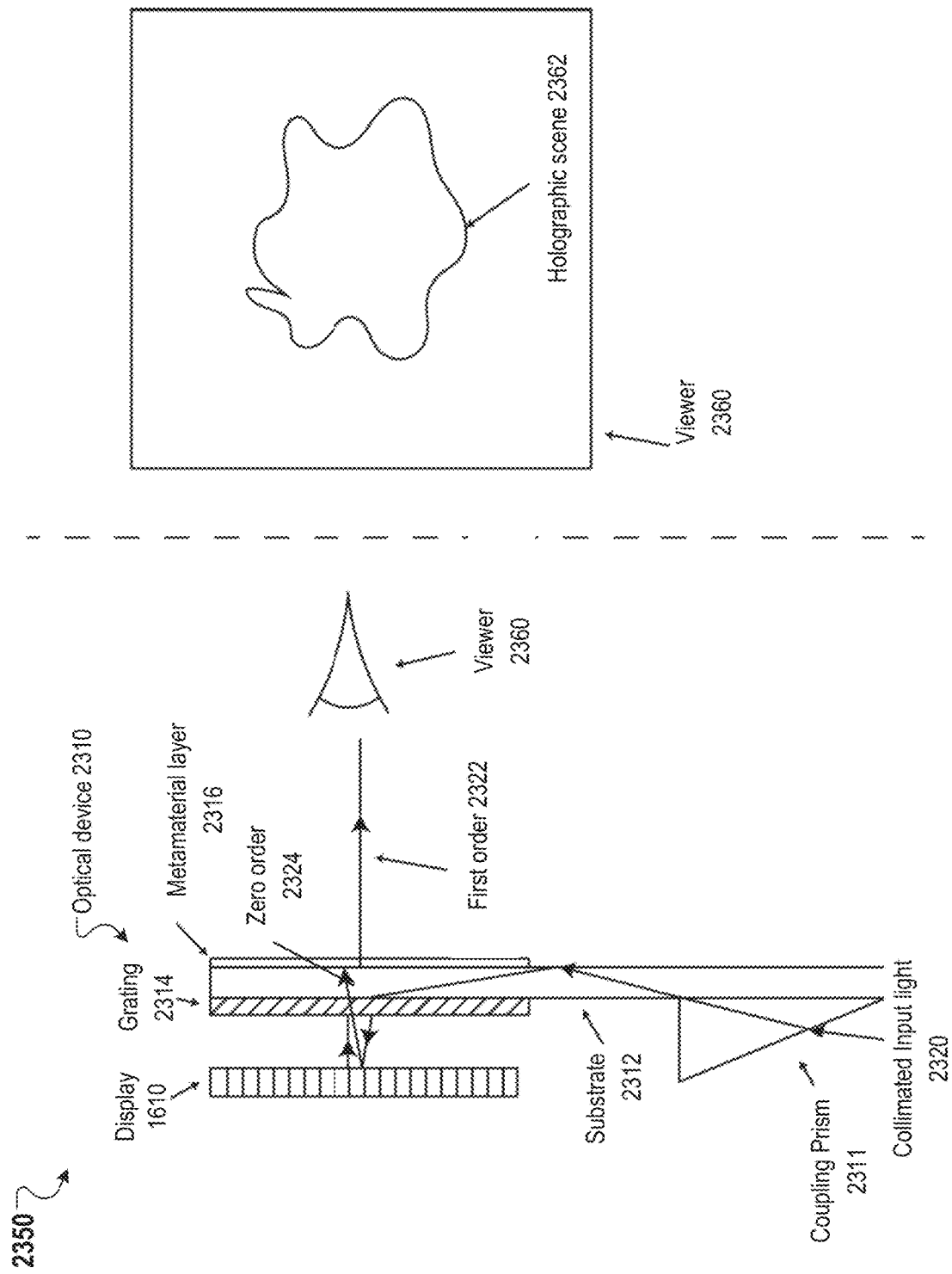
FIG. 23B illustrates an example of suppressing display zero order light in a holographic scene displayed on a viewer's eye by blocking (or absorbing) the display zero order light reflected from the display with a metamaterial layer.

In a fourth technique referred to as "zero order light blocking," as illustrated in FIGS. 23A-23B, display zero order light is first deviated away from diffracted first order light according to the third technique and then blocked (or absorbed) by an optically blocking component, e.g., a metamaterial layer or an anisotropic optical element such as a louver film. The optically blocking component is configured to transmit a light beam having an angle smaller than a predetermined angle and block a light beam having an angle larger than the predetermined angle. The predetermined angle can be smaller than the incident angle of the input light and larger than a half of the viewing angle of the reconstruction cone.

In a fifth technique referred to as "zero order light redirection," as illustrated in FIGS. 24 to 33, display zero order light is first deviated away from diffracted first order light according to the third technique and then redirected even further away from the diffracted first order light by an optically diffractive component, e.g., a diffractive grating.

When the input light includes different colors of light simultaneously or sequentially, as illustrated in FIGS. 30A-30B, 31A-31B, 32, and 33, the optically diffractive component can include one or more corresponding diffractive gratings that are configured to diffract the different colors of light towards different directions in a plane or in space to reduce color crosstalk among the different colors of light.

The above five techniques are mainly used to suppress main reflected zero order of the whole display zero order light. In a sixth technique, the display is configured to suppress higher orders of the whole display zero order light, e.g., by using irregular or nonuniform display elements having different sizes or shapes or both. The display elements can have no periodicity, and can form a Voronoi pattern or be Voronoil patterned display elements. In some implementations, the display can be the display 600 of FIG. 6A or the display 650 of FIG. 6B.

In the following, the first five techniques are described with more details.

First Technique—Phase Calibration

Phase calibration is a technique that can increase a contrast in a display, e.g., by pulling a direct current (DC) term of a computed hologram out, which can be implemented by a software or program instructions. Phase calibration can achieve an accuracy beyond a device calibration that may be bad or unknown.

In some implementations, a hologram includes respective phases for display elements of a display. As described above, the respective phase can be a computed EM contribution from one or more corresponding objects to each display element. According to the phase calibration technique, the hologram is configured by adjusting (e.g., scaling and/or shifting) the respective phases for the display elements to have a predetermined phase range, e.g., [0, 2π], to get a higher contrast in the display.

The respective phases can be adjusted according to an expression:

$$\varnothing_a = A\varnothing_i + B \quad (15),$$

where $\varnothing_i$ represents an initial phase value of a respective phase, $\varnothing_a$ represents an adjusted phase value of the respective phase, and A and B are constants for the respective phases, A being in [0, 1] and B being in [0, 2π]. In some examples, A is the same for all display elements. In some examples, B is the same for all display elements. In some examples, A is different for different display elements. In some examples, B is different for different display elements.

In a perfectly calibrated and linearized display system, a pair of values (1, 0) for (A, B) works best to give the best contrast by proving the highest diffraction efficiency for the input hologram. However, due to nonlinear LC curves and inaccurate calibration of the display, the respective phases for the display elements are typically not in a range of [0, 2π], and thus the display contrast is degraded. As the input light is the same, the display zero order light will be the same. If the diffraction efficiency of the hologram is increased, the display contrast can be higher and the S/N ratio of the holographic scene can be higher.

According to the phase calibration technique, the display contrast can be improved by scaling and shifting the respective phases in a phase coordinate system, such that the respective phases are adjusted to have a range, e.g., exactly [0, 2π]. In some cases, the range of the adjusted respective phases can be smaller or larger than the 2π range depending on the calibration and the maximum phase shift of the working LC. Therefore, for each display, there can be a pair of (A, B) that produces the highest diffraction efficiency resulting in the highest S/N ratio.

The respective phases for the display elements can be adjusted by adjusting the constants A and B such that a light suppression efficiency for the holographic scene is maximized. The light suppression efficiency can be larger than a predetermined percentage, e.g., 50%, 60%, 70%, 80%, 90%, or 99%.

In some implementations, the constants A and B are adjusted by a machine vision algorithm or a machine learning algorithm such as an artificial intelligence (AI) algorithm. In the machine vision algorithm, a hologram is designed to create pseudo-random points focused on a transmissive diffusing screen in a plane at a specific distance from the display. Then, the hologram is computed for each of three primary colors red, green, and blue (RGB) in a way that the RGB reconstructed points are aligned perfectly on that plane. Then the algorithm is set to find a pair of values (A, B) for each color so that a display contrast is at an acceptable level. At the beginning for a pair of values (A, B), e.g., [1, 0], a camera at the specific distance takes a picture of the pattern on the screen. In the taken picture, a brightness of all the points (X) is averaged, and also one small area (Y) on a background noise is measured. The ratio of X/Y is calculated and checked if it is larger than a specific value. If not, the pair of values (A, B) will be changed and the process is automatically repeated until an acceptable pair of values (A, B) is determined.

Second Technique—Zero Order Beam Divergence

FIG. 18 illustrates an example system 1800 of suppressing display zero order light in a holographic scene displayed on a projection screen 1830 by diverging the display zero order light beam. A beam splitter 1810 is positioned in front of a display 1610 and couples a collimated input light beam 1820 to illuminate the display 1610 at normal incidence. A first portion of the light beam 1820 is diffracted by display elements modulated by a hologram to become a diffracted first order light beam 1822, and a second portion of the light beam 1820 is reflected by gaps of the display 1610 to become a display zero order light beam 1824. An optically diverging component, e.g., a concave lens 1802, is arranged downstream the beam splitter 1810 and before the projection screen 1830. In some examples, the optically diverging component includes a convex lens arranged at a position further away from the projection screen 1830 than the concave lens 1802 such that a collimated light beam is first focused and then diverged towards the projection screen 1830.

When the display zero order light beam 1824 comes off the display 1610, the display zero order light beam 1824 is collimated. Thus, when the display zero order light beam 1824 transmits through the concave lens 1802, the display zero order light beam 1824 is diverged by the concave lens 1802, as illustrated in FIG. 18. Thus, a power density of the diverged display zero order light beam 1824 is decreased or diluted over the diverged beam area, compared to that of the original collimated input light beam 1820.

According to the second technique, the hologram (or respective phases) modulating display elements of the display 1610 can be preconfigured such that the diffracted first order light beam 1822 is converged when coming off the display 1610. The degree of convergence is configured to correspond to a degree of divergence of the concave lens 1802. That is, the divergence of the concave lens is compensated by the configured convergence. Thus, when the converged diffracted first order light beam 1822 transmits through the concave lens 1802, the diffracted first order light beam 1822 is collimated to form a reconstructed holographic scene 1832 on a projection screen 1830, which is the same as that without the pre-configuration of the hologram and the concave lens 1802. Thus, the reconstructed holographic scene 1832 has a power density the same as that of the collimated input light beam 1820. In contrast, a display zero order light beam 1834 is diverged and smeared (or diluted) across the projection screen 1830 with a decreased power density. The projection screen 1830 is spaced away from the display 1610 with a specified distance, e.g., 50 cm. The display zero order light beam 1834 can be dim and appear like a background noise in the holographic scene 1832. In such a way, a light suppression efficiency can be increased, e.g., to more than 99%, and an S/N ratio of the holographic scene 1832 can be increased.

In some implementations, the hologram is preconfigured by adding corresponding phases to the respective phases for the display elements of the display 1610. The respective phases for the display elements can be the respective phases adjusted according to the first technique—phase calibration. The corresponding phase for each of the display elements is expressed as:

$$\emptyset = \frac{\pi}{\lambda f}(ax^2 + by^2), \qquad (16)$$

where Ø represents the corresponding phase for the display element, λ represents a wavelength of the input light 1820, f represents a focal length of the optically diverging component (e.g., the concave lens 1802), x and y represent coordinates of the display element in a 2D display coordinate system, and a and b represent constants. A pair of values (a, b) can be adjusted based on applications, e.g., for introducing astigmatism for people whose eyes suffer from astigmatism. If a is identical to b, e.g., a=1 and b=1, a defocusing effect of the corresponding phase is circular; if a is different from b, e.g., a=1 and b=0.5, the defocusing effect is elliptical and can match a 2:1 anamorphic focusing lens. If either a=0 or b=0, but not both, the defocusing effect can produce a line focus rather than an area focus and can match a cylindrical focusing lens.

In some implementations, the hologram is preconfigured by adding a virtual lens for a configuration cone when designing (or simulating) the holographic scene in a 3D software application such as Unity, e.g., the application 106 of FIG. 1A. The configuration cone is described with further details in FIGS. 20A-20B. The diffracted first order light beam 1822 forms a reconstruction cone with a viewing angle, and the configuration cone corresponds to the reconstruction cone and has an apex angle identical to the viewing angle. In the simulation, the configuration cone can be moved with respect to the display in a global 3D coordinate system along a direction perpendicular to the display with a distance corresponding to a focal length of the optically diverging component. The configuration cone can be moved just once for all objects in the reconstruction cone. Holographic data, e.g., primitive lists for the objects, are then generated based on the moved configuration cone in the global 3D coordinate system.

Third Technique—Zero Order Light Deviation

As described above in FIGS. 16 and 17A-17B, a reconstruction cone of a holographic scene (or holographic content) has a viewing angle depending on a display and a wavelength of an input light beam. If display zero order light can be deviated outside of the reconstruction cone, the holographic scene can be observed without the display zero order light.

Figure 19A:
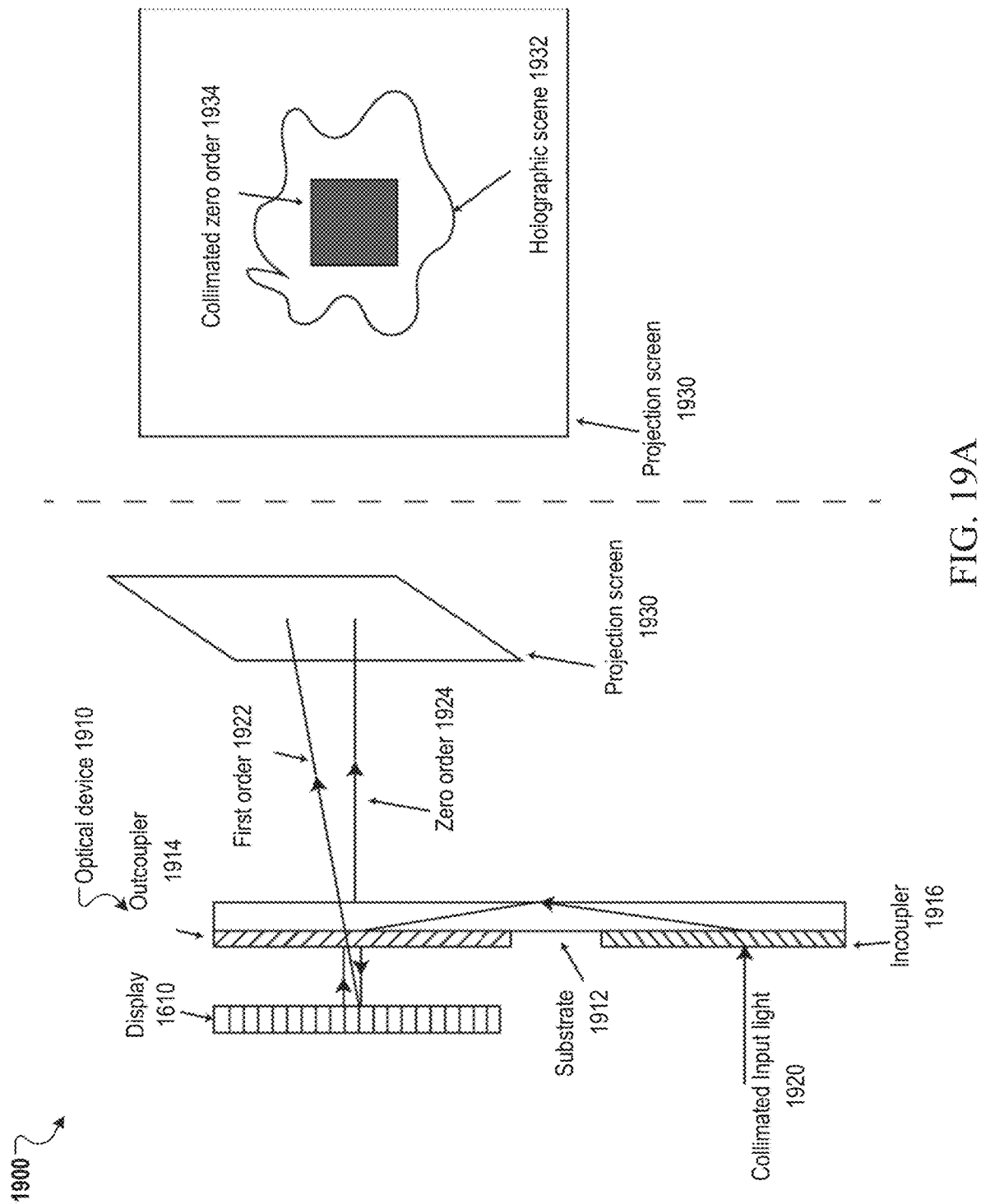
FIG. 19A illustrates an example of display zero order light in a holographic scene when the display is illuminated with light at normal incidence.

FIG. 19A illustrates an example system 1900 of display zero order light in a holographic scene when a display 1610 is illuminated with collimated input light 1920 at normal incidence, i.e., $\theta_i=0°$. An optical device 1910 couples the collimated input light 1920 to illuminate the display 1610 at the normal incidence. In some implementations, as illustrated in FIG. 19A, the optical device 1910 is a waveguide device, e.g., the waveguide device 588 of FIG. 5G, that includes an incoupler 1916 and an outcoupler 1914 formed on a substrate 1912.

A first portion of the input light 1920 is incident on display elements of the display 1610 that are modulated with a hologram, and is diffracted by the display elements to become diffracted first order light 1922. A second portion of the input light 1920 is incident on gaps of the display 1610, and is reflected at the gaps to become at least a part of display zero order light 1924. The diffracted first order light 1922 propagates in space to form a reconstruction cone with a viewing angle, e.g., 10°. As the incident angle, e.g., 0°, is less than a half of the viewing angle, e.g., 5°, the display zero order light 1924 propagating with a reflected angle identical to the incident angle, e.g., 0°, is within the reconstruction cone. As illustrated in FIG. 19A, the diffracted first order light 1922 forms a holographic scene 1932 on a two-dimensional (2D) projection screen 1930. The display zero order light 1924 appears to be collimated zero order light 1934 as an undesired image within the holographic scene 1932.

Figure 19B:
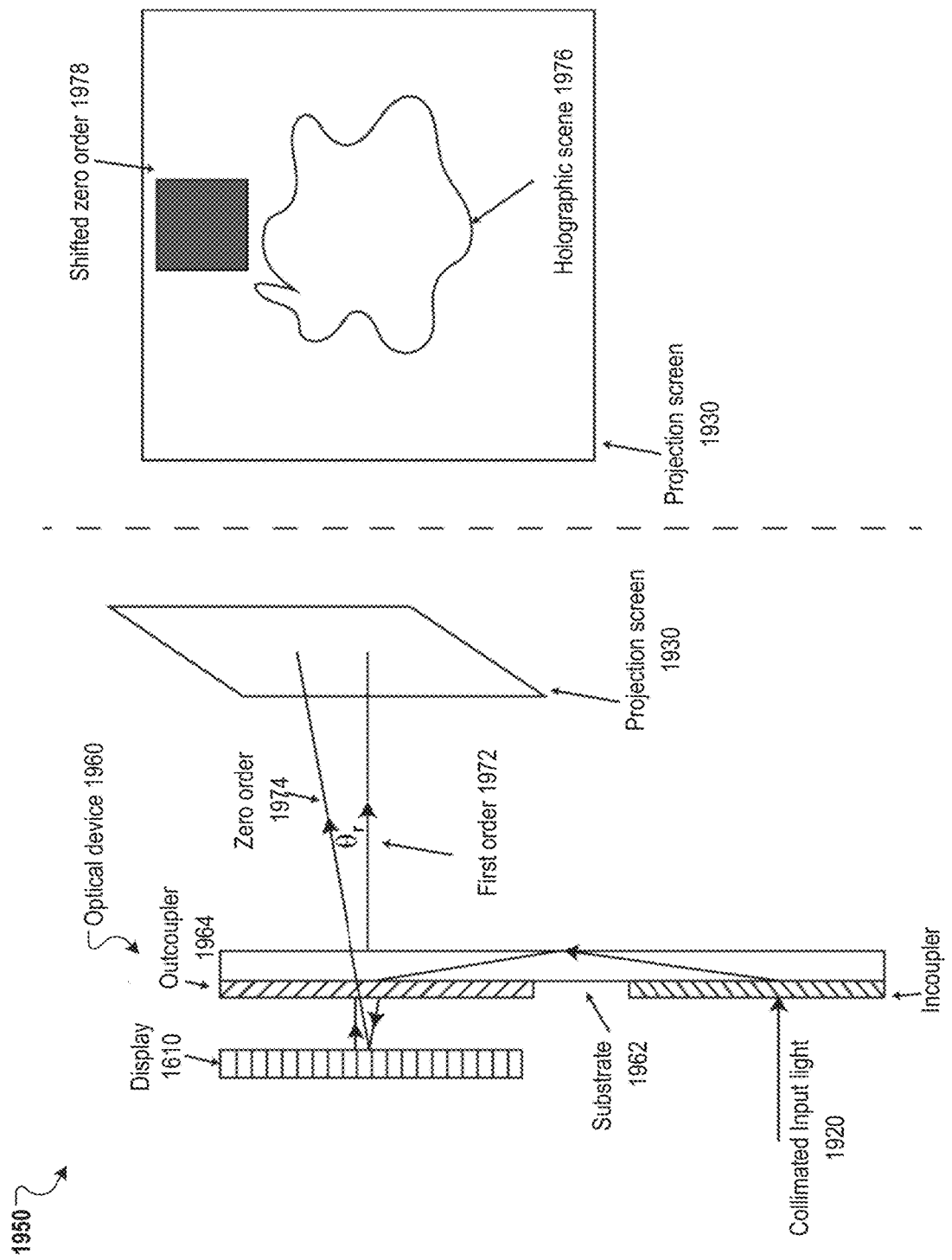
FIG. 19B illustrates an example of suppressing display zero order light in a holographic scene displayed on a projection screen by directing the display zero order light away from the holographic scene when the display is illuminated with light at an incident angle.

FIG. 19B illustrates an example 1950 of suppressing display zero order light in a holographic scene displayed on the projection screen 1930 by directing (or deviating) display zero order light away from the holographic scene. Different from the optical device 1910, an optical device 1960, including incoupler 1966 and outcoupler 1964 formed on a substrate 1962, is configured to couple the collimated input light 1920 to illuminate the display 1610 at an incident angle $\theta_i$ larger than 0°. Due to reflection, display zero order light 1974 comes off the display 1610 at a reflected angle $\theta_r$ identical to the incident angle $\theta_i$.

Figure 19C:
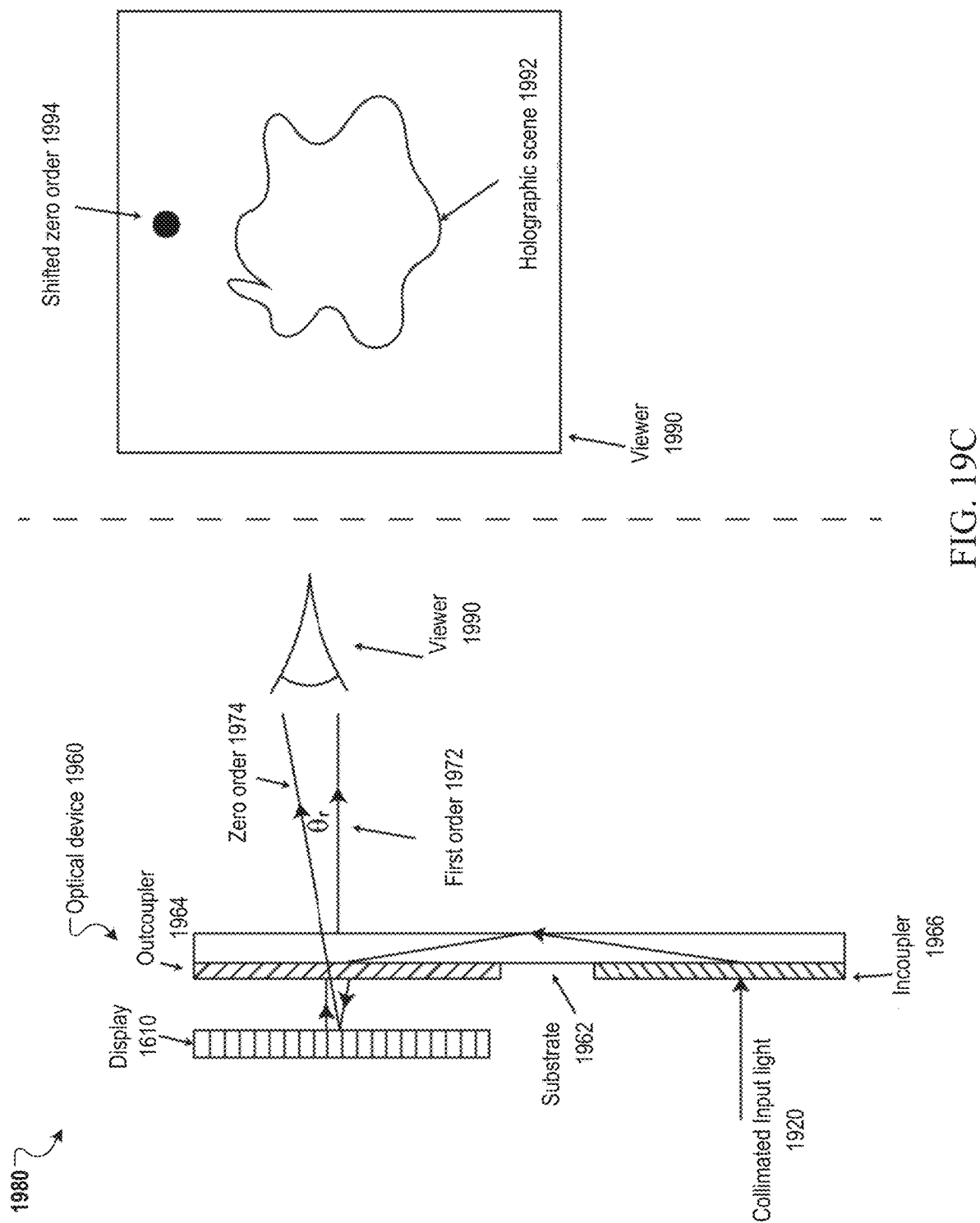
FIG. 19C illustrates an example of suppressing display zero order light in a holographic scene displayed on a viewer's eye by directing the display zero order light away from the holographic scene when the display is illuminated with light at an incident angle.

According to the third technique, a hologram (or respective phases) modulating display elements of the display 1610 can be preconfigured such that diffracted first order light 1972 comes off the display 1610 at normal incidence. That is, the deviation of the incident angle is compensated by the configured hologram. Thus, the diffracted first order light beam 1972 forms a reconstruction cone that appears as a reconstructed holographic scene 1976 on the projection screen 1930, the same as when the incident angle is at normal incidence. When the incident angle, e.g., 6°, is larger than a half of the viewing angle of the reconstruction cone, e.g., 5°, the display zero order light 1974 can be deviated or shifted away from the reconstruction cone. Accordingly, as illustrated in FIG. 19B, a shifted display zero order image 1978 formed by the display zero order light 1974 can be outside of the holographic scene 1976 on the projection screen 1930. Similarly, as illustrated in FIG. 19C, when seen by a viewer 1990, a display zero order spot 1994 formed by the display zero order light 1974 can be outside of a holographic scene 1992 formed by the diffracted first order light 1972 on an eye of the viewer 1990. By configuring a direction of the incident angle, the display zero order light can be deviated up or down or to a side in space.

In some implementations, the hologram is preconfigured by adding corresponding phases to the respective phases for the display elements of the display 1610. The respective phases for the display elements can be the respective phases adjusted according to the first technique—phase calibration. The corresponding phase for each of the display elements is expressed as:

$$\emptyset = \frac{2\pi}{\lambda}(x\cos\theta + y\cos\theta), \quad (17)$$

where Ø represents the corresponding phase for the display element, λ represents a wavelength of the input light 1920, x and y represent coordinates of the display element in a 2D display coordinate system (or in a 3D coordinate system), and θ represents an angle corresponding to the incident angle $\theta_i$, e.g., $\theta=\theta_i$.

In some implementations, the hologram is preconfigured by adding a virtual prism for a configuration cone when designing (or simulating) the holographic scene in a 3D software application such as Unity, e.g., the application 106 of FIG. 1A.

Figure 20A:
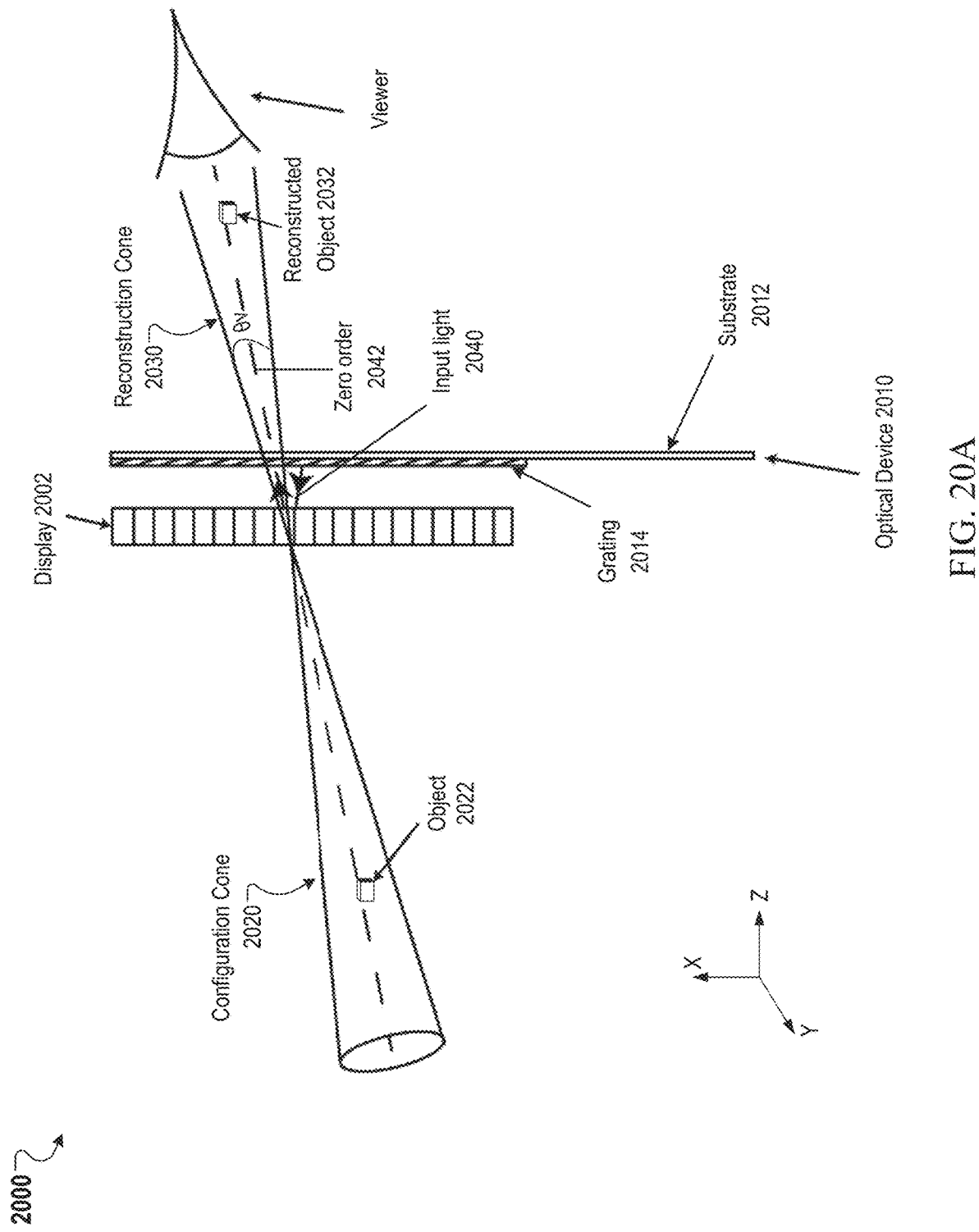
FIG. 20A illustrates an example of a configuration cone and a reconstruction cone corresponding to a holographic scene with respect to a display in a 3D coordinate system.

FIG. 20A illustrates an example 2000 of a configuration cone 2020 and a reconstruction cone 2030 with respect to a display 2002 and an optical device 2010 in a 3D coordinate system in the 3D software application. The optical device 2010 can be a lightguide device, e.g., the optically diffractive device 598 of FIG. 5H, that includes a grating 2014 formed on a substrate 2012.

As illustrated in FIG. 20A, the optical device 2010 couples input light 2040 to illuminate the display 2002 with an incident angle larger than 0°, not at normal incidence, which is identical in effect to rotating the configuration cone 2020 (together with all objects including an object 2022 within the configuration cone 2020) with an angle corresponding to (e.g., identical to) a reflected angle of the incident angle with respect to the 3D coordinate system. In some implementations, the configuration cone 2020 is rotated in the original 3D coordinate system. In some implementations, the original 3D coordinate system is rotated but the configuration cone 2020 is not rotated. Once the configuration cone 2020 in the 3D coordinate system is set, objects can be placed in the configuration cone 2020 without changing primitives' vertices individually. Accordingly, the simulated reconstruction cone 2030 (with all reconstructed objects including a reconstructed object 2032) and display zero order light 2042 are rotated with respect to the display 2002 with the same reflected angle with respect to the 3D coordinate system. That is, the display zero order light 2042 can appear in a holographic scene when seen by a viewer.

Figure 20B:
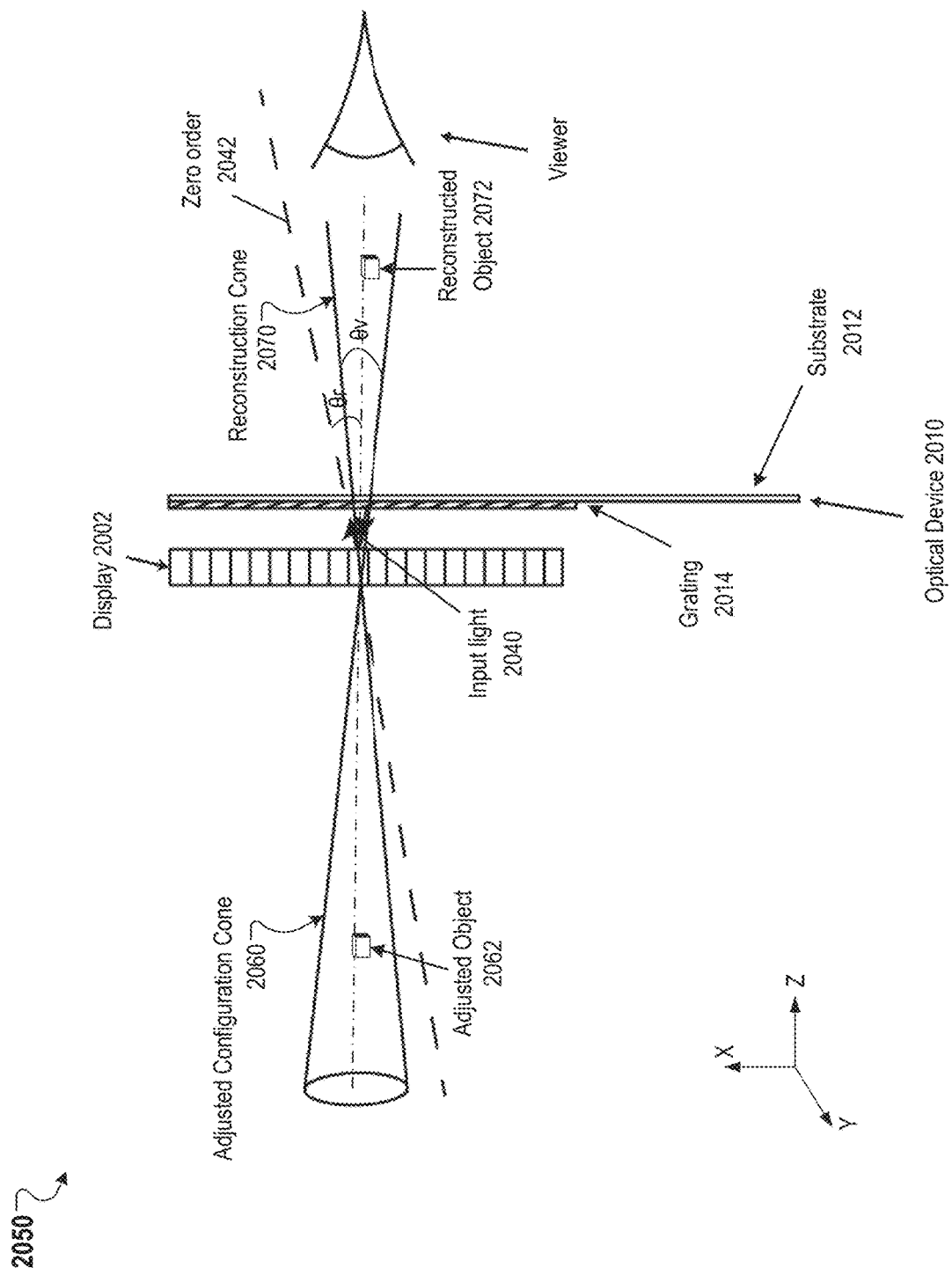
FIG. 20B illustrates an example of adjusting the configuration cone of FIG. 20A to configure a hologram corresponding to the holographic scene in the 3D coordinate system.

FIG. 20B illustrates an example 2050 of adjusting the configuration cone 2020 of FIG. 20A to configure a hologram corresponding to the holographic scene in the 3D coordinate system in the 3D software application. The configuration cone 2020 (together with the designed objects including the object 2022) can be rotated with a rotation angle with respect to a surface of the display 2002 in the 3D coordinate system. The rotation angle is corresponding to (e.g., identical to) the incident angle so that an adjusted configuration cone 2060 (with the adjusted designed objects including the adjusted object 2062) is at normal incidence to the display 2002. The configuration cone 2020 can be adjusted just once for all the designed objects. Holographic data, e.g., primitive lists for the objects, are then generated based on the adjusted configuration cone 2060 in the global 3D coordinate system. The hologram is then generated based on the holographic data.

Accordingly, when the optical device 2010 couples the input light 2040 to illuminate the display 2002 at the incident angle, a first portion of the input light 2040 is diffracted by the display elements modulated with the preconfigured hologram. The diffracted first order light forms a reconstruction cone 2070 (with reconstructed objects including the reconstructed object 2072 of the designed object 2062) normal to the display 2002. The reconstruction cone 2070 has a viewing angle $\theta_v$. In contrast, a second portion of the input light 2040 is reflected at the gaps without the modulation of the preconfigured hologram to become display zero order light 2042 that comes off the display at a reflected angle $\theta_r$ identical to the incident angle $\theta_i$. Thus, when the incident angle $\theta_i$ is larger than a half of the viewing angle, i.e., $\theta_i > \theta_v/2$, the display zero order light 2042 is outside the reconstruction cone 2070 and accordingly the holographic scene when seen by a viewer.

Figure 21:
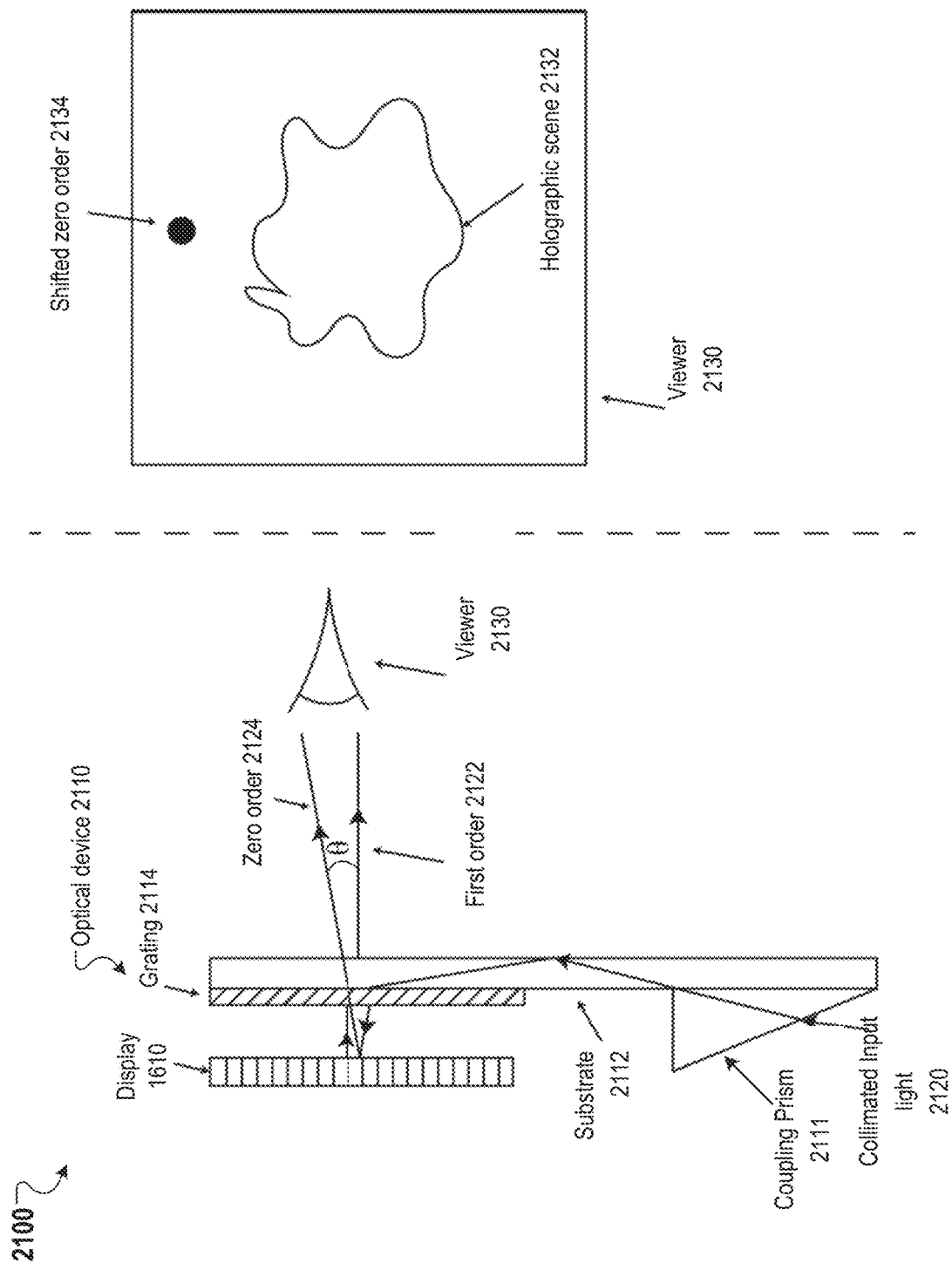
FIG. 21 illustrates an example of coupling light via a coupling prism to an optically diffractive device to illuminate a display at an incident angle for suppressing display zero order light in a holographic scene.
Figure 22:
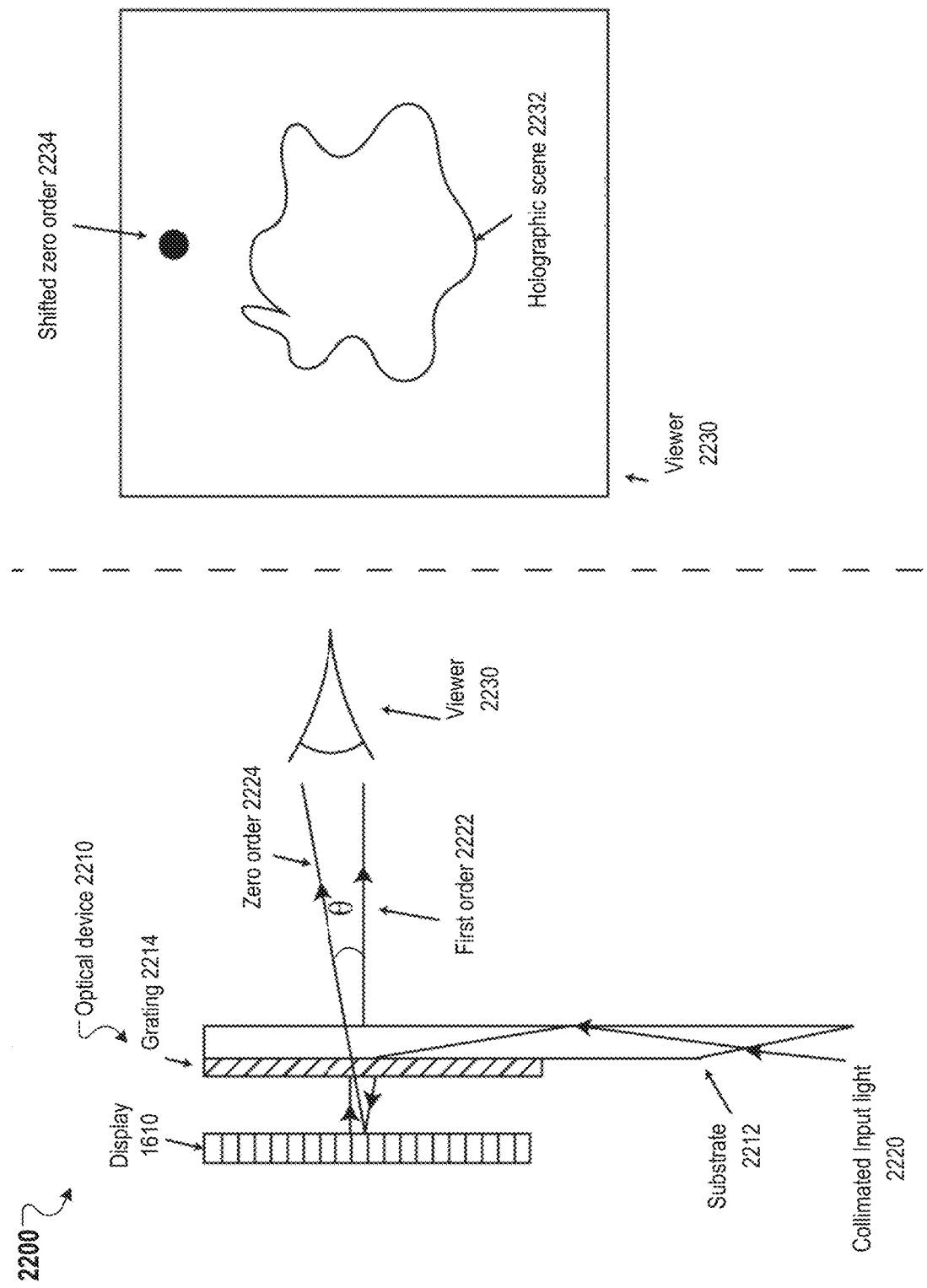
FIG. 22 illustrates an example of coupling light via a wedged substrate to an optically diffractive device to illuminate a display at an incident angle for suppressing display zero order light in a holographic scene.

The input light 2040 can be coupled into the optical device 2010 in any suitable way, e.g., by an incoupler such as the incoupler 1966 of FIG. 19B, by a prism as illustrated in FIG. 21, or a wedged substrate as illustrated in FIG. 22.

FIG. 21 illustrates an example 2100 of coupling collimated input light 2120 via a coupling prism 2111 to an optical device 2110 to illuminate a display 1610 at an incident angle for suppressing display zero order light in a holographic scene. The optical device 2110 includes a grating 2114 on a substrate 2112. The coupling prism 2111 couples the input light 2120 into the substrate 2112 that guides the input light 2120 towards the grating 2114. The grating 2114 diffracts the input light 2120 out towards the display 1610 at the incident angle. A hologram is preconfigured such that diffractive first order light 2122 comes off the display 1610 surrounding normal incidence to form a reconstruction cone, while display zero order light 2124 comes off the display 1610 at a reflected angle identical to the incident angle. When the incident angle is larger than a half of a viewing angle of the reconstruction cone, the display zero order light 2124 forms a shifted zero order spot 2134 outside of a holographic scene 2132 when seen by a viewer 2130.

FIG. 22 illustrates an example system 2200 of coupling light via a wedged substrate 2212 of an optical device 2210 to illuminate a display 1610 at an incident angle for suppressing display zero order light in a holographic scene. The optical device 2210 includes a grating 2214 on the wedged substrate 2212. The wedged substrate 2212 couples the input light 1020 into the substrate 2212 that guides the input light 2120 towards the grating 2214. The grating 2214 diffracts the input light 2120 out towards the display 1610 at the incident angle. A hologram is preconfigured such that diffractive first order light 2222 comes off the display 1610 surrounding normal incidence to form a reconstruction cone, while display zero order light 2224 comes off the display 1610 at a reflected angle identical to the incident angle. When the incident angle is larger than a half of a viewing angle of the reconstruction cone, the display zero order light 2224 forms a shifted zero order spot 2234 outside of a holographic scene 2232 when seen by a viewer 2230.

According to the third technique, the display zero order light coming off the display has a larger deviation angle than the diffracted first order light coming off the display. Thus, the display zero order light can be suppressed (or eliminated) in the holographic scene based on the angle difference, e.g., as described further in the fourth technique "zero order light blocking" and the fifth technique "zero order light redirection."

Fourth Technique—Zero Order Light Blocking

FIGS. 23A-23B illustrate example systems 2300, 2350 of suppressing display zero order light in a holographic scene by blocking or absorbing the display zero order light reflected from the display by an optically blocking component. The optically blocking component can be any suitable structure, e.g., an artificial structure such as a louvered layer, a metamaterial layer, a metamaterial structure, a metasurface, or any other kind of engineered microstructure or nanostructure that can exhibit the blocking property.

For illustration, similar to FIG. 21, a coupling prism 2311 couples a collimated input light 2320 into an optical device 2310 having a grating 2314 formed on a substrate 2312. The grating 2314 is configured to diffract the input light 2320 out to illuminate a display 1610 at an incident angle, e.g., larger than a half of a viewing angle of a reconstruction cone. By applying the third technique, a hologram is preconfigured such that diffracted first order light 2322 comes off the display 1610 in a same way as that when the input light is incident on the display at normal incidence, while display zero order light 2324 propagates away from the display 1610 at a reflected angle identical to the incident angle.

A metamaterial layer 2316, as an example of the optically blocking component, is formed on (e.g., deposited upon, or attached to) the substrate 2312. As illustrated in FIGS. 23A-23B, the metamaterial layer 2316 and the grating 2314 can be formed on opposite sides of the substrate 2312. The metamaterial layer 2316 can be made of an array of microstructures or nanostructures smaller than a wavelength of interest. By configuring a geometry of the microstructures or nanostructures individually and collectively, the metamaterial layer 2316 can be designed to interact with light in a desire manner. In the present disclosure, the metamaterial layer 2316 is configured to transmit a light beam having an angle smaller than a predetermined angle and block a light beam having an angle larger than the predetermined angle. The predetermined angle can be set to be smaller than the incident angle and larger than the half of the viewing angle of the reconstruction cone formed by the diffracted first order light 2322. Thus, the diffracted first order light 2322 can be transmitted through the metamaterial layer 2316 with a transmission efficiency, e.g., no less than a predetermined ratio such as 50%, 60%, 70%, 80%, 90%, or 99%. In contrast, the display zero order light can be blocked or absorbed by the metamaterial layer 2316, e.g., with a blocking efficiency of 100%.

A light suppression efficiency of the display zero order light in a holographic scene can be 100%. As illustrated in FIG. 23A, the diffracted first order light 2322 can form a holographic scene 2332 on a projection screen 2330, without the display zero order light 2324. As illustrated in FIG. 23B, when seen by a viewer 2360, the diffracted first order light 2322 can form a holographic scene 2362 on an eye of the viewer 2360, without the display zero order light 2324.

Fifth Technique—Zero Order Light Redirection

Figure 24:
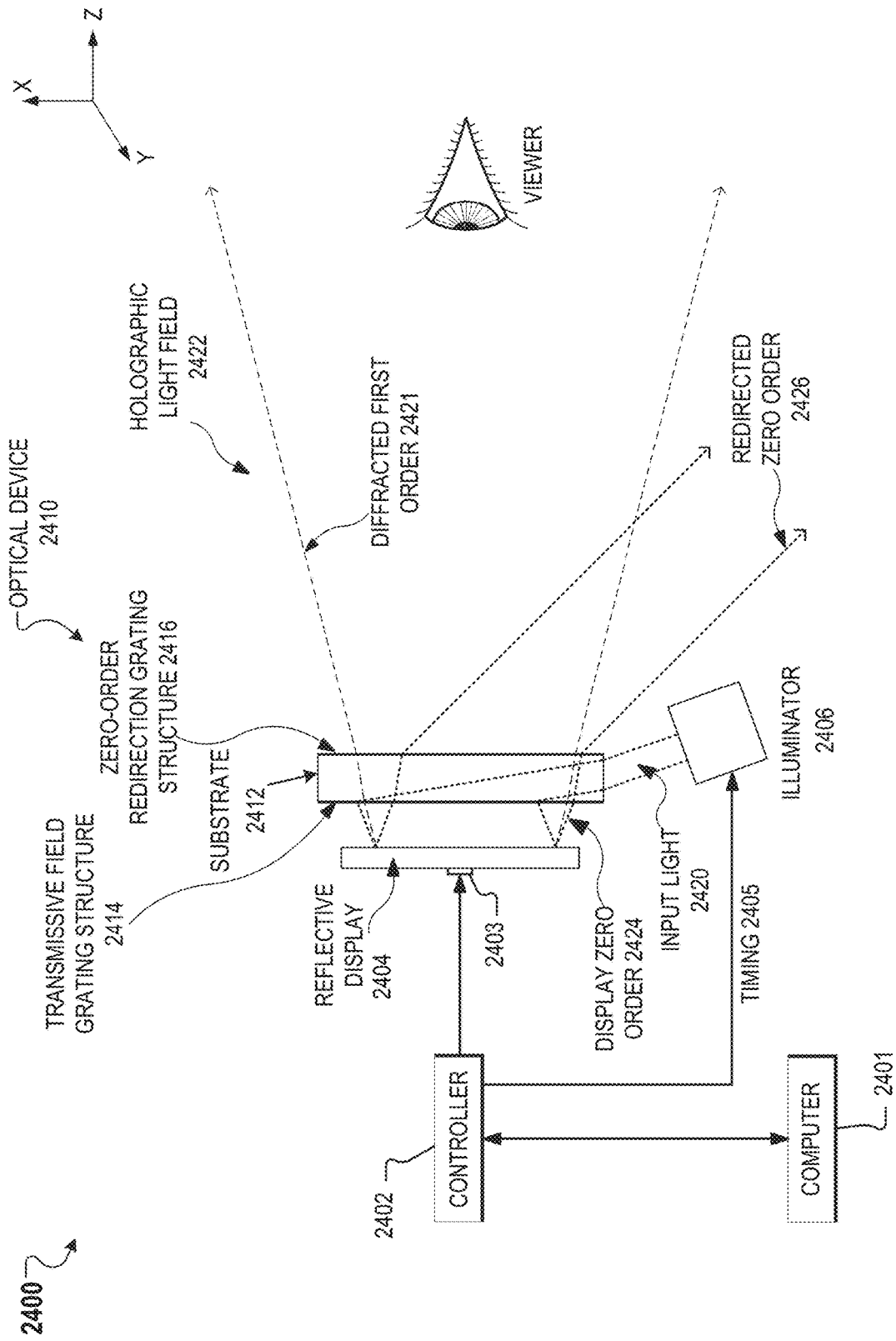
FIG. 24 illustrates a system of suppressing display zero order light in a holographic scene by redirecting the display zero order light away from the holographic scene via an optically redirecting structure.

FIG. 24 illustrates a system 2400 of suppressing display zero order light in a holographic scene by redirecting the display zero order light away from the holographic scene via an optically redirecting structure. The optically redirecting structure can be a grating, e.g., a holographic grating such as a Bragg grating, or any other suitable redirecting structure.

Similar to the system 590 of FIG. 5H, the system 2400 includes a computer 2401 (e.g., the computer 591 of FIG. 5H), a controller 2402 (e.g., the controller 592 of FIG. 5H), a reflective display 2404 (e.g., the reflective display 594 of FIG. 5H), and an illuminator 2406 (e.g., the illuminator 596 of FIG. 5H). The system 2400 also includes an optical device 2410 that can include an optically diffractive device, e.g., the optically diffractive device 598 of FIG. 5H, 598A of FIG. 5I, 598B of FIG. 5J, or 598C of 5K, the optically diffractive device 900 of FIGS. 9A and 9B, 1000 of FIGS. 10A and 10B, 1100 of FIG. 11, 1200 of FIG. 12A, 1250 of FIG. 12B, or 1270 of FIG. 12C, or 1500 of FIG. 15. In some implementations, as illustrated in FIG. 24, the optical device 2410 includes a transmissive field grating structure 2414 as the optically diffractive device on a substrate 2412 (e.g., the substrate 598-2 of FIG. 5H). The transmissive field grating structure 2414 can be the field grating structure 598-1 of FIG. 5H. The transmissive field grating structure 2414 can include one or more gratings for one or more different colors of light. The substrate 2412 can be a transparent glass substrate.

Similar to what is described above, the optical device 2410 can be arranged adjacent to a front surface of the display 2404. In some implementations, a top surface of the optical device 2410 (e.g., a surface of the field grating structure 2414) is attached to the front surface of the display 2404, e.g., through an index matching material. In some implementations, an air gap is between the top surfaces of the optical device 2410 and the display 2404. In some implementations, a spacer, e.g., glass, is inserted in the air gap between the top surfaces of the optical device 2410 and the display 2404. To better illustrate light propagation, the air gap is used as an example in FIG. 24 and the following FIGS. 26A to 33.

The controller 2402 is configured to receive graphic data corresponding to one or more objects from the computer 591 (e.g., by using a 3D software application such as Unity), perform computation on the graphic data, and generate and transmit control signals for modulation to the display 2404 through a memory buffer 2403. The controller 2402 is also coupled to the illuminator 2406 and configured to provide a timing signal 2405 to activate the illuminator 2406 to provide input light 2420. The input light 2420 is then diffracted by the transmissive field grating 2414 of the optical device 2410 to illuminate the display 2404. A first portion of the input light 2420 incident on display elements of the display 2404 is diffracted by the display 2404, and diffracted first order light 2421 forms a holographic light field 2422 towards a viewer. The holographic light field 2422 can correspond to a reconstruction cone (or frustum) that has a viewing angle. The display 2404 can include a back mirror on a back of the display 2404 and can reflect light towards the viewer. A second portion of the input light 2420 incident on gaps of the display 2404 is reflected by the display 2404, e.g., by the back mirror, to become display zero order light 2424.

As described above, the transmissive field grating 2414 can be configured to diffract the input light 2420 from the illuminator 2406 out to illuminate the display 2404 off axis at an incident angle, e.g., larger than a half of a viewing angle of the reconstruction cone (or frustum). By applying the third technique, the diffracted first order light 2421 comes off the display 2404 in the same manner as that when the input light 2420 is incident on axis at normal incidence, while the display zero order light 2424 comes off at a reflected angle that is identical to the incident angle, which is outside of the reconstruction cone.

As illustrated in FIG. 24, the system 2400 can include an optically redirecting structure 2416 configured to diffract a first light beam having an angle identical to a predetermined angle with a substantially larger diffraction efficiency at a diffraction angle than a second light beam having an angle different from the predetermined angle. The optically redirecting structure 2416 can be a holographic grating such as a Bragg grating. The diffraction angle can be substantially larger than the predetermined angle. In some implementations, the optically redirecting structure 2416 includes one or more gratings for one or more different colors of light, as illustrated further in FIGS. 30A-33. In some implementations, the optically redirecting structure 2416 is arranged downstream the optical device 2410 away from the display 2404. In some implementations, as illustrated in FIG. 24, the optically redirecting structure 2416 is formed on a side of the substrate 2412 that is opposite to the transmissive field grating structure 2414.

According to the fifth technique, the optically redirecting structure 2416 can be configured to have the predetermined angle identical to the reflected angle of the display zero order light 2424 or the incident angle of the input light 2420 at the display 2404. As the display zero order light 2424 propagates at the reflected angle, the optically redirecting structure 2416 can diffract the display zero order light 2424 with a substantially larger diffraction efficiency at the diffraction angle than the diffracted first order light 2421, while the diffracted first order light 2421 can transmit through the optically redirecting structure 2416 to form the holographic light field 2422. In such a way, the optically redirecting structure 2416 can redirect the display zero order light 2424 further away from the holographic light field 2422.

Figure 25A:
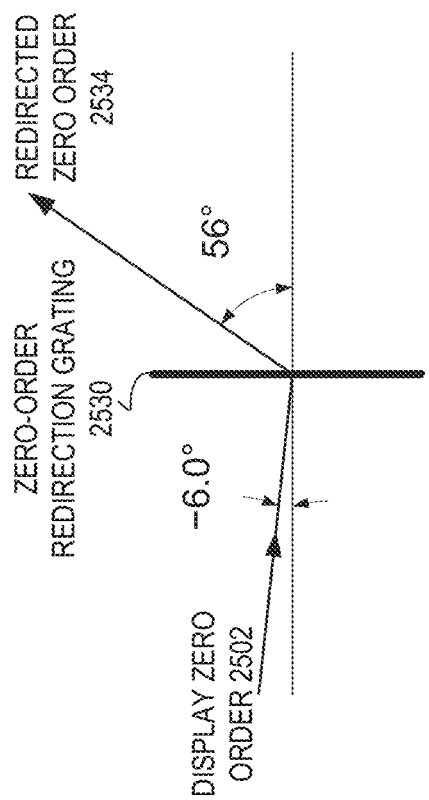
FIGS. 25A-25C illustrate examples of redirecting display zero order light via optically redirecting structures to different directions in space.
Figure 25B:
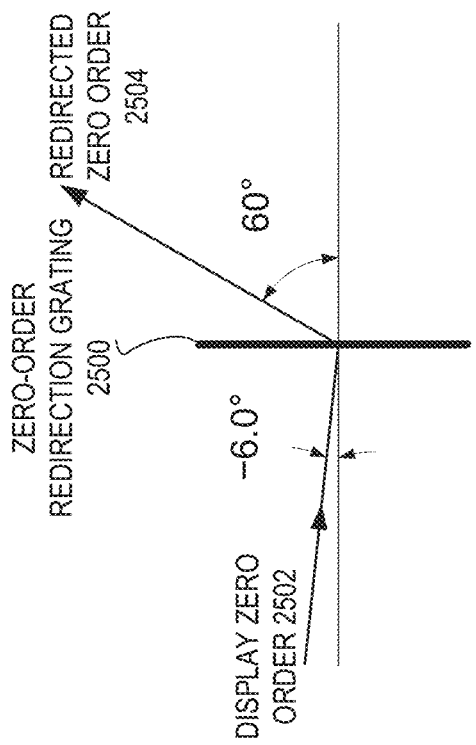
Figure 25C:
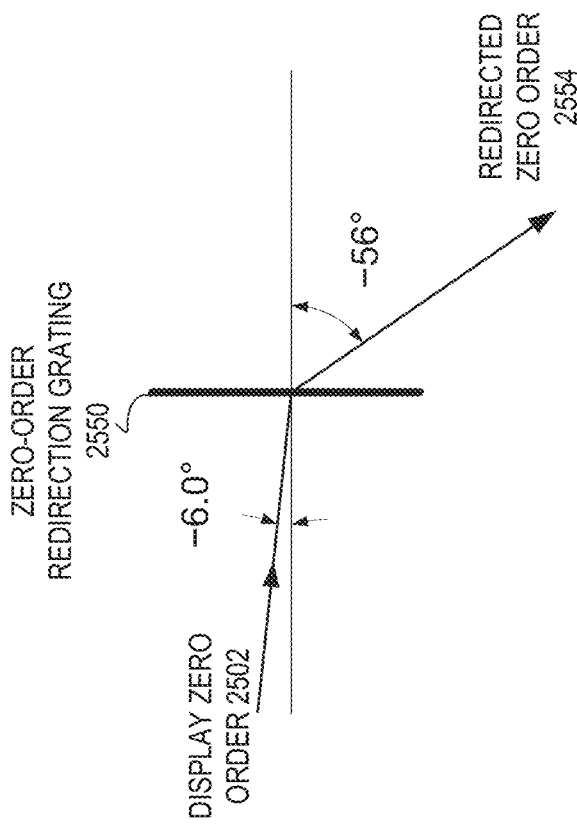

FIGS. 25A-25C illustrate examples of redirecting display zero order light via zero order redirection gratings 2500, 2530, 2550 in FIGS. 25A, 25B, 25C to different directions in space. The zero order redirection grating 2500, 2530, 2550 can be in the optically redirection grating structure 2416 of FIG. 24. The redirection gratings 2500, 2530, 2550 can be fabricated according to the method illustrated in FIG. 7A.

For comparison, display zero order light 2502 is incident on the zero order redirection grating 2500, 2530, 2550 at an incident angle −6.0°, which is a predetermined angle for the redirection grating 2500, 2530, 2550. The redirection grating 2500, 2530, 2550 is configured to diffract the display zero order light 2502 with a high diffraction efficiency at a diffraction angle that is substantially larger than the incident angle of the display zero order light 2502. The redirection gratings 2500, 2530, 2550 can be configured to diffract the display zero order light 2502 at different diffraction angles, for example, 60° for the grating 2500 shown in FIG. 25A, 56° for the grating 2530 shown in FIG. 25B, and −56° for the grating 2550 in FIG. 25C.

FIGS. 26A-26E illustrate examples of redirecting display zero order light when light is input at different incident angles via optically redirecting structures (e.g., zero order redirection gratings) to different directions in space. Each of the incident angles, e.g., −6° or 6° in air, is configured to be larger than a half of a viewing angle of a reconstruction cone corresponding to a holographic light field, e.g., 5° in air.

Figure 26A:
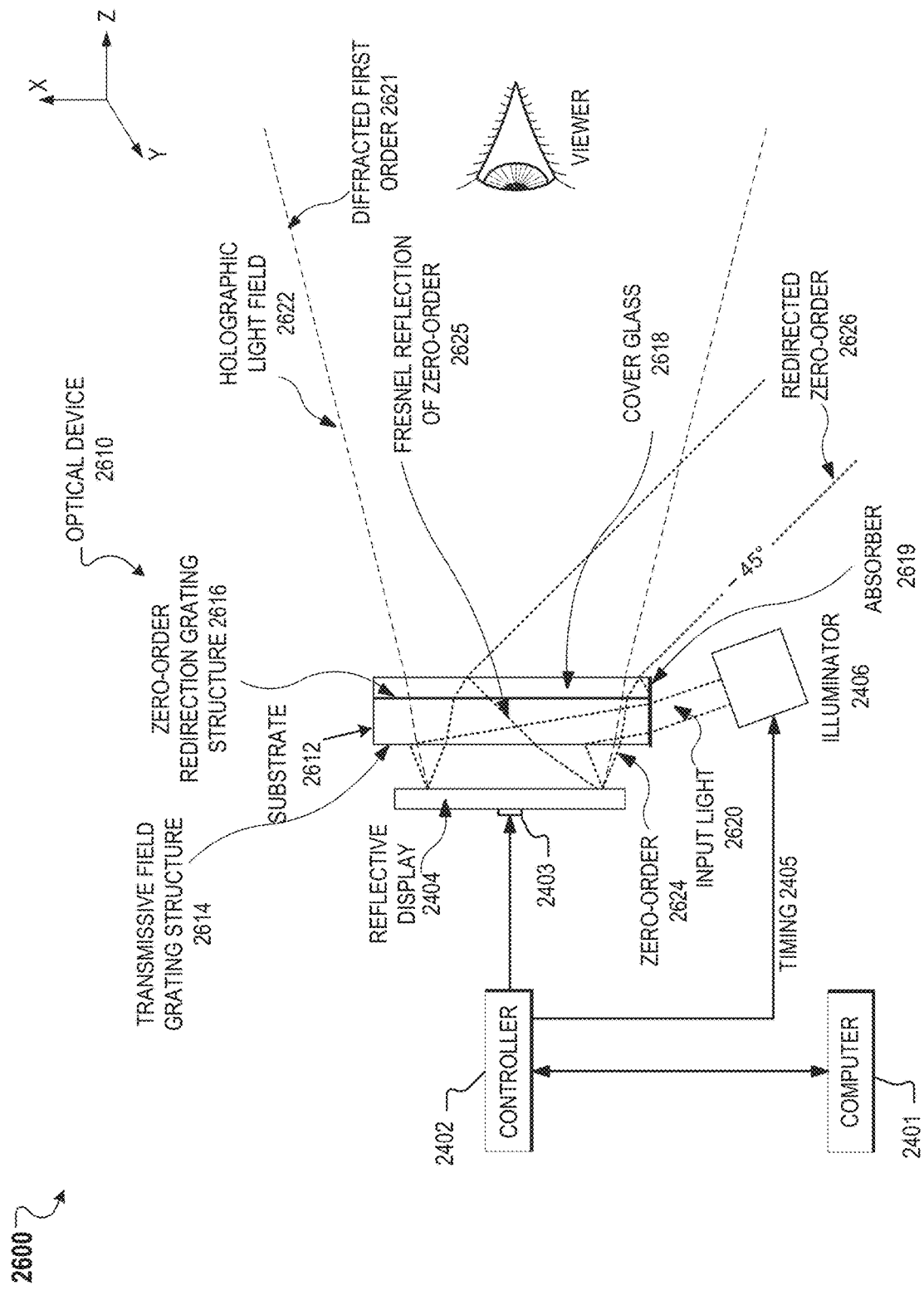
FIGS. 26A-26E illustrate examples of redirecting display zero order light when light is input at different incident angles via optically redirecting structures to different directions in space.

As illustrated in FIG. 26A, a system 2600 includes an optical device 2610 that can be the optical device 2410 of FIG. 24. The optical device 2610 includes a substrate 2612 (e.g., the substrate 2412 of FIG. 24), a transmissive field grating structure 2614 (e.g., the transmissive field grating structure 2414 of FIG. 24), and a zero order redirection grating structure 2616 (e.g., the zero order redirection grating structure 2416 of FIG. 24). The optical device 2610 can include a cover glass 2618 on the zero order redirection grating structure 2616.

Input light 2620 from the illuminator 2406 is diffracted by the transmissive field grating structure 2614 to illuminate the display 2404 with an incident angle −6° (in air). A first portion of the input light 2620 illuminating on modulated display elements of the display 2404 is diffracted to transmit through the optical device 2610 (including the zero order redirection grating structure 2616) to become diffracted first order light 2621 that forms a holographic light field 2622. A second portion of the input light 2620 illuminating on gaps of the display 2404 is reflected to come off the display 2404 as display zero order light 2624. The display zero order light 2624 is redirected by the zero order redirection grating structure 2616 at a diffraction angle substantially larger than the incident angle, e.g., −28° in glass. Due to Fresnel reflection, part of the redirected display zero order light is reflected back by an interface between the cover glass 2618 and the air to the optical device 2610, and the reflected display zero order light, e.g., Fresnel reflection of zero order light 2625, can be absorbed by an optical absorber 2619 formed on an edge of the optical device 2610. The optical absorber 2619 can be similar to the optical absorber 1104 of FIG. 11, 1204 of FIG. 12A, 12C, or 1254 of FIG. 12B. Another part of the redirected display zero order light is transmitted through the interface into the air downwards at a redirection angle of −45°, e.g., redirected zero order light 2626, which is far away from the holographic light field 2622.

Figure 26B:
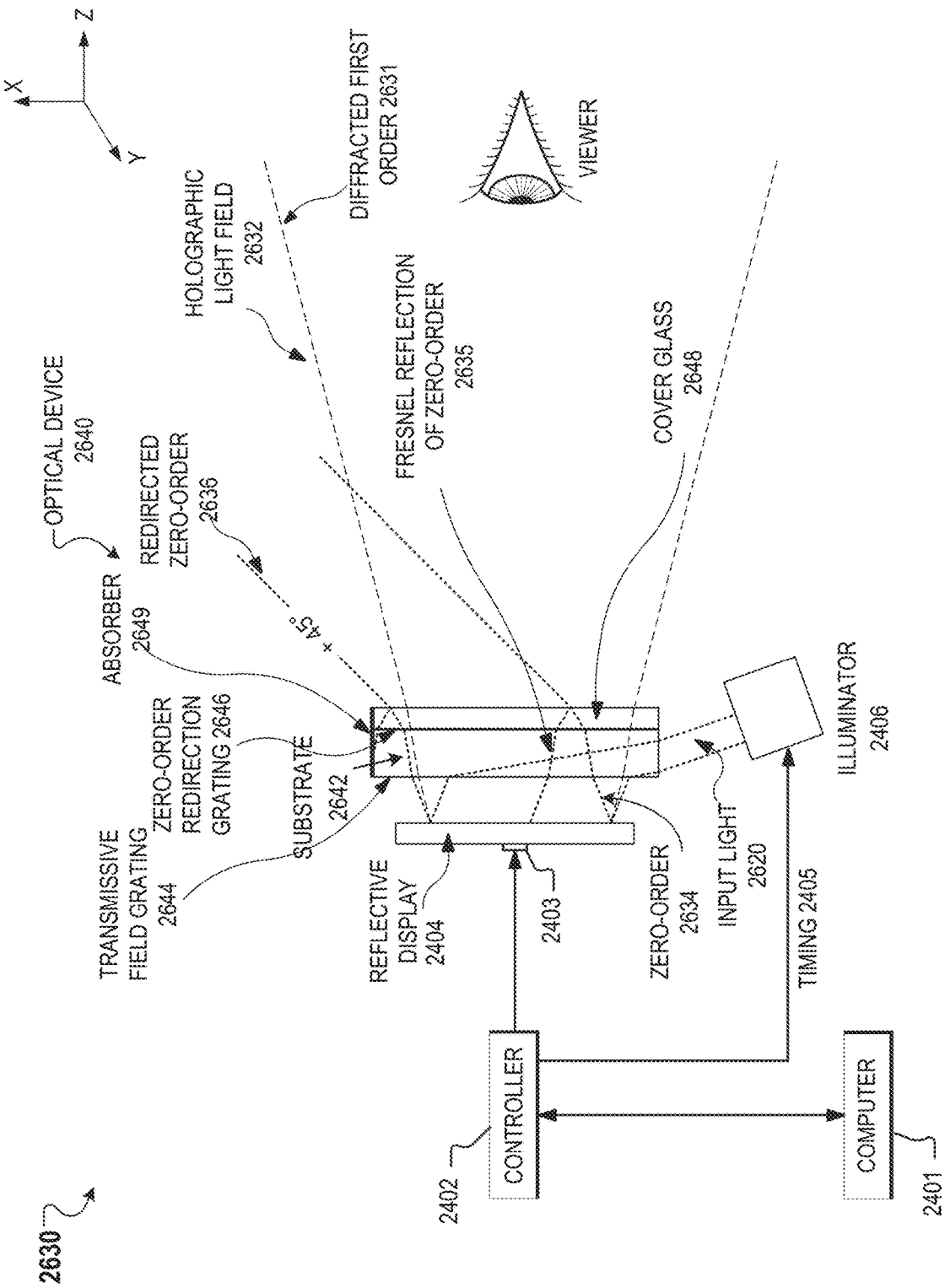

As illustrated in FIG. 26B, a system 2630 includes an optical device 2640 that can be the optical device 2410 of FIG. 24. The optical device 2640 includes a substrate 2642 (e.g., the substrate 2412 of FIG. 24), a transmissive field grating structure 2644 (e.g., the transmissive field grating structure 2414 of FIG. 24), and a zero order redirection grating structure 2646 (e.g., the zero order redirection grating structure 2416 of FIG. 24). The optical device 2640 can include a cover glass 2648 on the zero order redirection grating structure 2646.

Different from the transmissive field grating structure 2614 of the optical device 2610 of FIG. 26A, the transmissive field grating structure 2644 of the optical device 2640 diffracts the input light 2620 from the illuminator 2406 to illuminate the display 2404 with an incident angle +6° (in air). A first portion of the input light 2620 illuminating on modulated display elements of the display 2404 is diffracted to transmit through the optical device 2640 (including the zero order redirection grating structure 2646) to become diffracted first order light 2631 that forms a holographic light field 2632. A second portion of the input light 2620 illuminating on gaps of the display 2404 is reflected to come off the display 2404 as display zero order light 2634. Different from the zero order redirection grating structure 2616 of FIG. 26A, the zero order redirection grating structure 2646 redirects (or diffracts) the display zero order light 2624 at a diffraction angle substantially larger than the incident angle, e.g., +28° in glass. Due to Fresnel reflection, part of the redirected display zero order light is reflected back by an interface between the cover glass 2618 and the air to the optical device 2610, and the reflected display zero order light, e.g., Fresnel reflection of zero order light 2635, can be absorbed by an optical absorber 2649 formed on an edge of the optical device 2640. The optical absorber 2649 can be similar to the optical absorber 2619 of FIG. 26A. Another part of the redirected display zero order light is transmitted through the interface into the air upwards at a redirection angle of +45°, e.g., redirected zero order light 2636, which is far away from the holographic light field 2622.

Figure 26C:
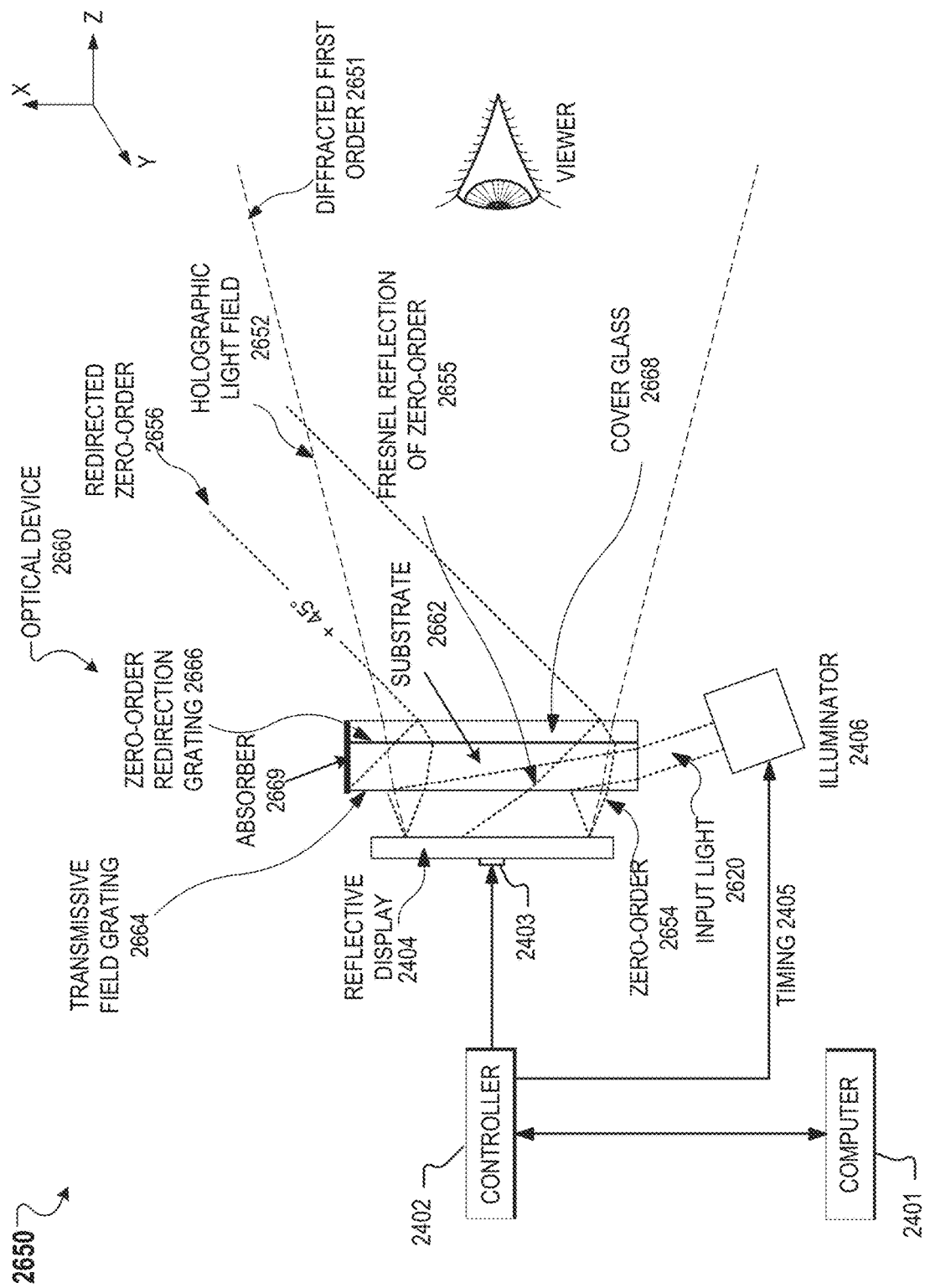

As illustrated in FIG. 26C, a system 2650 includes an optical device 2660 that can be the optical device 2410 of FIG. 24. The optical device 2660 includes a substrate 2662 (e.g., the substrate 2412 of FIG. 24), a transmissive field grating structure 2664 (e.g., the transmissive field grating structure 2414 of FIG. 24), and a zero order redirection grating structure 2666 (e.g., the zero order redirection grating structure 2416 of FIG. 24). The optical device 2660 can include a cover glass 2668 on the zero order redirection grating structure 2666.

Same as the transmissive field grating structure 2614 of the optical device 2610 of FIG. 26A, the transmissive field grating structure 2664 of the optical device 2660 diffracts the input light 2620 from the illuminator 2406 to illuminate the display 2404 with an incident angle −6° (in air). A first portion of the input light 2620 illuminating on modulated display elements of the display 2404 is diffracted to transmit through the optical device 2660 (including the zero order redirection grating structure 2666) to become diffracted first order light 2631 that forms a holographic light field 2632. A second portion of the input light 2620 illuminating on gaps of the display 2404 is reflected to come off the display 2404 to become at least a part of display zero order light 2654. Different from the zero order redirection grating structure 2616 of FIG. 26A, the zero order redirection grating structure 2666 redirects (or diffracts) the display zero order light 2654 at a diffraction angle substantially larger than the incident angle, e.g., +28° in glass. Due to Fresnel reflection, part of the redirected display zero order light is reflected back by an interface between the cover glass 2668 and the air to the optical device 2660, and the reflected display zero order light, e.g., Fresnel reflection of zero order light 2655, can be absorbed by an optical absorber 2649 formed on an edge of the optical device 2640. The optical absorber 2669 can be similar to the optical absorber 2619 of FIG. 26A. Another part of the redirected display zero order light is transmitted through the interface into the air upwards at a redirection angle of +45°, e.g., redirected zero order light 2656, which is far away from the holographic light field 2622.

To eliminate the effect of Fresnel reflection on the redirected display zero order light on the interface between a surface of the cover glass and the air, an anti-reflection (AR) coating can be formed on the surface of the cover glass 2668, so that the redirected display zero order light can be transmitted with a high transmittance into the air but with little or no reflection back to the optical device.

Figure 26D:
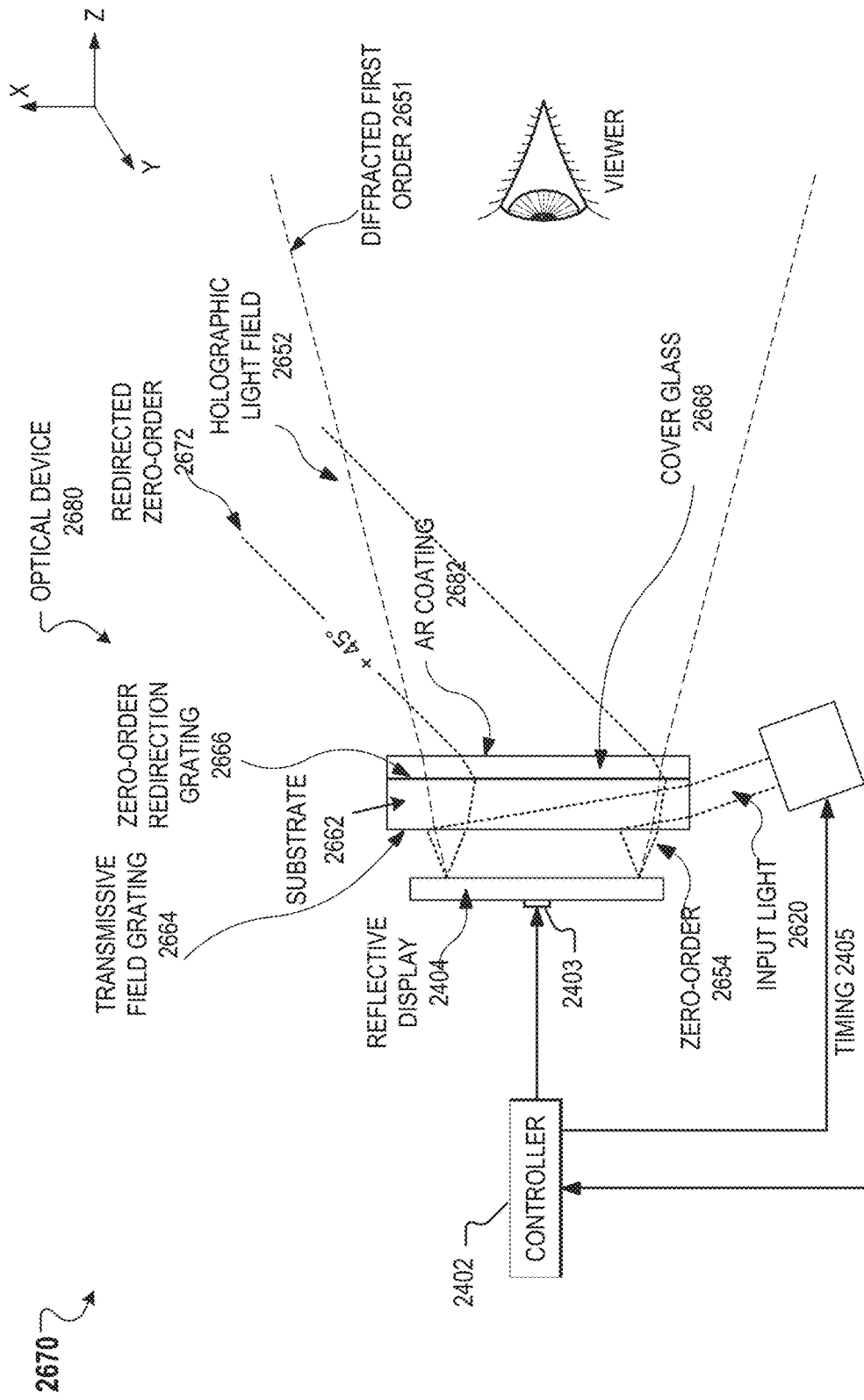

As illustrated in FIG. 26D, a system 2670 includes an optical device 2680. Similar to the optical device 2660 of FIG. 26C, the optical device 2680 is configured to diffract the input light 2620 to illuminate the display 2404 at an incident angle −6° (in air) and redirect the display zero order light 2654 into the air upwards at a redirection angle of +45°. However, different from the optical device 2660 of FIG. 26C, the optical device 2680 includes an AR coating layer 2682 formed on an external surface of the cover glass 2668, such that the redirected display zero order light is substantially transmitted through the cover glass 2668 into the air at a redirection angle of +45°, e.g., redirected zero order light 2672. In such a way, there is little or no Fresnel reflection of the redirected zero order light back into the optical device 2680.

Figure 26E:
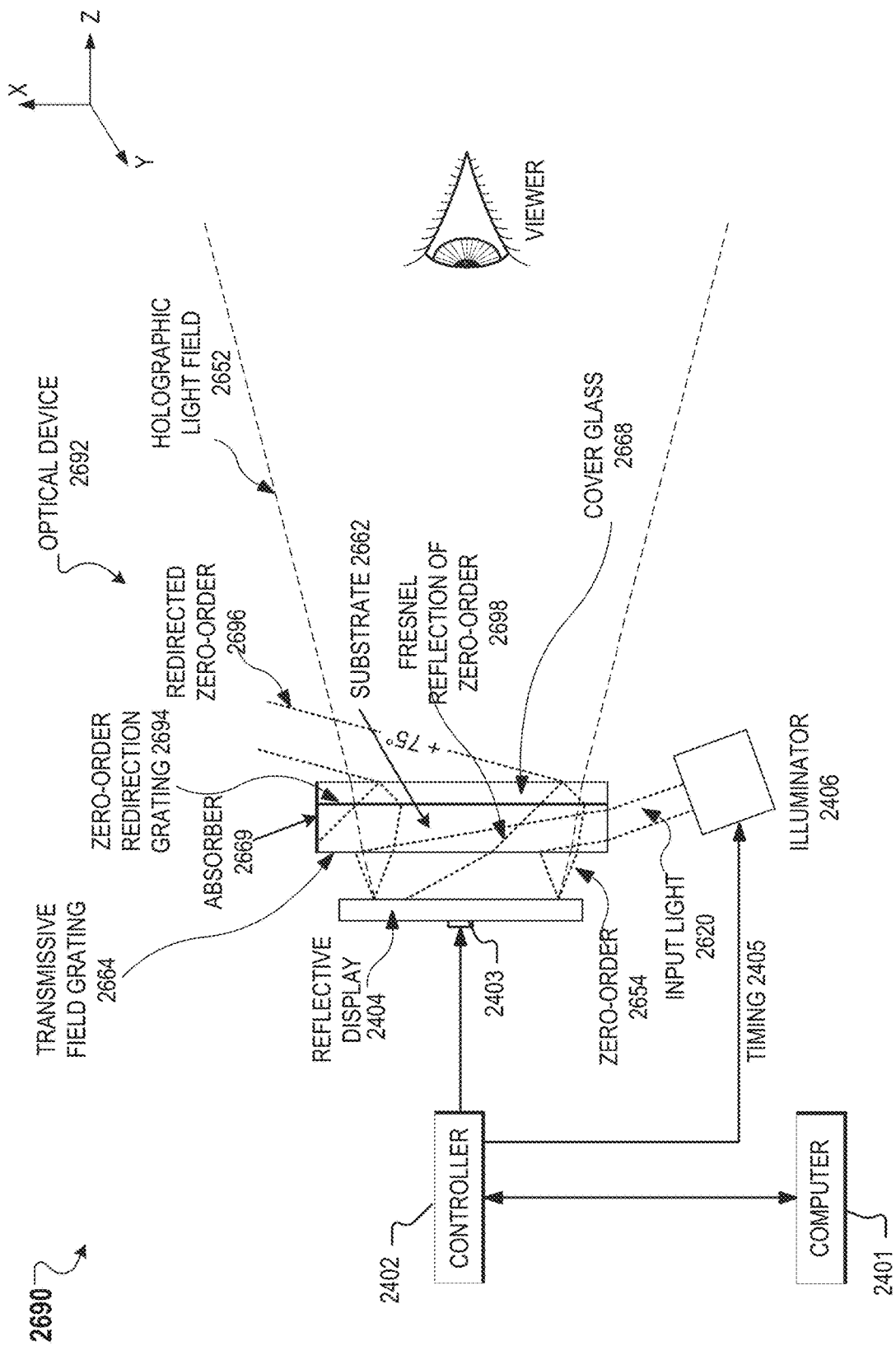

FIG. 26E shows another example of redirecting the display zero order light at an even larger redirection angle, e.g., +75° in air or approximately +40° in glass). As illustrated in FIG. 26E, a system 2690 includes an optical device 2692. Similar to the optical device 2660 of FIG. 26C, the optical device 2692 is configured to diffract the input light 2620 to illuminate the display 2404 at an incident angle −6° (in air). However, different from the optical device 2660 of FIG. 26C, the optical device 2692 includes a zero order redirection grating structure 2694 configured to redirect the display zero order light 2654 into the air upwards at a redirection angle of +75°, e.g., redirected zero order light 2696. Accordingly, there is larger Fresnel reflection of zero order light 2698 back into the optical device 2692, which can be absorbed by the optical absorber 2669.

When light with p polarization is incident at a Brewster's angle at an interface between a larger refractive index medium and a smaller refractive index medium, there is no Fresnel reflection for the light with p polarization.

Figure 27A:
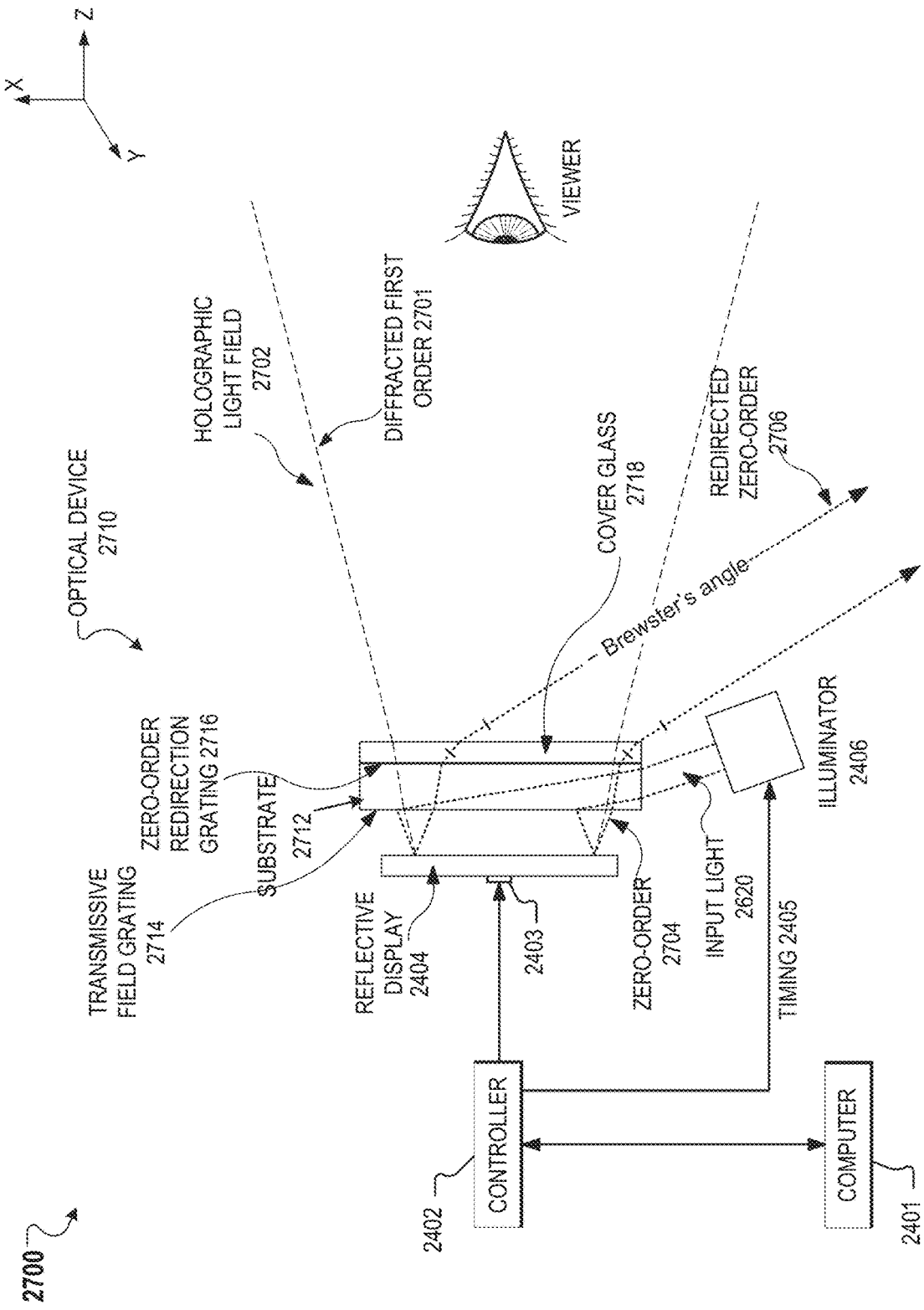
FIG. 27A illustrates an example of redirecting display zero order light with p polarization to transmit at a Brewster's angle.

FIG. 27A illustrates an example system 2700 of redirecting display zero order light with p polarization to transmit into air at a Brewster's angle. The system 2700 includes an optical device 2710 that can be the optical device 2410 of FIG. 24. The optical device 2710 includes a substrate 2712 (e.g., the substrate 2412 of FIG. 24), a transmissive field grating structure 2714 (e.g., the transmissive field grating structure 2414 of FIG. 24), and a zero order redirection grating structure 2716 (e.g., the zero order redirection grating structure 2416 of FIG. 24). The optical device 2710 can include a cover glass 2718 on the zero order redirection grating structure 2716.

Same as the transmissive field grating structure 2614 of the optical device 2610 of FIG. 26A, the transmissive field grating structure 2714 of the optical device 2710 diffracts the input light 2620 from the illuminator 2406 to illuminate the display 2404 with an incident angle −6° (in air). A first portion of the input light 2620 illuminating on modulated display elements of the display 2404 is diffracted to transmit through the optical device 2710 (including the zero order redirection grating structure 2716) to become diffracted first order light 2701 that forms a holographic light field 2702. A second portion of the input light 2620 illuminating on gaps of the display 2404 is reflected to come off the display 2404 as display zero order light 2704. The display zero order light 2704 can have p polarization state. In some cases, the input light 2620 from the illuminator 2406 has p polarization state. In some cases, the optical device 2710 includes one or more optical polarizing devices (e.g., polarizers, retarders, waveplates, or a combination thereof) configured to control a polarization state of the diffracted input light 2620 to be p polarization. In some implementations, the optical device 2710 includes an optical retarder (e.g., a broad-band half-wave retarder) followed by an optical polarizer (e.g., a linear polarizer). The optical retarder is configured to rotate each color of light from s polarization to p polarization, e.g., with corresponding efficiencies, and the optical polarizer is configured to absorb whatever percentage of each color of light has not been rotated from s polarization to p polarization.

Different from the zero order redirection grating structure 2616 of FIG. 26A, the zero order redirection grating structure 2716 redirects (or diffracts) the display zero order light 2654 with a Brewster's angle, e.g., approximately −37° in glass, at the interface between the cover glass 2718 and the air. Thus, there is no Fresnel reflection of the redirected display zero order light back to the optical device 2710, and almost all the redirected display zero order light is transmitted into the air at the Brewster's angle of approximately −57°, e.g., redirected zero order light 2706.

Figure 27B:
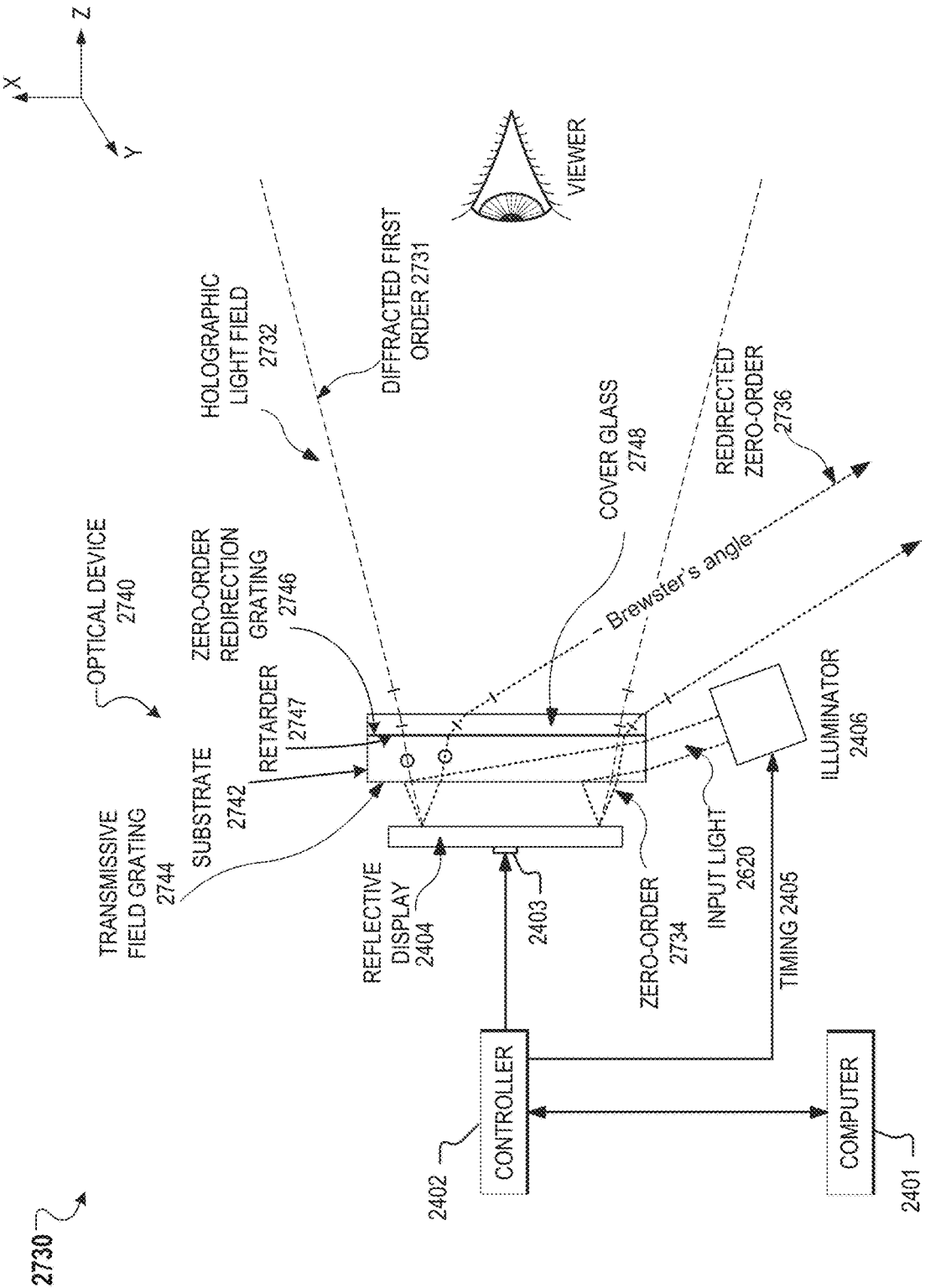
FIGS. 27B-27C illustrate examples of redirecting display zero order light with s polarization with an optical retarder for transmission at a Brewster's angle.
Figure 27C:
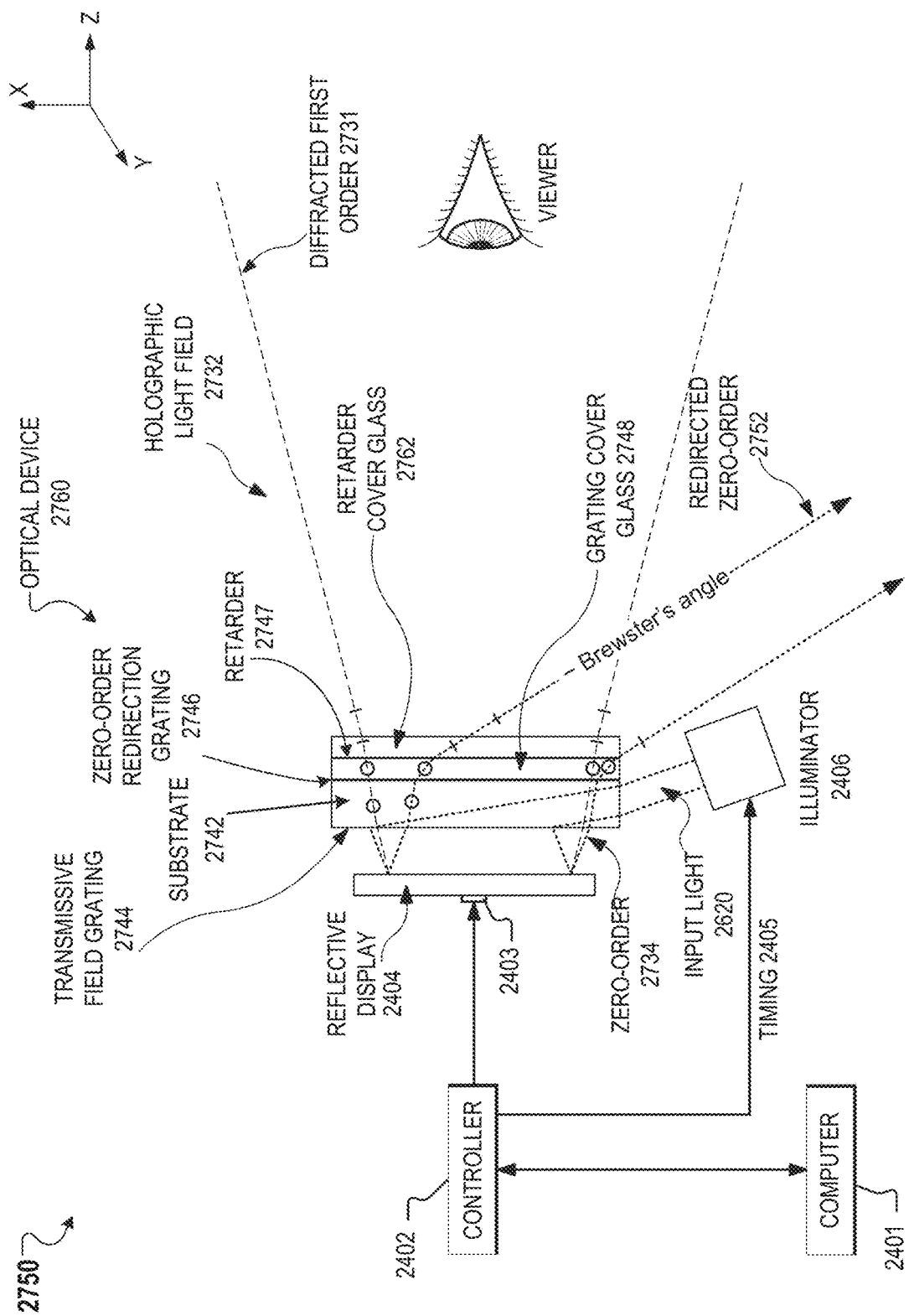

FIGS. 27B-27C illustrate examples of redirecting display zero order light with s polarization with an optically polarizing device such as an optical retarder for transmission at a Brewster's angle. When the display zero order light comes off the display 2404 with s polarization, an optical device can include an optical retarder before an interface into air. The optical retarder can convert a polarization state of the display zero order light from s polarization state to p polarization state for transmitting at Brewster's angle at the air interface without Fresnel reflection.

As illustrated in FIG. 27B, a system 2730 includes an optical device 2740 that can be the optical device 2410 of FIG. 24. The optical device 2740 includes a substrate 2742 (e.g., the substrate 2412 of FIG. 24), a transmissive field grating structure 2744 (e.g., the transmissive field grating structure 2414 of FIG. 24), and a zero order redirection grating structure 2746 (e.g., the zero order redirection grating structure 2416 of FIG. 24). The optical device 2740 can include a cover glass 2748 on the zero order redirection grating structure 2746.

Similar to the transmissive field grating structure 2714 of the optical device 2710 of FIG. 27A, the transmissive field grating structure 2744 of the optical device 2740 diffracts the input light 2620 from the illuminator 2406 to illuminate the display 2404 with an incident angle −6° (in air). A first portion of the input light 2620 illuminating on modulated display elements of the display 2404 is diffracted to transmit through the optical device 2740 (including the zero order redirection grating structure 2746) to become diffracted first order light 2731 that forms a holographic light field 2732. A second portion of the input light 2620 illuminating on gaps of the display 2404 is reflected to come off the display 2404 as display zero order light 2734. Different from the display zero order light 2704 in FIG. 27A, the display zero order light 2734 can have s polarization. In some cases, the input light 2620 from the illuminator 2406 has s polarization state. In some cases, the optical device 2740 includes one or more optically polarizing devices configured to control a polarization state of the diffracted input light 2620 to be s polarization.

Different from the optical device 2710 of FIG. 27A, the optical device 2740 includes an optical retarder 2747 that is configured to convert a polarization state of the display zero order light 2734 from s polarization to p polarization. In some examples, the polarization conversion can be achieved using a broadband half-wave retarder, which can rotate each color of light from s polarization to p polarization with differing efficiencies for each color. The half-wave retarder can be followed by a "cleanup" linear polarizer to absorb that percentage of each color of light which has not been rotated from s polarization to p polarization. In such a way, the retarder can rotate the polarization of light emerging from the optical device 2740 to another polarization more suitable for the best performance of the display 2404, and the linear polarizer can eliminate light incident upon the display 2404 in polarizations less suitable for the best performance of the display 240.

In some implementation, as illustrated in FIG. 27B, the optical retarder 2747 (and optionally a linear polarizer) is arranged before the zero order redirection grating structure 2746 on the substrate 2742. Same as the zero order redirection grating structure 2716 of FIG. 27A, the zero order redirection grating structure 2746 redirects (or diffracts) the display zero order light 2734 with p polarization with a Brewster's angle, e.g., approximately −37° in glass, at the interface between the cover glass 2748 and the air. Thus, there is no or negligible Fresnel reflection of the redirected display zero order light back to the optical device 2740, and almost all the redirected display zero order light is transmitted into the air at the Brewster's angle of approximately −57°, e.g., redirected zero order light 2736.

In some implementations, as illustrated in FIG. 27C, in an optical device 2760 of a system 2750, the optical retarder 2747 is arranged after the zero order redirection grating structure 2746 with respect to the substrate 2742. The zero order redirection grating structure 2746 is arranged between the substrate 2742 and the grating cover glass 2748. The optical retarder 2747 can be arranged between the grating cover glass 2748 and a retarder cover glass 2762. Same as the zero order redirection grating structure 2716 of FIG. 27A, the zero order redirection grating structure 2746 redirects (or diffracts) the display zero order light 2734 with a Brewster's angle, e.g., approximately −37° in glass, at the interface between the retarder cover glass 2762 and the air. Thus, there is no or negligible Fresnel reflection of the redirected display zero order light back to the optical device 2760, and almost all the redirected display zero order light is transmitted into the air at the Brewster's angle of approximately −57°, e.g., redirected zero order light 2752.

Figure 28:
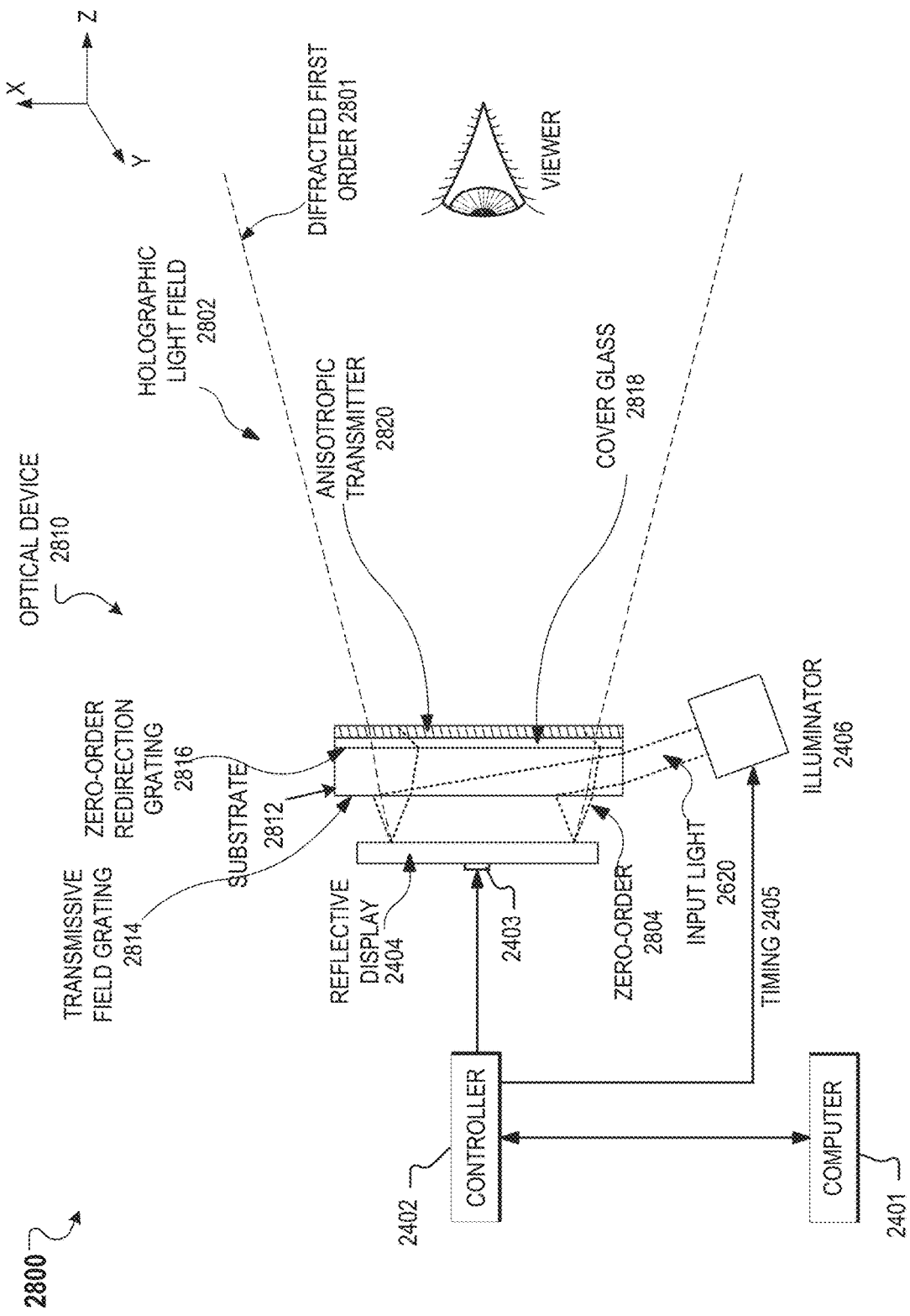
FIG. 28 illustrates an example of redirecting display zero order light to an anisotropic transmitter for absorbing the display zero order light.

FIG. 28 illustrates an example system 2800 of redirecting display zero order light to an anisotropic transmitter 2820 for absorbing redirected display zero order light. The anisotropic transmitter 2820 is configured to transmit a first light beam (e.g., diffracted first order light) with an angle (e.g., less than a half of a viewing angle of a reconstruction cone) smaller than a predetermined angle, and absorb a second light beam (e.g., the redirected display zero order light) with an angle (e.g., a redirection angle) larger than the predetermined angle. The predetermined angle is configured to be larger than the half of the viewing angle and smaller than the redirection angle at which the display zero order light is diffracted by an optically redirecting component.

The system 2800 includes an optical device 2810 that can include the optical device 2410 of FIG. 24. The optical device 2810 includes a substrate 2812 (e.g., the substrate 2412 of FIG. 24), a transmissive field grating structure 2814 (e.g., the transmissive field grating structure 2414 of FIG. 24), and a zero order redirection grating structure 2816 (e.g., the zero order redirection grating structure 2416 of FIG. 24). The optical device 2810 can include a cover glass 2818 on the zero order redirection grating structure 2816.

Same as the transmissive field grating structure 2414 of the optical device 2410 of FIG. 24, the transmissive field grating structure 2814 of the optical device 2810 diffracts the input light 2620 from the illuminator 2406 to illuminate the display 2404 with an incident angle, e.g., −6° in air. A first portion of the input light 2620 illuminating on modulated display elements of the display 2404 is diffracted to transmit through the optical device 2810 (including the zero order redirection grating structure 2816) to become diffracted first order light 2801 that forms a holographic light field 2802. The incident angle is configured to be larger than a half of the viewing angle of the reconstruction cone corresponding to the holographic light field 2802. A second portion of the input light 2620 illuminating on gaps of the display 2404 is reflected to come off the display 2404 as at least a part of display zero order light 2804. Similar to the zero order redirection grating structure 2416 of FIG. 24, the zero order redirection grating structure 2816 redirects (or diffracts) the display zero order light 2804 with a redirection angle substantially larger than the incident angle, e.g., an angle corresponding to approximately 75° in air.

Different from the optical device 2410 of FIG. 24, the optical device 2810 can include the anisotropic transmitter 2820 configured to transmit the diffracted first order light 2801 and absorb the display zero order light 2804. In some examples, the anisotropic transmitter 2820 includes a louver film configured to have a predetermined angle (or a pass angle) approximately ±30° in air or approximately ±20° in acrylic. The anisotropic transmitter 2820 substantially transmits the diffracted first order light 2801, e.g., at approximately ±5° in air (approximately ±3° in acrylic), and absorbs the display zero order light 2804, e.g., approximately 75° in air. The anisotropic transmitter 2820 can be index matched to the cover glass 2818, such that there is no significant Fresnel reflection from a surface of the anisotropic transmitter 2820 back into the optical device 2810 for the display zero order light 2804 having either s-polarization or p-polarization state. Louvers in the louver film can be also index matched to the transmissive material of the louver film to eliminate Fresnel reflections off the louvers.

In the previous examples shown in FIGS. 26A-26E, 27A-27B, and FIG. 28, the zero order redirection grating structures are configured to diffract display zero order light at redirection angles smaller than a critical angle for total internal reflection at an interface into air.

Figure 29:
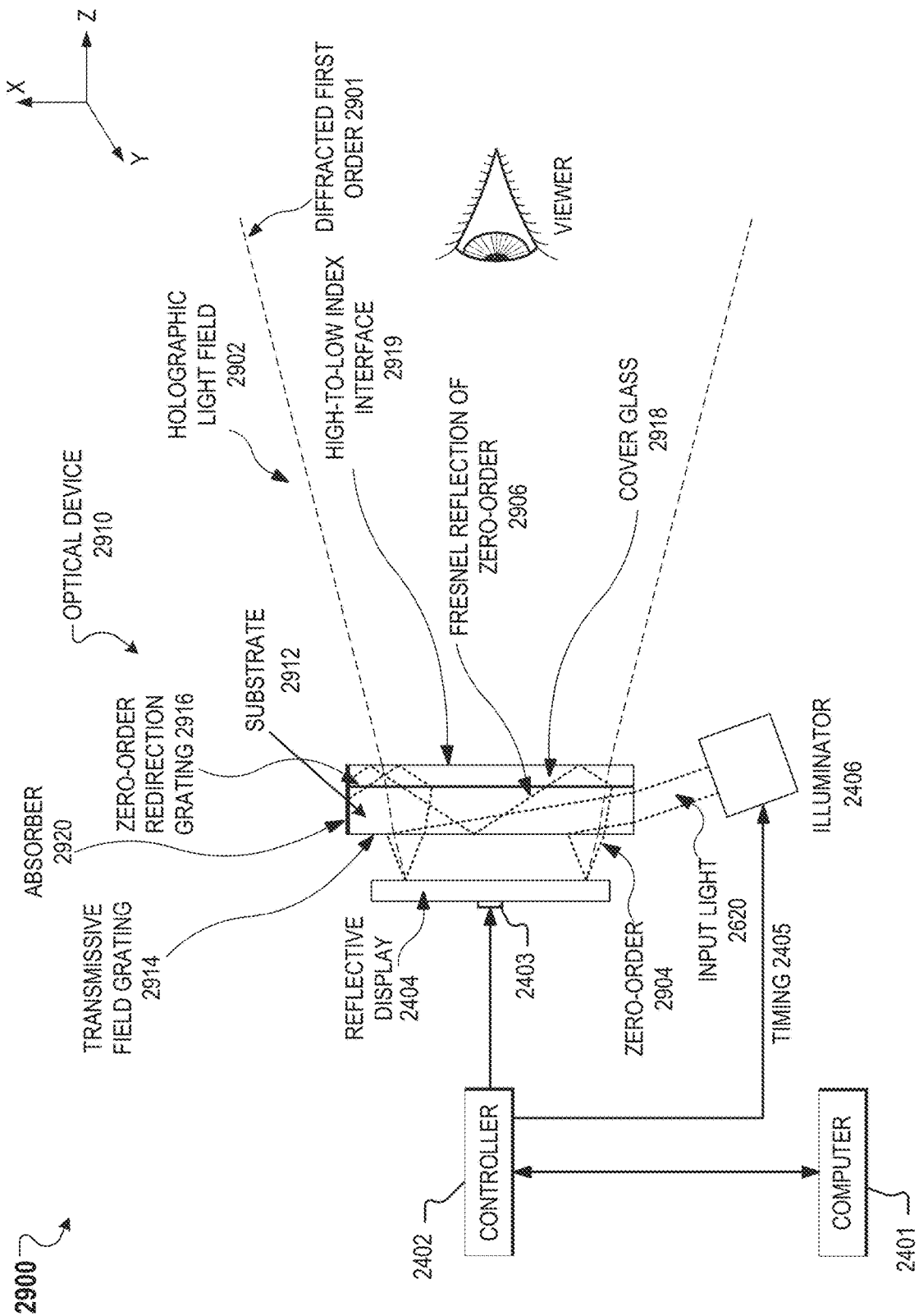
FIG. 29 illustrates an example of redirecting display zero order light to totally reflect the display zero order light.

FIG. 29 illustrates an example system 2900 of redirecting display zero order light to totally reflect the display zero order light. Similar to the optical device 2610 of FIG. 26A, an optical device 2910 of the system 2900 includes a transmissive field grating structure 2914 formed on a substrate 2912 and configured to diffract the input light 2620 to illuminate the display 2404 at an incident angle, e.g., −6° in air and approximately −4° in glass.

However, different from the optical device 2610 of FIG. 26A, the optical device 2910 includes a zero order redirection grating structure 2916 configured to redirect display zero order light 2904 at a redirection angle, e.g., approximately +60° in glass, larger than a critical angle for total internal reflection in glass, e.g., approximately 41° for a transition from a cover glass 2918 to air at a high-to-low index interface 2919. Thus, display zero order light 2904 is totally reflected back at the interface 2919, and Fresnel reflection of the display zero order light 2906 can be absorbed by an optical absorber 2920 (e.g., the optical absorber 2619 of FIG. 26A) formed on an edge of the optical device 2910. In contrast, a portion of the input light 2620 illuminating on modulated display elements of the display 2404 is diffracted to transmit through the optical device 2910 (including the zero order redirection grating structure 2916) to become diffracted first order light 2901 that forms a holographic light field 2902, without the display zero order light 2904.

Input light illuminating a display can include multiple different colors of light, e.g., red, green, and blue. The different colors of light can be sequentially incident on the display, and corresponding different color holographic data (or holograms) can sequentially modulate display elements of the display. As described above, an optically diffractive device, e.g., the optically diffractive device 598 of FIG. 5H, can be configured to diffract the different colors of light to illuminate the display, and can also be configured to reduce color crosstalk among the different colors of light. For example, the optically diffractive device 598 includes multiple holographic gratings for the different colors in different recording layers, e.g., as illustrated in FIGS. 9A to 12C. In some examples, as described above with respect to FIGS. 9A to 10B, the optically diffractive device can include multiple holographic gratings with one or more color-selective polarizers to suppress (e.g., eliminate or minimize) color crosstalk. In some examples, as described above with respect to FIGS. 11 to 12C and 15, the optically diffractive device can include multiple holographic gratings with one or more reflective layers for light of different colors incident at respective incident angles to suppress color crosstalk and zero order light.

Similarly, an optically redirecting device can be also configured to redirect different colors of display zero order light out of corresponding holographic scenes and can also be configured to reduce color crosstalk among the different colors of display zero order light, e.g., by redirecting the different colors of display zero order light to different directions away from the holographic scenes in plane and/or in space. In the following, FIGS. 30A-30B, 31A-31B, 32, and 33 illustrate different examples of implementations.

Figure 30A:
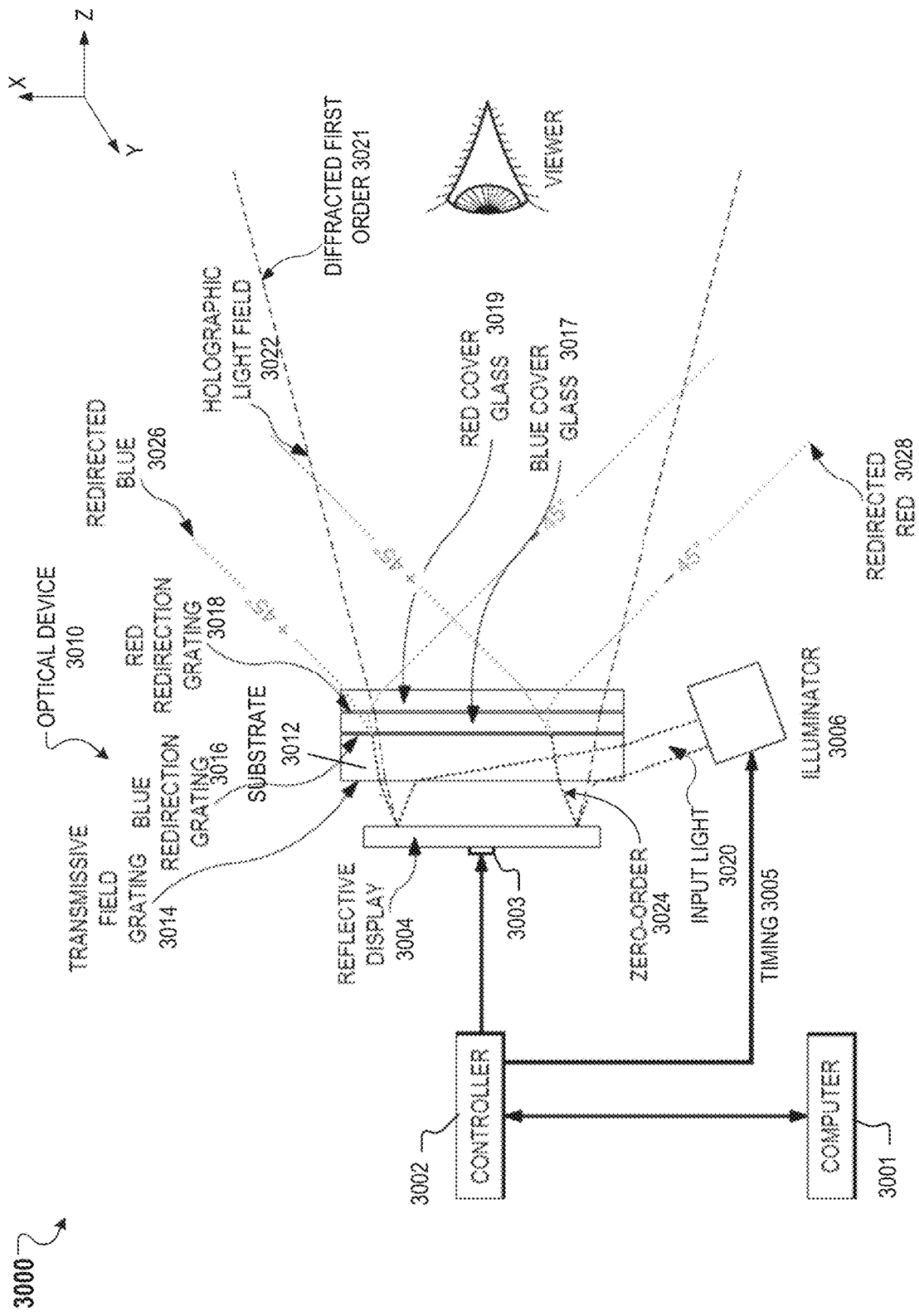
FIGS. 30A-30B illustrate examples of redirecting two different colors of display zero order light to different directions away from a holographic scene.
Figure 30B:
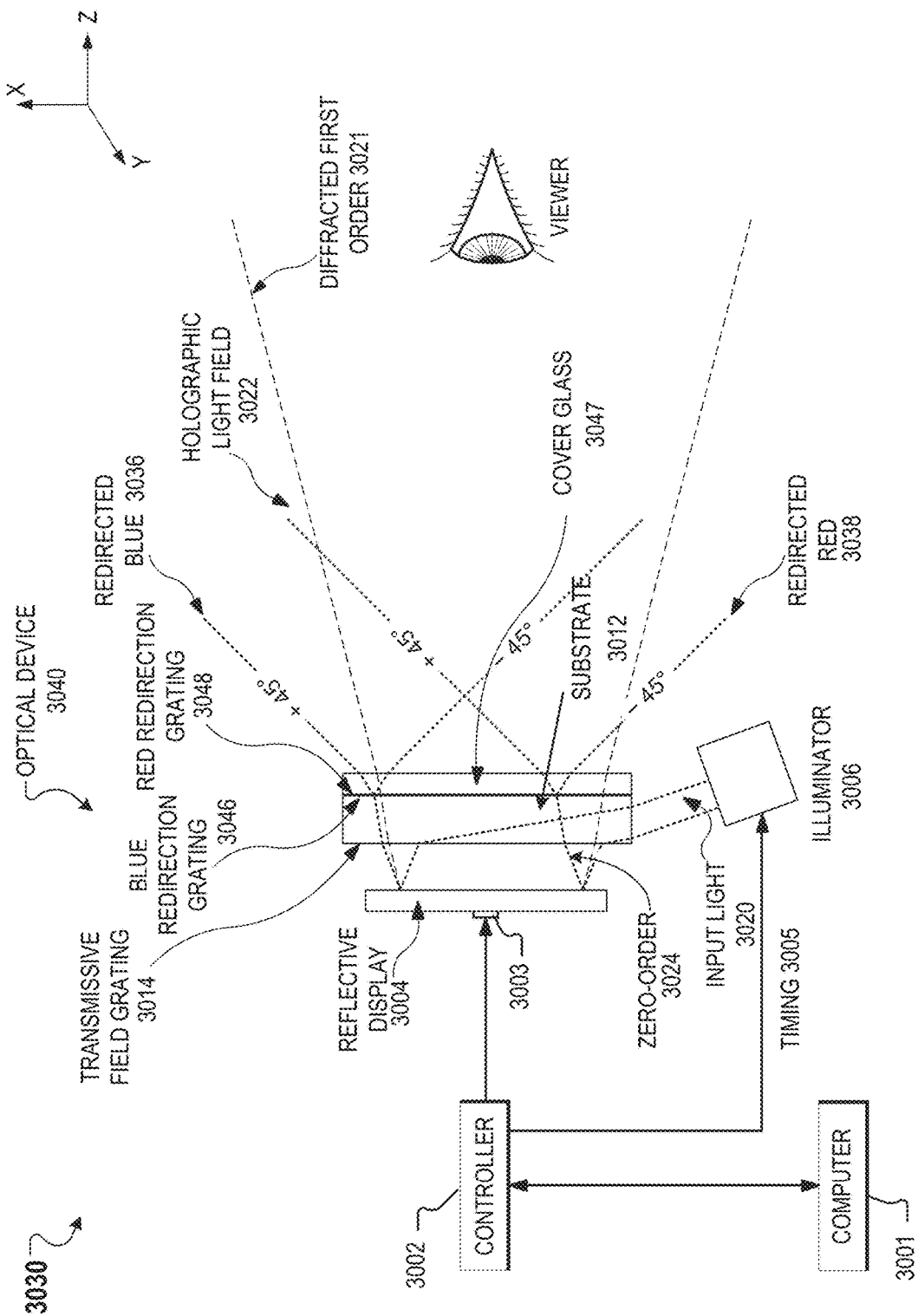

FIGS. 30A-30B illustrate examples of redirecting two different colors (e.g., blue and red) of display zero order light to different directions away from a holographic scene.

As illustrated in FIG. 30A, similar to the system 2400 of FIG. 24, a system 3000 includes a computer 2401 (e.g., the computer 2401 of FIG. 24), a controller 3002 (e.g., the controller 2402 of FIG. 24), a reflective display 3004 (e.g., the reflective display 2404 of FIG. 24), and an illuminator 3006 (e.g., the illuminator 2406 of FIG. 24). The system 3000 also includes an optical device 3010 that can include an optically diffractive device, e.g., the optically diffractive device 900 of FIGS. 9A and 9B or 1100 of FIG. 11. In some implementations, as illustrated in FIG. 30A, the optical device 3010 includes a transmissive field grating structure 3014 on a substrate 3012 (e.g., the substrate 2412 of FIG. 24). The transmissive field grating structure 3014 can include two corresponding different gratings for the two different colors of light.

The controller 3002 is configured to receive graphic data corresponding to one or more objects from the computer 3001 (e.g., by using a 3D software application such as Unity), perform computation on the graphic data, generate and transmit control signals for modulation to the display 3004 through a memory buffer 3003. The controller 3002 is also coupled to the illuminator 3006 and configured to provide a timing signal 3005 to activate the illuminator 3006 to provide input light 3020. The input light 3020 is then diffracted by the transmissive field grating structure 3014 of the optical device 3010 to illuminate the display 3004. A first portion of the input light 3020 incident on display elements of the display 3004 is diffracted by the display 3004, and diffracted first order light 3021 forms a holographic light field 3022 towards a viewer. The holographic light field 3022 can correspond to a reconstruction cone (or frustum) that has a viewing angle. A second portion of the input light 3020 incident on gaps of the display 3004 is reflected by the display 3004 to become at least a part of display zero order light 3024.

The transmissive field grating structure 3014 is configured to diffract the different colors of input light 3020 from the illuminator 3006 out to illuminate the display 3004 off axis at an incident angle, e.g., −6° in air or approximately −4° in glass, larger than a half of a viewing angle of the reconstruction cone (or frustum). By applying the third technique, the diffracted first order light 3021 comes off the display 3004 in the same manner as that when the input light 3020 is incident on axis at normal incidence, while the display zero order light 3024 comes off at a reflected angle that is identical to the incident angle, which is outside of the reconstruction cone.

As illustrated in FIG. 30A, the system 3000 can include an optically redirecting structure having corresponding zero order redirection gratings 3016 and 3018 for different colors (blue and red) of light. Each zero order redirection grating 3016, 3018 can be similar to the redirection grating 2416 of FIG. 24, and configured to diffract a first light beam having an angle identical to a predetermined angle with a substantially larger diffraction efficiency at a diffraction angle than a second light beam having an angle different from the predetermined angle. Each zero-order redirection grating 3016, 3018 can be a holographic grating such as a Bragg grating for a corresponding color of light.

As illustrated in FIG. 30A, the zero order redirection grating 3016 is configured to diffract blue color display zero order light at a reflected angle (identical to the incident angle) of at a diffraction angle of +45° in air (approximately +28° in glass), e.g., redirected blue zero order display light 3026. The zero order redirection grating 3018 is configured to diffract red color display zero order light from approximately −6° in air (approximately −4° in glass) to approximately −45° (approximately −28° in glass), e.g., redirected red display zero order light 3028.

The zero order redirection gratings 3016, 3018 can be sequentially arranged on the substrate 3012 on an opposite side of the transmissive field grating structure 3014. As light with a shorter wavelength tends to crosstalk more strongly off gratings intended for longer wavelengths, the zero order redirection grating 3016 for blue color of light can be arranged closer to the display than the zero order redirection grating 3018 for red color. The two zero order redirection gratings 3016, 3018 can have substantially dissimilar fringe-plane tilts, which can reduce color crosstalk.

In some implementations, as illustrated in FIG. 30A, each zero order redirection grating 3016, 3018 for a different color of light is recorded in a corresponding recording material, e.g., photosensitive polymer, and protected by a corresponding cover glass 3017, 3019.

In some implementations, as illustrated in FIG. 30B, each zero order redirection grating 3046, 3048 of an optical device 3040 in a system 3030 for a different color of light is recorded in a same recording material, e.g., photosensitive polymer, and protected by a cover glass 3047. The zero order redirection grating 3046 can be same as the zero order redirection grating 3016 and configured to diffract blue color display zero order light from approximately −6° in air (approximately −4° in glass) to approximately +45° (approximately +28° in glass), e.g., redirected blue display zero order light 3036. The zero order redirection grating 3048 can be same as the zero order redirection grating 3018 and configured to diffract red color display zero order light from approximately −6° in air (approximately −4° in glass) to approximately −45° (approximately −28° in glass), e.g., redirected red display zero order light 3038.

The optical devices 3010, 3040 can include optical absorbers (e.g., the optical absorber 2619 of FIG. 26A) on edges of the optical devices 3010, 3040, to reduce Fresnel reflection at the interface between the cover glass and the air.

Figure 31A:
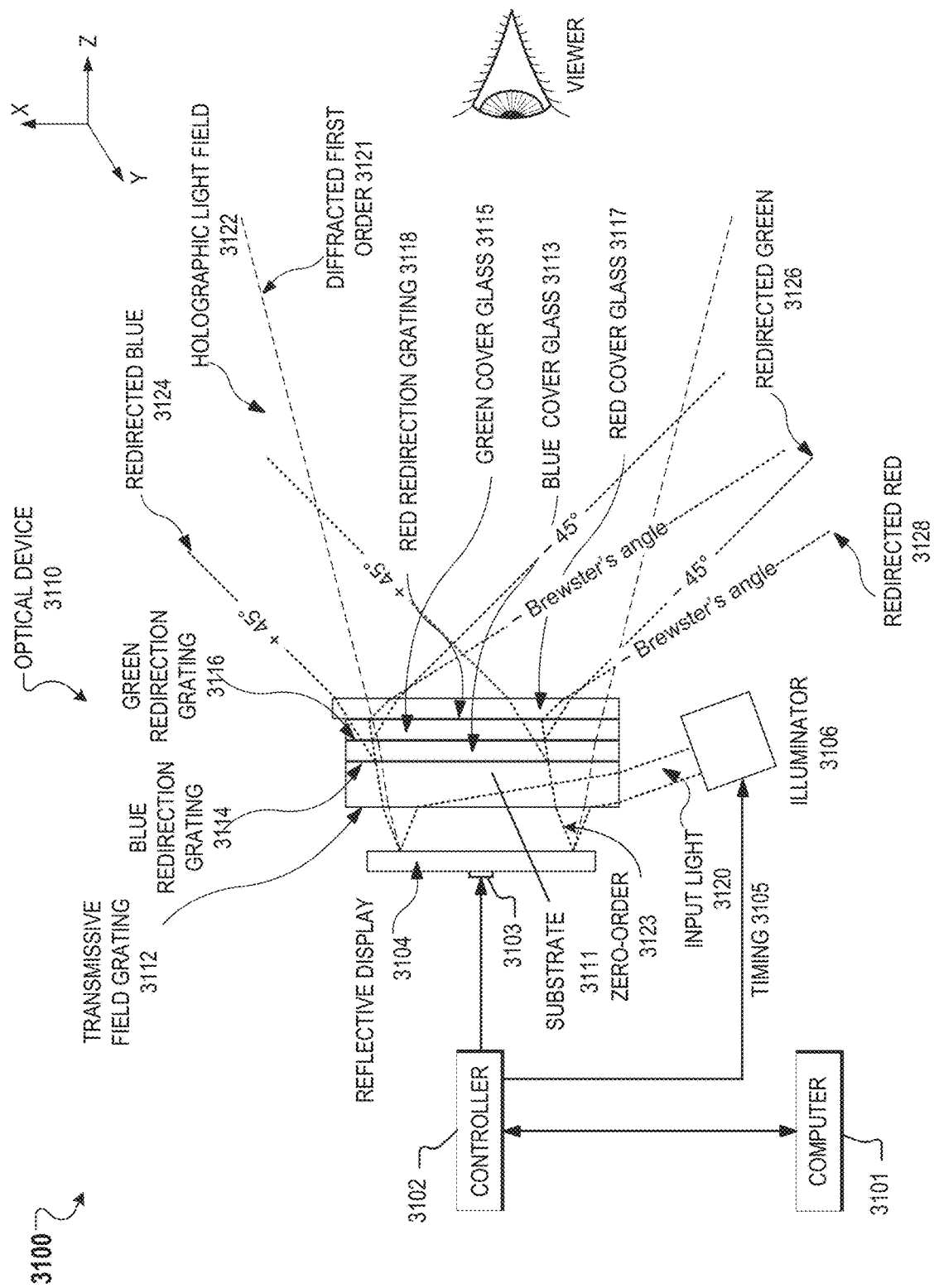
FIGS. 31A-31B illustrate examples of redirecting three different colors of display zero order light to different directions away from a holographic scene in a same plane.
Figure 31B:
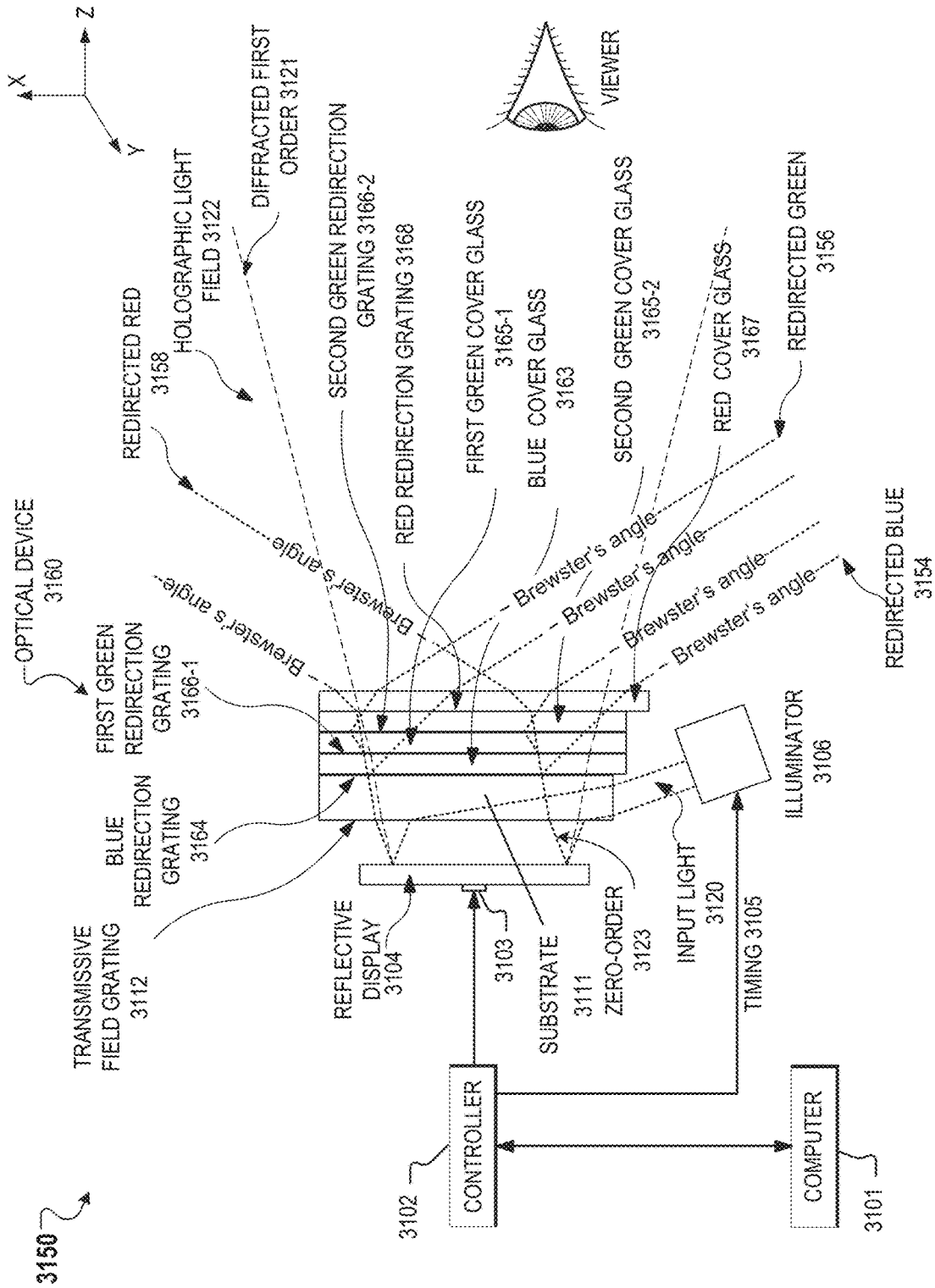

FIGS. 31A-31B illustrate example systems 3100 and 3150 of redirecting three different colors (blue, green, red) of display zero order light to different directions away from a holographic scene in a same plane. Compared to a system for two different colors of light, e.g., as illustrated in FIG. 30A or 30B, a system for three different colors of light includes an optical diffractive structure including three different diffraction gratings for diffracting the three colors of input light to illuminate a display at a same incident angle, and an optical redirecting structure including three different zero order redirection gratings for diffracting three colors of display zero order light at different diffraction angles towards different directions.

As illustrated in FIG. 31A, similar to the system 3000 of FIG. 30A, a system 3100 includes a computer 3101 (e.g., the computer 3101 of FIG. 30A), a controller 3102 (e.g., the controller 3002 of FIG. 30A), a reflective display 3104 (e.g., the reflective display 3004 of FIG. 30A), and an illuminator 3106 (e.g., the illuminator 3006 of FIG. 30A). The system 3100 also includes an optical device 3110 that can include an optically diffractive device, e.g., the optically diffractive device 1000 of FIGS. 10A and 10B, 1200 of FIG. 12A, 1250 of FIG. 12B, or 1270 of FIG. 12C, or 1500 of FIG. 15. In some implementations, as illustrated in FIG. 31A, the optical device 3110 includes a transmissive field grating structure 3112 on a substrate 3111. The transmissive field grating structure 3112 can include three corresponding different gratings for the three different colors of light.

The controller 3102 is configured to receive graphic data corresponding to one or more objects from the computer 3101 (e.g., by using a 3D software application such as Unity), perform computation on the graphic data, generate and transmit control signals for modulation to the display 3104 through a memory buffer 3103. The controller 3102 is also coupled to the illuminator 3106 and configured to provide a timing signal 3105 to activate the illuminator 3106 to provide input light 3120. The input light 3120 is then diffracted by the transmissive field grating 3112 of the optical device 3110 to illuminate the display 3104. A first portion of the input light 3120 incident on display elements of the display 3104 is diffracted by the display 3104, and diffracted first order light 3121 forms a holographic light field 3122 towards a viewer. The holographic light field 3122 can correspond to a reconstruction cone (or frustum) that has a viewing angle. A second portion of the input light 3120 incident on gaps of the display 3104 is reflected by the display 3104 to become display zero order light 3123.

The transmissive field grating 3112 is configured to diffract the different colors of input light 3120 from the illuminator 3106 out to illuminate the display 3104 off axis at an incident angle, e.g., −6° in air or approximately −4° in glass, larger than a half of a viewing angle of the reconstruction cone (or frustum). By applying the third technique, the diffracted first order light 3121 comes off the display 3104 in the same manner as that when the input light 3120 is incident on axis at normal incidence, while the display zero order light 3123 comes off at a reflected angle that is identical to the incident angle, which is outside of the reconstruction cone.

As illustrated in FIG. 31A, the system 3100 can include an optically redirecting structure having three corresponding zero order redirection gratings 3114, 3116, and 3018 for the different colors (blue, green, and red) of light. Each zero order redirection grating 3114, 3116, 3118 can be similar to the redirection grating 2416 of FIG. 24. Each zero-order redirection grating 3114, 3116, 3118 can be a holographic grating such as a Bragg grating for a corresponding color of light.

The zero order redirection gratings 3114, 3116, 3118 can be sequentially arranged on the substrate 3111 on an opposite side of the transmissive field grating structure 3112. In some implementations, as illustrated in FIG. 31A, each zero order redirection grating 3114, 3116, 3118 for a different color of light (blue, green, red) is recorded in a corresponding recording material, e.g., photosensitive polymer, and protected by a corresponding cover glass 3113, 3115, 3117. As noted above, the zero order redirection gratings 3114, 3116, 3118 for the three different colors of light can be recorded in a same recording material, e.g., photosensitive polymer, and protected by a cover glass. The three zero order redirection gratings 3114, 3116, 3118 can have substantially dissimilar fringe-plane tilts, which can reduce color crosstalk.

As illustrated in FIG. 31A, the blue color zero order redirection grating 3114 is configured to diffract blue color display zero order light from approximately −6° in air (approximately −4° in glass) to approximately +45° (approximately +28° in glass), e.g., redirected blue display zero order light 3124. The green color zero order redirection grating 3116 is configured to diffract green color display zero order light from approximately −6° in air (approximately −4° in glass) to approximately −45° (approximately −28° in glass), e.g., redirected green display zero order light 3126. The red color zero order redirection grating 3118 is configured to diffract red color display zero order light from approximately −6° in air (approximately −4° in glass) to the Brewster's angle approximately −57° (approximately −37° in glass), e.g., redirected red display zero order light 3128. If the red color display zero order light has p polarization state, the red color display zero order light can be totally transmitted into the air. The optical device 3110 can include one or more optical absorbers (e.g., the optical absorber 2619 of FIG. 26A) on one or more edges of the optical device 3110 to reduce Fresnel reflection of the blue and green colors of display zero order light at the interface between the cover glass and the air.

If all the three colors of display zero order light have p polarization state, e.g., when the input light is p polarized, an optical redirecting device can include zero order redirection gratings for the three different colors of display zero order light configured to diffract the three different colors of display zero order light into air all at the Brewster's angle, which can reduce Fresnel reflection. One or more diffractive gratings can be used together to redirect a particular color of light.

As illustrated in FIG. 31B, an optical device 3160 of a system 3150 includes a blue color redirection grating 3164, a pair of green color redirection grating 3166-1, 3166-2, and a red color redirection grating 3168, which are recorded in corresponding recording media and protected by corresponding cover glasses 3163, 3165-1 and 3165-2, and 3167. The blue color zero order redirection grating 3164 is configured to diffract blue color display zero order light from approximately +6° in air (approximately +4° in glass) to the Brewster's angle of approximately −57° in air (approximately −37° in glass), e.g., redirected blue display zero order light 3154. Green color display zero order light is first diffracted by first green color zero order redirection grating 3166-1 from approximately +6° in air (approximately +4° in glass) to approximately +70° (approximately +38° in glass), and then diffracted by second green color zero order redirection grating 3166-2 to the Brewster's angle of approximately −57° in air (approximately −37° in glass), e.g., redirected green display zero order light 3156. The red color zero order redirection grating 3168 is configured to diffract red color display zero order light from approximately +6° in air (approximately +4° in glass) to the Brewster's angle of approximately +57° in air (approximately +37° in glass), e.g., redirected red display zero order light 3158. The four zero order redirection gratings 3164, 3166-1, 3166-2, and 3168 can have substantially dissimilar fringe-plane tilts, which can reduce color crosstalk.

To reduce color crosstalk among different colors of display zero order light, an optical redirecting device can be configured to redirect the different colors of display zero order light towards different directions in a sample plane, as illustrated in FIGS. 30A-30B and 31A-31B. The optical redirecting device can also be configured to redirect the different colors of display zero order light towards different planes in space, as illustrated in FIG. 32 below.

Figure 32:
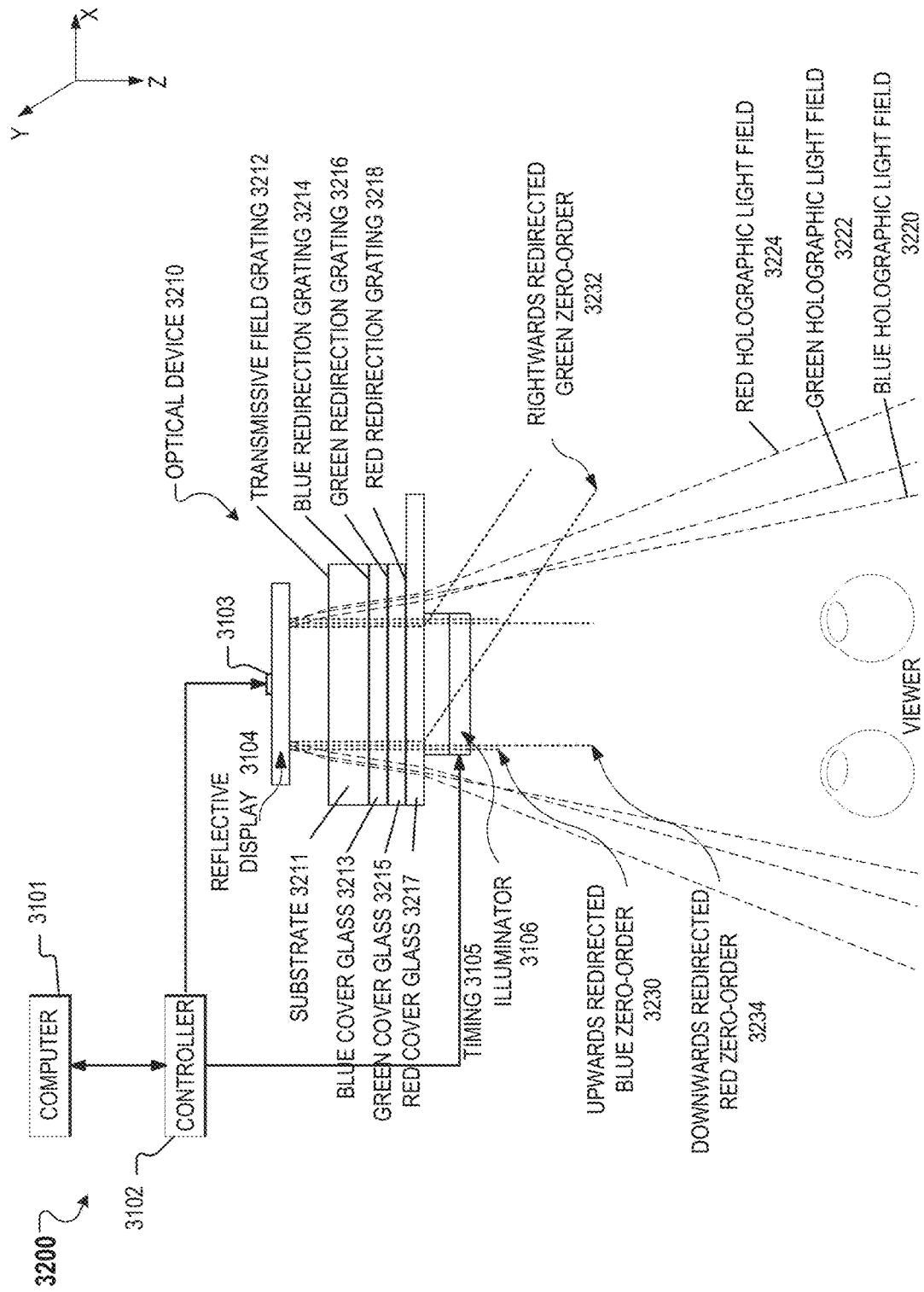
FIG. 32 illustrates an example of redirecting three different colors of display zero order light to different directions away from a holographic scene in space.

FIG. 32 illustrates an example system 3200 including an optical device 3210 of redirecting three different colors (e.g., blue, green, and red) of display zero order light to different directions away from corresponding holographic scenes in space.

Similar to the optical device 3110 of FIG. 31A, the optical device 3210 includes a transmissive field grating structure 3212 that is same as the transmissive field grating structure 3112 of FIG. 31A and configured to diffract each color input light to illuminate the display 3104 off axis at an incident angle, e.g., −6° in air or approximately −4° in glass, larger than a half of a viewing angle of the reconstruction cone (or frustum). By applying the third technique, the diffracted first order light comes off the display 3104 in the same manner as that when the input light is incident on axis at normal incidence. As noted above, light with a larger wavelength corresponds to a larger viewing angle. As illustrated in FIG. 32, blue color diffracted first order light forms a blue color holographic light field 3220, green color diffracted first order light forms a green color holographic light field 3222, and red color diffracted first order light forms a red color holographic light field 3224.

Similar to the optical device 3110 of FIG. 31A, the optical device 3210 includes blue, green, red color redirection gratings 3214, 3216, 3218 recorded in different recording media and sequentially arranged on an opposite side of a substrate 3211 with respect to the transmissive field grating structure 3212. The blue, green, red color redirection gratings 3214, 3216, 3218 are protected by corresponding blue, green, red cover glasses 3213, 3215, 3217. However, different from the redirection gratings 3114, 3116, 3118 of FIG. 31A, the redirection gratings 3214, 3216, 3218 redirect corresponding colors of display zero order light into different planes.

For example, as illustrated in FIG. 32, the blue color redirection grating 3214 diffracts the blue color display zero order light from approximately −6° in air (approximately −4° in glass) to an upwards Brewster's angle of approximately +57° in air (approximately +37° in glass), e.g., upwards redirected blue color zero order light 3230. The red color redirection grating 3218 redirects the red color display zero order light from approximately −6° in air (approximately −4° in glass) to a downwards Brewster's angle of approximately −57° in air (approximately −37° in glass), e.g., downwards redirected red color zero order light 3234. The green color redirection grating 3216 redirects the green color display zero order light from approximately −6° in air (approximately −4° in glass) to a rightwards Brewster's angle (approximately +57° in air, approximately +37° in glass), e.g., rightwards redirected green color zero order light 3232, which is orthogonal to the plane of the upwards redirected blue color zero order light 3230 and downwards redirected red color zero order light 3234. Note that the blue and red color redirection gratings 3214, 3218 have different fringe-plane tilts and/or orientations than the green color redirection grating 3216, which can suppress color crosstalk.

Figure 33:
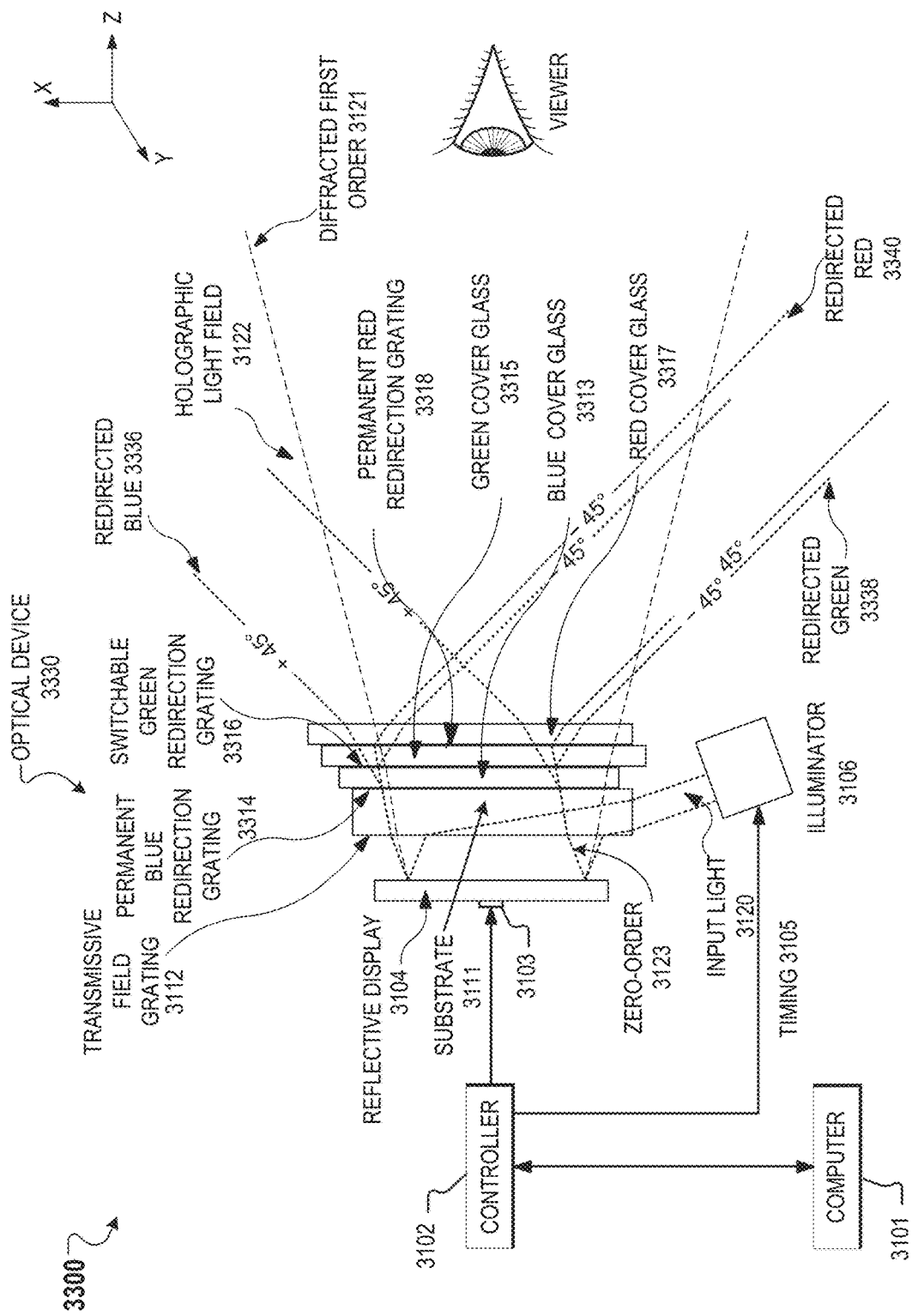
FIG. 33 illustrates an example of redirecting three different colors of display zero order light to different directions away from a holographic scene using a switchable grating for one of the colors.

FIG. 33 illustrates another example system 3300 of redirecting three different colors of display zero order light to different directions away from a holographic scene using at least one switchable grating for at least one corresponding color display zero order light.

Similar to the optical device 3110 of FIG. 31A, an optical device 3310 in the system 3300 includes blue, green, red color redirection gratings 3314, 3316, 3318 sequentially arranged on an opposite side of the substrate 3111 with respect to the transmissive field grating structure 3112. The blue, green, red color redirection gratings 3314, 3316, 3318 are protected by corresponding blue, green, red cover glasses 3313, 3315, 3317. Similar to the blue and red color redirection gratings 3114, 3118 of FIG. 31A, the blue and red color redirection gratings 3314, 3318 are permanently recorded in corresponding recording media.

However, different from the green color redirection grating 3116 of FIG. 31A that is permanently recorded in the corresponding recording medium, the green color redirection grating 3316 is recorded in a switchable recording material, e.g., an electrically switchable Holographic Polymer Dispersed Liquid Crystal (HPDLC) material, and configured to be switchable between different states. For example, the green color redirection grating 3316 can be switched to a first state during first intervals of a field-sequential color (FSC) illumination sequence when only green color of light is present. During the first green-only intervals, the switchable green color redirection grating 3316 in the first state diffracts green color display zero order light from approximately −6° in air (approximately −4° in glass) to a downwards angle of approximately −45° in air (approximately −28° in glass), e.g., redirected green color display zero order light 3338.

During other intervals of the FSC color illumination sequence, when only red or blue color of light is present, the switchable green color redirection grating 3316 is switched to a second state in which the switchable green color redirection grating does not diffract red or blue color of light. As illustrated in FIG. 32, the blue color redirection grating 3314 diffracts the blue color display zero order light from approximately −6° in air (approximately −4° in glass) to an upwards angle of approximately +45° in air (approximately +28° in glass), e.g., upwards redirected blue color zero order light 3336. The red color redirection grating 3318 redirects the red color display zero order light from approximately −6° in air (approximately −4° in glass) to a downwards angle of approximately −45° in air (approximately −28° in glass), e.g., downwards redirected red color zero order light 3340. Although the redirected red color zero order light 3340 has the same direction as the redirected green color zero order light 3338, the switchable green color redirection grating 3316 is switched between the first state during all, part, or parts of the first intervals for redirecting the green color of light and the second state during all, part, or parts of the other intervals for transmitting the red or blue color of light, which can suppress color crosstalk.

In some implementations, two or more separate switchable gratings can be used for two or more corresponding colors, with fewer or no permanently-recorded gratings, which may further suppress color crosstalk. In some implementations, binary (on/off) switchable gratings can be replaced by switchable gratings in which a first switched state diffracts a first color, and a second switched state diffracts a second color, which can enable the use of fewer or no permanently recorded gratings.

Figure 34:
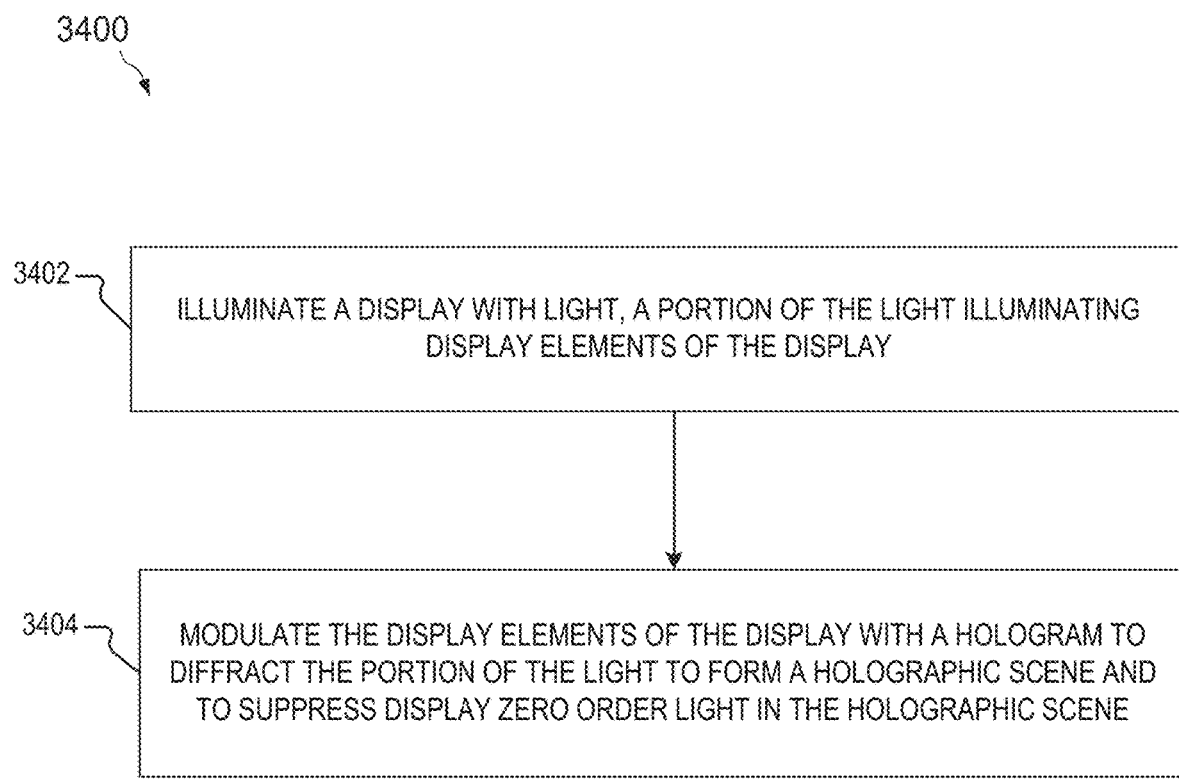
FIG. 34 is a flowchart of an example process of suppressing display zero order light in a holographic scene.

FIG. 34 is a flowchart of an example process 3400 of suppressing display zero order light in a holographic scene. The process 3400 can be implemented in a system for reconstructing 2D or 3D objects. The system can be any suitable system, e.g., the system 500 of FIG. 5A, 520 of FIG. 5B, 530 of FIG. 5C, 540 of FIG. 5D, 560 of FIG. 5E, 570 of FIG. 5F, 580 of FIG. 5G, 590 of FIG. 5H, 590A of FIG. 5I, 590B of FIG. 5J, 590C of FIG. 5K, 1800 of FIG. 18, 1950 of FIG. 19B, 1980 of FIG. 19C, 2100 of FIG. 21, 2200 of FIG. 22, 2300 of FIG. 23A, 2350 of FIG. 23B, 2400 of FIG. 24, 2600 of FIG. 26A, 2630 of FIG. 26B, 2650 of FIG. 26C, 2670 of FIG. 26D, 2690 of FIG. 26E, 2700 of FIG. 27A, 2730 of FIG. 27B, 2750 of FIG. 27C, 2800 of FIG. 28, 2900 of FIG. 29, 3000 of FIG. 30A, 3030 of FIG. 30B, 3100 of FIG. 31A, 3150 of FIG. 31B, 3200 of FIG. 32, or 3300 of FIG. 33.

At 3402, a display is illuminated with light. A first portion of the light illuminates display elements of the display. In some cases, a second portion of the light illuminates gaps between adjacent display elements. The display can be the display 1610 of FIG. 16, the display elements can be the display elements 1612 of FIG. 16, and the gaps can be the gaps 1614 of FIG. 16.

At 3404, the display elements of the display are modulated with a hologram corresponding to holographic data to diffract the first portion of the light to form a holographic scene corresponding to the holographic data and to suppress display zero order light in the holographic scene. The display zero order light can include reflected light from the display, e.g., the second portion of the light reflected at the gaps. The reflected light from the display can be a main order of the display zero order light. The display zero order light can also include any unwanted or undesirable light, e.g., diffracted light at the gaps, reflected light at surfaces of the display elements, and reflected light at a surface of a display cover covering the display. The holographic scene corresponds to a reconstruction cone (or frustum) with a viewing angle. The hologram is configured such that the display zero order light is suppressed in the holographic scene. The hologram can be configured such that the diffracted first portion of the light has at least one characteristic different from that of the display zero order light. The at least one characteristic can include at least one of a power density (e.g., as illustrated in FIG. 18), a beam divergence (e.g., as illustrated in FIG. 18), a propagating direction away from the display (e.g., as illustrated in FIGS. 19B, 19C, 20B, and 21-33), or a polarization state.

The display zero order light is suppressed in the holographic scene with a light suppression efficiency. The light suppression efficiency can be defined as a result of one minus a ratio between an amount of the display zero order light in the holographic scene using the suppression and an amount of the display zero order light in the holographic scene without any suppression. In some examples, the light suppression efficiency is more than a predetermined percentage that is one of 50%, 60%, 70%, 80%, 90%, or 99%. In some examples, the light suppression efficiency is 100%.

In some implementations, the process 3400 further includes: for each of a plurality of primitives corresponding to an object, determining an electromagnetic (EM) field contribution to each of the display elements of the display by computing, in a global three-dimensional (3D) coordinate system, EM field propagation from the primitive to the display element, and for each of the display elements, generating a sum of the EM field contributions from the plurality of primitives to the display element. The holographic data can include the sums of the EM field contributions for the display elements of the display from the plurality of primitives of the object. When the display is phase modulated, the holographic data can include respective phases for the display elements of the display. The holographic scene can include a reconstructed object corresponding to the object. The holographic data can include information of two or more objects.

In some implementations, as discussed above with respect to the first technique, "phase calibration," the hologram can be configured by adjusting the respective phases for the display elements to have a predetermined phase range, e.g., [0, 2π]. In some implementations, the respective phases can be adjusted according to the expression (15) below:

$$\emptyset_a = A\emptyset_i + B,$$

where $\emptyset_i$ represents an initial phase value of a respective phase, $\emptyset_a$ represents an adjusted phase value of the respective phase, and A and B are constants for the respective phases. The constants A and B can be adjusted such that the light suppression efficiency for the holographic scene is maximized or larger than a predetermined threshold, e.g., 50%, 60%, 70%, 80%, 90%, or 99%. In some implementations, the constants A and B are adjusted according to a machine vision algorithm or a machine learning algorithm.

In some implementations, as discussed above with respect to the second technique, "zero order beam divergence," an optically diverging component is arranged downstream the display. The optically diverging component can be a defocusing element including a concave lens. e.g., the concave lens 1802 of FIG. 18. The optically diverging component can be a focusing element including a convex lens. The diffracted first portion of the light is guided through the optically diverging component to form the holographic scene, while the display zero order light is diverged in the holographic scene. The light illuminating the display can be collimated, and the display zero order light can be collimated before arriving at the optically diverging component, and the hologram is configured such that the diffracted first portion of the light is converging before arriving at the optically diverging component. The optically diverging component can be a focusing element including a cylindrical lens. The optically diverging component can be a lenslet array including concave, convex, or cylindrical lenses, or a combination thereof. The optically diverging component can be one or more Holographic Optical Elements (HOEs), either added to the optical device, or incorporated within one or more of the other diffractive layers of the optical device. The one or more HOEs can be configured to converge, diverge or linearly focus light, or to impose a more complicated transfer function on the optically diverging component such as directing the display zero order light to a region or regions outside the reconstruction cone of the holographic scene. The region can include an annular or peripheral region or parts of an annular or peripheral region. The light illuminating the display can be collimated, and the hologram can be configured such that the diffracted first portion of the light is shaped with a shaping effect before arriving at the optically diverging component such that the effect of the optically diverging component on the first portion of the light compensates the shaping effect.

In some examples, the hologram is configured by adding a virtual lens, e.g., by adding a corresponding phase to the respective phase for each of the display elements, and the corresponding phases for the display elements are compensated by the optically diverging component such that the holographic scene corresponds to the respective phases for the display elements. The corresponding phase for each of the display elements can be expressed by the expression (16) below:

$$\emptyset = \frac{\pi}{\lambda f}(ax^2 + by^2),$$

where Ø represents the corresponding phase for the display element, λ represents a wavelength of the light, f represents a focal length of the optically diverging component, x and y represent coordinates of the display element in a coordinate system, and a and b represent constants.

In some examples, the hologram is configured in a 3D software application, e.g., Unity, by moving a configuration cone with respect to the display with respect to a global 3D coordinate system along a direction perpendicular to the display with a distance corresponding to a focal length of the optically diverging component. The configuration cone corresponds to the reconstruction cone and has an apex angle identical to the viewing angle. The software application can generate primitives for objects based on the moved configuration cone in the global 3D coordinate system.

The process 3400 can include displaying the holographic scene on a two-dimensional (2D) screen, e.g., the projection screen 1830 of FIG. 18, spaced away from the display along the direction perpendicular to the display. The 2D screen can be moved along the direction to obtain different slices of the holographic scene on the 2D screen.

The process 3400 can further include guiding the light to illuminate the display. In some examples, the light is guided by a beam splitter, e.g., the beam splitter 1810 of FIG. 18, to illuminate the display, and the diffracted first portion of the light and the display zero order light transmit through the beam splitter.

In some implementations, the display is illuminated with the light at normal incidence, e.g., as illustrated in FIG. 18 or 19A. In some implementations, the display is illuminated with the light at an incident angle that can be larger than a half of the viewing angle, as illustrated in FIG. 19B or 19C.

In some implementations, as discussed above with respect to the third technique, "zero order light deviation," the hologram is configured such that the diffracted first portion of the light forms the reconstruction cone that is the same as a reconstruction cone to be formed by the diffracted first portion of the light if the light is normally incident on the display, while the reflected second portion of the light comes off the display at a reflected angle identical to the incident angle, as illustrated in FIG. 19B or 19C.

In some examples, the hologram is configured by adding a virtual prism, e.g., by adding a corresponding phase to the respective phase for each of the display elements, and the corresponding phases for the display elements are compensated by the incident angle such that the holographic scene corresponds to the respective phases for the display elements. The corresponding phase for each of the display elements can be expressed by the expression (17) below:

$$\emptyset = \frac{2\pi}{\lambda}(x\cos\theta + y\cos\theta),$$

where Ø represents the corresponding phase for the display element, λ represents a wavelength of the light, x and y represent coordinates of the display element in the global 3D coordinate system, and θ represents an angle corresponding to the incident angle.

In some examples, the hologram is configured by moving the configuration cone with respect to the display with respect to the global 3D coordinate system, e.g., as illustrated in FIG. 20B, by rotating the configuration cone by a rotation angle with respect to a surface of the display with respect to the global 3D coordinate system, the rotation angle corresponding to the incident angle.

In some implementations, as discussed above with respect to the fourth technique, "zero order light blocking," the display zero order light is blocked to appear in the holographic scene. The light suppression efficiency for the holographic scene can be 100%.

In some examples, an optically blocking component is arranged downstream the display. The optically blocking component can include a plurality of microstructures or nanostructures. The optically blocking component can include a metamaterial layer, e.g., the metamaterial layer 2316 of FIG. 23A-23B, or a louver film, e.g., the anisotropic transmitter of FIG. 28. The optically blocking component is configured to transmit a first light beam having an angle smaller than a predetermined angle and block a second light beam having an angle larger than the predetermined angle, and the predetermined angle is smaller than the incident angle and larger than the half of the viewing angle. Thus, as illustrated in FIGS. 23A, 23B, the display zero order light is blocked by the optically blocking component, and the diffracted first portion of the light transmits through the optically blocking component with a transmission efficiency to form the holographic scene. The transmission efficiency is no less than a predetermined ratio, e.g., 50%, 60%, 70%, 80%, 90%, or 99%.

In some implementations, the process 3400 further includes: guiding the light to illuminate the display by guiding the light through an optically diffractive component on a substrate configured to diffract the light out with the incident angle. The optically diffractive component can the outcoupler 1914 of FIG. 19A, 1964 of FIG. 19B or 19C, or the transmissive field grating structure 2414 of FIG. 24. In some examples, the light is guided through a waveguide coupler, e.g., the incoupler 1916 of FIG. 19A, or 1966 of FIG. 19B or 19C, to the optically diffractive component. In some examples, the light is guided through a coupling prism, e.g., the coupling prism 2111 of FIG. 21 or 2311 of FIG. 23A or 23B, to the optically diffractive component. In some examples, the light is guided through a wedged surface of the substrate to the optically diffractive component, e.g., as illustrated in FIG. 22.

As illustrated in FIG. 23A or 23B, the optically diffractive component is formed on a first surface of the substrate facing to the display, and the optically blocking component is formed on a second surface of the substrate that is opposite to the first surface.

In some implementations, as discussed above with respect to the fifth technique, "zero order light redirection," an optically redirecting component is arranged downstream the display and configured to transmit the diffracted first portion of the light to form the holographic scene and redirect the display zero order light away from the holographic scene. The optically redirecting component can be the zero order redirection grating structure 2416 of FIG. 24, 2616 of FIG. 26A, 2646 of FIG. 26B, 2666 of FIG. 26C or 26D, 2694 of FIG. 26E, 2716 of FIG. 27A, 2746 of FIG. 27B or 27C, 2816 of FIG. 28, 2916 of FIGS. 29, 3016 and 3018 of FIG. 30A, 3046 and 3048 of FIG. 30B, 3114, 3116, and 3118 of FIG. 31A, 3164, 3166-1, 3166-2, and 3168 of FIG. 31B, or 3214, 3216, and 3218 of FIG. 32, or 3314, 3316, and 3318 of FIG. 33.

The optically redirecting component can be configured to diffract a first light beam having an angle identical to a predetermined angle with a substantially larger diffraction efficiency than a second light beam having an angle different from the predetermined angle, and the predetermined angle is substantially identical to the incident angle. The optically redirecting component can include one or more holographic gratings such as Bragg gratings.

In some implementations, the optically diffractive component is formed on a first surface of the substrate facing towards the display, and the optically redirecting component is formed on a second surface of the substrate that is opposite to the first surface, e.g., as illustrated in FIGS. 24 to 33.

The optically redirecting component is configured such that the display zero order light is diffracted outside of the holographic scene in a three-dimensional (3D) space along at least one of an upward direction, a downward direction, a leftward direction, a rightward direction, or a combination thereof. The light suppression efficiency for the holographic scene can be 100%. In some examples, as illustrated in FIG. 26A, the incident angle of the light is negative, e.g., −6° in air, and a diffraction angle of the display zero order light diffracted by the optically redirecting component is negative, e.g., −45° in air. In some examples, as illustrated in FIG. 26B, the incident angle of the light is positive, e.g., +6° in air, and a diffraction angle of the display zero order light diffracted by the optically redirecting component is positive, e.g., +45° in air. In some examples, as illustrated in FIG. 26C or 26D, the incident angle of the light is negative, e.g., −6° in air, and a diffraction angle of the display zero order light diffracted by the optically redirecting component is positive, e.g., +45° in air. In some examples, the incident angle of the light is positive, +6° in air, and a diffraction angle of the display zero order light diffracted by the optically redirecting component is negative, e.g., −45° in air.

The optically redirecting component can be covered by a second substrate, e.g., the cover glass 2618 of FIG. 26A. The optically redirecting component can be configured to redirect the display zero order light to an optical absorber, e.g., the optical absorber 2619 of FIG. 26A or 2649 of FIG. 26B, formed on at least one of a side surface of the second substrate or a side surface of the substrate. The second substrate can include an anti-reflective (AR) coating, e.g., the AR coating 2682 of FIG. 26D, on a surface of the second substrate opposite to the optically redirecting component. The anti-reflective coating is configured to transmit the display zero order light to prevent Fresnel reflection of the display zero order light. An anti-reflective coating can also be configured to reduce or eliminate reflections of ambient light from the viewer and the environment reflected off the viewer-facing front surface of the second substrate, e.g., the AR coating 2682 of FIG. 26D. The final AR coating can be designed such that it does not interfere with those of the five techniques as described herein which depend upon the properties of the final transition into air on the viewer's side. Preventing Fresnel reflection from the front surface prevents the viewer seeing themselves and room lights mirrored by the front surface. Deeper surfaces within the optical device involve only comparatively small refractive index changes, and hence minimal Fresnel reflection of the observer and room light back towards the viewer, or the surfaces can also be AR coated, or, as in the case of the rear-reflector of the display, the surfaces are behind multiple absorptive layers, such as linear polarizers, through which ambient illumination can make a double pass and be hence attenuated, an effect which can be enhanced by adding to or incorporating within the device a layer of a material with a cumulative optical density in the range 0.2 to 1.0.

In some implementations, the display zero order light is p polarized before arriving at the second substrate. As illustrated in FIG. 27A, the optically redirecting component can be configured to diffract the display zero order light to be incident at a Brewster's angle on an interface between the second substrate and a surrounding medium, e.g., air, such that the display zero order light totally transmits through the second substrate.

In some implementations, the display zero order light is s polarized before arriving at the second substrate. The process 3400 can further include: converting a polarization state of the display zero order light from s polarization to p polarization. In some examples, converting the polarization state of the display zero order light is by an optical retarder (e.g., the optical retarder 2747 of FIG. 27B) (and optionally a linear polarizer) arranged upstream the optically redirecting component with respect to the display. In some examples, converting the polarization state of the display zero order light is by an optical retarder (e.g., the optical retarder 2747 of FIG. 27C) (and optionally a linear polarizer) arranged downstream the optically redirecting component with respect to the display. The optical retarder can be formed on a side of the second substrate opposite to the optically redirecting component, and the optical retarder can be covered by a third substrate (e.g., the retarder cover glass 2762 of FIG. 27C).

In some implementations, as illustrated in FIG. 28, an optically blocking component is formed on a side of the second substrate opposing to the optically redirecting component. The optically blocking component is configured to transmit the diffracted first portion of the light and to absorb the display zero order light diffracted by the optically redirecting component. In some examples, the optically blocking component includes an anisotropic transmitter (e.g., the anisotropic transmitter 2820 of FIG. 28) configured to transmit a first light beam with an angle smaller than a predetermined angle, and absorb a second light beam with an angle larger than the predetermined angle. The predetermined angle is larger than half of the viewing angle and smaller than a diffraction angle at which the display zero order light is diffracted by the optically redirecting component.

In some implementations, as illustrated in FIG. 29, the optically redirecting component is configured to diffract the display zero order light to be incident with an angle larger than a critical angle on an interface between the second substrate and a surrounding medium, such that the display zero order light diffracted by the optically diffractive component is totally reflected at the interface. An optical absorber, e.g., the optical absorber 2920 of FIG. 29, can be formed on side surfaces of the substrate and the second substrate and configured to absorb the totally reflected display zero order light.

In some implementations, as illustrated in FIGS. 30A to 33, the light includes a plurality of different colors of light, and the optically diffractive component is configured to diffract the plurality of different colors of light at the incident angle on the display. The optical redirecting component comprises a respective optically redirecting subcomponent for each of the plurality of different colors of light.

In some implementations, as illustrated in FIG. 30B, the respective optically redirecting subcomponents for the plurality of different colors of light are recorded in a same recording structure, or in recording structure which are adjacent and separated only by a thin optical indexing, contacting, or adhesive layer. In some implementations, as illustrated in FIGS. 30A, 31A, 31B, 32, 33, the respective optically directing subcomponents for the plurality of different colors of light are recorded in different corresponding recording structures which may be separated by cover glasses.

The optical redirecting component can be configured to diffract the plurality of different colors of light at different diffraction angles towards different directions in a 3D space. In some examples, as illustrated in FIGS. 31A-31B, the optical redirecting component is configured to diffract at least one of the plurality of different colors of light to be incident at at least one Brewster's angle at an interface. The interface can include one of an interface between a top substrate and a surrounding medium or an interface between two adjacent substrates.

In some implementations, as illustrated in FIG. 32, the optical redirecting component is configured to diffract a first color of light (e.g., blue) and a second color of light (e.g., red) within a plane, and a third color of light (e.g., green) orthogonal to the plane.

In some implementations, as illustrated in FIG. 31B, the optical redirecting component includes at least two different optically redirecting subcomponents (e.g., the redirection gratings 3166-1, 3166-2 of FIG. 31B) configured to diffract a same color of light of the plurality of different colors of light. The two different optically redirecting subcomponents can be sequentially arranged in the optical redirecting component.

Guiding the light to illuminate the display can include sequentially guiding the plurality of different colors of light to illuminate the display in a series of time periods. In some implementations, as illustrated in FIG. 33, the optical redirecting component can include a switchable optically redirecting subcomponent (e.g., the switchable green redirection grating 3316 of FIG. 33) configured to diffract a first color of light at a first state during all, part, or parts of a first time period and transmit a second color of light at a second state during all, part, or parts of a second time period.

In some implementations, the switchable optically redirecting subcomponent is configured to diffract a first color of light at a first state during all, part, or parts of a first time period and diffract a second color of light at a second state during all, part, or parts of a second time period.

The plurality of different colors of light can include a first color of light and a second color of light, the first color of light having a shorter wavelength than the second color of light. In the optically redirecting component, a first optically redirecting subcomponent for the first color of light can be arranged closer to the display than a second optically redirecting subcomponent for the second color of light, as illustrated in FIGS. 30A to 33.

In some implementations, fringe planes of at least two optically redirecting subcomponents for at least two different colors of light are oriented substantially differently.

In some implementations, the optically redirecting component includes: a first optically redirecting component configured to diffract a first color of light, a second optically redirecting component configured to diffract a second color of light, and at least one optical retarder (and optionally a linear polarizer) arranged between the first and second optically redirecting subcomponent and configured to convert a polarization state of the first color of light such that the first color of light transmits through the second optically redirecting component.

The reflected second portion of the light has a reflected angle identical to the incident angle and propagates outside of the holographic scene. In some examples, a half of the viewing angle is within a range from −10 degrees to 10 degrees or a range from −5 degrees to 5 degrees. In some examples, the incident angle is −6 degrees or 6 degrees.

In some implementations, the optical redirecting component is configured to allow the display zero order light to pass through unchanged, and redirect the diffracted first portion of the light to form a holographic scene corresponding to a cone or frustum having a predetermined angle, which is away from the display zero order light.

In some implementations, the optical redirecting component is configured to redirect the display zero order light towards a first direction and redirect the diffracted first portion of the light towards a second direction away from the first direction. For example, the diffracted first portion of the light can be redirected to be normal to a wedged surface of a substrate, and the display zero order light can be redirected to hit the wedged surface beyond a critical angle and hence undergo total-internal-reflection (TIR) back into the substrate.

Additional Aspects of Displaying Reconstructed Three-Dimensional Objects

Implementations of the present disclosure provide a display system for displaying reconstructed three-dimensional (3D) objects in a holographic light field, e.g., the holographic light field 518 of FIG. 5A, 528 of FIG. 5B, 538 of FIG. 5C, 548 of FIG. 5D, 568 of FIG. 5E, 578 of FIG. 5F, 599-1 or 599-2 of FIG. 5H, SI, 5J, or 5K, 2422 of FIG. 24, 2622 of FIG. 26A, 2632 of FIG. 26B, 2652 of FIG. 26C, 26D or 26E, 2702 of FIG. 27A, 2732 of FIG. 27B or 27C, 2802 of FIG. 28, 2902 of FIG. 29, 3022 of FIG. 30A or 30B, 3122 of FIG. 31A or 31B or 33, or 3220, 3222, 3224 of FIG. 32. Techniques described herein can improve one or more characteristics (e.g., size or zero order suppression) of the holographic light field to thereby improve a performance of the display system, e.g., by using larger reflective displays, using larger gratings, and/or controlling input light. For illustration purpose only, the techniques are discussed with reference to the system 3100 in FIG. 31A.

First Exemplary Method—Using Larger Reflective Displays

One method to increase a size of the holographic light field 3122 of FIG. 31A is to build the same optical geometry using a larger reflective display 3104 and a proportionately larger substrate 3111 with unchanged beam angles.

As the linear extent of the reflective display 3104 increases, the front-area of the substrate 3111 increases as a square of the increase in the linear extent of the reflective display 3104. If the beam angles and beam distributions remain unchanged, then the thickness of the substrate 3111 increases as the increase in the linear extent of the reflective display 3104. As a result, a volume of the substrate 3111 can increase as a cube of the increase in the linear extent of the reflective display 3104. For example, doubling the width of the reflective display 3104, while maintaining the same width-to-height aspect ratio of the reflective display 3104 and a proportional thickness of the substrate 3111, quadruples the front-area of the substrate 3111 and increases the volume of the substrate 3111 by a factor of eight. Eventually the large thickness and the high cost of the substrate 3111 may become undesirable, e.g., because it may be desirable that the substrate 3111 maintains an optical-grade clarity, substantially free from significant inclusions, absorption, scatter, birefringence, and/or other visible optical defects or imperfections.

The weight of the substrate 3111 also may become undesirable. For example, the substrate 3111 may have a thickness of approximately 20% of the height of the reflective display 3104. As an example, for a 686 mm (27") diagonal reflective display 3104 with a 16:9 aspect-ratio (typical dimensions for a computer monitor), the substrate 3111 may have dimensions of 598 mm×336 mm×68 mm or greater. If such a substrate 3111 were made from a solid block of acrylic with a density of 1.17 to 1.20 g/cm$^3$, the weight of substrate 3111 could be at least 16 kg (35 pounds). For a similar 1,650 mm (65") diagonal reflective display 3104 with the 16:9 aspect-ration, the substrate 3111 can be at least 165 mm thick and weigh at least 225 kg (495 pounds), which can be challenging to ship, install, and move. Mounting and support structures for such a block of acrylic may also be large and heavy.

Further, if all or part of the holographic light field 3122 is projected into a viewing space in front of the final cover glass 3113, then it may be desirable for the holographic light field 3122 to be positioned proportionately further in front of the front cover glass 3113 (e.g., more than 165 mm in front of the reflective display 3104 with a 1,650 mm diagonal). This could reduce its field of view and resolution. If a lesser, zero, or negative z-axis translation is applied, the holographic light field 3122 may appear deeper behind the front surface of the front cover glass 3113.

To address the above issues, the substrate 3111 can be made thinner, which may reduce its mas, cost, and cause the substrate to have lesser constraints on its z-position and field of view.

In some embodiments, the substrate 3111 can be made of a material with a lower density and/or with a refractive index permitting more extreme angles and beam-angle changes for the beams entering, within, and exiting the substrate 3111. For example, a liquid-filled substrate 3111 can be used with a liquid, e.g., water or oil, with a refractive index that can be smaller (e.g., 17% to 20% smaller) than a refractive index of acrylic. The liquid can be enclosed in a tank, which may help resolve certain potential shipping and installation issues because the tank can be transported empty and then filled in situ.

In certain embodiments, the angle of the input light 3120 as refracted into the substrate 3111 can be increased for one or more wavelengths of the input light 3120. This can allow for the use of a relatively thin substrate 3111 for the input light 3120, e.g., to illuminate a same area of the reflective display 3104. In some cases, it may be desirable to choose the angle(s) to achieve a particular diffraction efficiency and/or to meet desired critical-angle properties.

In some embodiments, the substrate 3111 can be wedged, e.g., similar to the substrate 1252 of FIG. 12B or the substrate 1272 of FIG. 12C, such that incident angles of the input light 3120 on the field grating 3112 can be relatively large.

In certain embodiments, two or more illuminators can be used to illuminate different regions of the reflective display 3104, e.g., respectively from upper and lower directions. For example, a first illuminator 3106 providing first input light 3120 into a first edge-face of the substrate 3111 (e.g., a lower edge-face of substrate 3111) can be used to illuminate only a first region (e.g., a lower half) of the reflective display 3104. A second illuminator (which can be similar to the first illuminator 3106) providing second input light (which can be similar to the first input light 3120) into a second edge-face of the substrate 3111 (e.g., an upper edge-face of the substrate 3111) can be used to illuminate only a second region (e.g., an upper half) of the reflective display 3104. Such an arrangement can allow the reflective display 3104 to be fully illuminated while allowing the substrate 3111 to be relatively thin (e.g., allowing the thickness of the substrate 3111 to be halved). Optionally, a third, fourth, or greater number of input lights, each entering through a different corresponding edge-face of the substrate 3111 (e.g., left and right edge-faces of the substrate 3111), can be used to illuminate, respectively, regions (e.g., a left region and a right region, respectively) of the reflective display 3104.

In some embodiments, input light can illuminate different regions of the reflective display 3104 along different optical paths. For example, a first illuminator 3106, providing first input light 3120 into an edge-face of the substrate 3111 (e.g., a lower edge-face of the substrate 3111) and directly illuminating the transmissive field grating 3112, can be used in combination with a second illuminator, providing second input light into an edge-face of substrate 3111 (which may be the same edge-face as used by the first input light) but with the second input light being initially directed forwards towards the redirection grating 3114 and subsequently being reflected back towards the transmissive field grating 3112 such that the first input light illuminates a first region (e.g., an upper half) of the reflective display 3104 and the second input light illuminates a second adjacent region (e.g., a lower half) of the reflective display 3104. Such reflection of the second input light may be achieved by using total internal reflection (TIR) or a reflective grating at a surface of or prior to the redirection grating 3114 (e.g., by an interface between the substrate 3111 and the redirection grating 3114). Alternatively, a partially reflective surface (e.g., a 50:50 or gradient or patterned beamsplitter) can be incorporated into the substrate 3111 to split a single input light 3120 within the substrate 3111 into two beams, including a first beam proceeding directly to the transmissive field grating 3112 with a reduced optical power and a second beam initially proceeding away from the transmissive field grating 3112, also with reduced optical power, and subsequently being directed back towards the transmissive field grating 3112, e.g., by TIR or a reflective grating at a surface of or prior to the redirection grating 3114.

In certain embodiments, the diffraction efficiency of the transmissive field grating 3112 may be patterned such that, when the input light 3120 first encounters a sub-region of the transmissive field grating 3112, only a chosen percentage of the input light 3120 is diffracted out towards the reflective display 3104, while all or part of the remainder of the input light 3120 is reflected back into the substrate 3111. The reflected input light 3120 in the substrate 3111 is further reflected by TIR off, for example, the front surface of the substrate 3111 back towards a second sub-region of the transmissive field grating 3112 which couples out a second portion towards the reflective display 3104 with a diffraction efficiency adjusted such that two such regions of the transmissive field grating 3112 illuminate two corresponding sub-regions of the reflective display 3104 with a substantially similar optical power. The above process can be extended to three or more such sub-regions of the transmissive field grating 3112 and accordingly three or more corresponding sub-regions of the reflective display 3104.

In some embodiments, light not initially diffracted to a reflective display is recycled to illuminate the reflective display. For example, the diffraction efficiency of the transmissive field grating 3112 can be patterned or chosen such that, when the input light 3120 first encounters a first sub-region of the transmissive field grating 3112, only a chosen percentage of such input light 3120 is diffracted out towards the reflective display 3104, while all or part of the remainder of the input light 3120 is reflected back into the substrate 3111. The reflected input light 3120 can eventually make its way (e.g., by TIR within substrate 3111 or via a direct path) to a reflective element attached to or subsequent to an edge face of the substrate 3111 (e.g., a mirror or a reflective grating in place of the absorber 1203 of FIG. 12B) which reflects it back through the substrate 3111 to reilluminate (directly, or after further TIR or diffractive redirections) the first sub-region of the transmissive field grating 3112 or a second sub-region of the transmissive field grating 3112 where the sub-region of the transmissive field grating 3112 diffracts it out towards the reflective display 3104.

In some embodiments, each of sub-regions of the reflective display 3104 is made of an individual display device (e.g., LCoS) or any other reflective display device, and the reflective display 3104 is formed by a tiled array of smaller display devices. This can allow differences in diffraction efficiency and hence in device illumination for each sub-region of the transmissive field grating 3112 to be compensated for by operating such smaller display devices with different reflectivities.

In certain embodiments, a relatively high aspect ratio of the width to the height of the reflective display is used to increase the size of the holographic light field. Because the thickness of the substrate 3111 generally depends on illuminated height of the reflective display 3104 but not on the illuminated width of the reflective display 3104, the thickness of the substrate 3111 does not have to be increased if the aspect ratio of the reflective display 3104 is increased such that its width is increased without necessarily a corresponding increase in its height. For example, rather than the 16:9 aspect ratio of width:height, an aspect ratio of 20:9 may be used. Increasing the aspect ratio of the reflective display 3104 in this manner can increase the size of a holographic light field, because the viewer typically has two eyes in a predominantly horizontal arrangement, affording stereopsis.

In some cases, when multiple viewers observe the holographic light field display at the same time, the viewers are likely to be positioned side-by-side (rather than one looking over the head of the other), so the wider field of view afforded by a high-aspect ratio can be suitable for group viewing. Further, empirically it has been observed that most viewers of holographic light fields, e.g., casual viewers, are more likely to move their heads from side to side rather than up and down, so again a higher aspect ratio with a wider width can be implemented to increase the performance of the system.

In some cases, a useful and pleasing holographic light field display may have a very high aspect ratio (a strip or slit display). A wider aspect ratio can be achieved with a comparatively thin substrate 3111, e.g., if gratings 3112, 3114, 3116, and 3118 are tiled in the horizontal direction.

In general, irrespective of the aspect ratio of the reflective display 3104 (and hence of the substrate 3111 and the gratings 3112, 3114, 3116, and 3118), it is desirable for the width of input light 3110 to be sufficient to illuminate the width of the reflective display 3104 (and the width of the substrate 3111 and the gratings 3112, 3114, 3116, and 3118). For low aspect ratios of the reflective display 3104, the input light 3120 can have a mildly extended rectangular profile or cross-section (or even a square profile or cross-section), which can be implemented by masking or otherwise truncating a sufficiently large circular or elliptical beam profile from the illuminator 3106.

Second Exemplary Method—Using Larger Gratings

If the reflective display 3104 and the substrate 3111 are enlarged, then the transmissive field grating 3112 and the display zero-order redirecting gratings 3114, 3116, and 3118 can also be enlarged to match.

In some embodiments, the transmissive field grating 3112 can be split into two or more regions, each utilizing an input light entering substrate 3111 through a different edge face of the substrate 3111 as noted above.

In certain embodiments, larger gratings 3112, 3114, 3116, and 3118 can be produced by enlarging corresponding optical elements and recording materials of their respective production systems.

In some embodiments, larger gratings 3112, 3114, 3116, and 3118 can be produced by tiled optical-recording, in which sub-regions of each of the gratings can be recorded in sequence using smaller optical elements and full-sized recording materials in a step-and-repeat process. This can allow fore the use of smaller optical components, which are often relatively inexpensive. Additionally or alternatively, this can allow for the use of lower recording powers (e.g., rather than increasing recording exposure durations), which can allow for the use of relatively inexpensive recording laser sources, and/or a relative large range of laser technologies, wavelengths, and vendors available to provide such sources. Such tiled-gratings also may be used to provide multiple regions for enlarging the transmissive field grating 3112 using multiple input lights.

Edges of the tiled sub-regions of gratings can abut each other with a slight gap between the sub-regions of the gratings. Optionally, the sub-regions can join seamlessly, or the sub-regions can overlap slightly or substantially. Combinations of such approaches are possible. In some cases, slight gaps can be invisible or may have low visibility to the viewer. For example, when the holographic light field 3122 occupies optical distances from the viewer which do not include the optical distance of the grating from the viewer, the gaps may be out-of-focus when the viewer's eyes are focused on the holographic light field 3122. In certain cases, slight overlaps may have little or no visibility to the viewer. Substantial overlaps, e.g., a 50% overlap, between two sub-regions of the gratings may be implemented to smooth and/or reduce the visibility of the tiling and/or to improve the net uniformity of the overlapped gratings.

In some cases, to reduce the visibility of such slight gaps or overlaps between the tiled sub-regions of gratings, the sub-regions of gratings can be aligned with gaps between smaller display devices forming the reflective display 3104 as a tiled array of smaller display devices.

In some cases, effectively seamless gratings, with neither a significant gap nor a significant overlap, can be implemented by including one or more edge-defining elements, e.g., a square, a rectangular, or otherwise a plane-tiling aperture, in the optics of the recording reference and/or object beams when recording the gratings for a sub-region, and projecting or re-imaging the edge or edges so formed such that the edges are substantially in a sharp focus within the recording material during the recording of the grating or gratings. Sharply well defined edges can also be achieved, for example, using reflective or transmissive phase masks in the optics of the recording reference and/or object beams when recording the gratings for a sub-region.

In some embodiments, larger gratings 3112, 3114, 3116, and 3118 can be produced using mechanical rather than optical means, e.g., embossed, nano-imprinted, or self-assembled structures, and such mechanically produced gratings can also be tiled in one or more dimensions, e.g., by the use of roller embossing in a roll-to-roll system.

Third Exemplary Method—Controlling Input Light

As noted above, as the aspect ratio of reflective display 3104 is increased, a more extended rectangular profile for the input light 3110 can become desirable, and a more elliptical beam profile from the illuminator 3106 can also become desirable. Because many laser-diodes produce elliptical beams, in some cases, the desired beam profile from the illuminator 3106 can be implemented by rotating the ellipticity of laser diode sources within the illuminator 3106, e.g., by mechanically or optically rotating the laser diode sources within the illuminator 3106.

Because many laser diodes emit substantially polarized light, and because certain other components of the optical device 3110 may perform better for a particular polarization orientation (e.g., may require a particular polarization orientation), it may be desirable to rotate the ellipticity and polarization orientation of light sources within the illuminator 3106 independently, e.g., by using a broad-wavelength-band half-wave retarder to rotate the polarization of all of the input light 3120, or by using individual narrow-wavelength-band half-wave retarders to rotate the polarization of each color of input light 3120, separately. Because the profile or cross-section of the input light 3120 may be quite extensive in both width and height, low cost half-wave plates such as polymer waveplates or liquid-crystal waveplates may be more suitable than high cost half-wave plates fabricated form for example quartz.

In some embodiments, the uniformity of the input light 3120 can be improved by using apodizing optical elements or profile converters, e.g., arrangements of optical elements like lenses or holographic optical elements (HOEs) or integrating rods to effect, for example, Gaussian to top-hat and/or circular to rectangular profile conversion, or by using polarization recycling elements.

In certain embodiments, anamorphic optics can be implemented. The aspect ratio of the reflective display 3104 can be increased to such an extent that the a desired degree of anamophicity of the input light 3120 may exceed a threshold degree which can conveniently be provided by cost effective light sources in the illuminator 3160 without masking off and hence wasting an unacceptable proportion of the light source power. In such cases, the width of the input light 3120 can be further increased by the use of anamorphic optics, e.g., anamorphic lenses or cylindrical lenses, or HOEs performing as anamorphic or cylindrical lenses or mirrors.

Exemplary System

Figure 35A:
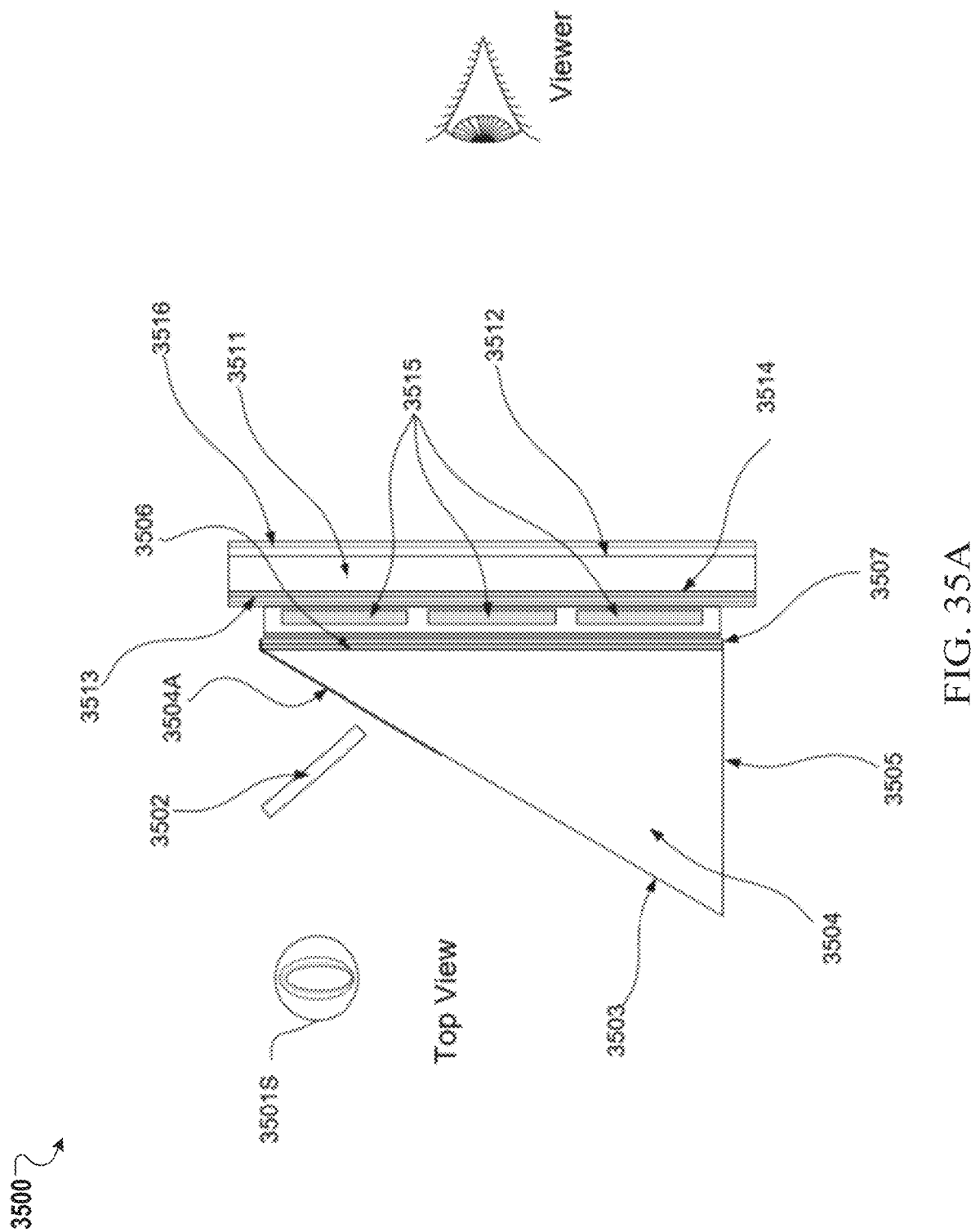
FIGS. 35A-35C illustrate an example of a system for displaying reconstructed 3D objects.
Figure 35B:
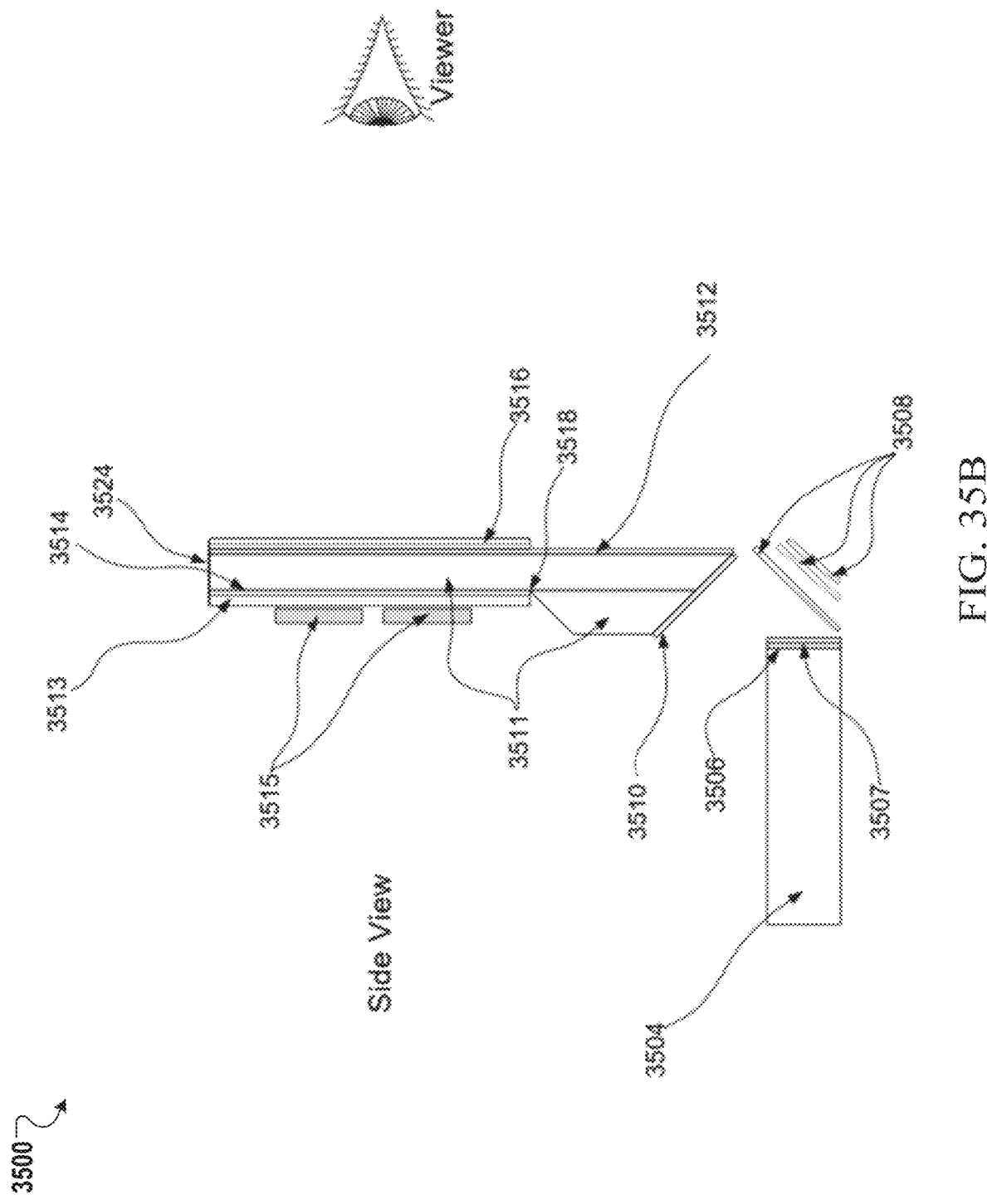
Figure 35C:
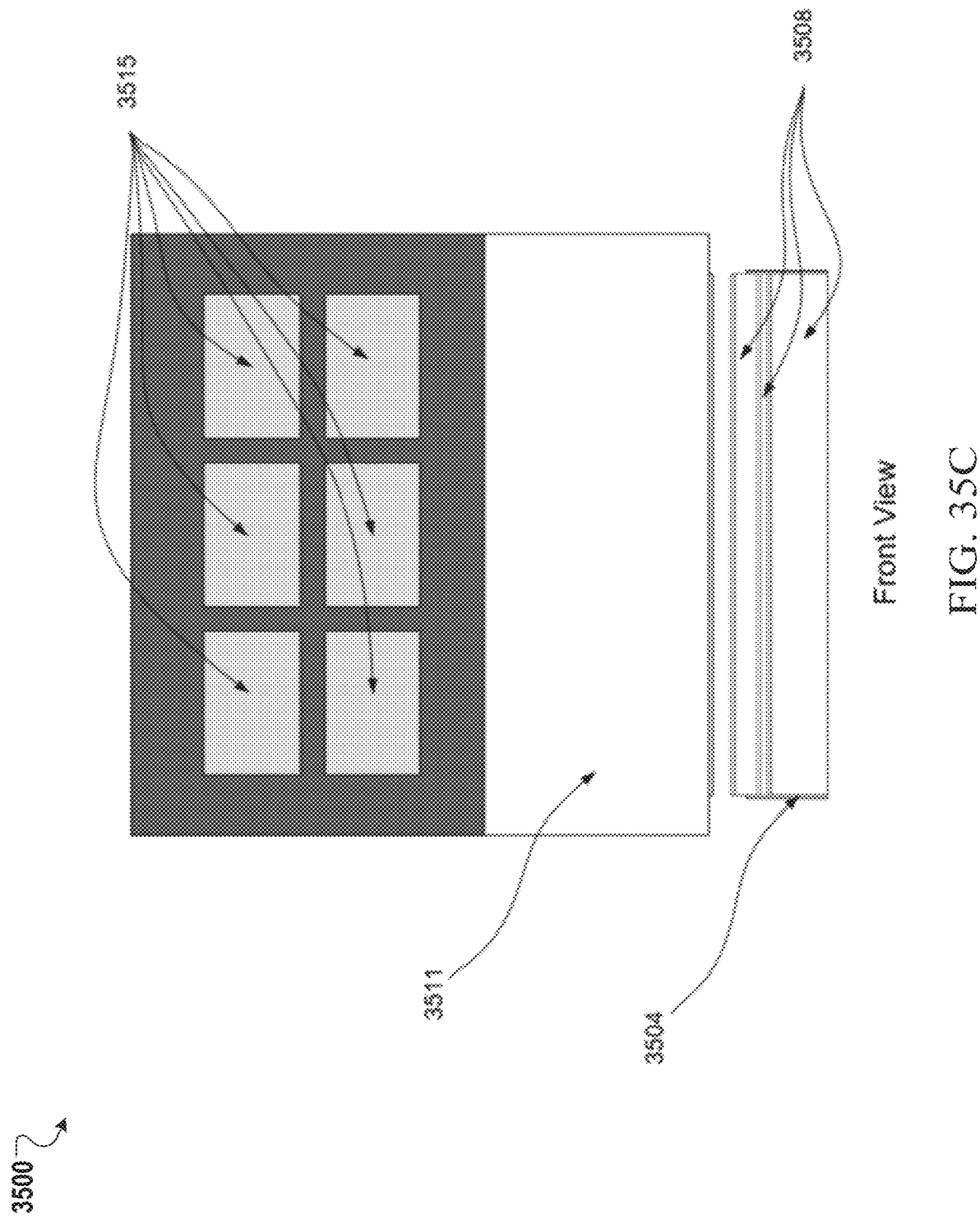
Figure 36A:
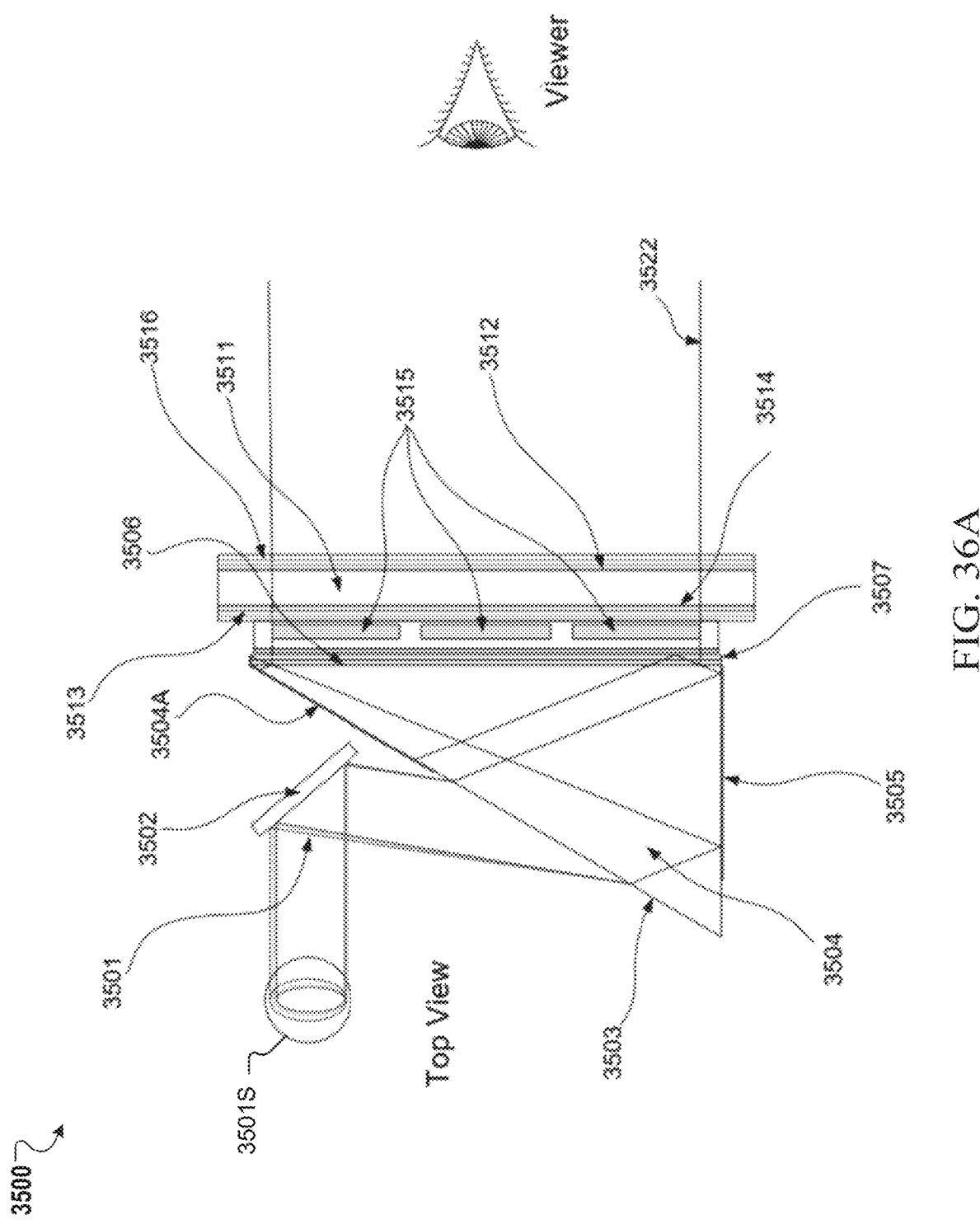
FIGS. 36A-36C illustrate the same views of the system of FIGS. 35A-35C, respectively, but with three colors of light propagate in the system.
Figure 36B:
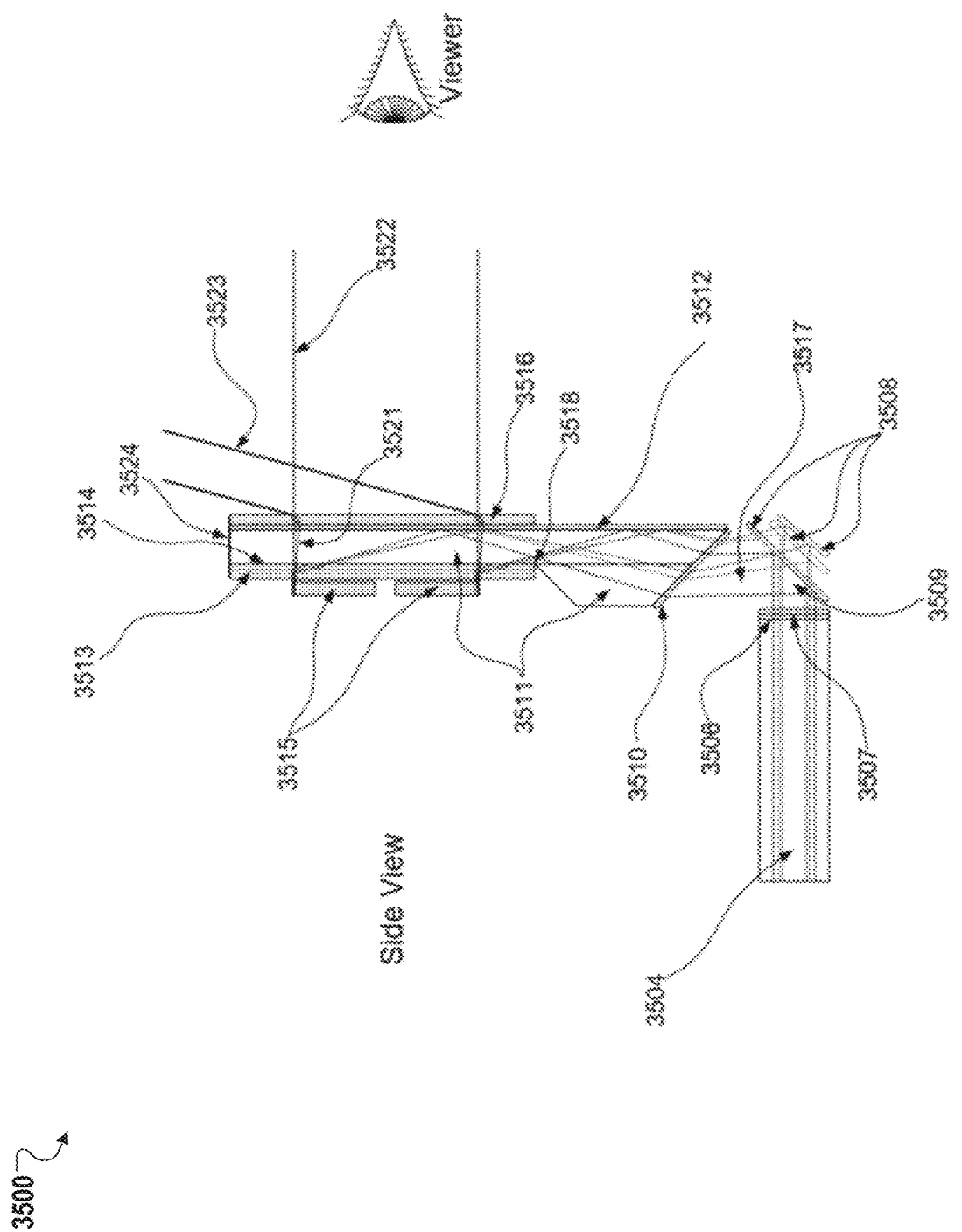
Figure 36C:
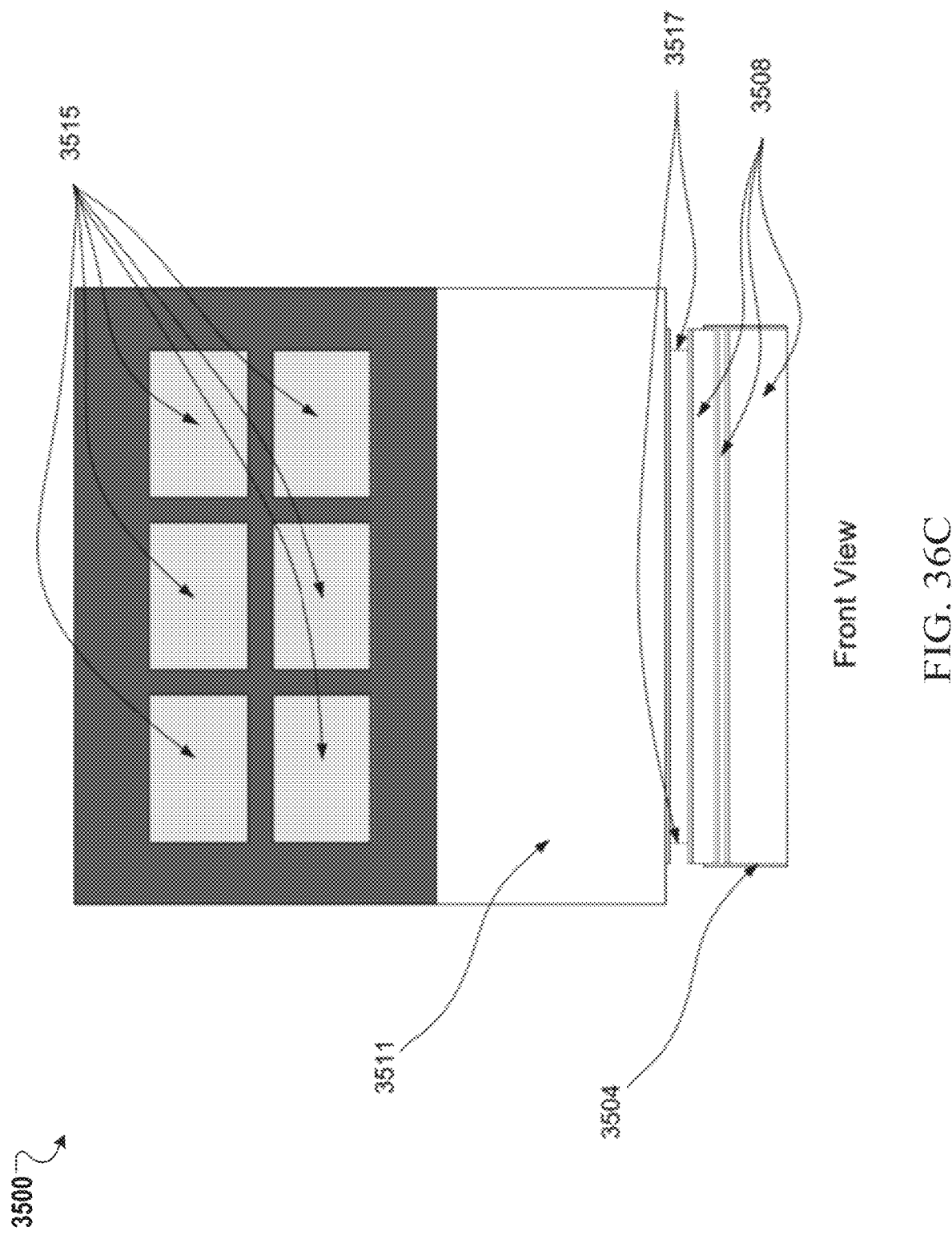

FIGS. 35A-C illustrate an example system 3500 for displaying reconstructed 3D objects. FIGS. 36A-C show the same views of the system 3500 as FIGS. 35A-C, respectively, but with three colors of light (e.g., red, green, blue) propagate through the system 3500.

A rectangular section of substantially-coaxial elliptical beams 3501 (as illustrated in FIG. 36A) from an illuminator 3501S (e.g., made of three laser diodes for three different colors such as red, green, and blue) is reflected off a mirror 3502 and then refracted into a first face 3503 of a prism element 3504. The beams 3501 have a width defined between an upper beam and a lower beam, as illustrated in FIG. 36A. The different colors of light beams refracted into the prism element 3504 can be stacked together along a first direction (e.g., as illustrated in FIG. 36A) and spaced from (or overlapping with) one another along a second direction (e.g., as illustrated in FIG. 36B). A second surface 3505 of the prism element 3504 reflects the beams to a third surface 3506 of the prism element 3504 on which one or more transmissive expansion gratings 3507 are optically stacked (generally, one grating per color). Each expansion grating is illuminated by its corresponding color at a relatively high angle of incidence within the prism element 3504, for example 68°, and is configured to diffract a portion of its illuminating light out towards a series of reflectors 3508. In effect, the gratings 3507 expand the original rectangular section of light beams 3501 from the laser diodes by a substantial factor (e.g., a factor of approximately 6) in one dimension (e.g., in width as illustrated in FIG. 36A). Light beams reflected by the third surface 3506 and/or the expansion gratings 3507 and/or a cover layer applied to the expansion gratings 3507, back into the prism element 3504 can be absorbed by an absorptive layer 3504A applied to a surface of the prism element 3504 (e.g., as illustrated in FIG. 36A).

Because the light incident upon the gratings 3507 is incident at a high angle, the depth of prism element 3504 (e.g., the length of its face 3505, part of which at least is reflective) can be comparatively small. The incidence angle can exceed criticality if the light is incident from air (refractive index ~1.0) upon the gratings 3507 at such a large angle, causing all of the incident light to reflect away from the gratings. In the system 3500, the light is incident from the prism element 3504 that can be made of, for example, glass or acrylic with a high refractive index (e.g., ~1.5), and thus, the incident angle does not exceed the critical angle.

In some embodiments, the reflectors 3508 can include three dichroic reflectors, one per color, or two dichroics and a mirror for one color, or one dichroic reflector for two colors and a mirror for one color, that are arranged in the beam (all three colors) 3509 diffracted out by expansion gratings 3507, to reflect each color into a cover plate 3510 attached to a shaped substrate 3511. Each color of light is incident on the cover plate 3510 at a different angle and over a different region of the cover plate 3510, and is refracted into the cover plate 3510 (and thereafter into the shaped substrate 3511) at such angles that the colors of light subsequently are reflected off, for example, a low-index layer formed on the front face 3512 of the shaped substrate 3511, then diffracted out of three stacked field gratings (one per color) 3513 attached to the back face 3514 of the shaped substrate 3511. All three colors of light are incident on an array of reflective display devices 3515 at substantially the same angle for each color and with each color illuminating substantially the entirety of the reflective area formed by one or more reflective display devices 3515. The reflective display devices reflect and diffract each color back through the field gratings 3513, through the shaped substrate 3511, and into a stack of three stacked display (e.g., LCoS) Zero-order Suppression (LZOS) gratings 3516 (one per color) (elsewhere herein referred to as redirection gratings, e.g., redirection gratings 3114, 3116, and 3118 of FIG. 31A) attached to the front face 3512 of the substrate 3511.

A proportion of each color incident on the reflective display devices 3515 is reflected into a display zero-order beam 3521, and a proportion of each color which is incident upon each display device (e.g., LCoS) is diffracted by each display device into a corresponding holographic light field 3522, e.g., the holographic light field 3220, 3222, 3224 of FIG. 32, which may be seen by a viewer. As discussed elsewhere herein, the display zero-order suppression gratings (or redirection gratings) 3516 are angle-selective transmission gratings which substantially diffract light incident upon them at the display zero-order angle but substantially transmit light incident upon them at greater or lesser angles, separating the reflected display zero-order light from the diffracted holographic light field. The rejected display zero-order light 3523 may exit the front of the redirection gratings at a substantial angle as shown in FIG. 36B, or may be reflected back into the shaped substrate 3511 by TIR or by reflection gratings as described elsewhere herein.

In some embodiments, the tilt angle of the reflective elements 3508 can be adjusted to achieve greater uniformity of diffraction from the transmissive field gratings 3513 (e.g., by causing the transmissive field gratings 3513 to be illuminated at or close to their replay Bragg angles), and/or to achieve greater brightness of diffraction from the transmissive field gratings 3513 (e.g., by causing the transmissive field gratings 3513 to be illuminated at or close to their replay Bragg angles). Such adjustments can be made substantially independently for each color by adjusting the tilt angle of a respective one of the reflective elements 3508.

In some embodiments, the adjustments can be made as a one-off adjustment during manufacture or assembly. Optionally, the adjustments can be made by the user or installer in the field. In certain embodiments, the adjustments can be performed automatically, for example as part of a feedback loop utilizing color and/or brightness sensors to detect and optimize optical properties of the holographic light field, e.g., brightness, uniformity, color uniformity, or white-point. In some cases, the tilt angles of the reflective elements 3508 orthogonal to the tilt angles shown in FIG. 35B are adjusted to optimize the performance of the display system 3500. These approaches can be combined as appropriate.

In some cases, tilt adjustments of the reflective elements 3508 can be used to correct for changes or errors in alignment of the components of the display system caused by factors, e.g., manufacturing and assembly tolerances, shipping, storage, and in-use vibration and shock, thermal expansion and contraction, aging of the gratings, laser-diodes or other wavelength-dependent components, and wavelength shifts of the laser-diodes due to aging, operating temperature, operating duty cycle, and/or part-to-part variations.

In some cases, substantially larger or substantially smaller tilt adjustments of the reflective elements 3508 can be used to maintain alignment even if the angle between the expansion prism 3504 and the shaped substrate 3511 is changed substantially from 90° (as shown in FIG. 35B) for example by tilting or rotating the shaped substrate 3511 backwards or forwards to tilt the holographic light field respectively upwards or downwards.

To achieve relatively uniform illumination on the reflective display 3515, the centers of the beams from the laser diodes can be offset, which can also maintain color uniformity in the holographic light field. Small differences in the path travelled by each color to and from the display devices 3515 (in general, primarily due to chromatic dispersion of the beams), for example at their entry into prism element 3504, can otherwise slightly misalign the concentrations of the three colors. This can also be corrected for by adjusting the diffraction efficiency of the reflective display devices 3515 in a spatially variant manner (e.g., in one or two dimensions). Such adjustment can be made on-the-fly as the diffraction efficiency is a function of computer generated holograms (CGHs), or by utilizing elements before or after the display devices 3515 with constant or adjustable spatially varying transmissivities or absorbances (e.g., in one or two dimensions).

In some cases, input light 3517 (e.g., as illustrated in FIG. 36B) into the substrate 3511 can be p-polarized at the edge surface of the substrate 3511 where the input light 3517 enters the substrate 3511 (or the cover glass 3510 if used) to reduce Fresnel losses at the surface, or the surface can be tilted or anti-reflection coated to reduce such Fresnel losses. A broad-wavelength-band halfwave retarder affixed to the surface or subsequent to the surface can convert such p-polarization to s-polarization if s-polarization light is the required or desired polarization for the transmissive field grating 3513.

In some cases, a broad-wavelength-band retarder positioned between the transmissive field grating 3513 and the reflective display devices 3515 can be used to further adjust the polarization of illumination light upon the reflective display device 3515 to provide the required or desired or optimal polarization state for the reflective display devices 3515. Such a retarder can be affixed to the exit face of the field grating 3513, or to the outer surface of the reflective display devices 3515, or to both, and can be a halfwave plate to provide p-polarization or s-polarization or can be a quarterwave plate to provide circular polarization or can have a retardance of another value, which can also vary spatially and/or temporally and/or by wavelength, to provide optimal polarization at every point on the reflective display devices 3515 for each color. In so far as such a waveplate provides a polarization state, for the reflected holographic light field from the reflective display devices 3515, which may be not the desired or optimal polarization state for subsequent polarization-dependent elements, e.g., redirection gratings 3516. In some cases, one or more further waveplates can be provided prior to such an element or elements with fixed or with spatially or temporally or chromatically varying retardances to further adjust the polarization to satisfy the element or elements.

In some cases, an optical distance between the substrate 3511 and the coupling reflective elements 3508 can be proportionately large to allow the three colors of light to be separated further at their reflections of the reflective elements 3508 so that each color can be reflected by a corresponding reflective element without having to be transmitted through one or two other reflective elements, or even made so large that the three colors of light separate enough to be reflected using three mirrors with no transmissions through other reflective elements.

In certain embodiments, the coupling reflective elements 3508 can be positioned and tilted such that the illumination of each of the reflective elements 3508 comes from a substantially different direction rather than from substantially optically-coaxial laser beams. This may allow the illuminator 3501S to be split into two or three separate illuminators each providing one or two of the three illumination colors, which can be cheaper and/or more efficient than using optics within the illuminator 3501S to combine the light from three laser diodes into a combined white input light which provide input light 3501.

In some embodiments, the shaped substrate 3511 can be formed monolithically, e.g., by computer numerical control (CNC) machined from a larger block of material, can be formed by optically bonding or indexing two or more simpler (and hence more manufacturable) shapes, or can be formed by additive or subtractive manufacturing techniques.

In certain embodiments, the reflective display 3515 (or an array of reflective display devices 3515) with a greater vertical extent can be illuminated by increasing the height of the input light 3517, which is subject to the input light 3517 actually entering the cover glass 3510 (which may be omitted) at the tip of the shaped substrate 3511 that forms a first lower cutoff for display illumination, and subject to the input light 3517 missing a corner 3518 of the shaped substrate 3511 that forms an upper cutoff and a second lower cutoff for display illumination.

In some embodiments, the illumination of the reflective display 3515 is at an angle of approximately 6°, which can be changed to approximately 0° because the transmissive field grating 3513 can also act as a zero-order suppression element, similar to the redirection gratings 3516. In such embodiments, the field grating 3513 can reflect rather than transmit, entrapping specularly-reflected zero-order light from the reflective display 3515 within the shaped substrate 3511, where TIR can guide it up and out of the top of the shaped substrate 3511 or into an absorber 3524 formed thereupon. Using the field grating 3513 at or near 0° in combination with the redirection gratings 10016 can reduce residual display zero-order to a very high degree, e.g., less than 2% residual display zero-order light or even <1%.

In certain embodiments, when one-dimensional suppression gratings are used, the display zero-order suppression appears as a dark band across the reflective display 3515, not a point, with the zero-order of each illumination color just visible as a point of that color within this dark band. If the viewer is more likely to look into the reflective display 3515 from above the normal to the reflective display 3515, as is commonly the case for a desk or table display, then the system can be configured to arrange the band to be above (but, in angular-space, close to) the holographic light field, where it is less likely to be noticed or objectionable, rather than below or on either side of the holographic light field. Similarly, if the viewer is more likely to look into the display from below the normal to the reflective display 3515, then the system can be configured to arrange the band to be below the holographic light field. If most viewers look into the display using two eyes distributed predominantly horizontally, then the band can be arranged at up or below, instead of left or right, of the holographic light field.

In some embodiments in which the illuminator 3501S derives from light sources with spectral bandwidths on an order of a few nm or a few tens of nm, diffraction in the expansion gratings 3505 and the field gratings 3507 can spectrally disperse the illumination light incident upon the reflective display 3515. The illumination light can then exhibit spectral diversity (from the spectral bandwidths of the laser diodes) and spatial diversity (from the dispersion of light from the laser diodes by these gratings, and, to a lesser extent, from the source size of the laser diodes). These multiple orthogonal degrees of diversity can cause significant reduction in visible laser speckle in the holographic light field, compared to those provided just by the spectral and spatial diversity of the laser diodes themselves.

In some embodiments, expansion gratings 3505 can be formed with an optical power such that the expansion gratings 3505 can fully or partially collimate the input light 3501 in one or two transverse directions, reducing or eliminating the need for laser-diode collimation in the illuminator 3501S.

The incidence angles of the input light 3517 upon the cover plate 3510 may be selected such that two or more such incidence angles are substantially equal, and in this case the number of reflective elements 3508 may be reduced since a single such reflective element may suffice to reflect two or more colors. Further, the final reflective element in 3508 may be provided as a reflective coating upon a surface of, or within the substrate of, the previous reflective element, which substrate may be wedged to provide a different reflection angle for this final reflector.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, such as, one or more modules of computer program instructions encoded on a tangible, non-transitory computer-storage medium for execution by, or to control the operation of, data processing apparatus. Alternatively or in addition, the program instructions can be encoded on an artificially generated propagated signal, such as, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus and special purpose logic circuitry may be hardware-based and software-based. The apparatus can optionally include code that creates an execution environment for computer programs, for example, code that constitutes processor firmware, a protocol stack, a database management system, an operating system, or a combination of one or more of them. The present specification contemplates the use of data processing apparatuses with or without conventional operating systems.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as, a CPU, a GPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The main elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD-R, DVD-RAM, and DVD-ROM disks. The memory may store various objects or data, including caches, look-up-tables, classes, frameworks, applications, backup data, jobs, web pages, web page templates, database tables, repositories storing business and dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), holographic or light field display, or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include multiple user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), worldwide interoperability for microwave access (WIMAX), a wireless local area network (WLAN) using, for example, 902.11 a/b/g/n and 902.20, all or a portion of the Internet, and any other communication system or systems at one or more locations. The network may communicate with, for example, internet protocol (IP) packets, frame relay frames, asynchronous transfer mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and software, may interface with each other or the interface using an application programming interface (API) or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in any suitable language providing data in any suitable format. The API and service layer may be an integral or a stand-alone component in relation to other components of the computing system. Moreover, any or all parts of the service layer may be implemented as child or sub-modules of another software module, enterprise application, or hardware module without departing from the scope of this specification.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing may be advantageous and performed as deemed appropriate.

For the sake of brevity, conventional techniques for construction, use, and/or the like of holographic gratings, LCOS devices, and other optical structures and systems may not be described in detail herein. Furthermore, the connecting lines shown in various figures contained herein are intended to represent exemplary functional relationships, signal or optical paths, and/or physical couplings between various elements. It should be noted that many alternative or additional functional relationships, signal or optical paths, or physical connections may be present in an exemplary holographic grating, LCOS, or other optical structure or system, and/or component thereof.

The detailed description of various exemplary embodiments herein makes reference to the accompanying drawings and pictures, which show various exemplary embodiments by way of illustration. While these various exemplary embodiments are described in sufficient detail to enable those skilled in the art to practice the disclosure, it should be understood that other exemplary embodiments may be realized and that logical, optical, and mechanical changes may be made without departing from the spirit and scope of the disclosure. Thus, the detailed description herein is presented for purposes of illustration only and not of limitation. For example, the steps recited in any of the method or process descriptions may be executed in any suitable order and are not limited to the order presented unless explicitly so stated. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps.

As used in this document, "each" refers to each member of a set or each member of a subset of a set. Furthermore, any reference to singular includes plural exemplary embodiments, and any reference to more than one component may include a singular exemplary embodiment. Although specific advantages have been enumerated herein, various exemplary embodiments may include some, none, or all of the enumerated advantages.

Benefits, other advantages, and solutions to problems have been described herein with regard to specific exemplary embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an exemplary embodiment, B alone may be present in an exemplary embodiment, C alone may be present in an exemplary embodiment, or that any combination of the elements A, B and C may be present in a single exemplary embodiment; for example, A and B, A and C, B and C, or A and B and C.

Accordingly, the earlier provided description of example implementations does not define or constrain this specification. Other changes, substitutions, and alterations are also possible without departing from the spirit and scope of this specification.

What is claimed is:

1. A method comprising:
   illuminating a display with light at an incident angle, a portion of the light illuminating display elements of the display, wherein the light comprises a plurality of different colors of light;
   modulating the display elements of the display with a hologram corresponding to holographic data to diffract the portion of the light to form a holographic scene corresponding to the holographic data, wherein the hologram comprises respective control signals for modulating the display elements of the display, and the respective control signals are configured such that, when the display is illuminated with the light, display zero order light comes off the display with a larger deviation angle than the diffracted portion of the light, the display zero order light comprising reflected light from the display; and
   redirecting the display zero order light away from the holographic scene to suppress the display zero order light in the holographic scene by using an optically redirecting component to diffract the display zero order light having a larger redirecting incident angle through the optically redirecting component with a substantially larger diffraction efficiency than the diffracted portion of the light, the larger redirecting incident angle corresponding to the larger deviation angle.

2. The method of claim 1, wherein the diffracted portion of the light forms a reconstruction cone with a viewing angle, and the incident angle is larger than a half of the viewing angle.

3. The method of claim 2, further comprising configuring the hologram such that the diffracted portion of the light forms the reconstruction cone that is same as a corresponding reconstruction cone to be formed by the diffracted portion of the light if the light is normally incident on the display.

4. The method of claim 1, further comprising guiding the light to illuminate the display through an optically diffractive component that is configured to diffract the plurality of different colors of light at the incident angle on the display.

5. The method of claim 1, wherein the optically redirecting component is configured to transmit the diffracted portion of the light to form the holographic scene.

6. The method of claim 5, further comprising guiding the light to illuminate the display by sequentially guiding the plurality of different colors of light to illuminate the display in a series of time periods.

7. The method of claim 6, wherein the optical redirecting component comprises a switchable optically redirecting subcomponent configured to diffract a first color of light at a first state during a first time period and transmit a second color of light at a second state during a second time period.

8. The method of claim 6, wherein the optical redirecting component comprises a switchable optically redirecting subcomponent configured to diffract a first color of light at a first state during a first time period and diffract a second color of light at a second state during a second time period.

9. The method of claim 1, wherein the optical redirecting component comprises a respective optically redirecting subcomponent for each of the plurality of different colors of light.

10. The method of claim 9, wherein the respective optically redirecting subcomponents for the plurality of different colors of light are recorded in a same recording structure.

11. The method of claim 9, wherein the respective optically directing subcomponents for the plurality of different colors of light are recorded in different corresponding recording structures.

12. The method of claim 9, wherein the optical redirecting component is configured to diffract the plurality of different colors of light at different diffraction angles towards different directions in a three-dimensional (3D) space.

13. The method of claim 12, wherein the optical redirecting component is configured to diffract at least one of the plurality of different colors of light to be incident at at least one Brewster's angle at an interface.

14. The method of claim 13, wherein the interface comprises at least one member selected from the group consisting of an interface between a top substrate and a surrounding medium, and an interface between two adjacent substrates.

15. The method of claim 12, wherein the optical redirecting component is configured to diffract a first color of light and a second color of light within a plane, and a third color of light orthogonal to the plane.

16. The method of claim 12, wherein the optical redirecting component comprises at least two different optically redirecting subcomponents configured to diffract a same color of light of the plurality of different colors of light.

17. The method of claim 16, wherein the two different optically redirecting subcomponents are sequentially arranged in the optical redirecting component.

18. The method of claim 9, wherein the plurality of different colors of light comprises a first color of light and a second color of light, the first color of light having a shorter wavelength than the second color of light, and wherein, in the optically redirecting component, a first optically redirecting subcomponent for the first color of light is arranged closer to the display than a second optically redirecting subcomponent for the second color of light.

19. The method of claim 9, wherein the optically redirecting component comprises:
   a first optically redirecting subcomponent configured to diffract a first color of light;
   a second optically redirecting subcomponent configured to diffract a second color of light; and
   at least one optically polarizing device arranged between the first and second optically redirecting subcomponents and configured to convert a polarization state of the first color of light such that the first color of light transmits through the second optically redirecting subcomponent.

20. The method of claim 1, wherein illuminating the display with the light comprises illuminating gaps between adjacent display elements of the display with a second portion of the light, and wherein the display zero order light comprises at least one member selected from the group consisting of: the second portion of the light reflected at the gaps; the second portion of the light diffracted at the gaps; reflected light from the display elements; and reflected right from a display cover covering the display.

21. An optical device comprising:

an optically diffractive component; and an optically redirecting component, wherein the optically diffractive component is configured to diffract light at an incident angle onto a display comprising a plurality of display elements spaced with gaps on the display, the light comprises a plurality of different colors of light, the display is configured to diffract a portion of the light illuminating the display elements, and the optically redirecting component is configured to transmit the portion of the light to form a holographic scene and to redirect display zero order light away from the holographic scene in a three-dimensional (3D) space, the display zero order light comprising reflected light from the display, and wherein the optical device is configured such that the display zero order light is incident on the optically redirecting component at a redirecting incident angle larger than that of the diffracted portion of the light, and the optically redirecting component is configured to diffract the display zero order light through the optically redirecting component with a substantially larger diffraction efficiency than the diffracted portion of the light.

22. The optical device of claim 21, wherein the optical redirecting component is configured to diffract display zero order light of the plurality of different colors of light reflected by the display at different diffraction angles towards different directions in the 3D space, the display zero order light comprising reflected light of the plurality of different colors of light by the display.

23. The optical device of claim 22, wherein the optical diffractive component comprises a plurality of holographic gratings for the plurality of different colors of light, and each of the plurality of holographic gratings is configured to diffract a respective color of light of the plurality of different colors of light at the incident angle on the display.

24. The optical device of claim 22, wherein the optical redirecting component comprises a plurality of redirecting holographic grating for the display zero order light of the plurality of different colors of light, and each of the plurality of redirecting holographic gratings is configured to diffract display zero order light of a respective color of light of the plurality of different colors of light at a respective diffractive angle towards a respective direction in the 3D space.

25. The optical device of claim 24, wherein the optical redirecting component comprises at least two different redirecting holographic gratings configured to diffract display zero order light of a same color of light of the plurality of different colors of light.

26. The optical device of claim 24, wherein the optical redirecting component comprises a switchable redirecting holographic grating configured to diffract a first color of light at a first state during a first time period and transmit or diffract a second color of light at a second state during a second time period.

27. The optical device of claim 24, wherein the plurality of different colors of light comprises a first color of light and a second color of light, the first color of light having a shorter wavelength than the second color of light, and wherein, in the optically redirecting component, a first redirecting holographic grating for the first color of light is arranged closer to the display than a second redirecting holographic grating for the second color of light.

28. The optical device of claim 24, wherein fringe planes of at least two redirecting holographic gratings for at least two different colors of light are oriented substantially differently.

29. The optical device of claim 24, wherein the optically redirecting component comprises:

a first redirecting holographic grating configured to diffract a first color of light;

a second redirecting holographic grating configured to diffract a second color of light; and at least one optical polarizing device arranged between the first and second redirecting holographic gratings and configured to convert a polarization state of the first color of light such that the first color of light transmits through the second redirecting holographic grating.

30. A system comprising:

a display comprising display elements separated with gaps on the display; and an optical device comprising:

an optically diffractive component; and an optically redirecting component, wherein the optically diffractive component is configured to diffract light at an incident angle onto a display comprising a plurality of display elements spaced with gaps on the display, and wherein the light comprises a plurality of different colors of light, wherein the display is configured to diffract a portion of the light illuminating the display elements, wherein the optically redirecting component is configured to transmit the portion of the light to form a holographic scene and to redirect display zero order light away from the holographic scene in a three-dimensional (3D) space, the display zero order light comprising reflected light from the display, wherein the optical device is configured such that the display zero order light is incident on the optically redirecting component at a redirecting incident angle larger than that of the diffracted portion of the light, and the optically redirecting component is configured to diffract the display zero order light through the optically redirecting component with a substantially larger diffraction efficiency than the diffracted portion of the light, and wherein the optical redirecting component is configured to diffract display zero order light of the plurality of different colors of light reflected by the display at different diffraction angles towards different directions in the 3D space, the display zero order light comprising reflected light of the plurality of different colors of light by the display.

\* \* \* \* \*